US010013564B2

(12) United States Patent
Holman et al.

(10) Patent No.: US 10,013,564 B2
(45) Date of Patent: Jul. 3, 2018

(54) METHODS, SYSTEMS, AND DEVICES FOR HANDLING IMAGE CAPTURE DEVICES AND CAPTURED IMAGES

(71) Applicant: Elwha LLC, Bellevue, WA (US)

(72) Inventors: Pablos Holman, Seattle, WA (US); Roderick A. Hyde, Redmond, WA (US); Royce A. Levien, Lexington, MA (US); Richard T. Lord, Gig Harbor, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/219,493

(22) Filed: Mar. 19, 2014

(65) Prior Publication Data

US 2015/0104006 A1    Apr. 16, 2015

Related U.S. Application Data

(63) Continuation of application No. 14/219,444, filed on Mar. 19, 2014, now abandoned, which is a continuation-in-part of application No. 14/051,213, filed on Oct. 10, 2013, and a continuation-in-part of application No. 14/055,471, filed on Oct. 16, 2013, now abandoned, and a continuation-in-part of application No. 14/055,543, filed on Oct. 16, 2013, now abandoned, and a continuation-in-part of
(Continued)

(51) Int. Cl.
*G06F 21/60* (2013.01)
*G06F 21/62* (2013.01)

(52) U.S. Cl.
CPC ........ *G06F 21/602* (2013.01); *G06F 21/6209* (2013.01)

(58) Field of Classification Search
CPC .................................................... G06F 21/602
USPC .......................................................... 713/171
See application file for complete search history.

(56) References Cited

U.S. PATENT DOCUMENTS

| 5,644,727 A | 7/1997 | Atkins |
| 5,862,217 A | 1/1999 | Steinberg et al. |

(Continued)

FOREIGN PATENT DOCUMENTS

| JP | 2009188922 A | 8/2009 |
| JP | 2009288245 A | 12/2009 |

OTHER PUBLICATIONS

Ashok et al., "Do Not Share! Invisible Light Beacons for Signaling Preferences to Privacy-Respecting Cameras", 2014.*
(Continued)

*Primary Examiner* — O. C. Vostal

(57) ABSTRACT

Computationally implemented methods and systems include acquiring an encrypted image that is a captured image that has been encrypted through use of a particular device code associated with an image capture device that captured the captured image, wherein the captured image includes a representation of a feature of an entity, decrypting the acquired encrypted image that was encrypted through use of the particular device code, and performing a validation detection operation to detect a privacy beacon associated with the entity in the decrypted captured image. In addition to the foregoing, other aspects are described in the claims, drawings, and text.

39 Claims, 70 Drawing Sheets

Related U.S. Application Data application No. 14/084,254, filed on Nov. 19, 2013, now abandoned, and a continuation-in-part of application No. 14/084,579, filed on Nov. 19, 2013, and a continuation-in-part of application No. 14/084,581, filed on Nov. 19, 2013, and a continuation-in-part of application No. 14/084,591, filed on Nov. 19, 2013, now abandoned, and a continuation-in-part of application No. 14/108,077, filed on Dec. 16, 2013, now abandoned, and a continuation-in-part of application No. 14/108,107, filed on Dec. 16, 2013, and a continuation-in-part of application No. 14/108,185, filed on Dec. 16, 2013, and a continuation-in-part of application No. 14/108,217, filed on Dec. 16, 2013, now abandoned, and a continuation-in-part of application No. 14/109,682, filed on Dec. 17, 2013, and a continuation-in-part of application No. 14/109,726, filed on Dec. 17, 2013, now abandoned, and a continuation-in-part of application No. 14/145,873, filed on Dec. 31, 2013, now abandoned, and a continuation-in-part of application No. 14/145,886, filed on Dec. 31, 2013, now abandoned, and a continuation-in-part of application No. 14/148,523, filed on Jan. 6, 2014, and a continuation-in-part of application No. 14/148,560, filed on Jan. 6, 2014, and a continuation-in-part of application No. 14/185,741, filed on Feb. 20, 2014, now abandoned, and a continuation-in-part of application No. 14/186,528, filed on Feb. 21, 2014, and a continuation-in-part of application No. 14/218,746, filed on Mar. 18, 2014, now abandoned, and a continuation-in-part of application No. 14/218,790, filed on Mar. 18, 2014, now Pat. No. 9,799,036.

(56) References Cited

U.S. PATENT DOCUMENTS

| | | | | |
|---|---|---|---|---|
| 6,067,399 | A | 5/2000 | Berger | |
| 6,178,243 | B1 | 1/2001 | Pomerantz et al. | |
| 6,424,727 | B1 | 7/2002 | Musgrave et al. | |
| 6,456,985 | B1* | 9/2002 | Ohtsuka | H04N 1/4486 380/243 |
| 6,526,158 | B1 | 2/2003 | Goldberg | |
| 6,532,541 | B1 | 3/2003 | Chang et al. | |
| 6,600,823 | B1* | 7/2003 | Hayosh | G06Q 20/042 380/51 |
| 6,727,935 | B1 | 4/2004 | Allen et al. | |
| 6,765,608 | B1 | 7/2004 | Himeda et al. | |
| 6,775,775 | B1* | 8/2004 | Yoshiura | G06Q 20/3672 705/66 |
| 6,968,058 | B1 | 11/2005 | Kondoh et al. | |
| 7,013,288 | B1 | 3/2006 | Reifel et al. | |
| 7,036,019 | B1 | 4/2006 | Saito | |
| 7,117,519 | B1 | 10/2006 | Anderson et al. | |
| 7,603,321 | B2 | 10/2009 | Gurvey | |
| 7,663,670 | B1 | 2/2010 | Orboubadian | |
| 7,864,218 | B2 | 1/2011 | Kusaka et al. | |
| 8,085,995 | B2 | 12/2011 | Yagnik | |
| 8,126,190 | B2 | 2/2012 | Jung et al. | |
| 8,301,505 | B2 | 10/2012 | Farouki et al. | |
| 8,302,169 | B1 | 10/2012 | Presotto et al. | |
| 8,391,825 | B2 | 3/2013 | Arseneau et al. | |
| 8,412,602 | B2 | 4/2013 | Paz-Pujalt | |
| 8,468,097 | B2 | 6/2013 | Alrabady et al. | |
| 8,497,912 | B2 | 7/2013 | Wun | |
| 8,620,800 | B1 | 12/2013 | Micaelian et al. | |
| 8,824,861 | B2 | 9/2014 | Gentile et al. | |
| 8,831,299 | B2 | 9/2014 | Kurtz et al. | |
| 8,854,465 | B1* | 10/2014 | McIntyre | B60R 25/1004 348/148 |
| 8,898,468 | B2 | 11/2014 | Reddy et al. | |
| 9,065,979 | B2 | 6/2015 | Cohen et al. | |
| 9,083,937 | B1 | 7/2015 | Oliphant | |
| 9,360,990 | B1 | 6/2016 | Emigh et al. | |
| 9,426,345 | B1 | 8/2016 | Turner, Jr. et al. | |
| 9,621,628 | B1* | 4/2017 | Benton | H04L 67/06 |
| 2001/0052037 | A1 | 12/2001 | Terasaki et al. | |
| 2002/0001395 | A1 | 1/2002 | Davis et al. | |
| 2002/0038076 | A1 | 3/2002 | Sheehan et al. | |
| 2002/0057915 | A1* | 5/2002 | Mann | E03C 1/057 396/661 |
| 2002/0065779 | A1 | 5/2002 | Dutta | |
| 2002/0088000 | A1 | 7/2002 | Morris | |
| 2002/0114452 | A1* | 8/2002 | Hamilton | H04N 1/32101 380/42 |
| 2002/0120589 | A1 | 8/2002 | Aoki | |
| 2002/0164048 | A1 | 11/2002 | Bruckstein et al. | |
| 2003/0037138 | A1 | 2/2003 | Brown et al. | |
| 2003/0069788 | A1 | 4/2003 | Han | |
| 2003/0098776 | A1* | 5/2003 | Friedli | B66B 1/468 340/5.8 |
| 2003/0179407 | A1 | 9/2003 | Herr | |
| 2003/0231769 | A1 | 12/2003 | Bolle et al. | |
| 2004/0075749 | A1 | 4/2004 | Kondo et al. | |
| 2004/0096002 | A1 | 5/2004 | Zdepski et al. | |
| 2004/0120522 | A1* | 6/2004 | Takeda | G03G 21/04 380/201 |
| 2004/0152485 | A1 | 8/2004 | Deeds | |
| 2004/0162981 | A1 | 8/2004 | Wong | |
| 2004/0201751 | A1* | 10/2004 | Bell | H04N 5/772 348/231.99 |
| 2004/0202382 | A1 | 10/2004 | Pilu | |
| 2004/0204238 | A1 | 10/2004 | Aoki | |
| 2004/0204985 | A1 | 10/2004 | Gibson et al. | |
| 2004/0227634 | A1 | 11/2004 | Caulfield et al. | |
| 2004/0249709 | A1 | 12/2004 | Donovan et al. | |
| 2004/0260614 | A1 | 12/2004 | Taratino et al. | |
| 2005/0008226 | A1 | 1/2005 | Aoki | |
| 2005/0010776 | A1 | 1/2005 | Kenen et al. | |
| 2005/0049971 | A1 | 3/2005 | Bettinger | |
| 2005/0060545 | A1* | 3/2005 | Mont | H04L 9/0847 713/165 |
| 2005/0066187 | A1 | 3/2005 | Peinado et al. | |
| 2005/0093980 | A1 | 5/2005 | Nonaka et al. | |
| 2005/0096979 | A1 | 5/2005 | Koningstein | |
| 2005/0111660 | A1 | 5/2005 | Hosoda | |
| 2005/0196013 | A1 | 9/2005 | Rhoads | |
| 2005/0206960 | A1 | 9/2005 | Shibata | |
| 2005/0223045 | A1 | 10/2005 | Funahashi et al. | |
| 2005/0226413 | A1 | 10/2005 | Wada | |
| 2005/0243265 | A1 | 11/2005 | Winlow et al. | |
| 2005/0262201 | A1* | 11/2005 | Rudolph | H04L 12/1827 709/205 |
| 2005/0275720 | A1 | 12/2005 | Noguchi | |
| 2006/0028558 | A1 | 2/2006 | Sato et al. | |
| 2006/0044599 | A1 | 3/2006 | Lipowitz et al. | |
| 2006/0075235 | A1* | 4/2006 | Renkis | G08B 13/19621 713/171 |
| 2006/0104483 | A1* | 5/2006 | Harel | G07C 9/00158 382/115 |
| 2006/0135233 | A1 | 6/2006 | Willis et al. | |
| 2006/0170767 | A1 | 8/2006 | Brassil | |
| 2006/0206911 | A1 | 9/2006 | Kim et al. | |
| 2006/0287813 | A1 | 12/2006 | Quigley | |
| 2007/0011186 | A1 | 1/2007 | Horner et al. | |
| 2007/0040654 | A1 | 2/2007 | Lee et al. | |
| 2007/0057763 | A1* | 3/2007 | Blattner | G06F 3/03543 340/5.52 |
| 2007/0061267 | A1 | 3/2007 | Saito | |
| 2007/0067626 | A1 | 3/2007 | Briancon et al. | |
| 2007/0086626 | A1* | 4/2007 | Mariani | G06K 9/00228 382/115 |
| 2007/0112968 | A1* | 5/2007 | Schwab | G07C 9/00079 709/229 |
| 2007/0115350 | A1 | 5/2007 | Currivan et al. | |
| 2007/0153091 | A1 | 7/2007 | Watlington et al. | |
| 2007/0172155 | A1 | 7/2007 | Guckenberger | |
| 2007/0174321 | A1 | 7/2007 | Viikari et al. | |
| 2007/0192872 | A1 | 8/2007 | Rhoads et al. | |

(56) References Cited

U.S. PATENT DOCUMENTS

| | | | |
|---|---|---|---|
| 2007/0255962 A1 | 11/2007 | Lu et al. | |
| 2007/0291155 A1 | 12/2007 | Kawaguchi et al. | |
| 2007/0296817 A1 | 12/2007 | Ebrahimi et al. | |
| 2007/0297610 A1 | 12/2007 | Chen et al. | |
| 2008/0031446 A1 | 2/2008 | Suga | |
| 2008/0059255 A1 | 3/2008 | Birkby | |
| 2008/0071770 A1 | 3/2008 | Schloter et al. | |
| 2008/0117295 A1 | 5/2008 | Ebrahimi et al. | |
| 2008/0181533 A1 | 7/2008 | Jung et al. | |
| 2008/0195664 A1 | 8/2008 | Maharajh et al. | |
| 2008/0222127 A1 | 9/2008 | Bergin | |
| 2008/0228821 A1 | 9/2008 | Mick et al. | |
| 2008/0239096 A1 | 10/2008 | Shasa | |
| 2008/0267403 A1 | 10/2008 | Boult | |
| 2008/0270802 A1 | 10/2008 | Ashley et al. | |
| 2008/0275763 A1 | 11/2008 | Tran et al. | |
| 2008/0297586 A1* | 12/2008 | Kurtz | H04N 7/147 348/14.08 |
| 2008/0297587 A1 | 12/2008 | Kurtz et al. | |
| 2008/0297588 A1 | 12/2008 | Kurtz et al. | |
| 2008/0297589 A1 | 12/2008 | Kurtz et al. | |
| 2008/0298571 A1 | 12/2008 | Kurtz et al. | |
| 2008/0313226 A1 | 12/2008 | Bowden et al. | |
| 2009/0021591 A1 | 1/2009 | Sako | |
| 2009/0037515 A1* | 2/2009 | Zapata | H04L 43/0811 709/202 |
| 2009/0037949 A1 | 2/2009 | Birch | |
| 2009/0070206 A1 | 3/2009 | Sengamedu, Sr. | |
| 2009/0122149 A1 | 5/2009 | Ishii | |
| 2009/0132435 A1 | 5/2009 | Titus et al. | |
| 2009/0150210 A1 | 6/2009 | Athsani et al. | |
| 2009/0193055 A1 | 7/2009 | Kuberka et al. | |
| 2009/0203361 A1 | 8/2009 | Huang et al. | |
| 2009/0216769 A1 | 8/2009 | Bellwood et al. | |
| 2009/0245512 A1* | 10/2009 | Masui | G09C 5/00 380/54 |
| 2009/0249443 A1* | 10/2009 | Fitzgerald | H04L 63/10 726/2 |
| 2009/0254572 A1 | 10/2009 | Redlich et al. | |
| 2009/0257589 A1 | 10/2009 | Yokota et al. | |
| 2009/0285506 A1 | 11/2009 | Benson et al. | |
| 2010/0002084 A1 | 1/2010 | Hattori et al. | |
| 2010/0024045 A1 | 1/2010 | Sastry et al. | |
| 2010/0052852 A1 | 3/2010 | Mohanty | |
| 2010/0082990 A1* | 4/2010 | Grigorovitch | H04W 12/06 713/176 |
| 2010/0088686 A1 | 4/2010 | Langworthy et al. | |
| 2010/0094878 A1 | 4/2010 | Soroca et al. | |
| 2010/0110095 A1 | 5/2010 | Sekiguchi et al. | |
| 2010/0124363 A1 | 5/2010 | Ek et al. | |
| 2010/0149782 A1 | 6/2010 | Smith, Jr. et al. | |
| 2010/0163687 A1* | 7/2010 | Brand | B61L 3/127 246/117 |
| 2010/0182447 A1 | 7/2010 | Namba et al. | |
| 2010/0201498 A1 | 8/2010 | Griffin | |
| 2010/0278453 A1 | 11/2010 | King | |
| 2010/0287048 A1 | 11/2010 | Ramer et al. | |
| 2010/0289920 A1 | 11/2010 | Mizuno | |
| 2010/0316222 A1* | 12/2010 | Inami | G06T 1/0021 380/277 |
| 2010/0317420 A1 | 12/2010 | Hoffberg | |
| 2010/0323608 A1 | 12/2010 | Sanhedrai et al. | |
| 2010/0333152 A1 | 12/2010 | Redmann et al. | |
| 2011/0019033 A1 | 1/2011 | Asa et al. | |
| 2011/0019816 A1* | 1/2011 | Inami | G06F 21/608 380/28 |
| 2011/0035275 A1 | 2/2011 | Frankel et al. | |
| 2011/0082902 A1 | 4/2011 | Rottler et al. | |
| 2011/0096922 A1 | 4/2011 | Oya | |
| 2011/0109792 A1 | 5/2011 | Montag | |
| 2011/0129120 A1 | 6/2011 | Chan | |
| 2011/0138183 A1 | 6/2011 | Reddy et al. | |
| 2011/0145574 A1 | 6/2011 | Ju et al. | |
| 2011/0184814 A1 | 7/2011 | Konkol et al. | |
| 2011/0234829 A1 | 9/2011 | Gagvani et al. | |
| 2011/0234841 A1 | 9/2011 | Akeley et al. | |
| 2011/0292230 A1 | 12/2011 | Winters | |
| 2011/0292231 A1 | 12/2011 | Winters | |
| 2011/0317922 A1 | 12/2011 | Chertok et al. | |
| 2012/0013631 A1 | 1/2012 | Hughes | |
| 2012/0045095 A1 | 2/2012 | Tate et al. | |
| 2012/0054029 A1 | 3/2012 | Trice et al. | |
| 2012/0054838 A1 | 3/2012 | Kim et al. | |
| 2012/0056546 A1 | 3/2012 | Harvey | |
| 2012/0058747 A1 | 3/2012 | Yiannios et al. | |
| 2012/0087589 A1 | 4/2012 | Chang-Tsun et al. | |
| 2012/0095922 A1 | 4/2012 | Wada | |
| 2012/0121084 A1 | 5/2012 | Tomlinson et al. | |
| 2012/0131471 A1 | 5/2012 | Terlouw et al. | |
| 2012/0154418 A1 | 6/2012 | Mikawa | |
| 2012/0215811 A1 | 8/2012 | Tipper et al. | |
| 2012/0233000 A1 | 9/2012 | Fisher et al. | |
| 2012/0237908 A1* | 9/2012 | Fitzgerald | G06F 21/88 434/236 |
| 2012/0249550 A1 | 10/2012 | Akeley et al. | |
| 2012/0259776 A1* | 10/2012 | Bajaj | G06Q 40/02 705/42 |
| 2012/0317227 A1 | 12/2012 | Bettinger | |
| 2012/0321143 A1* | 12/2012 | Krupka | G06K 9/00677 382/118 |
| 2013/0073359 A1 | 3/2013 | Caplan | |
| 2013/0078962 A1* | 3/2013 | Clarke | H04M 1/6041 455/414.1 |
| 2013/0088616 A1 | 4/2013 | Ingrassia, Jr. | |
| 2013/0093913 A1 | 4/2013 | Okumura et al. | |
| 2013/0095924 A1 | 4/2013 | Geisner et al. | |
| 2013/0096873 A1 | 4/2013 | Rosengaus et al. | |
| 2013/0156331 A1 | 6/2013 | Kurabayashi et al. | |
| 2013/0169781 A1 | 7/2013 | Hanina et al. | |
| 2013/0169853 A1 | 7/2013 | Luong | |
| 2013/0182917 A1 | 7/2013 | Kritt et al. | |
| 2013/0191211 A1 | 7/2013 | Nichols et al. | |
| 2013/0198280 A1 | 8/2013 | Liu et al. | |
| 2013/0217332 A1* | 8/2013 | Altman | H04H 60/90 455/41.2 |
| 2013/0232012 A1 | 9/2013 | Yan et al. | |
| 2013/0246692 A1 | 9/2013 | Macor | |
| 2013/0262314 A1* | 10/2013 | Butler | G06Q 30/04 705/50 |
| 2013/0262588 A1 | 10/2013 | Barak et al. | |
| 2013/0269013 A1 | 10/2013 | Parry et al. | |
| 2013/0275232 A1 | 10/2013 | Oh et al. | |
| 2013/0283061 A1 | 10/2013 | Jeong | |
| 2013/0305383 A1* | 11/2013 | Garralda | G06Q 30/00 726/26 |
| 2013/0342699 A1 | 12/2013 | Hansen | |
| 2014/0016107 A1 | 1/2014 | Coulson | |
| 2014/0036088 A1 | 2/2014 | Gabriel | |
| 2014/0049653 A1* | 2/2014 | Leonard | G06T 1/0042 348/207.1 |
| 2014/0051946 A1 | 2/2014 | Arne et al. | |
| 2014/0101197 A1 | 4/2014 | Charytoniuk | |
| 2014/0101456 A1 | 4/2014 | Meunier et al. | |
| 2014/0112534 A1 | 4/2014 | Sako et al. | |
| 2014/0122889 A1 | 5/2014 | Freund et al. | |
| 2014/0139680 A1 | 5/2014 | Huang et al. | |
| 2014/0140575 A1 | 5/2014 | Wolf | |
| 2014/0142868 A1* | 5/2014 | Bidaud | G01N 21/8803 702/40 |
| 2014/0160248 A1 | 6/2014 | Pomerantz et al. | |
| 2014/0160250 A1 | 6/2014 | Pomerantz et al. | |
| 2014/0168272 A1 | 6/2014 | Chedeau et al. | |
| 2014/0173648 A1 | 6/2014 | Ball et al. | |
| 2014/0176663 A1 | 6/2014 | Cutler et al. | |
| 2014/0176733 A1 | 6/2014 | Drooker et al. | |
| 2014/0177830 A1 | 6/2014 | Gajek | |
| 2014/0196152 A1 | 7/2014 | Ur et al. | |
| 2014/0201527 A1 | 7/2014 | Krivorot | |
| 2014/0201844 A1 | 7/2014 | Buck | |
| 2014/0245452 A1 | 8/2014 | Hurwitz et al. | |
| 2014/0247272 A1* | 9/2014 | Sako | H04N 5/23293 345/589 |

(56) References Cited

U.S. PATENT DOCUMENTS

| | | | |
|---|---|---|---|
| 2014/0263623 | A1 | 9/2014 | Robison et al. |
| 2014/0278403 | A1 | 9/2014 | Jacob et al. |
| 2014/0280533 | A1 | 9/2014 | Chedeau et al. |
| 2014/0294293 | A1 | 10/2014 | Yamamura |
| 2014/0344948 | A1 | 11/2014 | Hayato et al. |
| 2014/0363143 | A1 | 12/2014 | Dharssi et al. |
| 2015/0016799 | A1* | 1/2015 | Park ................. G06Q 10/10 386/224 |
| 2015/0032535 | A1 | 1/2015 | Li et al. |
| 2015/0035999 | A1 | 2/2015 | Shehane et al. |
| 2015/0049487 | A1 | 2/2015 | Connor |
| 2015/0058229 | A1 | 2/2015 | Wiacek et al. |
| 2015/0104103 | A1 | 4/2015 | Candelore |
| 2015/0113661 | A1 | 4/2015 | Mishra |
| 2015/0178565 | A1 | 6/2015 | Rivlin et al. |
| 2016/0171244 | A1 | 6/2016 | Ur et al. |
| 2016/0188635 | A1 | 6/2016 | Shah et al. |
| 2016/0232375 | A1 | 8/2016 | Loeb et al. |
| 2017/0126630 | A1 | 5/2017 | Ekambaram et al. |

OTHER PUBLICATIONS

Merrieam-Webster, "circuitry", 2017.*
Yamada et al., "Use of Invisible Noise Signals to Prevent Privacy Invasion through Face Recognition from Camera Images", 2012.*
PCT International Search Report; International App. No. PCT/US2014/060148; dated Mar. 31, 2015; pp. 1-4.
Gao, Yongsheng et al., "Face Recognition Using Line Edge Map," IEEE Transactions on Pattern Analysis and Machine Intelligence, vol. 24, No. 6, Jun. 2002, pp. 764-779.
Kim, Dong-Ju et al., "Face Recognition via Local Directional Pattern," International Journal of Security and Its Applications, vol. 7, No. 2, Mar. 2013, pp. 191-200.
Kodate, Kashiko et al., "Compact Parallel Optical Correlator for Face Recognition, and Its Application," Face Recognition, Kresimir Delac and Mislay Grgic (Ed.), ISBN: 978-3-902613-03-5, InTech,Available from: http://www.intechopen.com/books/face_recognition/compact_parallel_optical_correlator_for_face_recognition_and_its_application, Jun. 2007, pp. 235-249.
Krawczyk, H. et al., "HMAC-based Extract-and-Expand Key Derivation Function (HKDF)," Internet Engineering Task Force (IETF), Request for Comments: 5869, May 2010, 15 pages.
Vander Lugt, A.B., "Signal Detection by Complex Spatial Filtering," Report of Project Michigan, Institute of Science and Technology, The University of Michigan, Jul. 1963, 56 pages.
PCT International Search Report; International App. No. PCT/US2014/060141; dated Jan. 16, 2015; pp. 1-4.
"Liquidated damages"; Wikipedia; bearing a date of May 4, 2011; printed on Jan. 12, 2017; pp. 1-2 located at: http://en.wikipedia.org/wiki/Liquidated_damages.
Ashok et al.; "Do Not Share! Invisible Light Beacons for Signaling Preferences to Privacy-Respecting Cameras"; VLCS'14; Sep. 7, 2014; pp. 1-6; ACM.
Chattopadhyay et al.; "PrivacyCam: a Privacy Preserving Camera Using uCLinux on the Blackfin DSP"; IEEE Workshop on Embedded Vision Systems; Jun. 2007; pp. 1-8; IEEE.
Kapadia et al. "Virtual Walls: Protecting Digital Privacy in Pervasive Environments"; Pervasive; 2007; pp. 162-179; Springer-Verlag, Berlin Heidelberg, Germany.
Könings et al; "PriFi Beacons: Piggybacking Privacy Implications on WiFi Beacons"; UbiComp '13; Sep. 8-12, 2013; pp. 83-86; ACM; Zurich, Switzerland.
Laibowitz et al.; "Wearable Sensing for Dynamic Management of Dense Ubiquitous Media"; IEEE; 2009; pp. 1-6.
Pidcock et al; "NotiSense: An Urban Sensing Notification System to Improve Bystander Privacy"; 2011; pp. 1-5; PhoneSense.

* cited by examiner

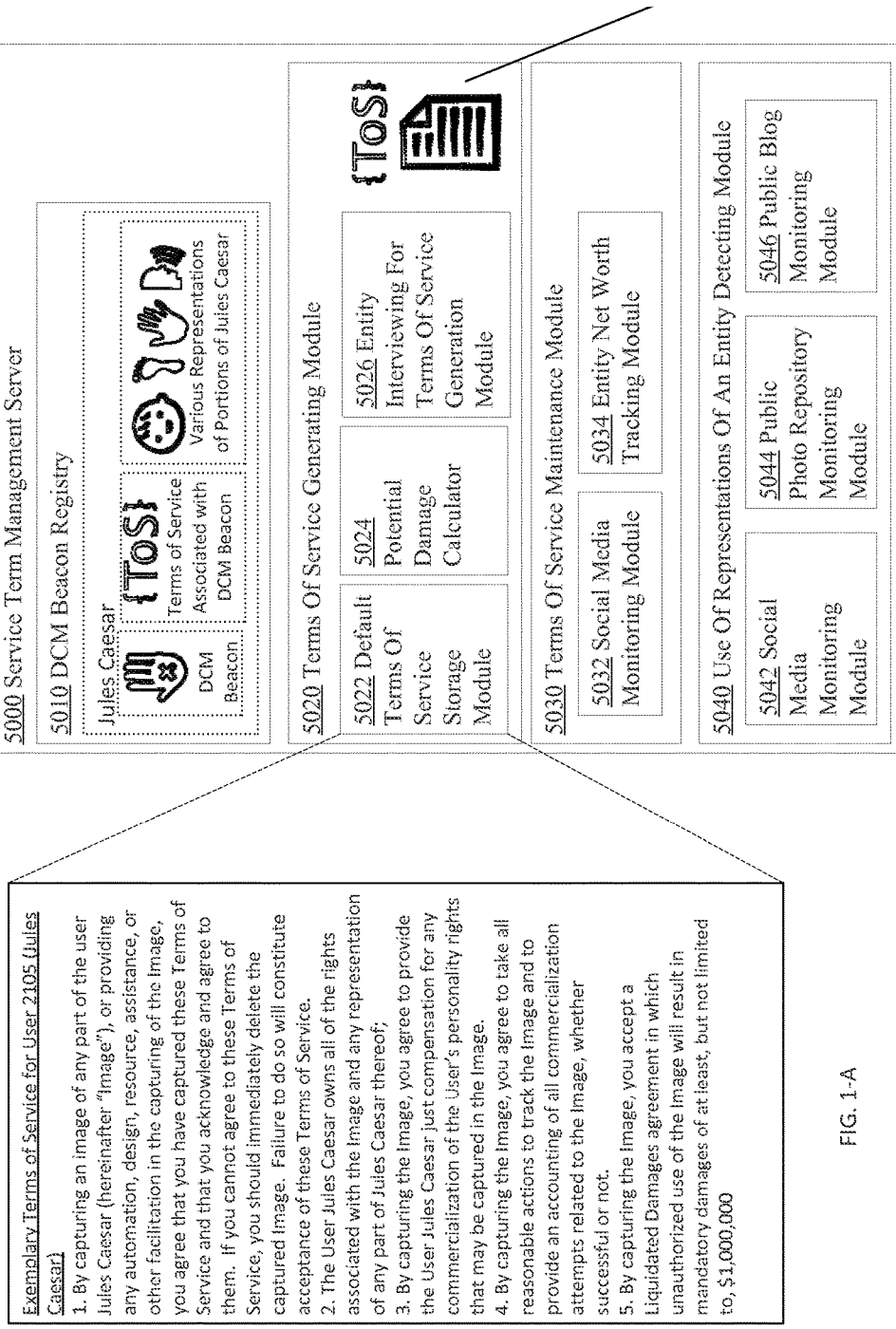
FIG. 1-A

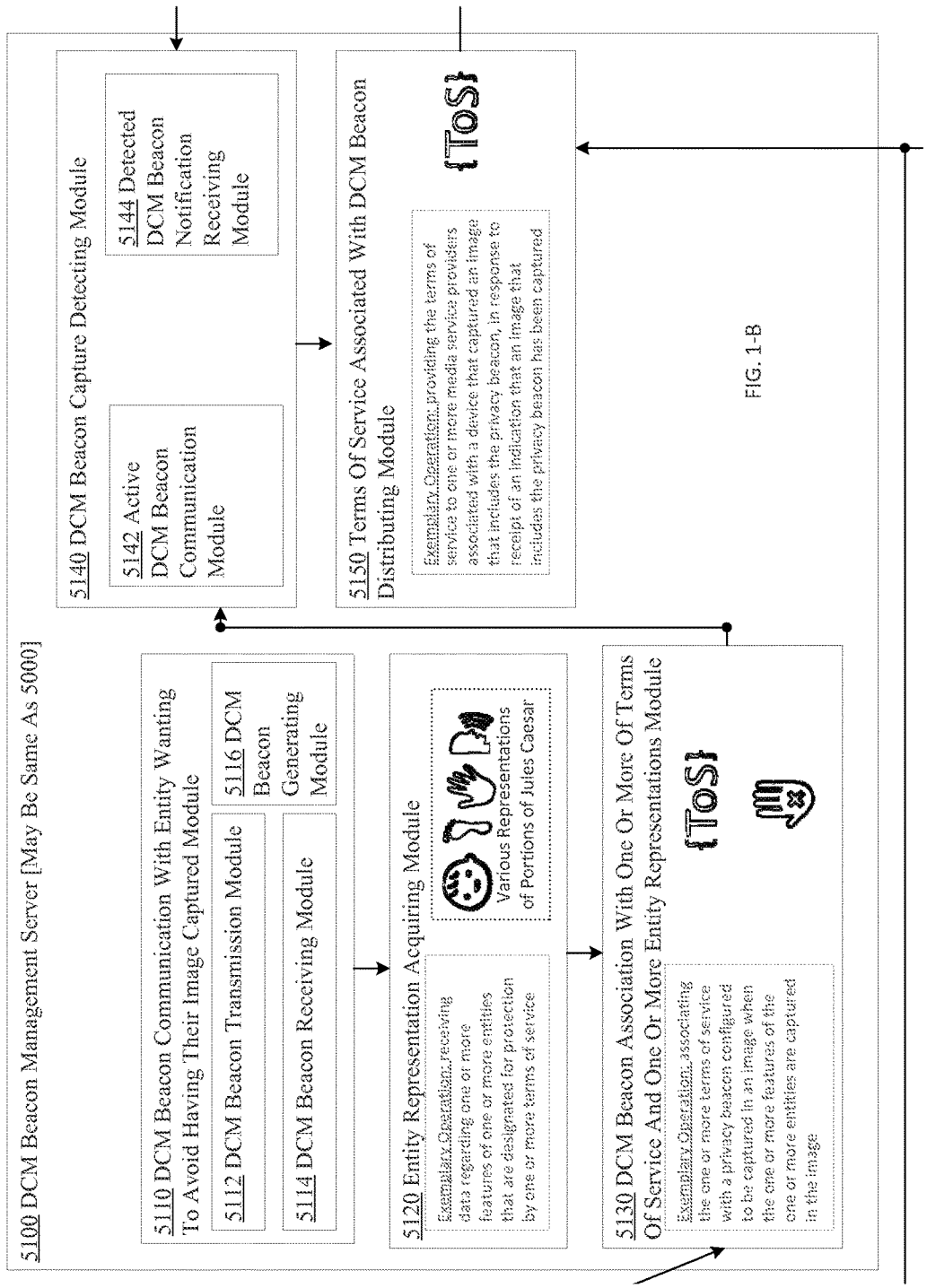
FIG. 1-B

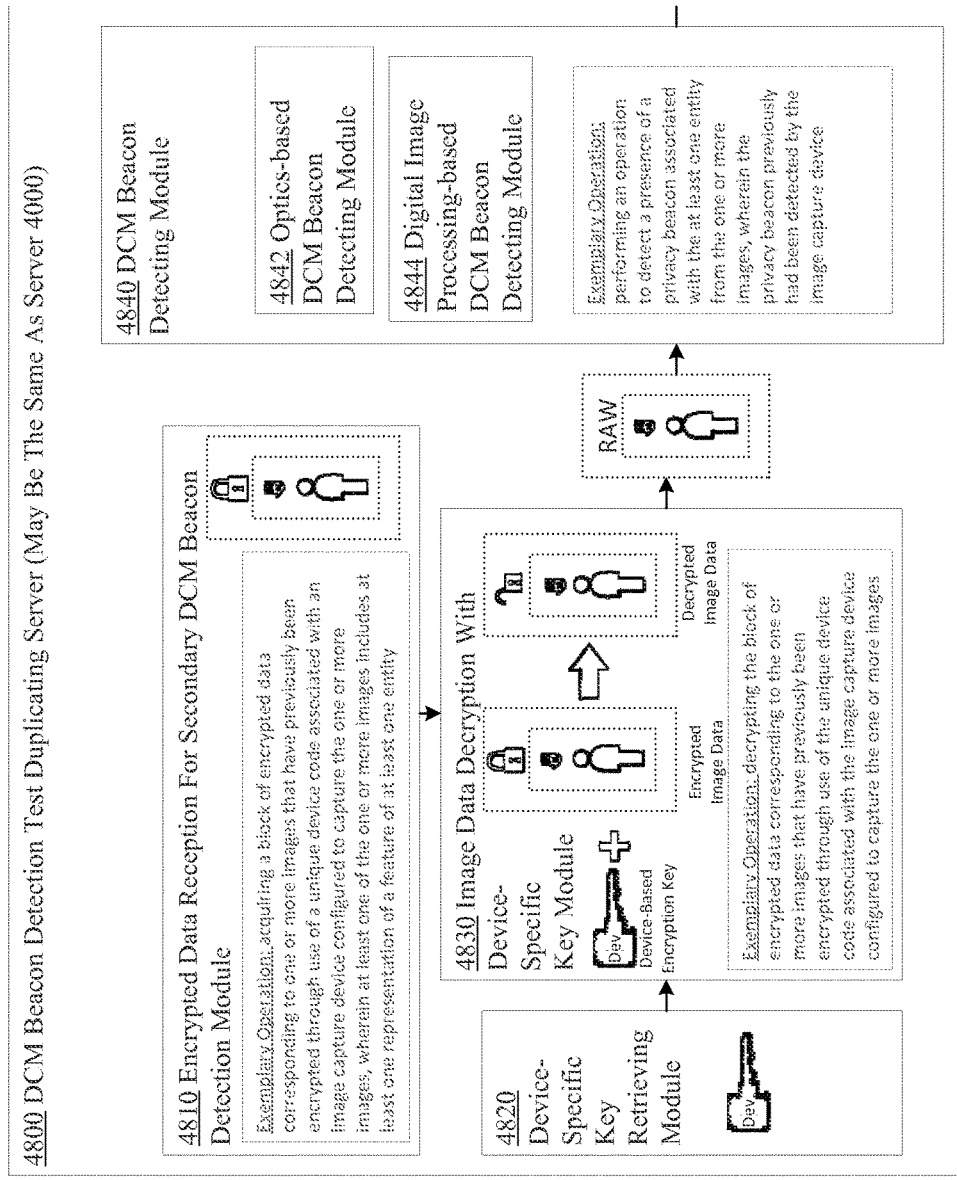
FIG. 1-C

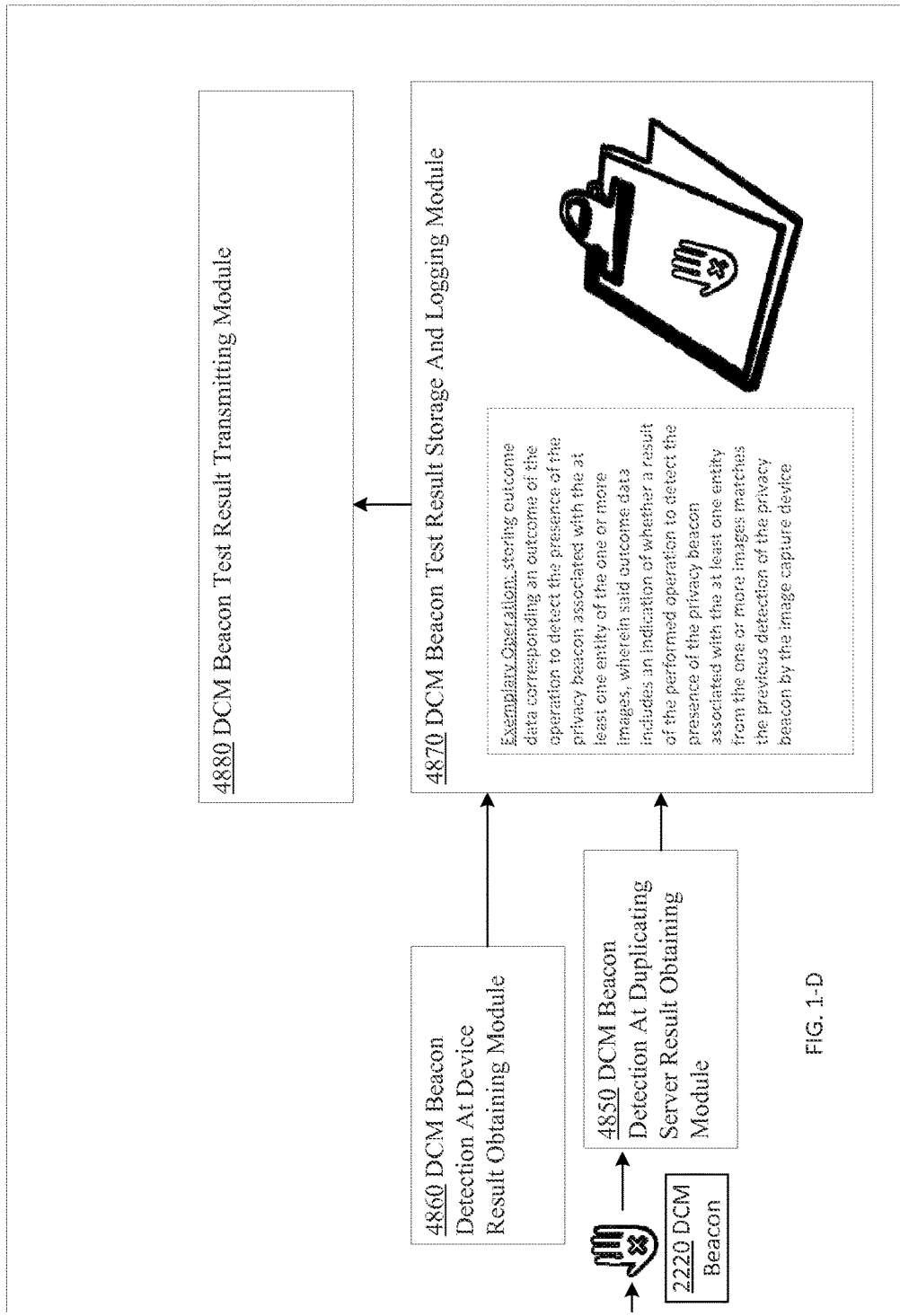
FIG. 1-D

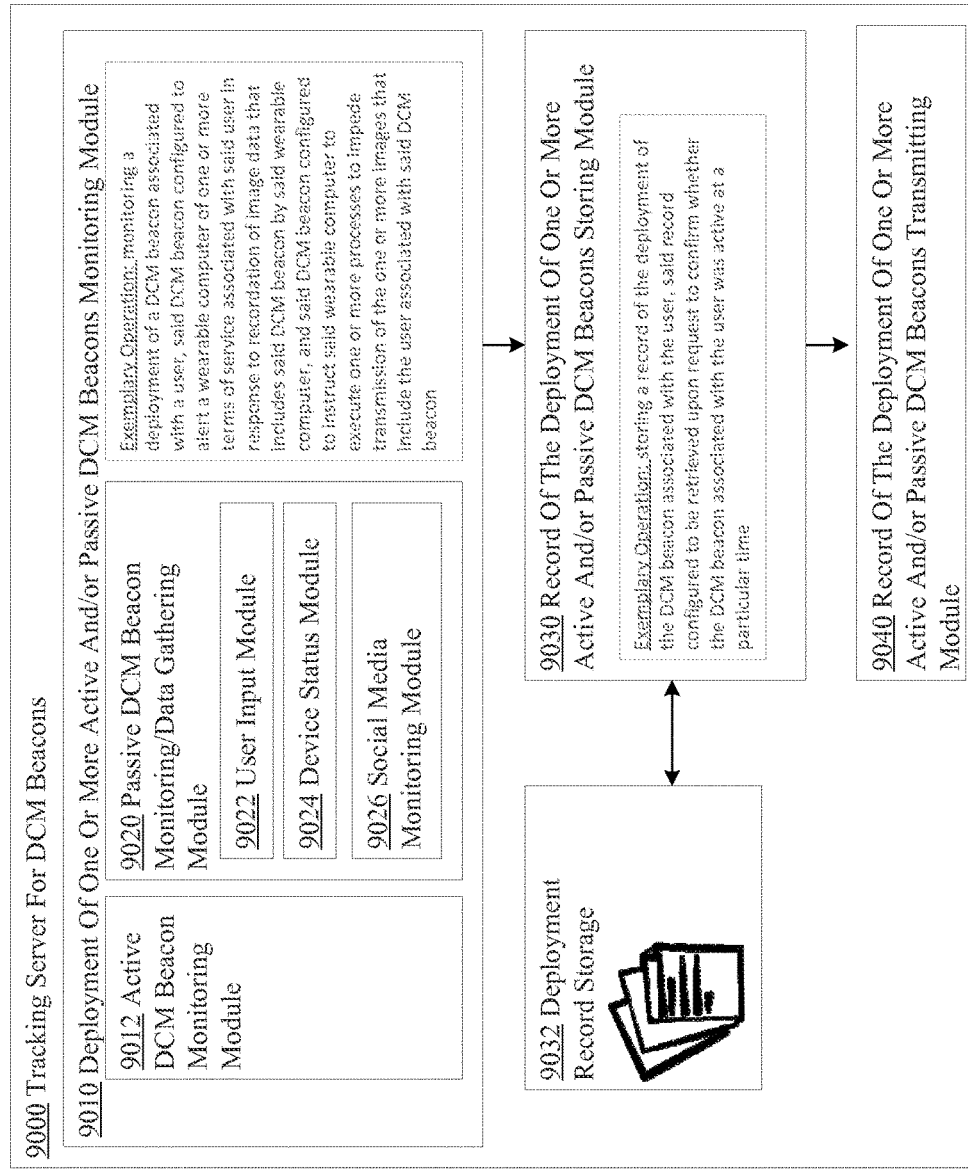
FIG. 1-E

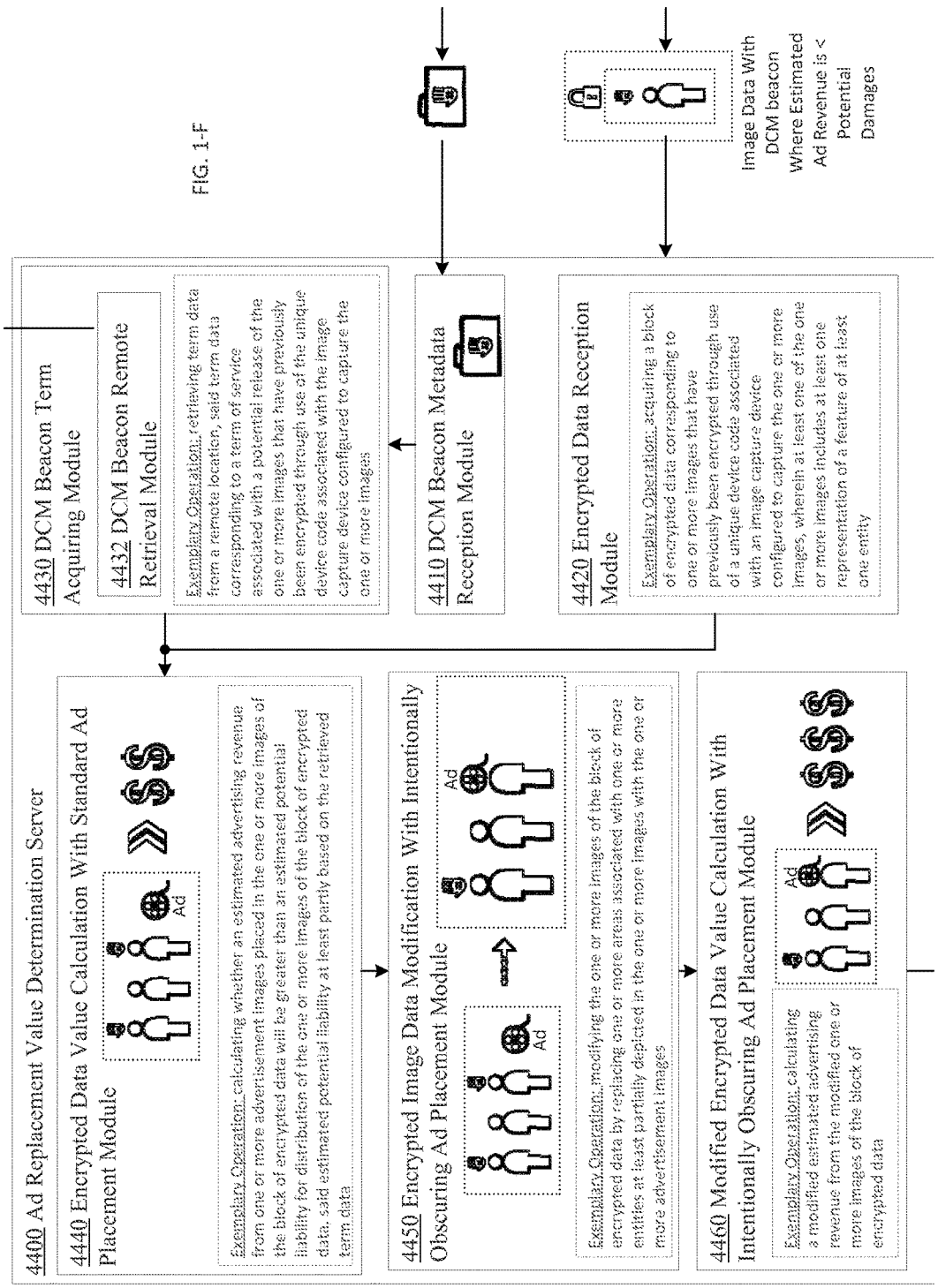

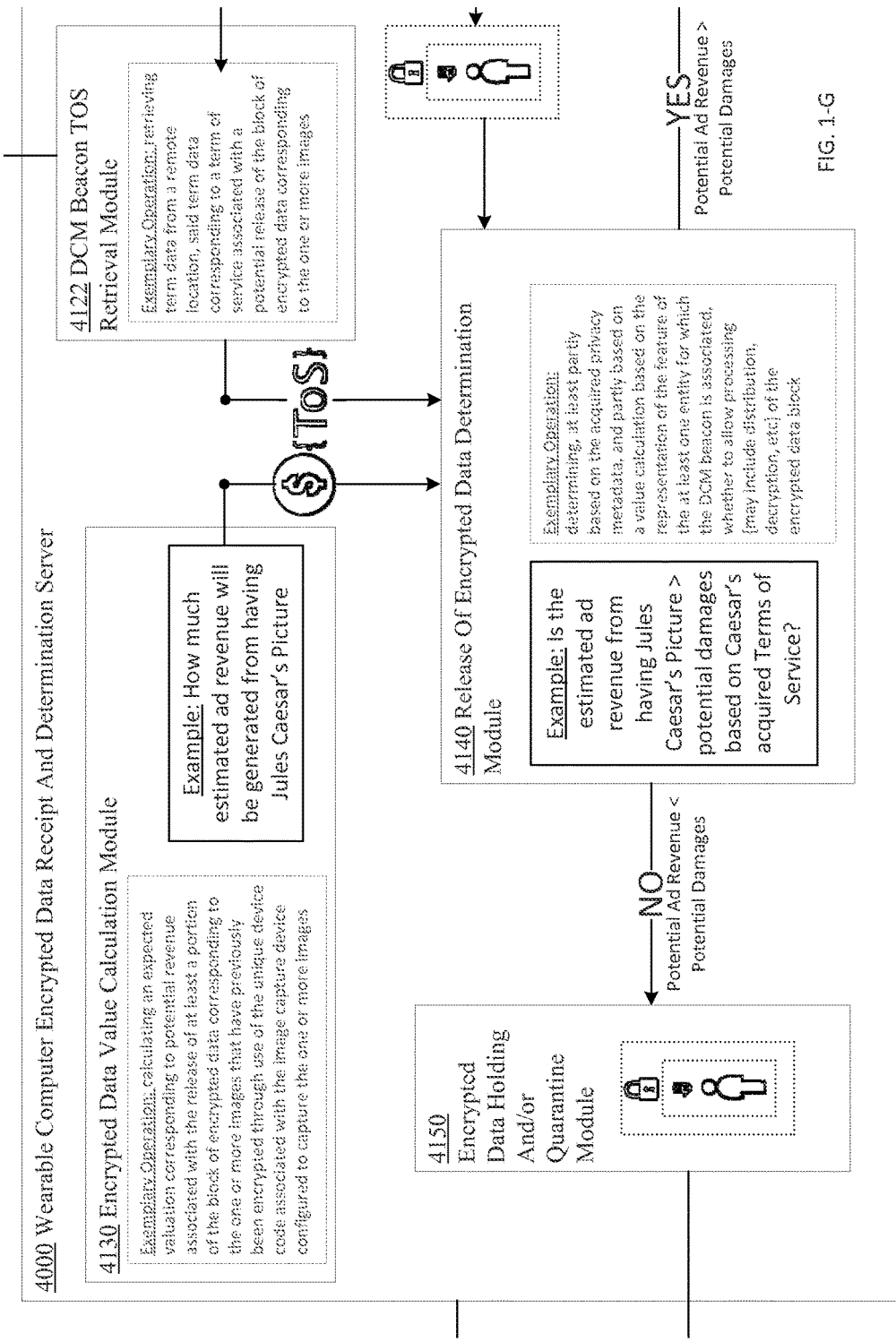
FIG. 1-G

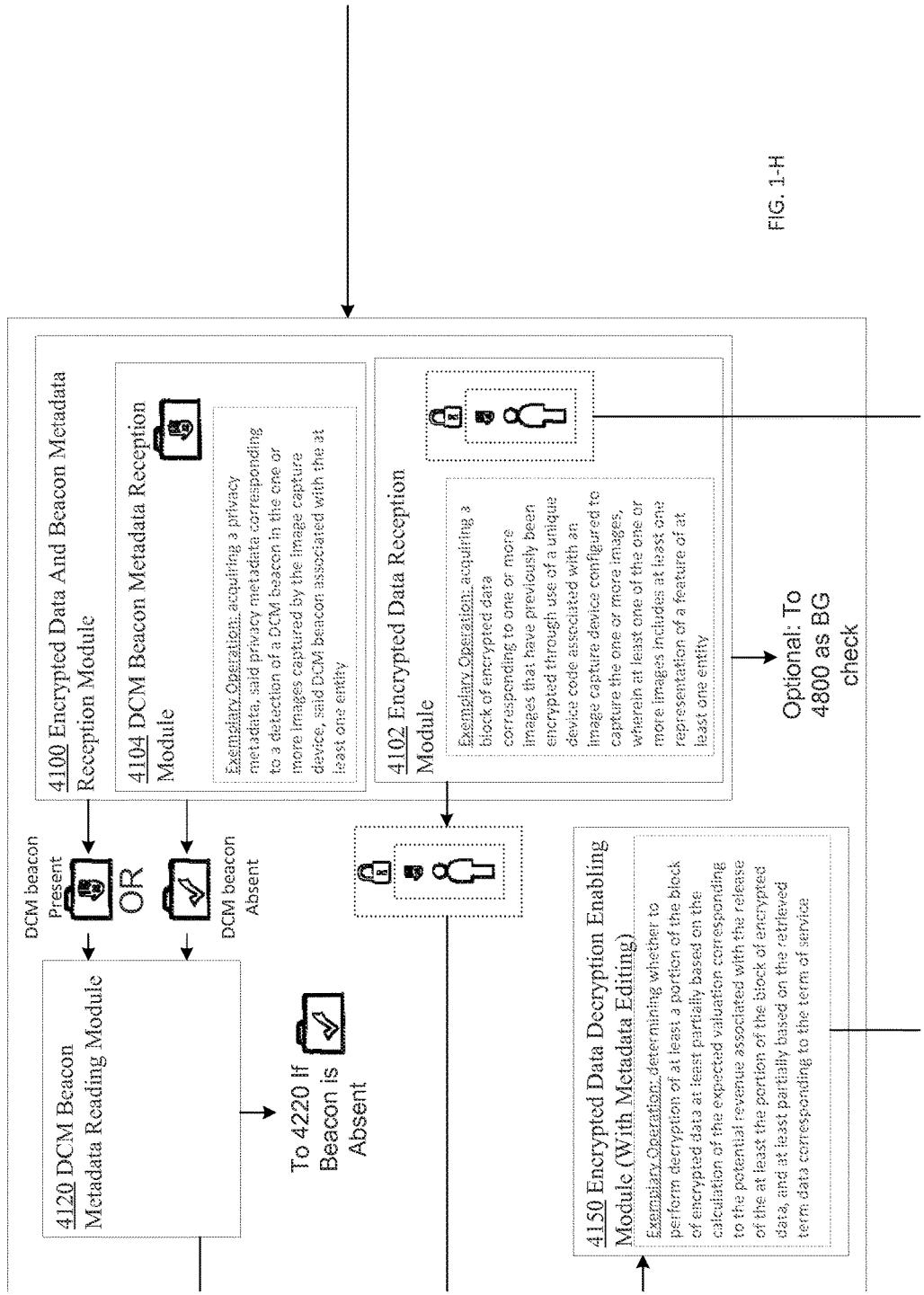
FIG. 1-H

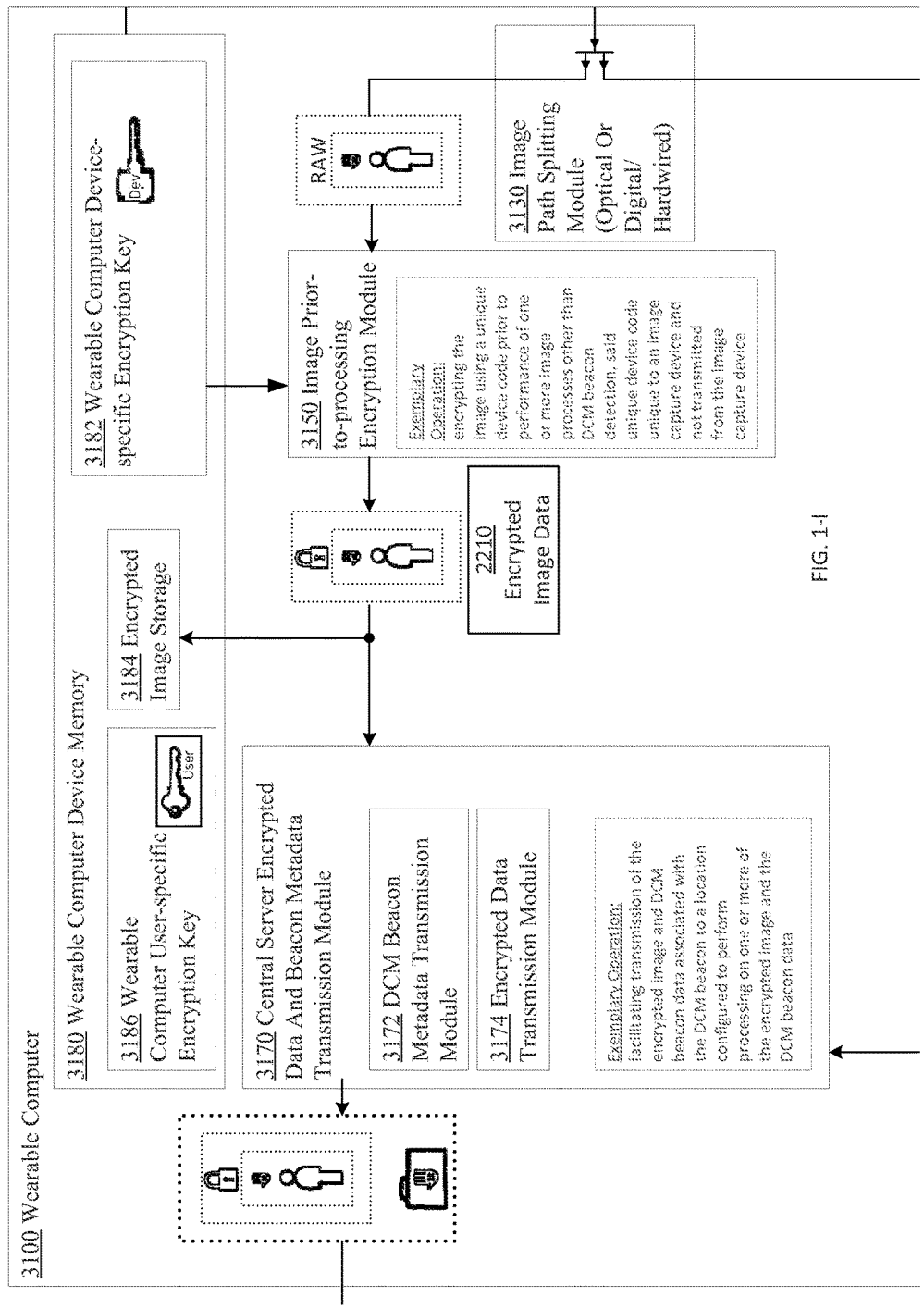
FIG. 1-I

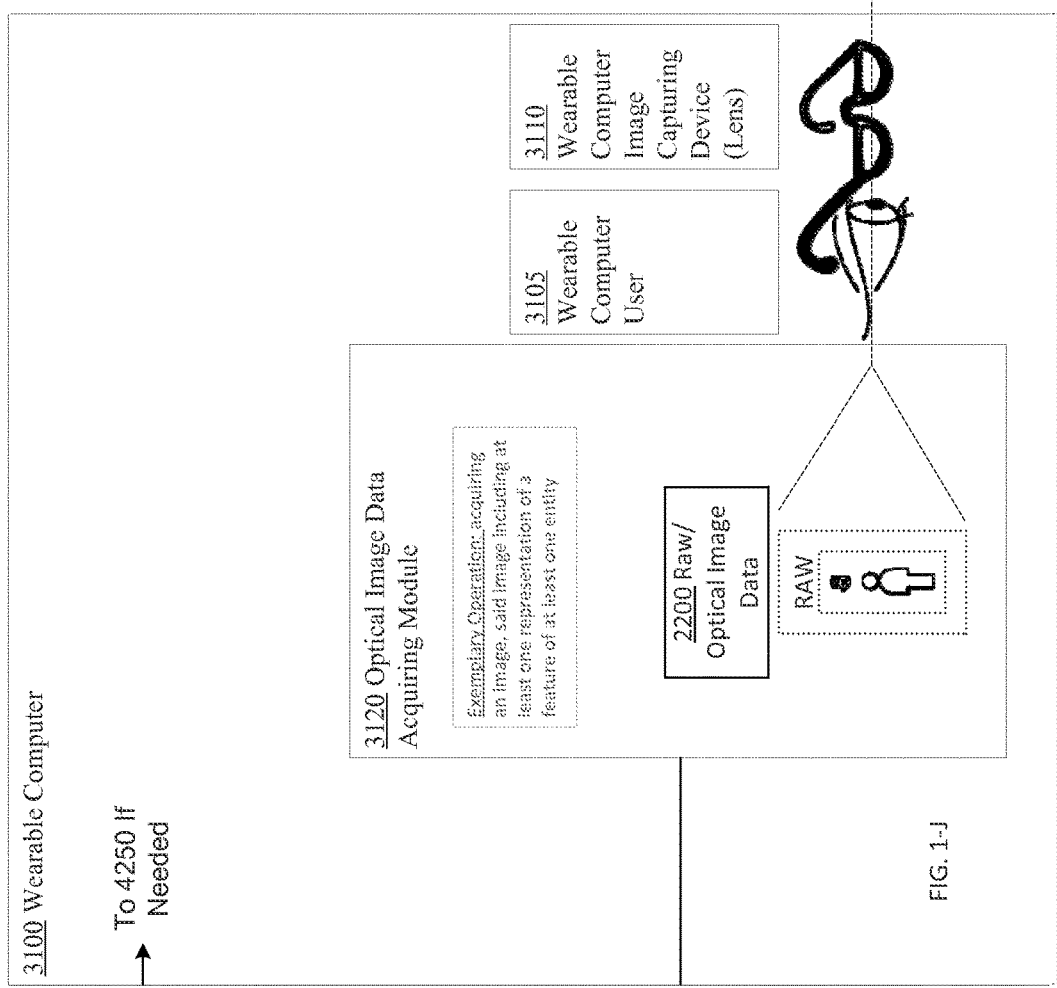
FIG. 1-J

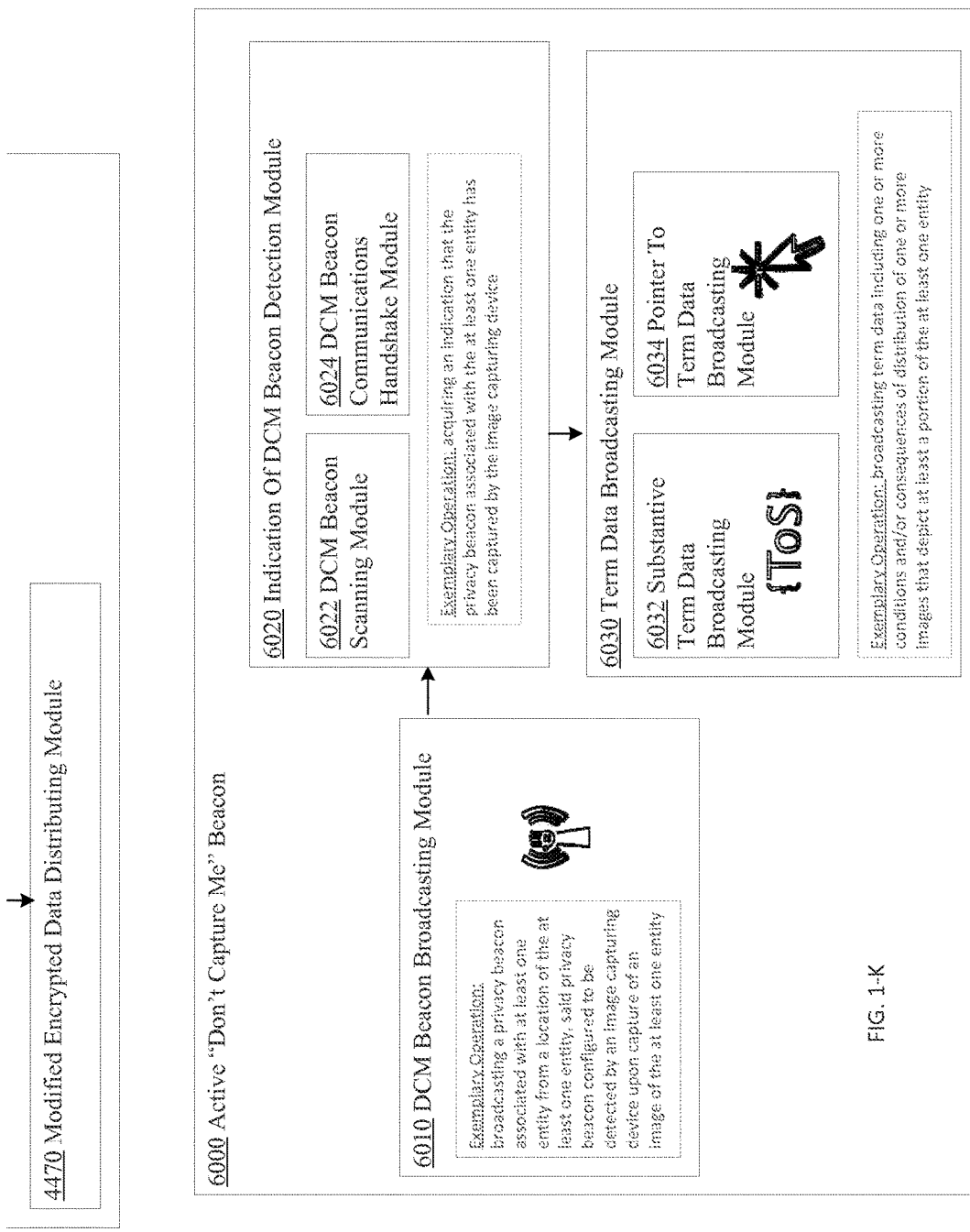
FIG. 1-K

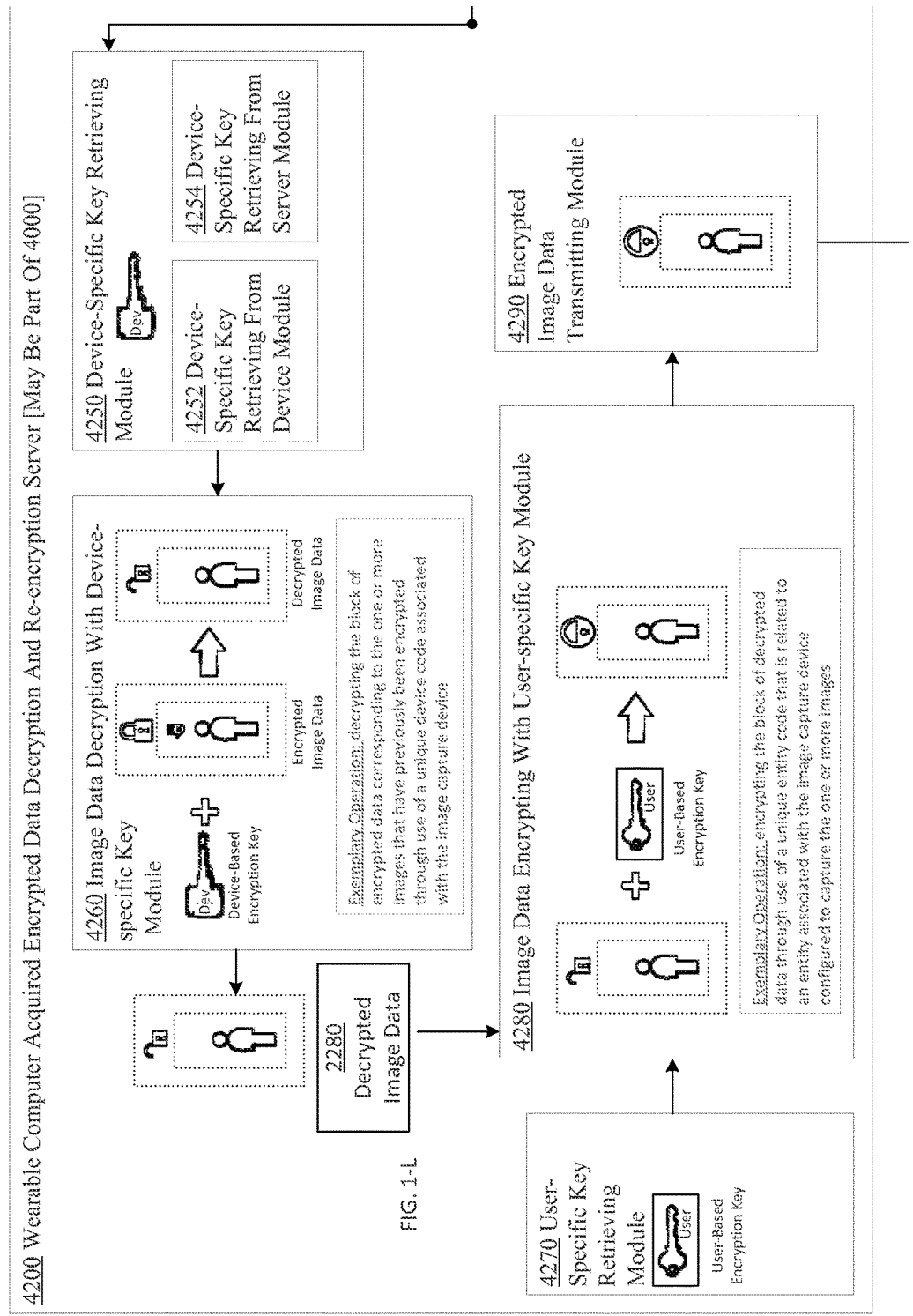
FIG. 1-L

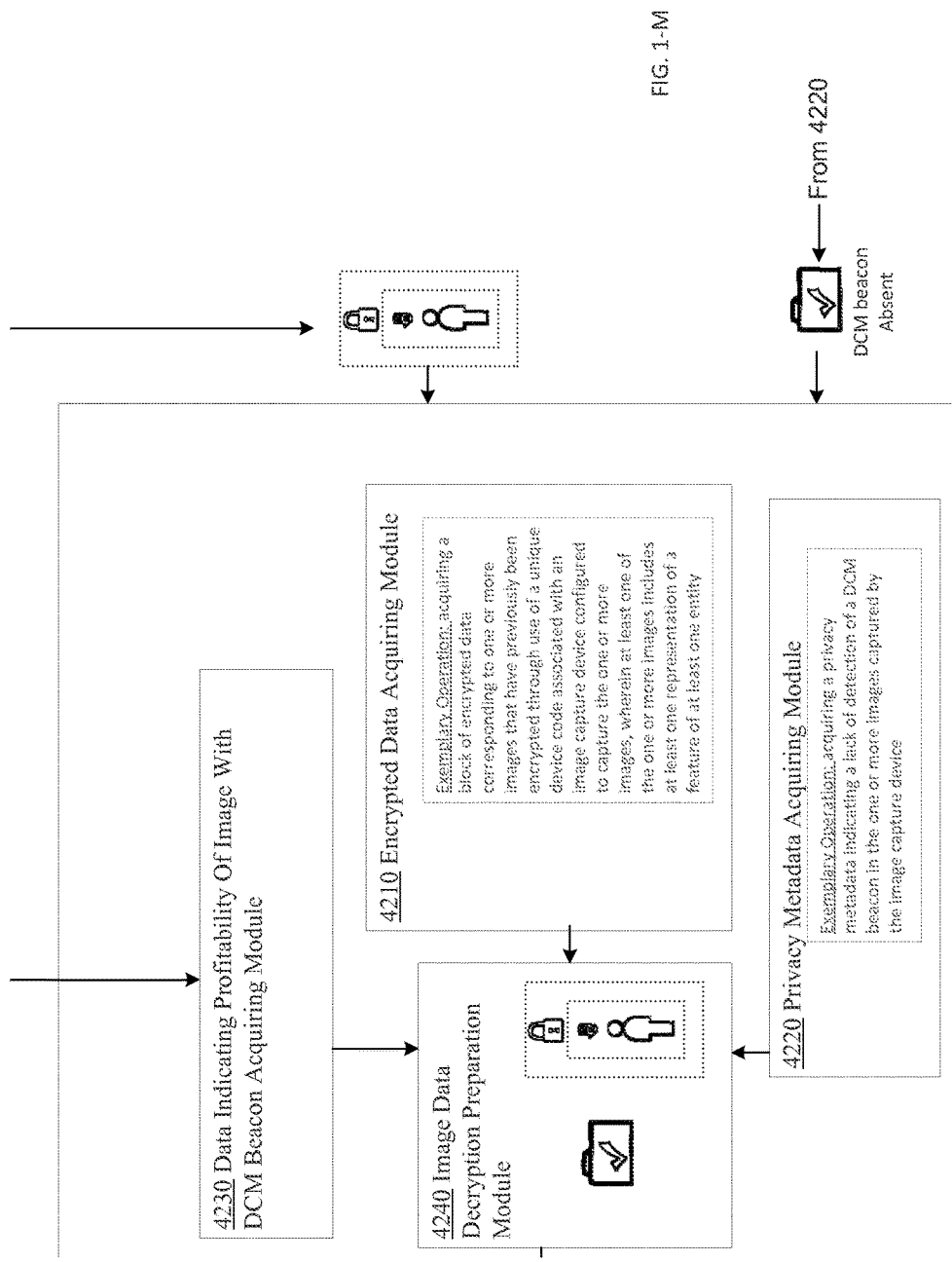
FIG. 1-M

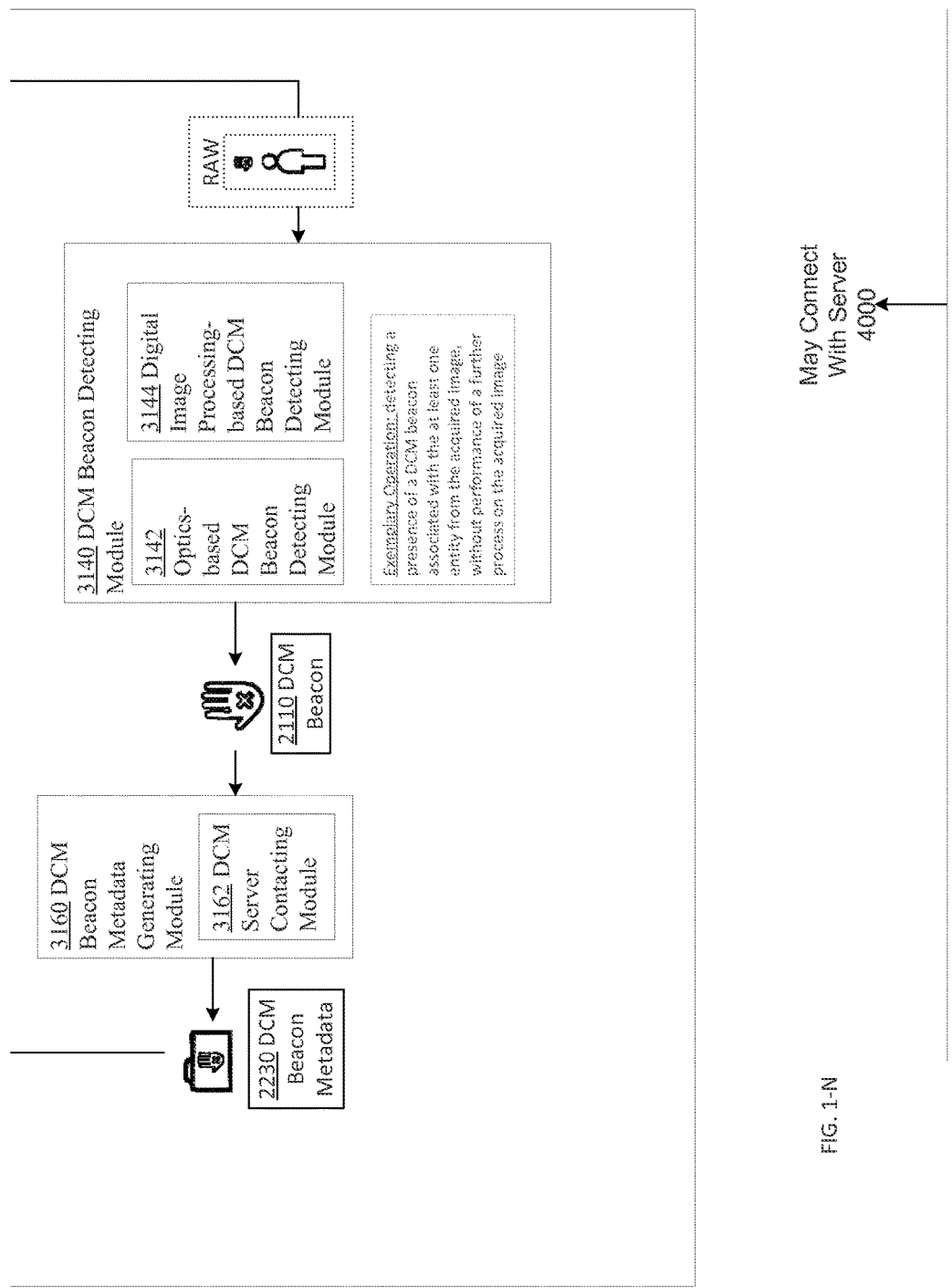
FIG. 1-N

This page intentionally left blank.

FIG. 1-O

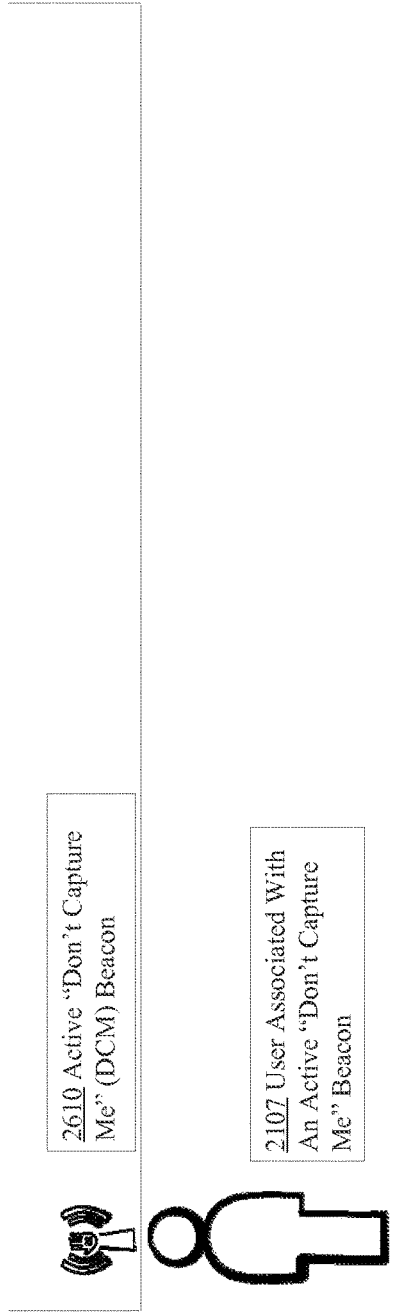
FIG. 1-P

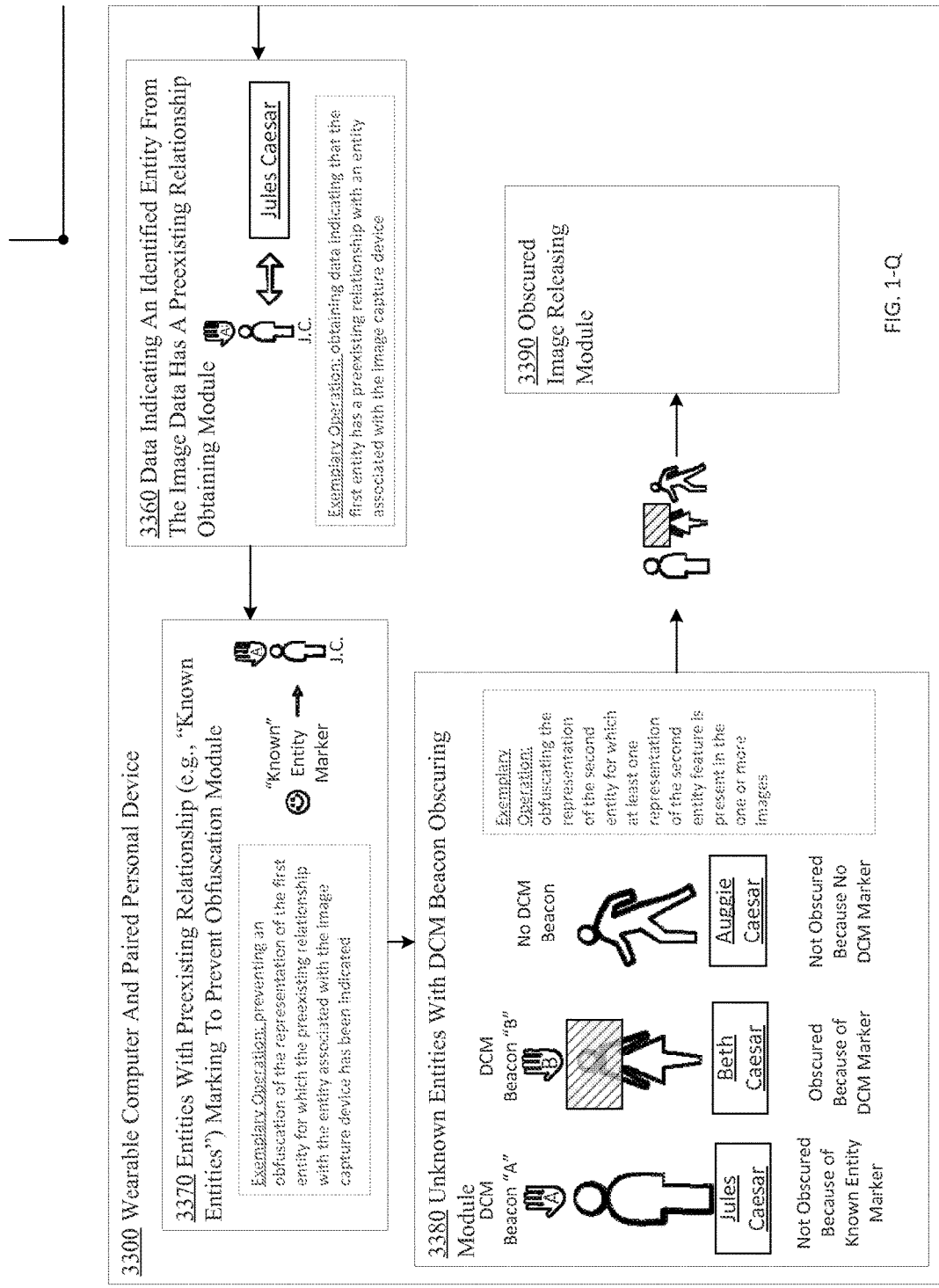
FIG. 1-Q

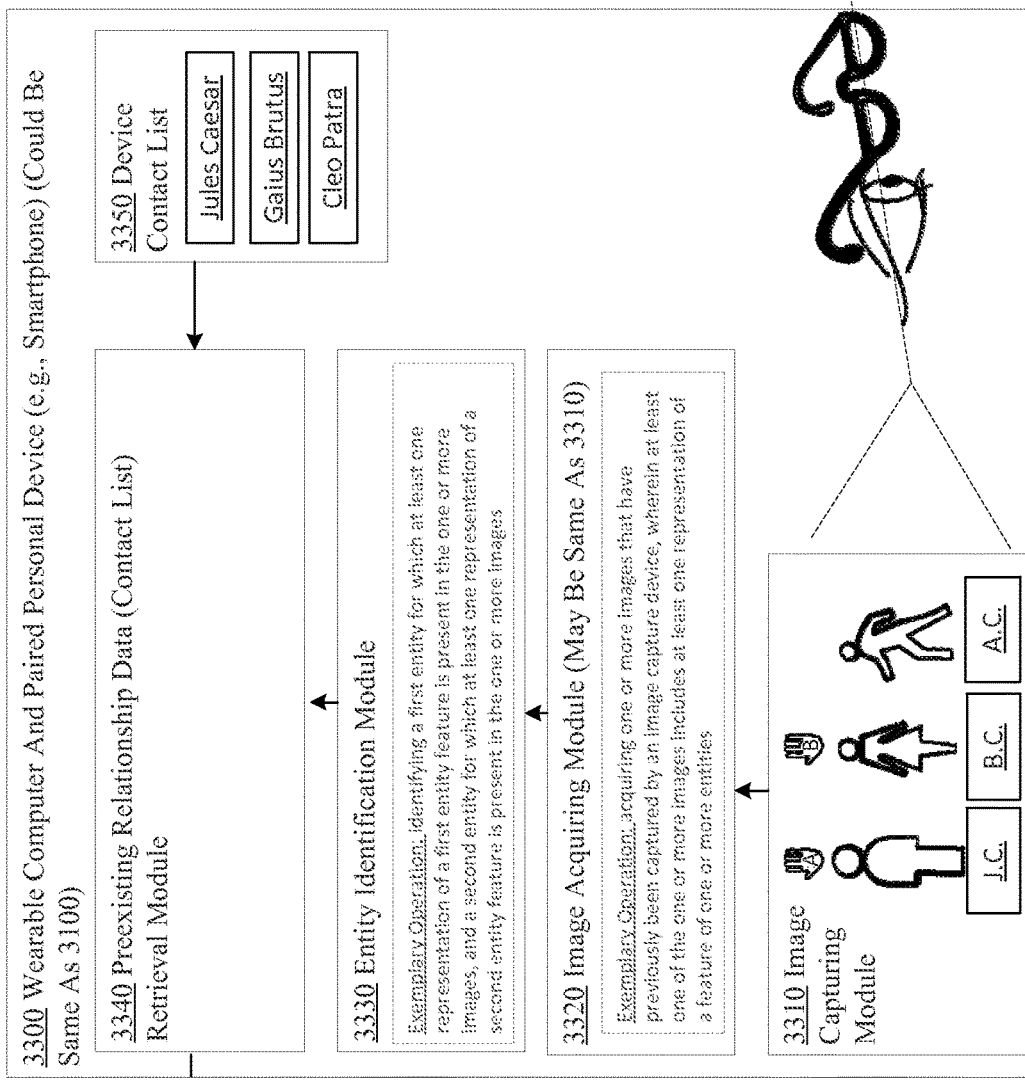
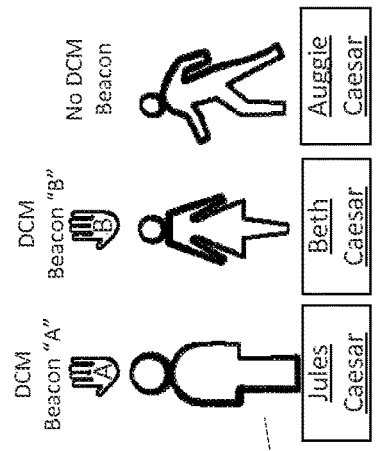
FIG. 1-R

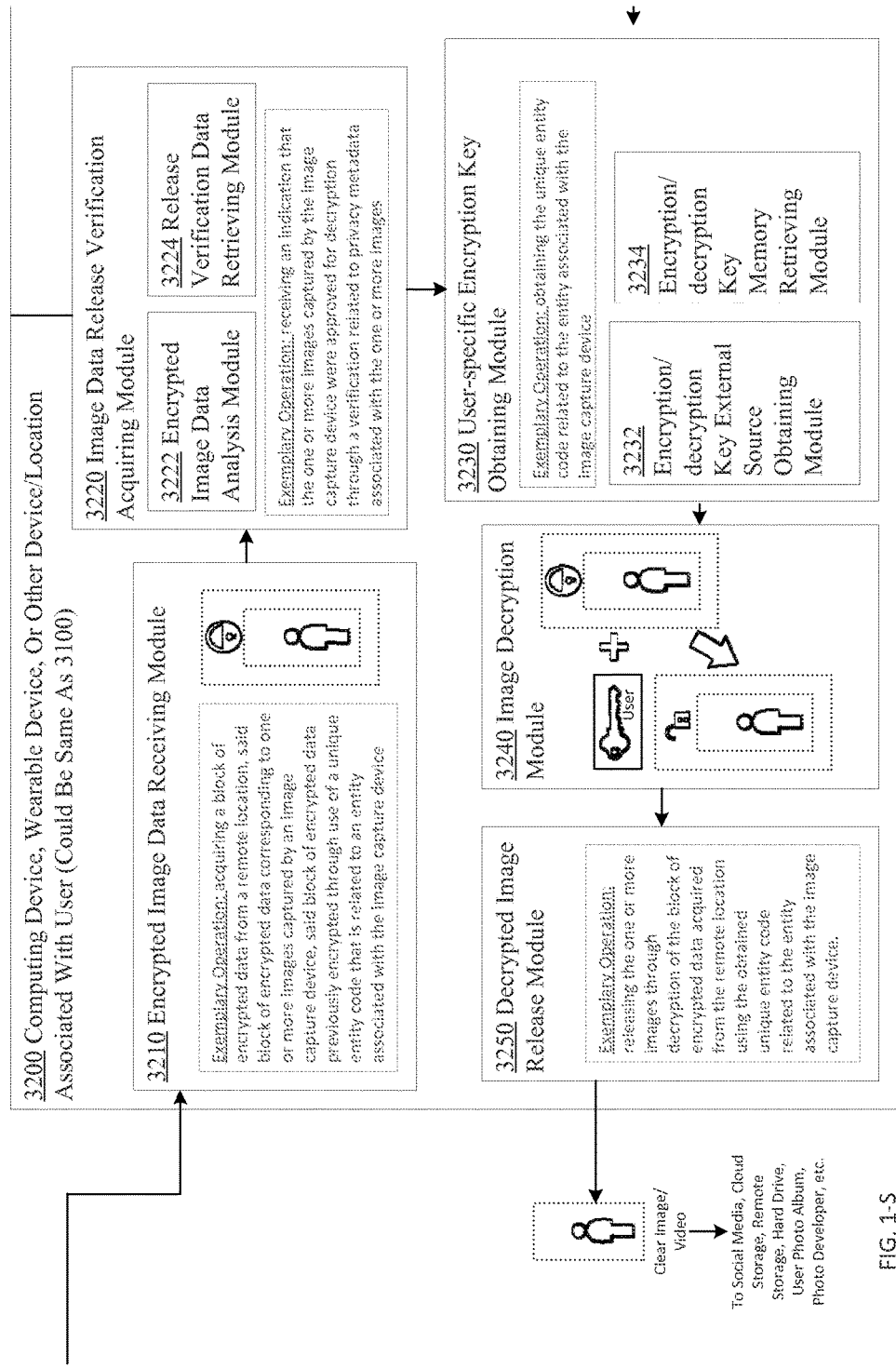
FIG. 1-S

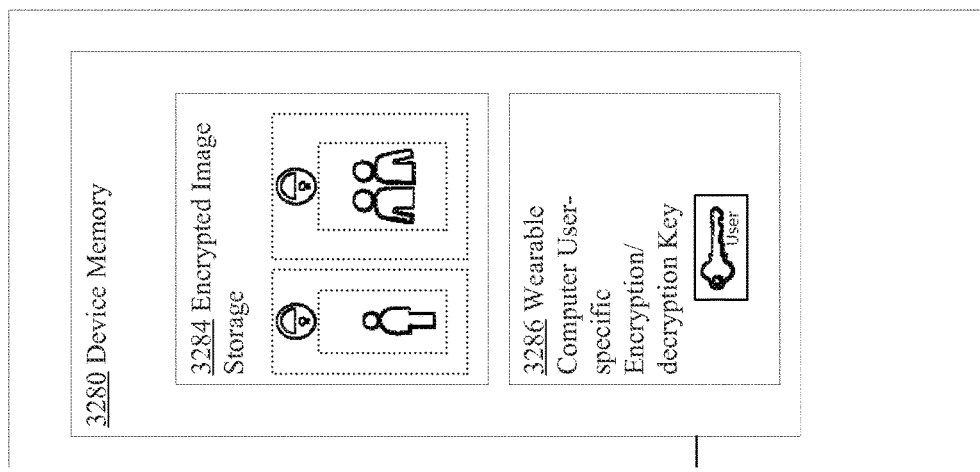
FIG. 1-T

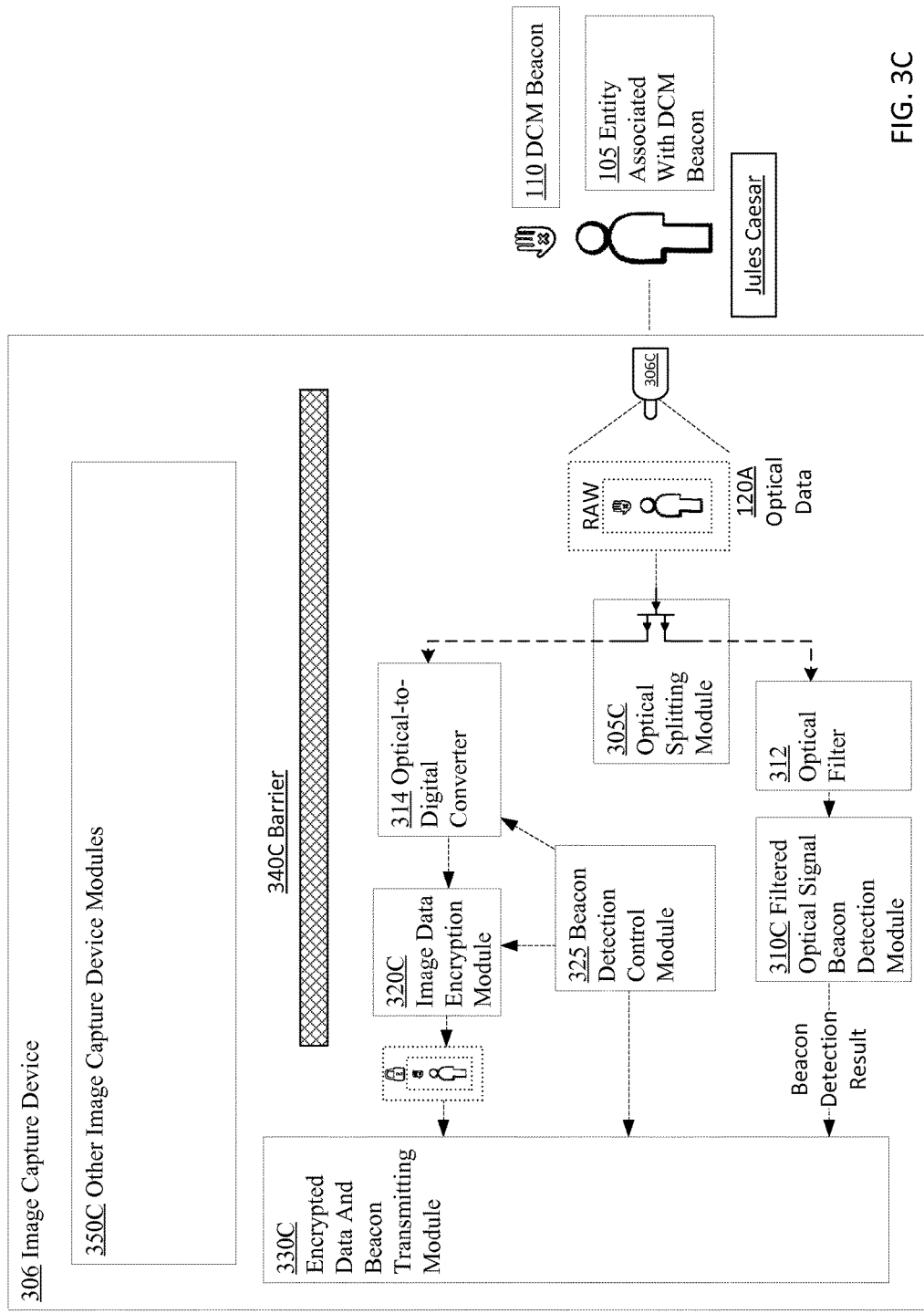

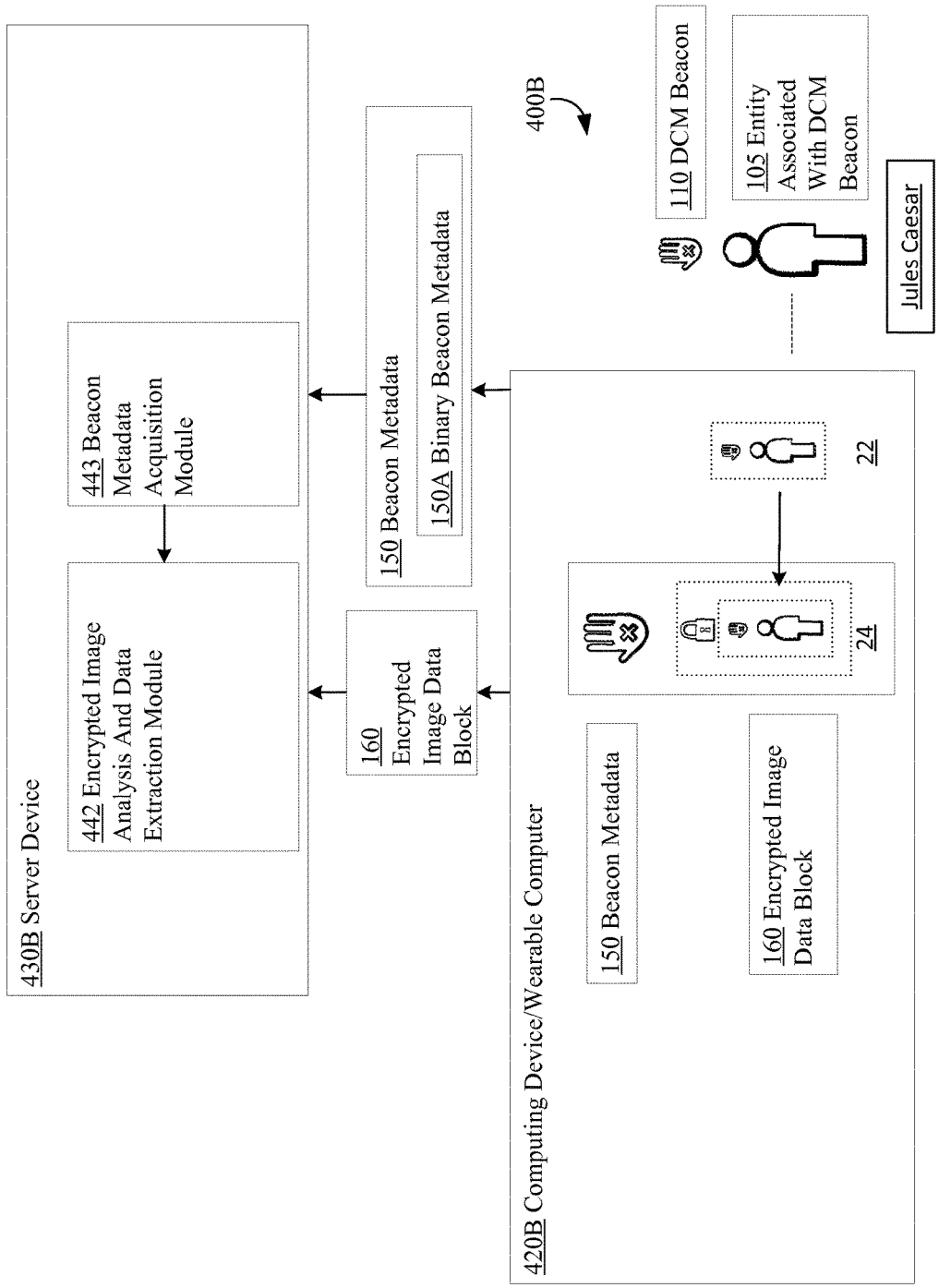

252 Encrypted Image That Is A Captured Image That Was Encrypted Through Use Of A Particular Device Code Associated With An Image Capture Device That Captured The Captured Image That Includes A Representation Of A Feature Of An Entity Obtaining Module

| 602 Encrypted Image That Is A Captured Image That Was Encrypted Through Use Of A Particular Unique Device Code Associated With An Image Capture Device That Captured The Captured Image That Includes A Representation Of A Feature Of An Entity Obtaining Module | 604 Encrypted Image That Is A Captured Image That Was Encrypted Through Use Of A User-defined Device Code Associated With An Image Capture Device That Captured The Captured Image That Includes A Representation Of A Feature Of An Entity Obtaining Module | 606 Encrypted Image That Is A Captured Image That Was Encrypted Through Use Of A Manufacturer-defined Device Code Associated With An Image Capture Device That Captured The Captured Image That Includes A Representation Of A Feature Of An Entity Obtaining Module | 608 Encrypted Image That Is A Captured Image That Was Encrypted Through Use Of A Particular Device Code Associated With An Image Capture Device That Captured The Captured Image That Includes A Representation Of A Feature Of An Entity Obtaining After Detection Of A Privacy Beacon By The Image Capture Device Module |

Fig. 6

| Fig. 6A | Fig. 6B |

FIG. 6A

256 Validation Detection Operation To Detect A Privacy Beacon Associated With The Entity In The Decrypted Captured Image Performing Module 802 Validation Detection Operation That Is Similar To A Device Detection Operation To Detect The Privacy Beacon, Said Validation Detection Operation Is To Detect A Privacy Beacon Associated With The Entity In The Decrypted Captured Image Performing Module 804 Validation Detection Operation That Is A Same Operation As The Device Detection Operation To Detect The Privacy Beacon, Said Validation Detection Operation Is To Detect A Privacy Beacon Associated With The Entity In The Decrypted Captured Image Performing Module

FIG. 8A

256 Validation Detection Operation To Detect A Privacy Beacon Associated With The Entity In The Decrypted Captured Image Performing Module 826 Validation Detection Operation To Detect A Privacy Beacon That Is Configured To Facilitate Retrieval Of A Terms Of Service That Govern Usage Of Personality Rights Captured In The Captured Image And Associated With The Entity In The Decrypted Captured Image Performing Module 828 Validation Detection Operation To Detect A Privacy Beacon That Is Configured To Facilitate Retrieval, From A Remote Location, Of A Terms Of Service That Govern Usage Of Personality Rights Captured In The Captured Image And Associated With The Entity In The Decrypted Captured Image Performing Module

| Fig. 8A | Fig. 8B | Fig. 8C |

258 Result Data That Includes An Output Of The Performed Validation Detection Operation To Detect The Privacy Beacon In The Captured Image Storing Module 902 Result Data That Includes An Output Of The Performed Validation Detection Operation To Detect The Privacy Beacon In The Captured Image, Wherein The Output Matches An Output Of A Previously Performed Device Detection Operation To Detect The Privacy Beacon Storing Module 904 Result Data That Includes An Output Of The Performed Validation Detection Operation To Detect The Privacy Beacon In The Captured Image And That Includes Privacy Beacon Data Associated With The Privacy Beacon Storing Module

Fig. 9

| Fig. 9A | Fig. 9B |

FIG. 9A

258 Result Data That Includes An Output Of The Performed Validation Detection Operation To Detect The Privacy Beacon In The Captured Image Storing Module

906 Result Data That Includes An Output Of The Performed Validation Detection Operation To Detect The Privacy Beacon In The Captured Image, Wherein The Output Of The Performed Validation Detection Operation Does Not Match An Output Of A Previously Performed Device Detection Operation On The Captured Image To Detect The Privacy Beacon Storing Module

908 Result Data That Includes An Output Of The Performed Validation Detection Operation To Detect The Privacy Beacon In The Captured Image, Wherein The Output Of The Performed Validation Detection Operation Is A Detection Of A Different Privacy Beacon Than The Output Of The Previously Performed Device Detection Operation On The Captured Image To Detect The Privacy Beacon Storing Module

910 Result Data That Includes An Output Of The Performed Validation Detection Operation To Detect The Privacy Beacon In The Captured Image, Wherein The Output Of The Performed Validation Detection Operation Indicates Detection Of The Privacy Beacon And The Output Of The Previously Performed Device Detection Operation On The Captured Image Indicates Failure To Detect The Privacy Beacon Storing Module

912 Result Data That Includes An Output Of The Performed Validation Detection Operation To Detect The Privacy Beacon In The Captured Image, Wherein The Output Of The Performed Validation Detection Operation Indicates Failure To Detect The Privacy Beacon And The Output Of The Previously Performed Device Detection Operation On The Captured Image Indicates Detection Of The Privacy Beacon Storing Module

| Fig. 9A | Fig. 9B |

1008 Storing Outcome Data That Includes At Least A Result Of The Performed Validation Detection Operation To Detect The Privacy Beacon In The Captured Image

1406 Storing Outcome Data That Includes A Result Of The Performed Operation To Detect The Privacy Beacon In The Captured Image, When The Result Of The Performed Validation Detection Operation Does Not Match A Result Of A Previously Performed Device Detection Operation On The Captured Image To Detect The Privacy Beacon

1408 Storing Outcome Data That Includes The Result Of The Performed Operation To Detect The Privacy Beacon In The Captured Image, When The Result Of The Performed Validation Detection Operation Detected A Different Privacy Beacon Than The Result Of The Previously Performed Device Detection Operation On The Captured Image To Detect The Privacy Beacon

1410 Storing Outcome Data That Includes The Result Of The Performed Operation To Detect The Privacy Beacon In The Captured Image, When The Performed Validation Detection Operation Detected The Privacy Beacon And The Device Detection Operation Determined That The Privacy Beacon Was Absent From The Captured Image

1412 Storing Outcome Data That Includes The Result Of The Performed Operation To Detect The Privacy Beacon In The Captured Image, When The Performed Validation Detection Operation Determined An Absence Of The Privacy Beacon In The Captured Image And The Device Detection Operation Detected The Privacy Beacon

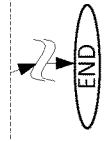

262 Capture Beacon Emitting From A Device Configured To Capture A Particular Image Module 1501 Capture Beacon Emitting From An Image Capture Device Configured To Capture A Particular Image Module 1503 Capture Beacon Emitting From An Image Capture Device Configured To Capture The Particular Image Configured To Capture A Particular Image Module 1505 Capture Beacon That Informs A Recipient Monitor Device Of An Image Capture Capability Of The Device Configured To Capture The Particular Image Emitting From The Device Configured To Capture The Particular Image Module 1507 Capture Beacon That Informs A Recipient Monitor Device Of A Position Of The Device Configured To Capture The Particular Image Emitting From The Device Configured To Capture The Particular Image Module 1509 Capture Beacon That Informs A Recipient Monitor Device Of A Position At A Movie Theater Of The Device Configured To Capture The Particular Image Emitting From The Device Configured To Capture The Particular Image Module Fig. 15
Fig. 15A | Fig. 15B 264 Permission Data That Includes One Or More Permissions For Capture Of The Particular Image Receiving Module, Wherein Said Receiving From At Least One Device In Response To The Emitted Capture Beacon

| 1615 Permission Data That Includes A Request To Discard The Captured Image Receiving Module, Wherein Said Receiving From At Least One Device In Response To The Emitted Capture Beacon | 1617 Permission Data That Includes A Request To Encrypt The Captured Image Receiving Module, Wherein Said Receiving From At Least One Device In Response To The Emitted Capture Beacon | 1619 Permission Data That Includes A Request To Transmit The Captured Image To A Particular Location Receiving Module, Wherein Said Receiving From At Least One Device In Response To The Emitted Capture Beacon |

Fig. 16

| Fig. 16A | Fig. 16B |

FIG. 16B

266 Validation Detection Operation To Detect A Privacy Beacon Associated With The Entity In The Decrypted Captured Image Performing Module 1701 Validation Detection Operation To Detect A Privacy Beacon Associated With The Entity In The Decrypted Captured Image Performing After Receipt Of The Permission Data Module

FIG. 17

METHODS, SYSTEMS, AND DEVICES FOR HANDLING IMAGE CAPTURE DEVICES AND CAPTURED IMAGES

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 14/219,444, entitled METHODS, SYSTEMS, AND DEVICES FOR HANDLING IMAGE CAPTURE DEVICES AND CAPTURED IMAGES, naming Pablos Holman, Roderick A. Hyde, Royce A. Levien, Richard T. Lord, Robert W. Lord, and Mark A. Malamud as inventors, filed 19 Mar. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/051,213, entitled METHODS, SYSTEMS, AND DEVICES FOR FACILITATING VIABLE DISTRIBUTION OF DATA COLLECTED BY WEARABLE COMPUTATION, naming Pablos Holman, Roderick A. Hyde, Royce A. Levien, Richard T. Lord, Robert W. Lord, and Mark A. Malamud as inventors, filed 10 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/055,471, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 16 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/055,543, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 16 Oct. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,254, entitled DEVICES, METHODS, AND SYSTEMS FOR ANALYZING CAPTURED IMAGE DATA AND PRIVACY DATA, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,579 entitled DEVICES, METHODS, AND SYSTEMS FOR ANALYZING CAPTURED IMAGE DATA AND PRIVACY DATA, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,581, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/084,591, entitled METHODS, SYSTEMS, AND DEVICES FOR HANDLING IMAGE DATA FROM CAPTURED IMAGES, naming Pablos Holman, Roderick A. Hyde, Royce A. Levien, Richard T. Lord, Robert W. Lord, and Mark A. Malamud as inventors, filed 19 Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,077, entitled METHODS, SYSTEMS, AND DEVICES FOR DELIVERING IMAGE DATA FROM CAPTURED IMAGES TO DEVICES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,107, entitled METHODS, SYSTEMS, AND DEVICES FOR DELIVERING IMAGE DATA FROM CAPTURED IMAGES TO DEVICES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,185, entitled METHODS, SYSTEMS, AND DEVICES FOR HANDLING INSERTED DATA INTO CAPTURED IMAGES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/108,217, entitled METHODS, SYSTEMS, AND DEVICES FOR HANDLING INSERTED DATA INTO CAPTURED IMAGES, naming Pablos Holman, Roderick A. Hyde, Royce A. Levien, Richard T. Lord, Robert W. Lord, and Mark A. Malamud as inventors, filed 16 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/109,682, entitled METHODS, SYSTEMS, AND DEVICES FOR HANDLING CAPTURED IMAGE DATA THAT IS RECEIVED BY DEVICES, naming Pablos Holman, Roderick A. Hyde, Royce A. Levien, Richard T. Lord, Robert W. Lord, and Mark A. Malamud as inventors, filed 17 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/109,726, entitled METHODS, SYSTEMS, AND DEVICES FOR HANDLING CAPTURED IMAGE DATA THAT IS RECEIVED BY DEVICES, naming Pablos Holman, Roderick A. Hyde, Royce A. Levien, Richard T. Lord, Robert W. Lord, and Mark A. Malamud as inventors, filed 17 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/145,873, entitled METHODS, SYSTEMS, AND DEVICES FOR MONITORING PRIVACY BEACONS RELATED TO ENTITIES DEPICTED IN IMAGES, naming Pablos Holman, Roderick A. Hyde, Royce A. Levien, Richard T. Lord, Robert W. Lord, and Mark A. Malamud as inventors, filed 31 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/145,886, entitled METHODS, SYSTEMS, AND DEVICES FOR MONITORING PRIVACY BEACONS RELATED TO ENTITIES DEPICTED IN IMAGES, naming Pablos Holman, Roderick A. Hyde, Royce A. Levien, Richard T. Lord, Robert W. Lord, and Mark A. Malamud as inventors, filed 31 Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/148,523, entitled DEVICES, METHODS, AND SYSTEMS FOR MANAGING REPRESENTATIONS OF ENTITIES THROUGH USE OF PRIVACY BEACONS, naming Pablos Holman, Roderick A. Hyde, Royce A. Levien, Richard T. Lord, Robert W. Lord, and Mark A. Malamud as inventors, filed 6 Jan. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/148,560, entitled DEVICES, METHODS, AND SYSTEMS FOR MANAGING REPRESENTATIONS OF ENTITIES THROUGH USE OF PRIVACY BEACONS, naming Pablos Holman, Roderick A. Hyde, Royce A. Levien, Richard T. Lord, Robert W. Lord, and Mark A. Malamud as inventors, filed 6 Jan. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/185,741, entitled METHODS, SYSTEMS, AND DEVICES FOR OBSCURING ENTITIES DEPICTED IN CAPTURED IMAGES, naming Pablos Holman, Roderick A. Hyde, Royce A. Levien, Richard T. Lord, Robert W. Lord, and Mark A. Malamud as inventors, filed 20 Feb. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/186,528, entitled METHODS, SYSTEMS, AND DEVICES FOR OBSCURING ENTITIES DEPICTED IN CAPTURED IMAGES, naming Pablos Holman, Roderick A. Hyde, Royce A. Levien, Richard T. Lord, Robert W. Lord, and Mark A. Malamud as inventors, filed 21 Feb. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/218,746, entitled DEVICES, METHODS, AND SYSTEMS FOR MANAGING REPRESENTATIONS OF ENTITIES THROUGH USE OF PRIVACY INDICATORS, naming Pablos Holman, Roderick A. Hyde, Royce A. Levien, Richard T. Lord, Robert W. Lord, and Mark A. Malamud as inventors, filed 18 Mar. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/218,790, entitled DEVICES, METHODS, AND SYSTEMS FOR MANAGING REPRESENTATIONS OF ENTITIES THROUGH USE OF PRIVACY INDICATORS, naming Pablos Holman, Roderick A. Hyde, Royce A. Levien, Richard T. Lord, Robert W. Lord, and Mark A. Malamud as inventors, filed 18 Mar. 2014, which is currently co-pending or is an application of which a currently co-pending application is entitled to the benefit of the filing date.

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to the capture of images that may include personality rights.

SUMMARY

Recently, there has been an increased popularity in wearable computers, e.g., computers that are placed in articles of clothing or clothing accessories, e.g., watches, eyeglasses, shoes, jewelry, accessories, shirts, pants, headbands, and the like. As technology allows electronic devices to become smaller and smaller, more and more items may be "smart" items, e.g., may contain a computer.

In addition, image capturing technology has also improved, allowing for high quality digital cameras that can capture pictures, audio, video, or a combination thereof. These digital cameras may be small enough to fit onto wearable computers, e.g., inside of eyeglasses. In some instances, the digital camera may blend into the eyeglasses mold, and may not be immediately recognizable as a camera. Such eyeglasses may be indistinguishable or somewhat distinguishable from standard eyeglasses that do not contain a camera and/or a computer.

Further, the cost of data storage has decreased dramatically, and it is not uncommon for an average person in a developed nation to have access to enough digital storage to store months' and/or years' worth of video and pictures. As the cost of data storage has decreased dramatically, so too has the cost of processors to process that data, meaning that automation may be able to take an entire day's worth of surreptitious recording, and isolate those portions of the recording that captured persons, either specific persons or persons in general.

Accordingly, with technology, it is possible for a person to "wear" a computer, in the form of eyeglasses, watches, shirts, hats, or through a pocket-sized device carried by a person, e.g., a cellular telephone device. This wearable computer may be used to record people, e.g., to capture pictures, audio, video, or a combination thereof a person, without their knowledge. Thus, conversations that a person may assume to be private, may be recorded and widely distributed. Moreover, a person may be surreptitiously recorded while they are in a locker room, in a bathroom, or in a telephone booth. It may be difficult or impossible to tell when a person is being recorded. Further, once proliferation of these wearable computers with digital cameras becomes widespread, people must assume that they are under surveillance 100% of the time that they are not in their house.

Therefore, a need has arisen to provide systems that attempt to limit the capture and distribution of a person's personality rights. The present invention is directed to devices, methods, and systems that attempt to limit the capture and distribution of captured images of persons. Specifically, the present invention is directed to devices, methods, and systems that attempt to limit the capture and distribution of captured images of persons, implemented at a device that carries out the capturing of the image. In some embodiments, this device may be a wearable computer, but in other embodiments, any image capturing device or any device that has an image capturing device incorporated into its functionality may implement the devices, methods, and systems described herein.

The instant application is directed to devices, methods, and systems that have a capability to capture images, and in which the capture of those images may include capturing images of a person, persons, or portion(s) of a person for which a privacy beacon may be associated. The privacy beacon may be optical, digital, or other form (e.g., radio, electromagnetic, biomechanic, quantum-state, and the like), and may be detected through digital or optical operations, as discussed herein. The instant application describes devices, methods and systems that may interface with other parts of a larger system, which may be described in detail in this or other applications.

In one or more various aspects, a method includes, but is not limited to, acquiring an encrypted image that is a captured image that has been encrypted through use of a particular device code associated with an image capture device that captured the captured image, wherein the captured image includes a representation of a feature of an entity, decrypting the acquired encrypted image that was encrypted through use of the particular device code, performing a validation detection operation to detect a privacy beacon associated with the entity in the decrypted captured image, and storing outcome data that includes at least a result of the performed validation detection operation to detect the privacy beacon in the captured image. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for carrying out the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring an encrypted image that is a captured image that has been encrypted through use of a particular device code associated with an image capture device that captured the captured image, wherein the captured image includes a representation of a feature of an entity, means for decrypting the acquired encrypted image that was encrypted through use of the particular device code, means for performing a validation detection operation to detect a privacy beacon associated with the entity in the decrypted captured image, and means for storing outcome data that includes at least a result of the performed validation detection operation to detect the privacy beacon in the captured image. In addition to the foregoing, other system aspects are described in the claims, drawings, and text forming a part of the disclosure set forth herein.

In one or more various aspects, a system includes, but is not limited to, circuitry for acquiring an encrypted image that is a captured image that has been encrypted through use of a particular device code associated with an image capture device that captured the captured image, wherein the captured image includes a representation of a feature of an entity, circuitry for decrypting the acquired encrypted image that was encrypted through use of the particular device code, circuitry for performing a validation detection operation to detect a privacy beacon associated with the entity in the decrypted captured image, and storing outcome data that includes at least a result of the performed validation detection operation to detect the privacy beacon in the captured image. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring an encrypted image that is a captured image that has been encrypted through use of a particular device code associated with an image capture device that captured the captured image, wherein the captured image includes a representation of a feature of an entity, one or more instructions for decrypting the acquired encrypted image that was encrypted through use of the particular device code, one or more instructions for performing a validation detection operation to detect a privacy beacon associated with the entity in the decrypted captured image, and one or more instructions for storing outcome data that includes at least a result of the performed validation detection operation to detect the privacy beacon in the captured image. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring an encrypted image that is a captured image that has been encrypted through use of a particular device code associated with an image capture device that captured the captured image, wherein the captured image includes a representation of a feature of an entity, one or more interchained physical machines ordered for decrypting the acquired encrypted image that was encrypted through use of the particular device code, one or more interchained physical machines ordered for performing a validation detection operation to detect a privacy beacon associated with the entity in the decrypted captured image, and one or more interchained physical machines ordered for storing outcome data that includes at least a result of the performed validation detection operation to detect the privacy beacon in the captured image.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1, including FIGS. 1-A through 1-T, shows a high-level system diagram of one or more exemplary environments in which transactions and potential transactions may be carried out, according to one or more embodiments. FIG. 1 forms a partially schematic diagram of an environment(s) and/or an implementation(s) of technologies described herein when FIGS. 1-A through 1-T are stitched together in the manner shown in FIG. 1-P, which is reproduced below in table format.

In accordance with 37 C.F.R. § 1.84(h)(2), FIG. 1 shows "a view of a large machine or device in its entirety . . . broken into partial views . . . extended over several sheets" labeled FIG. 1-A through FIG. 1-T (Sheets 1-20). The "views on two or more sheets form, in effect, a single complete view, [and] the views on the several sheets . . . [are] so arranged that the complete figure can be assembled" from "partial views drawn on separate sheets . . . linked edge to edge. Thus, in FIG. 1, the partial view FIGS. 1-A through 1-T are ordered alphabetically, by increasing in columns from left to right, and increasing in rows top to bottom, as shown in the following table:

TABLE 1

Figure 2A:
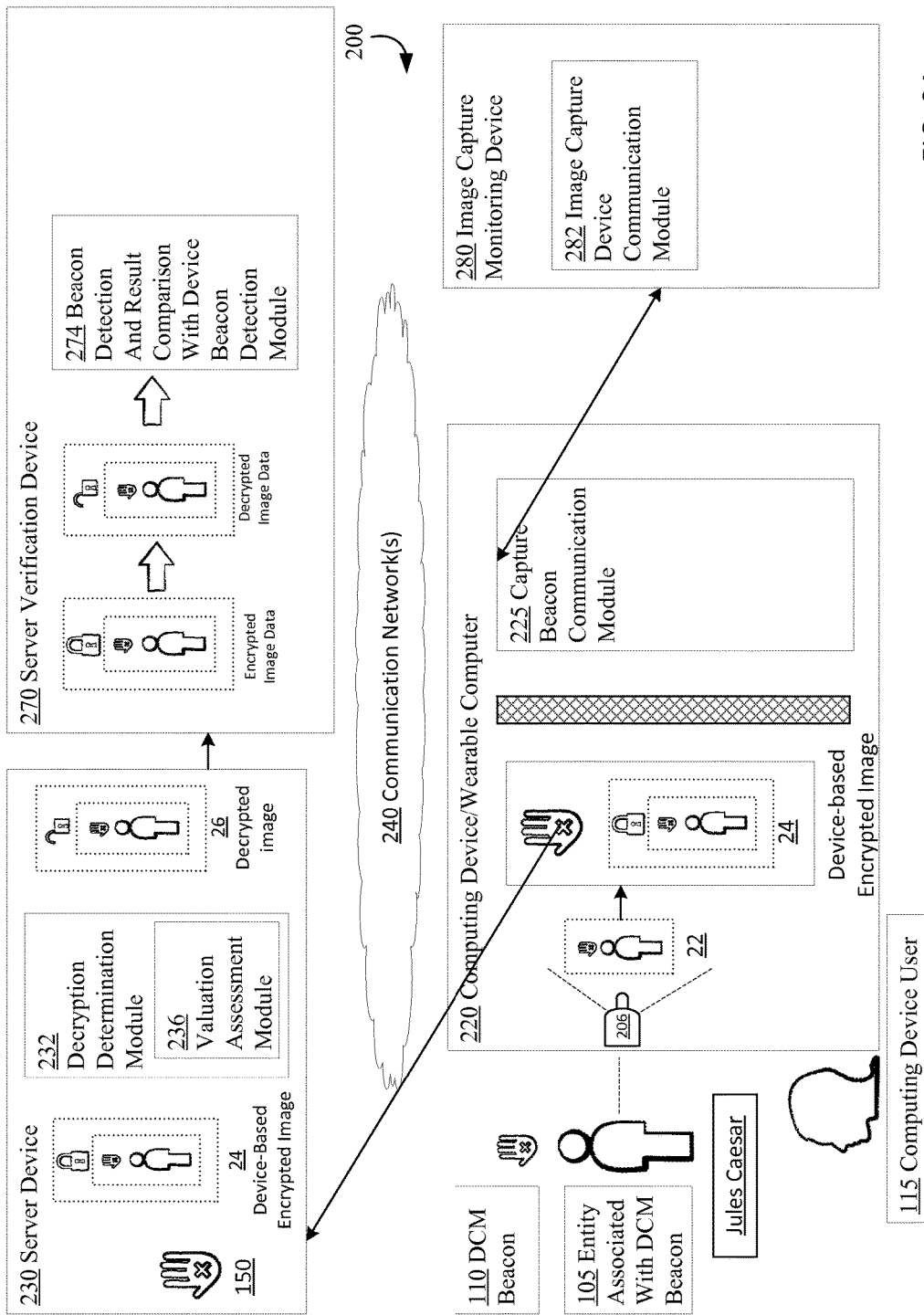

Table showing alignment of enclosed drawings to form partial schematic of one or more environments.

Figure 1:
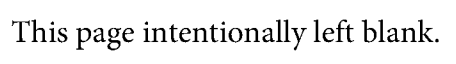

| | | | | |
|---|---|---|---|---|
| (1,1) - FIG. 1-A | (1,2) - FIG. 1-B | (1,3) - FIG. 1-C | (1,4) - FIG. 1-D | (1,5) - FIG. 1-E |
| (2,1) - FIG. 1-F | (2,2) - FIG. 1-G | (2,3) - FIG. 1-H | (2,4) - FIG. 1-I | (2,5) - FIG. 1-J |
| (3,1) - FIG. 1-K | (3,2) - FIG. 1-L | (3,3) - FIG. 1-M | (3,4) - FIG. 1-N | (3,5) - FIG. 1-O |
| (4,1) - FIG. 1-P | (4,2) - FIG. 1-Q | (4,3) - FIG. 1-R | (4,4) - FIG. 1-S | (4,5) - FIG. 1-T |

In accordance with 37 C.F.R. § 1.84(h)(2), FIG. 1 is " . . . a view of a large machine or device in its entirety . . . broken into partial views . . . extended over several sheets . . . [with] no loss in facility of understanding the view." The partial views drawn on the several sheets indicated in the above table are capable of being linked edge to edge, so that no partial view contains parts of another partial view. As here, "where views on two or more sheets form, in effect, a single complete view, the views on the several sheets are so arranged that the complete figure can be assembled without concealing any part of any of the views appearing on the various sheets." 37 C.F.R. § 1.84(h)(2).

It is noted that one or more of the partial views of the drawings may be blank, or may not contain substantive elements (e.g., may show only lines, connectors, and the like). These drawings are included in order to assist readers of the application in assembling the single complete view from the partial sheet format required for submission by the USPTO, and, while their inclusion is not required and may be omitted in this or other applications, their inclusion is proper, and should be considered intentional.

FIG. 1-A, when placed at position (1,1), forms at least a portion of a partially schematic diagram of an environment(s) and/or an implementation(s) of technologies described herein.

FIG. 1-B, when placed at position (1,2), forms at least a portion of a partially schematic diagram of an environment(s) and/or an implementation(s) of technologies described herein.

FIG. 1-C, when placed at position (1,3), forms at least a portion of a partially schematic diagram of an environment(s) and/or an implementation(s) of technologies described herein.

FIG. 1-D, when placed at position (1,4), forms at least a portion of a partially schematic diagram of an environment(s) and/or an implementation(s) of technologies described herein.

FIG. 1-E, when placed at position (1,5), forms at least a portion of a partially schematic diagram of an environment(s) and/or an implementation(s) of technologies described herein.

FIG. 1-F, when placed at position (2,1), forms at least a portion of a partially schematic diagram of an environment(s) and/or an implementation(s) of technologies described herein.

FIG. 1-G, when placed at position (2,2), forms at least a portion of a partially schematic diagram of an environment(s) and/or an implementation(s) of technologies described herein.

FIG. 1-H, when placed at position (2,3), forms at least a portion of a partially schematic diagram of an environment(s) and/or an implementation(s) of technologies described herein.

FIG. 1-I, when placed at position (2,4), forms at least a portion of a partially schematic diagram of an environment(s) and/or an implementation(s) of technologies described herein.

FIG. 1-H, when placed at position (2,5), forms at least a portion of a partially schematic diagram of an environment(s) and/or an implementation(s) of technologies described herein.

FIG. 1-K, when placed at position (3,1), forms at least a portion of a partially schematic diagram of an environment(s) and/or an implementation(s) of technologies described herein.

FIG. 1-L, when placed at position (3,2), forms at least a portion of a partially schematic diagram of an environment(s) and/or an implementation(s) of technologies described herein.

FIG. 1-M, when placed at position (3,3), forms at least a portion of a partially schematic diagram of an environment(s) and/or an implementation(s) of technologies described herein.

FIG. 1-N, when placed at position (3,4), forms at least a portion of a partially schematic diagram of an environment(s) and/or an implementation(s) of technologies described herein.

FIG. 1-O, when placed at position (3,5), forms at least a portion of a partially schematic diagram of an environment(s) and/or an implementation(s) of technologies described herein.

FIG. 1-P, when placed at position (4,1), forms at least a portion of a partially schematic diagram of an environment(s) and/or an implementation(s) of technologies described herein.

FIG. 1-Q, when placed at position (4,2), forms at least a portion of a partially schematic diagram of an environment(s) and/or an implementation(s) of technologies described herein.

FIG. 1-R, when placed at position (4,3), forms at least a portion of a partially schematic diagram of an environment(s) and/or an implementation(s) of technologies described herein.

FIG. 1-S, when placed at position (4,4), forms at least a portion of a partially schematic diagram of an environment(s) and/or an implementation(s) of technologies described herein.

FIG. 1-T, when placed at position (4,5), forms at least a portion of a partially schematic diagram of an environment(s) and/or an implementation(s) of technologies described herein.

FIG. 2A shows a high-level block diagram of an exemplary environment 200, according to one or more embodiments.

Figure 2B:
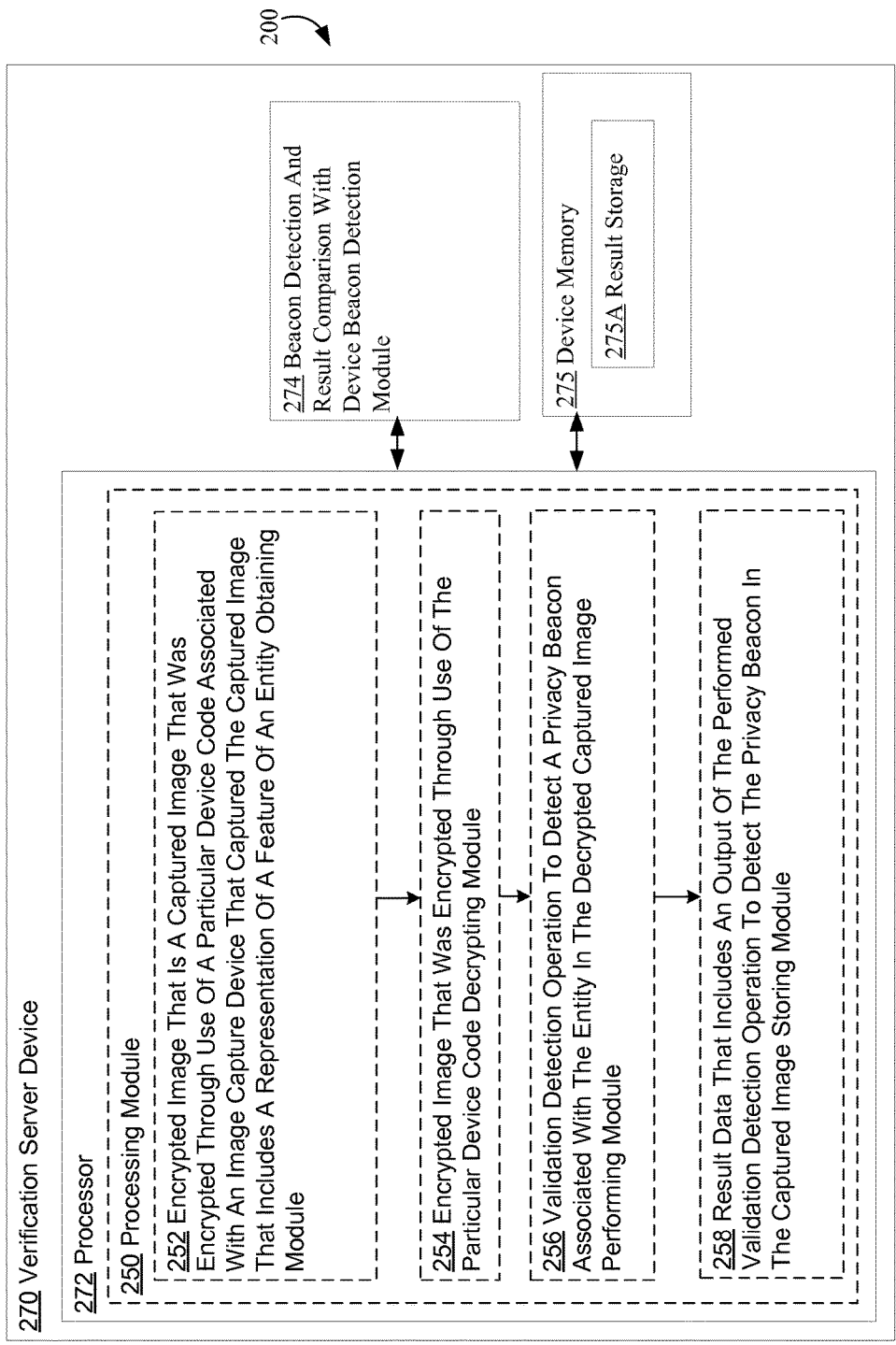

FIG. 2B shows a high-level block diagram of a verification server device 270 operating in exemplary environment 200, according to one or more embodiments.

Figure 2C:
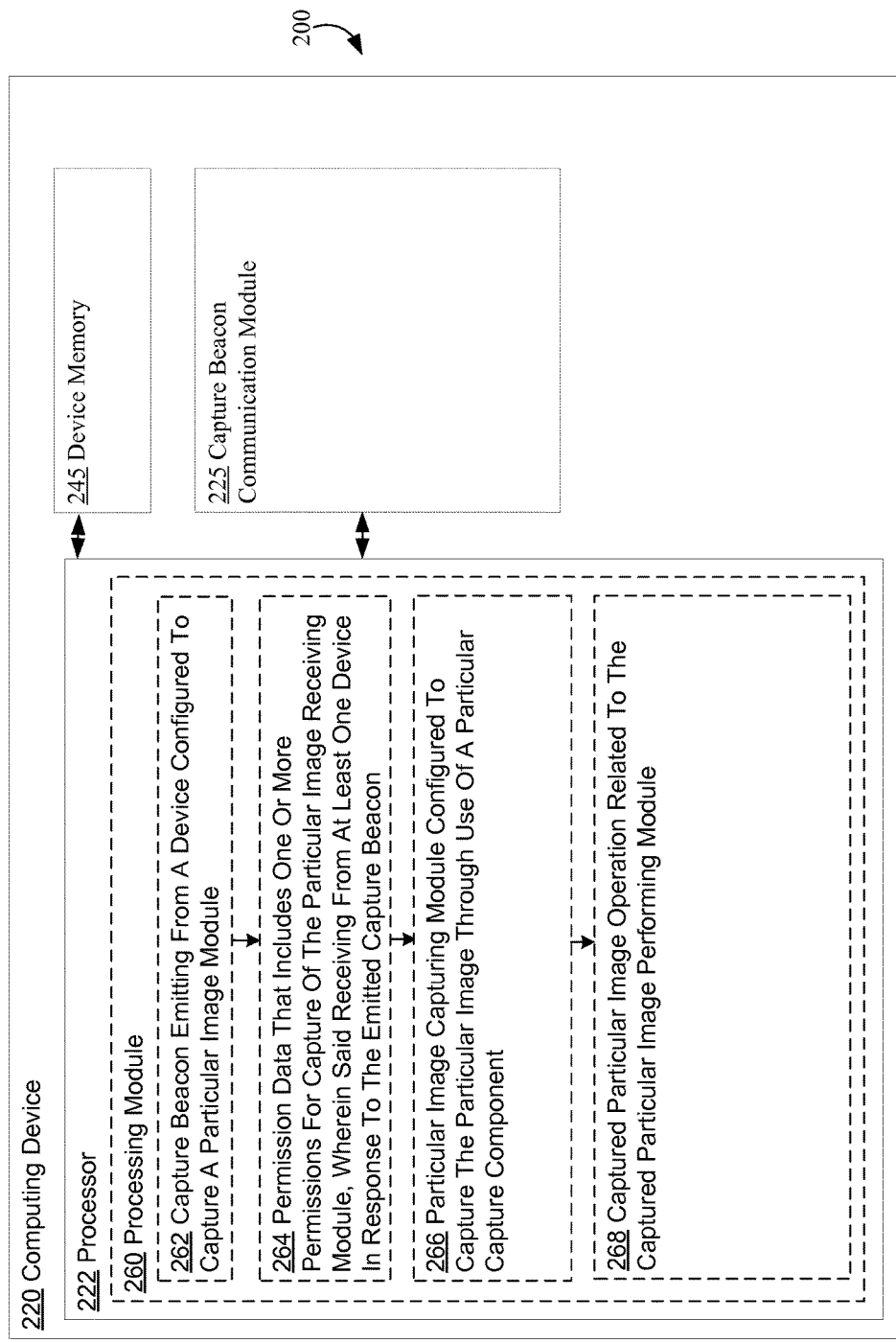

FIG. 2C shows a high-level block diagram of a computing device 220 operating in exemplary environment 200, according to one or more embodiments.

Figure 3A:
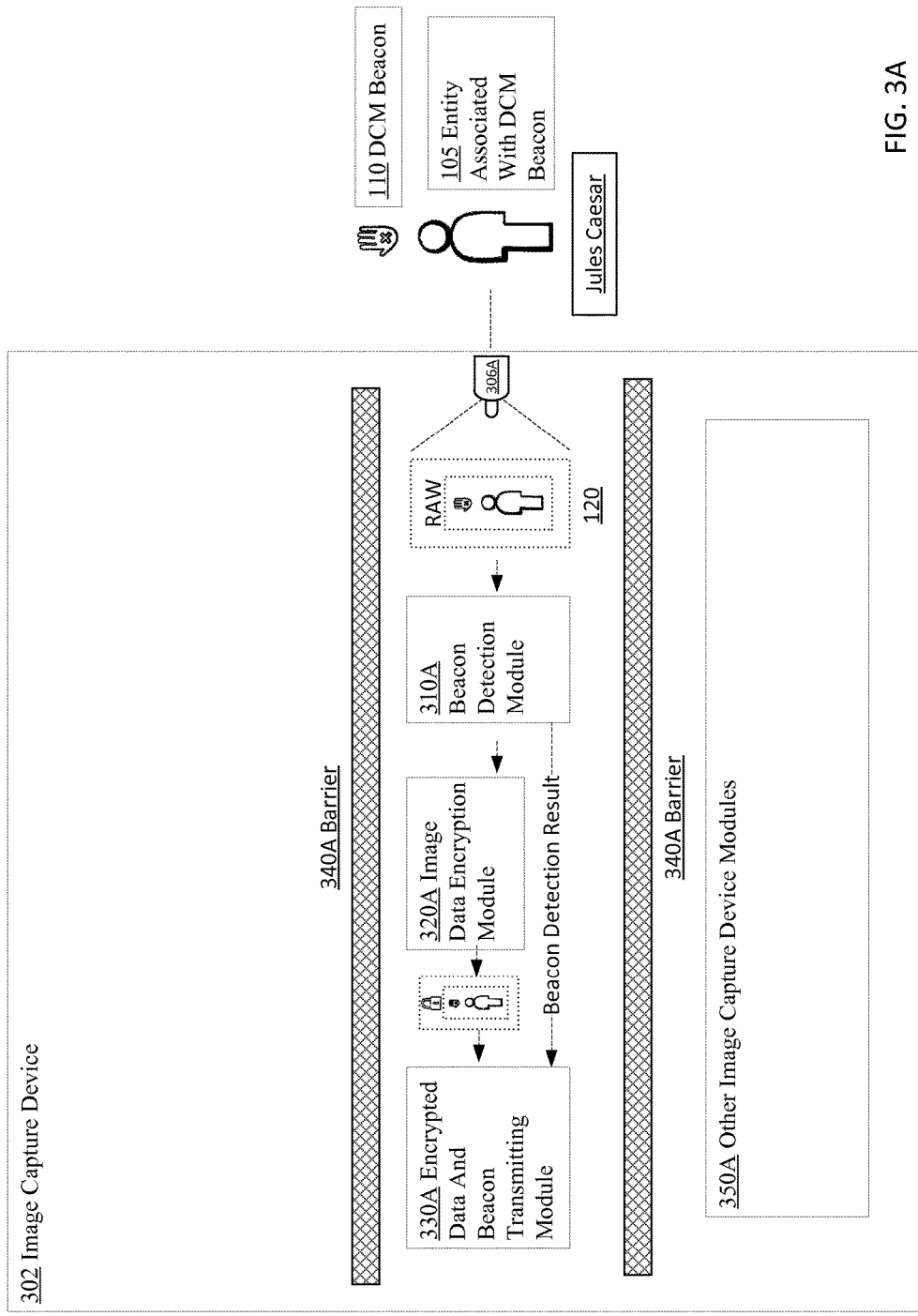

FIG. 3A shows a high-level block diagram of an exemplary image capture device 302, according to one or more embodiments.

Figure 3B:
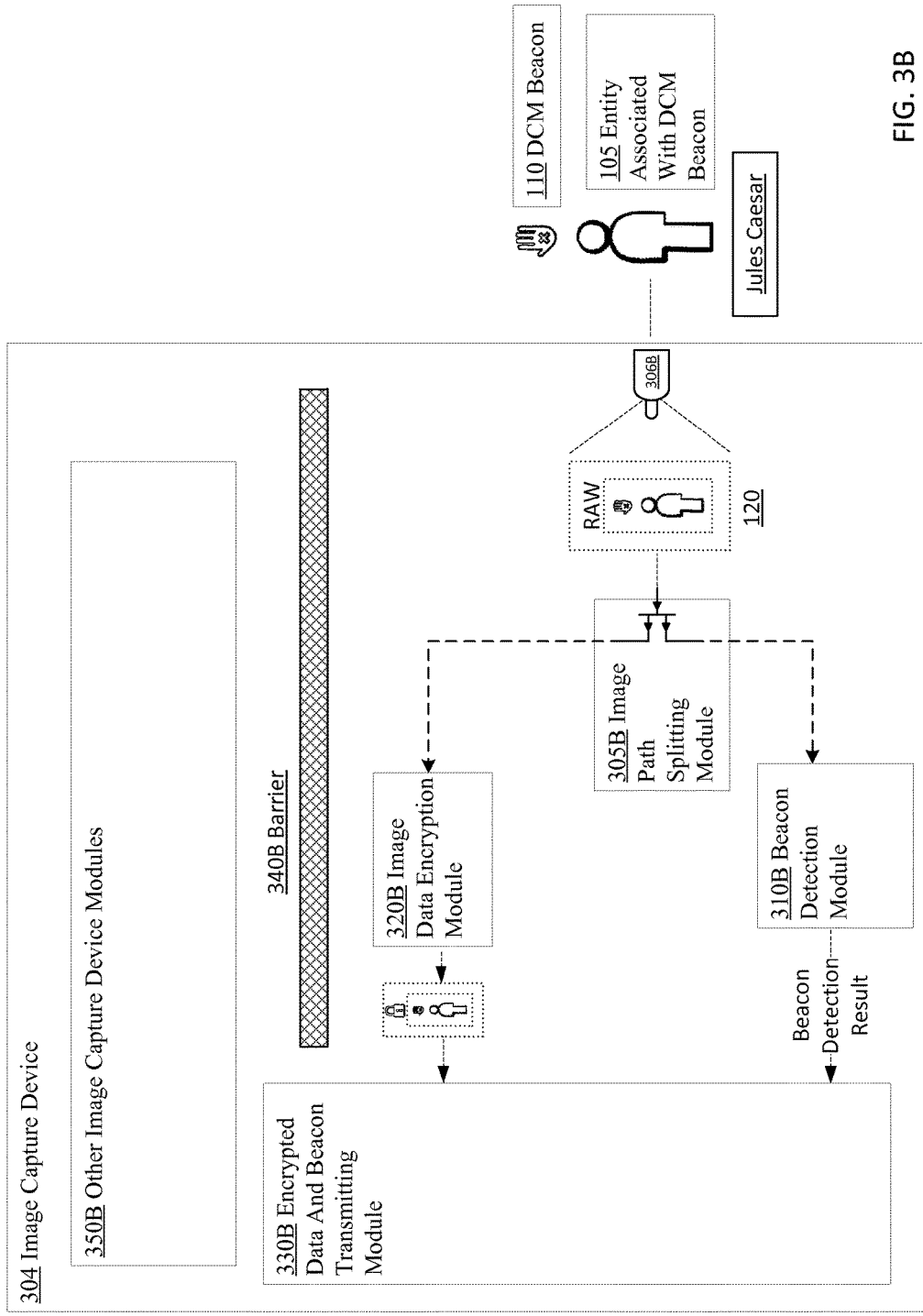

FIG. 3B shows a high-level block diagram of an exemplary image capture device 304, according to one or more embodiments.

FIG. 3C shows a high-level block diagram of an exemplary image capture device 306, according to one or more embodiments.

Figure 3D:
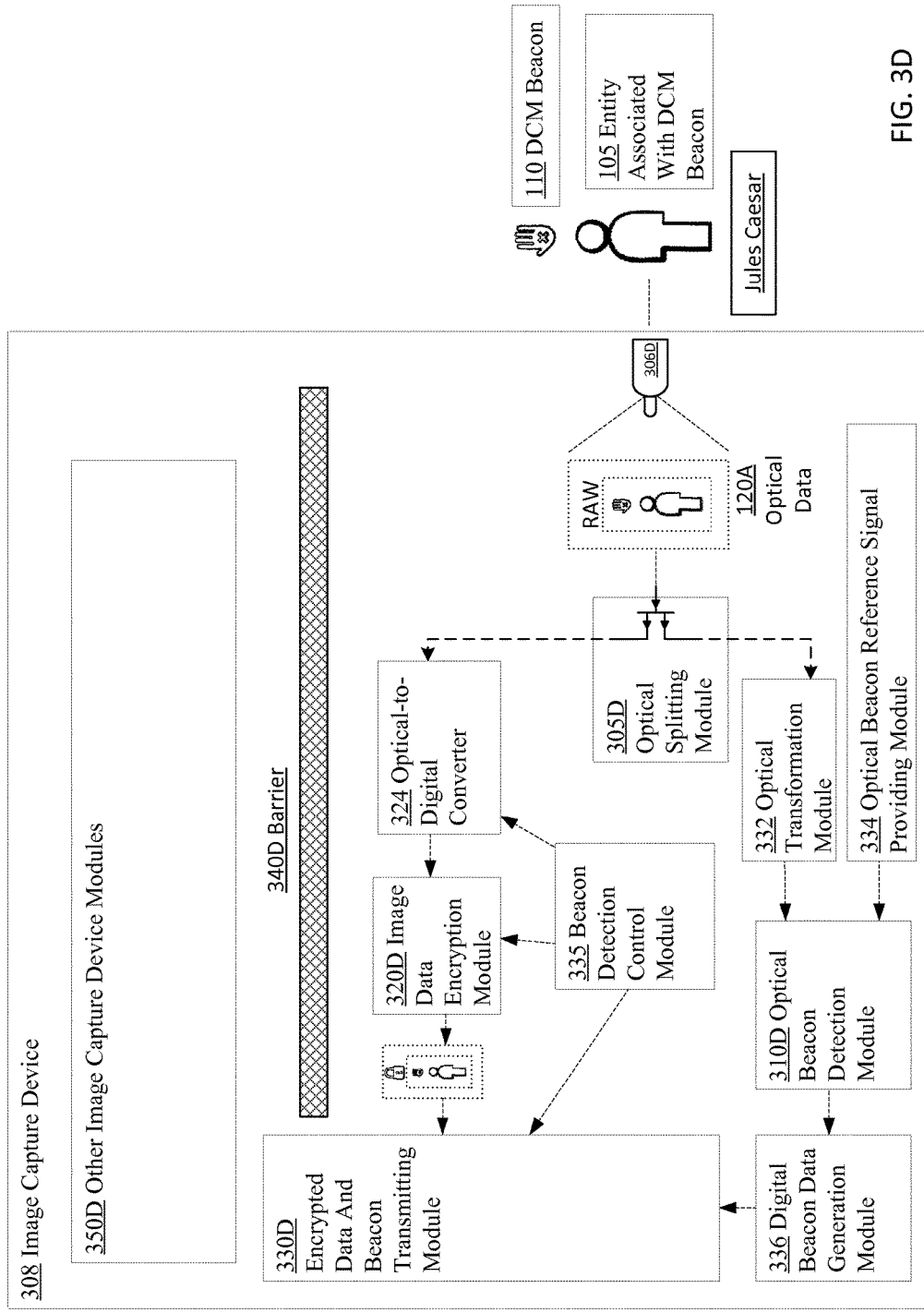

FIG. 3D shows a high-level block diagram of an exemplary image capture device 308, according to one or more embodiments.

Figure 3E:
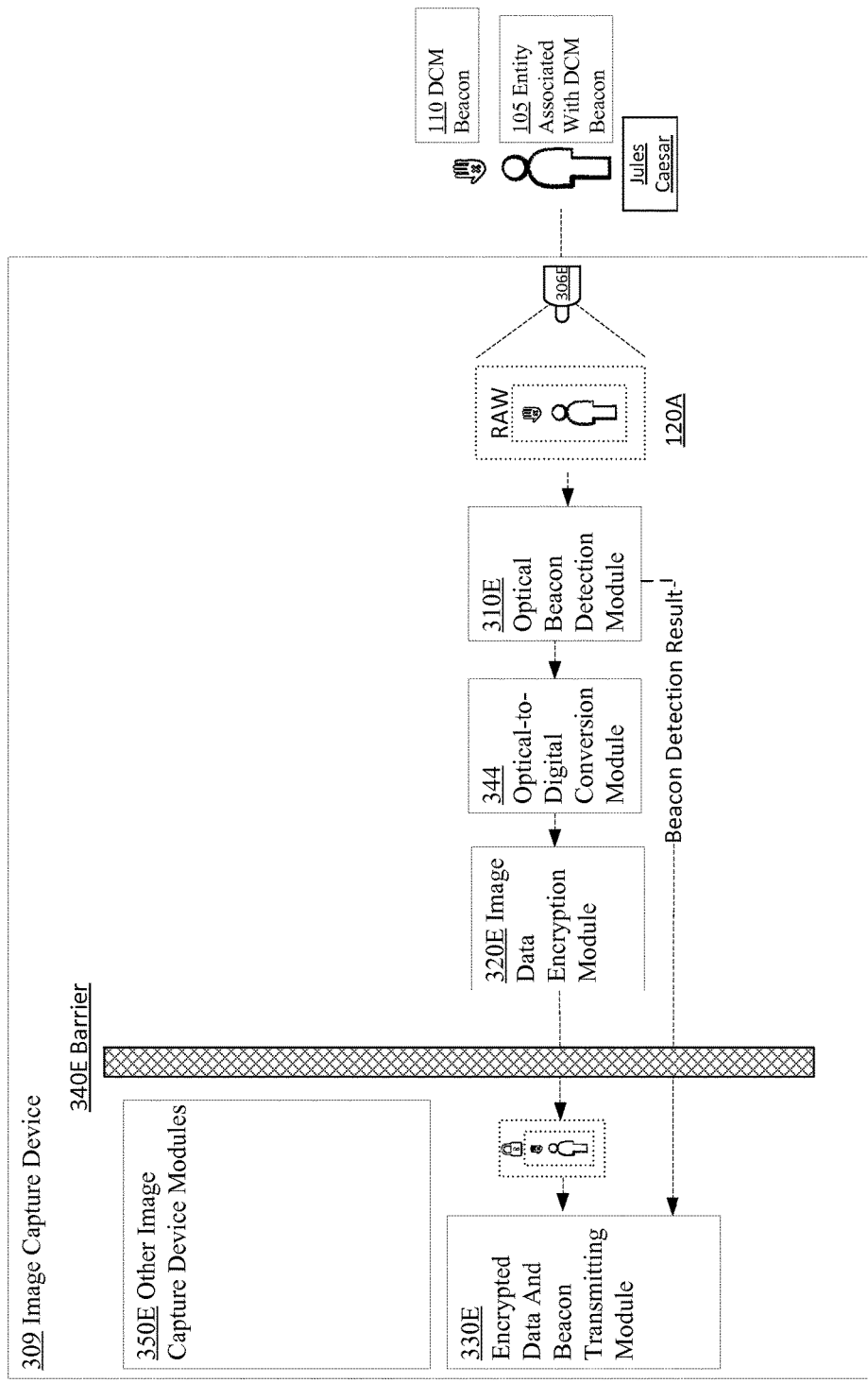

FIG. 3E shows a high-level block diagram of an exemplary image capture device 309, according to one or more embodiments.

Figure 4A:
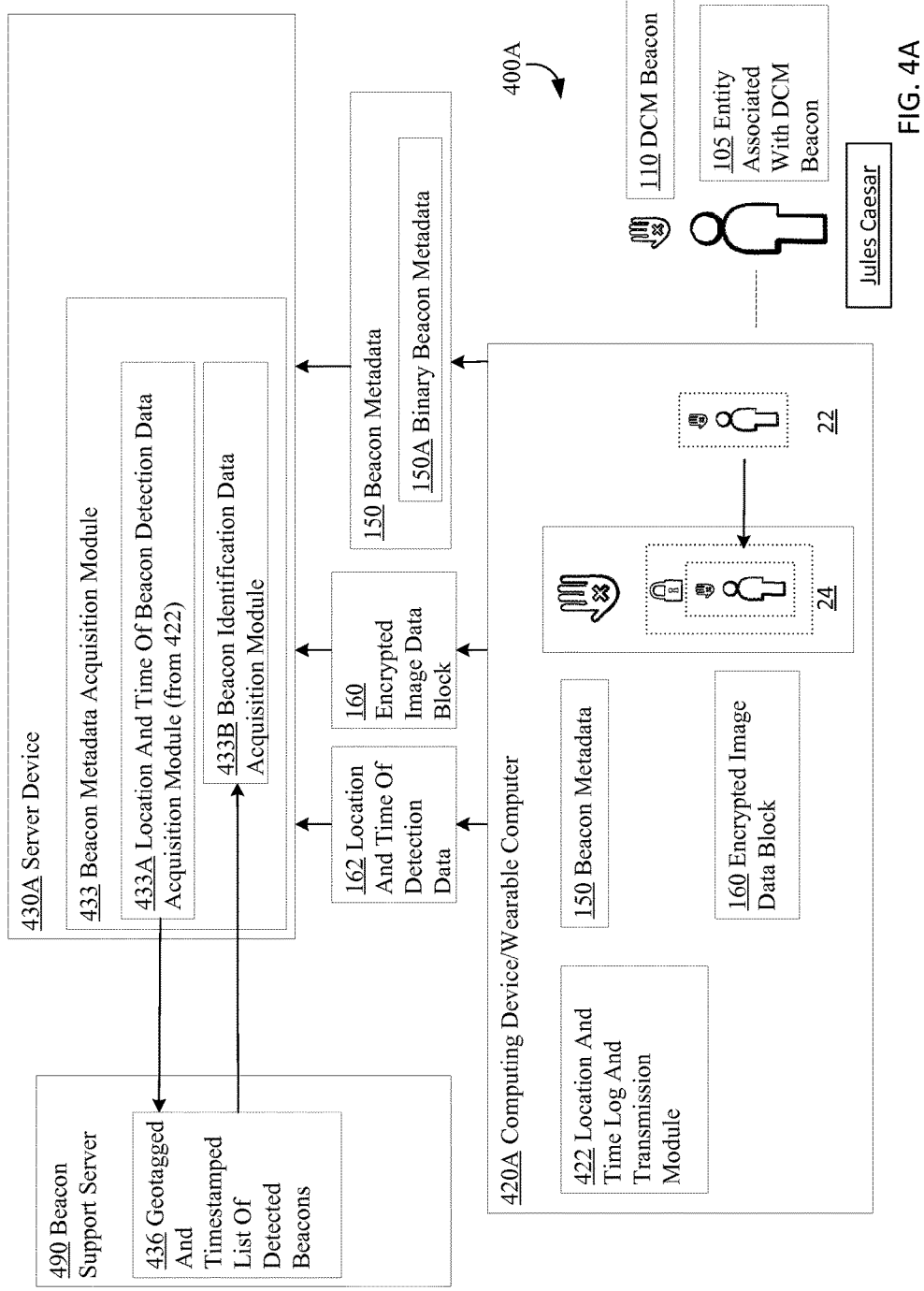

FIG. 4A shows a high-level block diagram of an exemplary environment 400A including a computing device 420A and a server device 430A.

FIG. 4B shows a high-level block diagram of an exemplary environment 400B including a computing device 420B and a server device 430B.

Figure 4C:
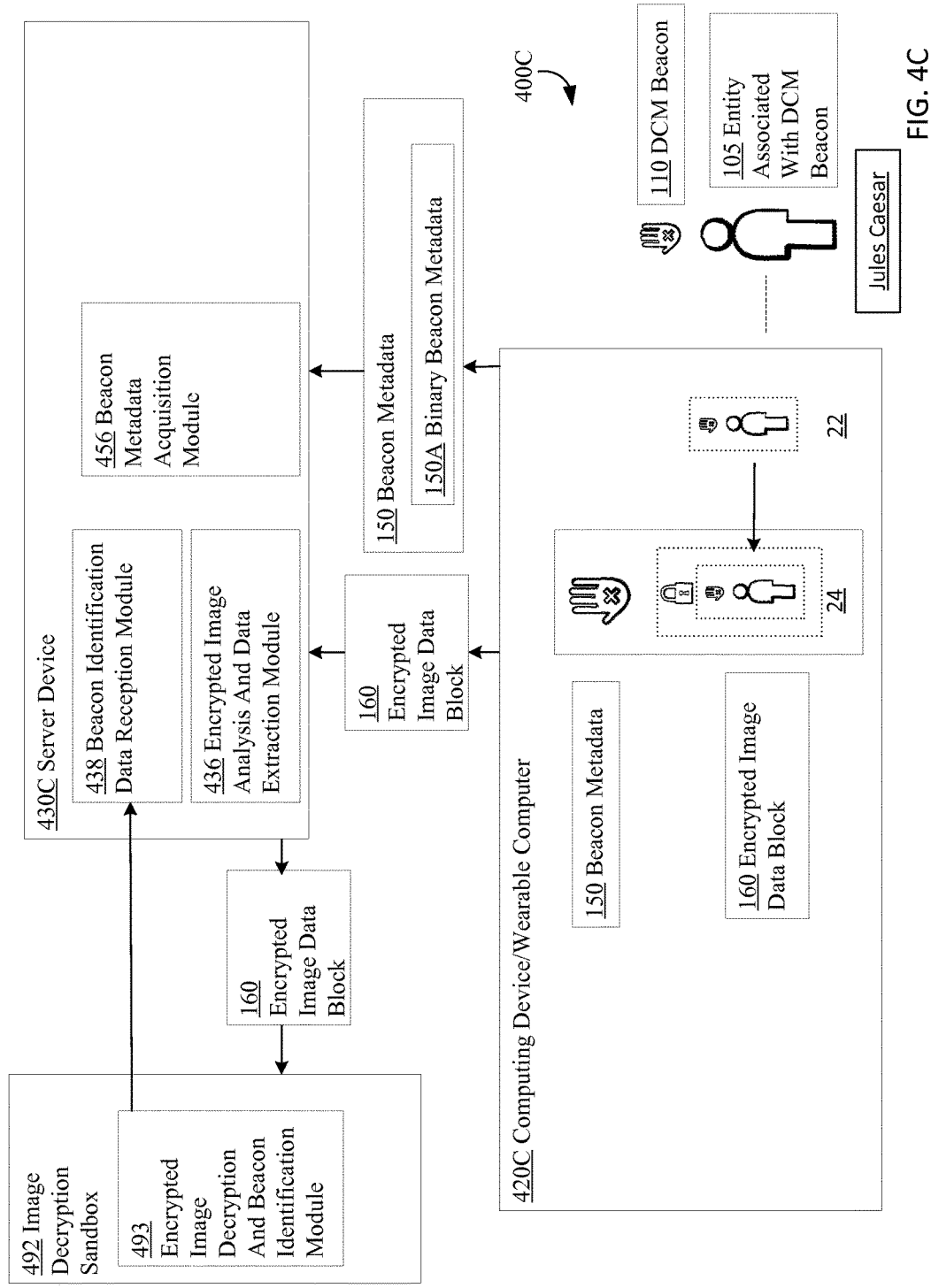

FIG. 4C shows a high-level block diagram of an exemplary environment 400C including a computing device 420C and a server device 430C.

Figure 4D:
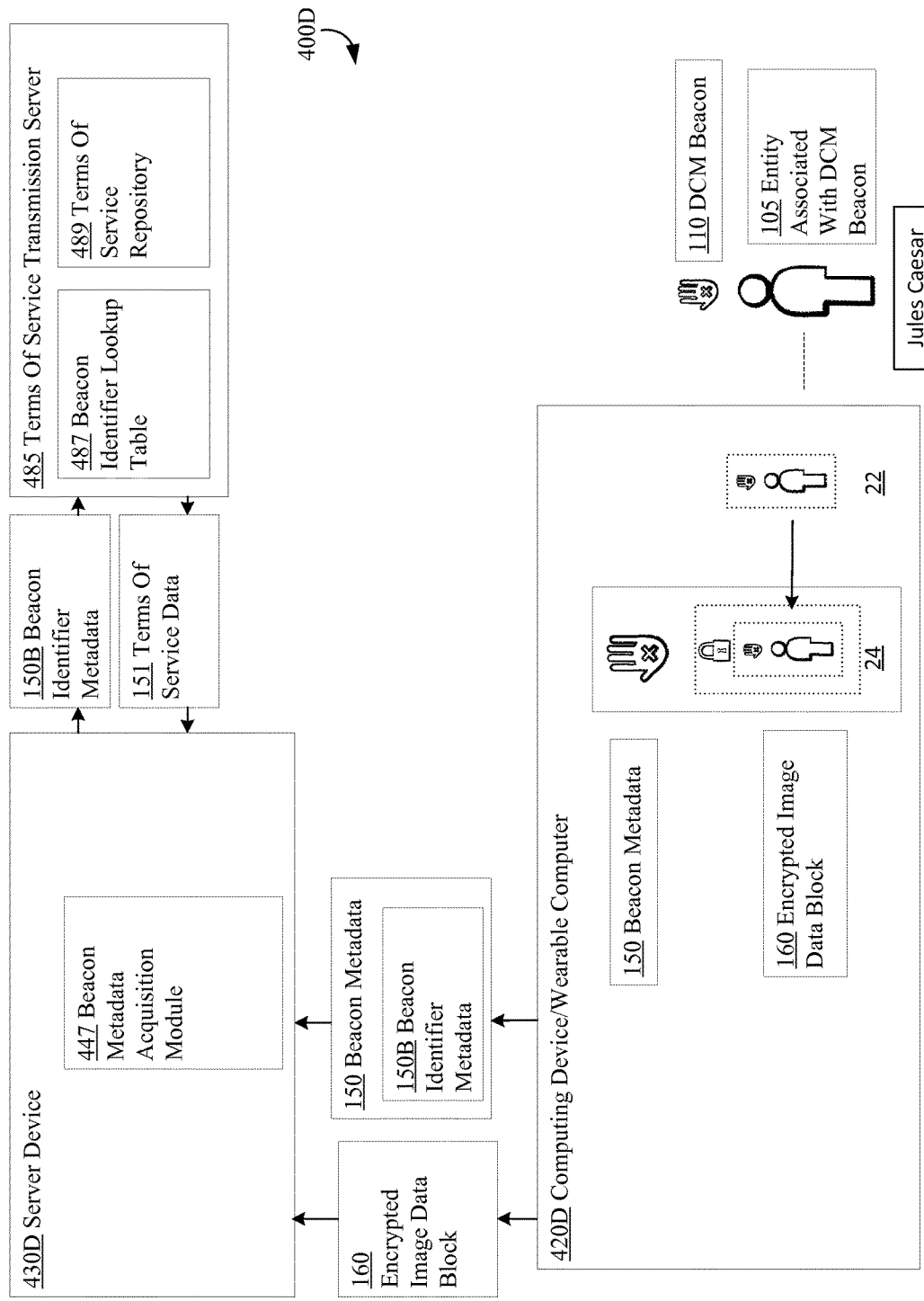

FIG. 4D shows a high-level block diagram of an exemplary environment 400D including a computing device 420D and a server device 430D.

Figure 4E:
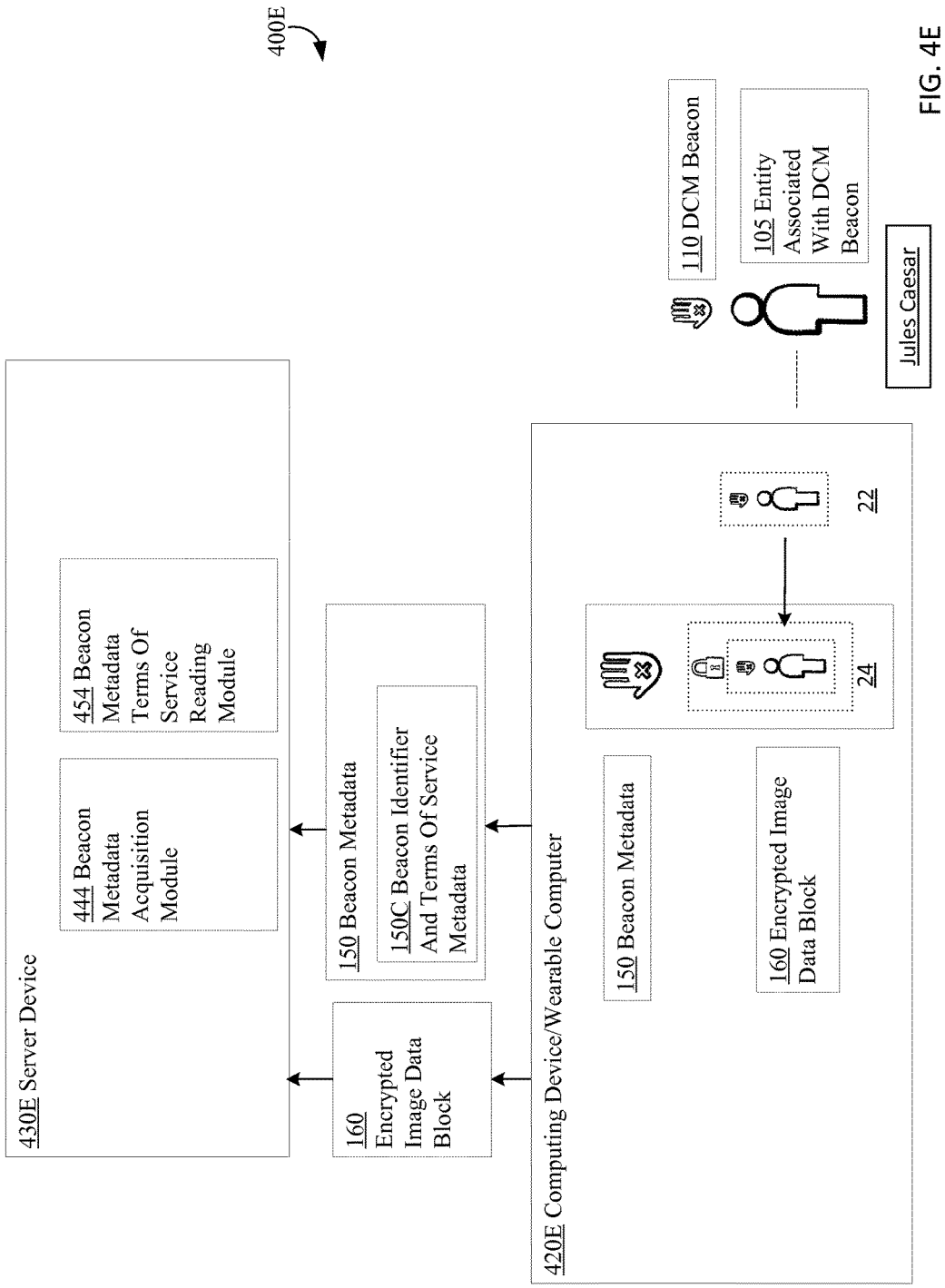

FIG. 4E shows a high-level block diagram of an exemplary environment 400E including a computing device 420E and a server device 430E.

Figure 5A:
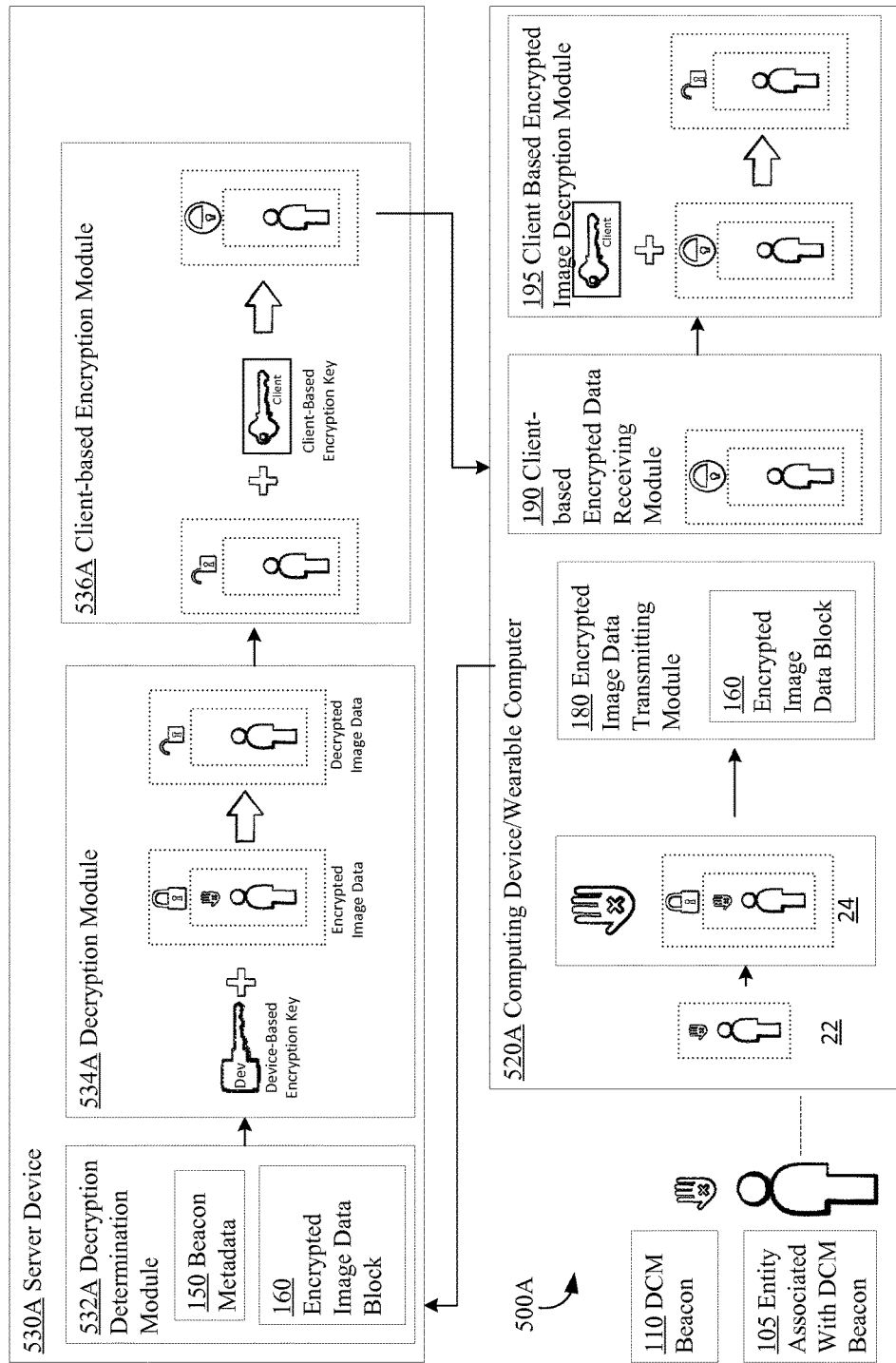

FIG. 5A shows a high-level block diagram of an exemplary environment 500A including a computing device 520A and a server device 530A.

Figure 5B:
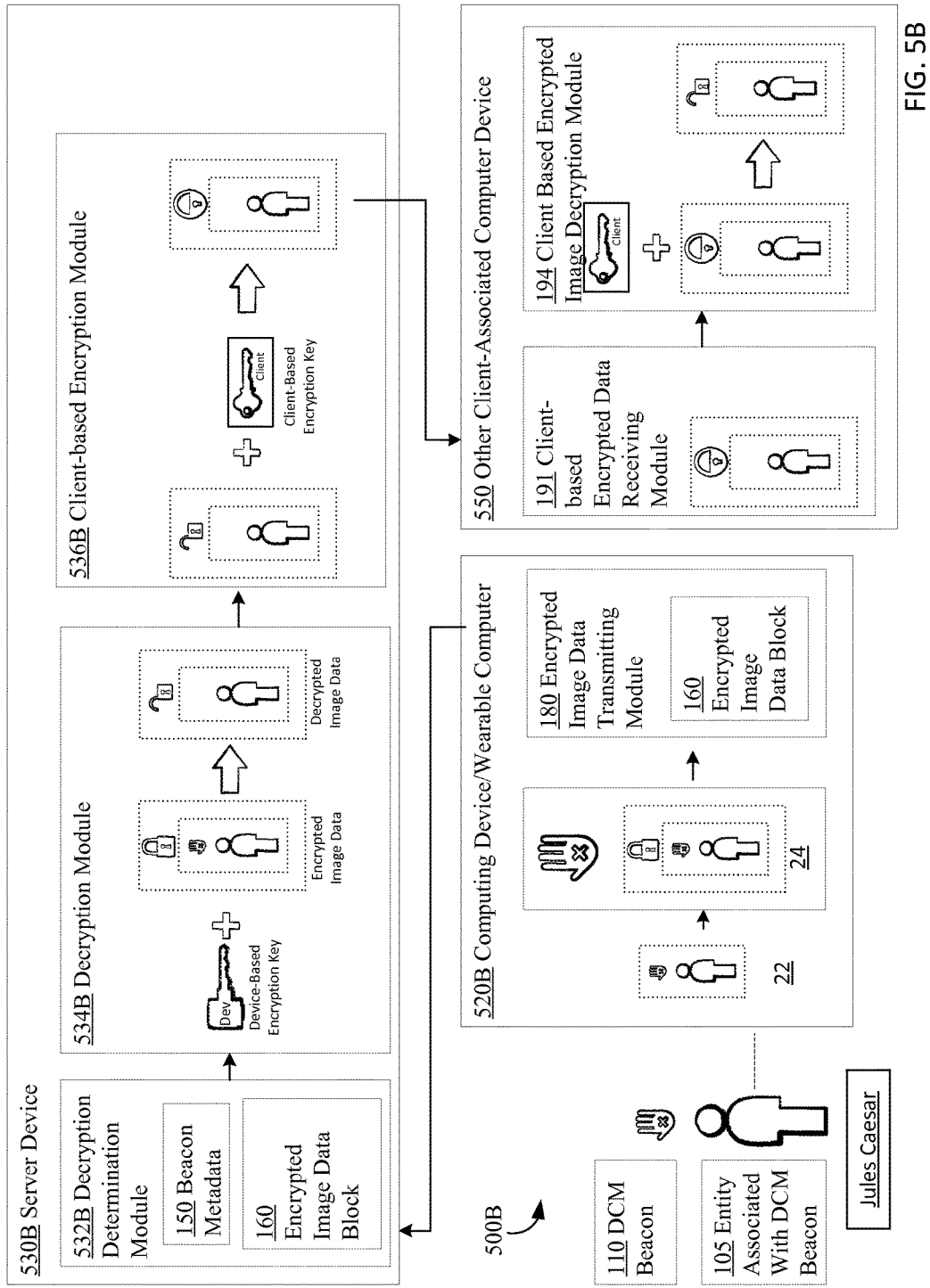

FIG. 5B shows a high-level block diagram of an exemplary environment 500B including a computing device 520B and a server device 530B.

Figure 5C:
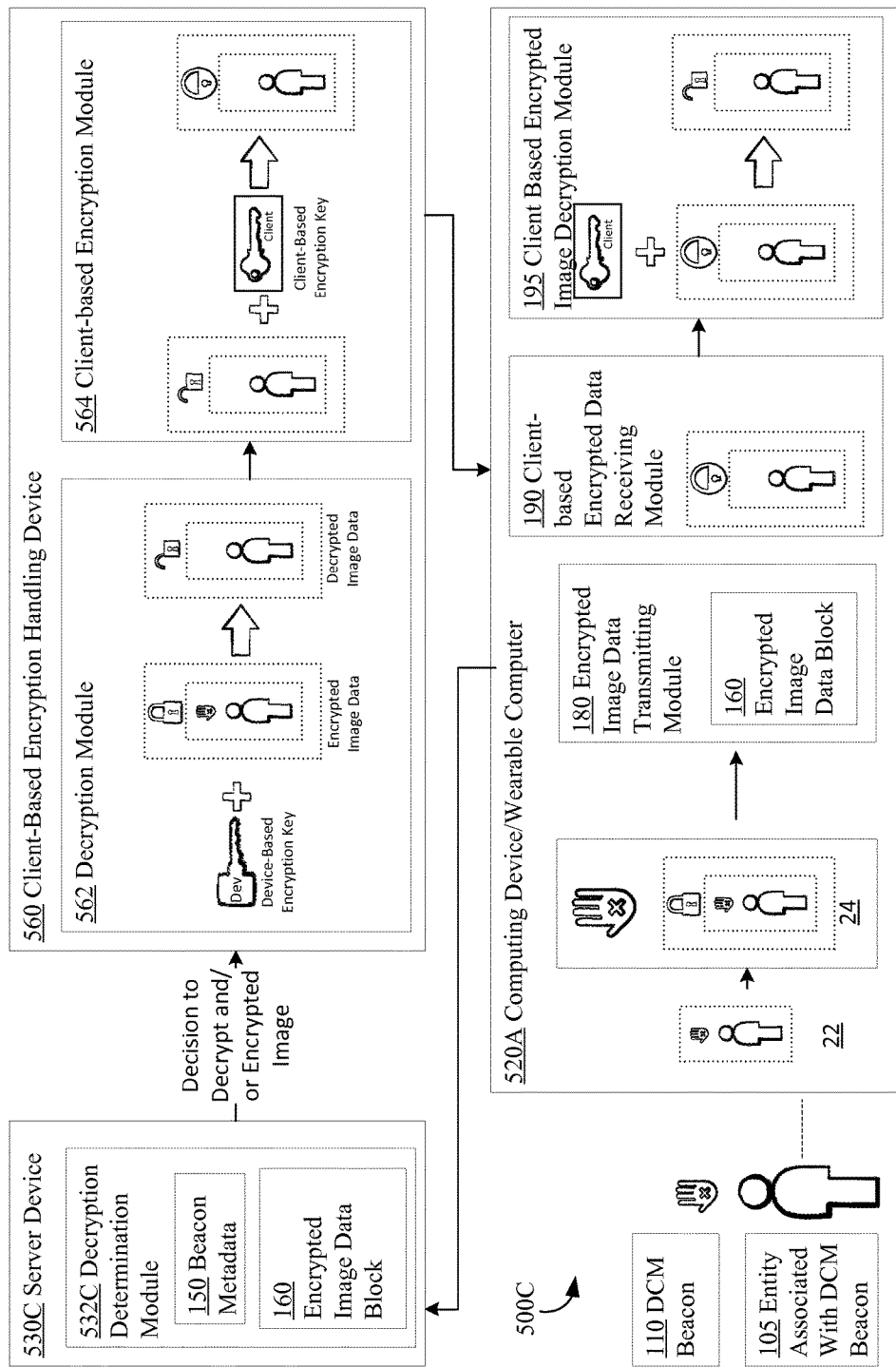

FIG. 5C shows a high-level block diagram of an exemplary environment 500C including a computing device 520C and a server device 530C.

Figure 5D:
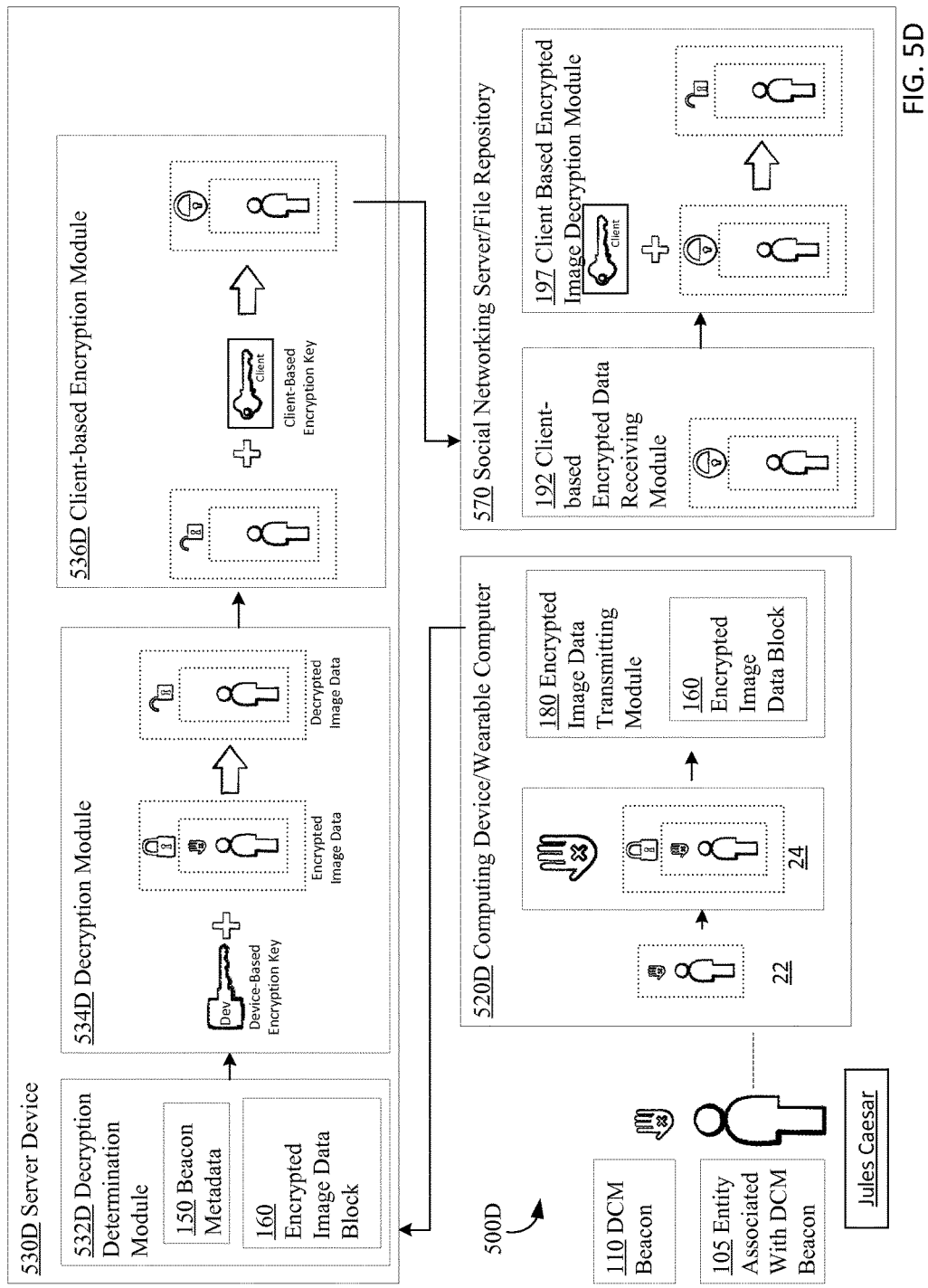

FIG. 5D shows a high-level block diagram of an exemplary environment 500D including a computing device 520D and a server device 530D.

Figures 6, 6B:
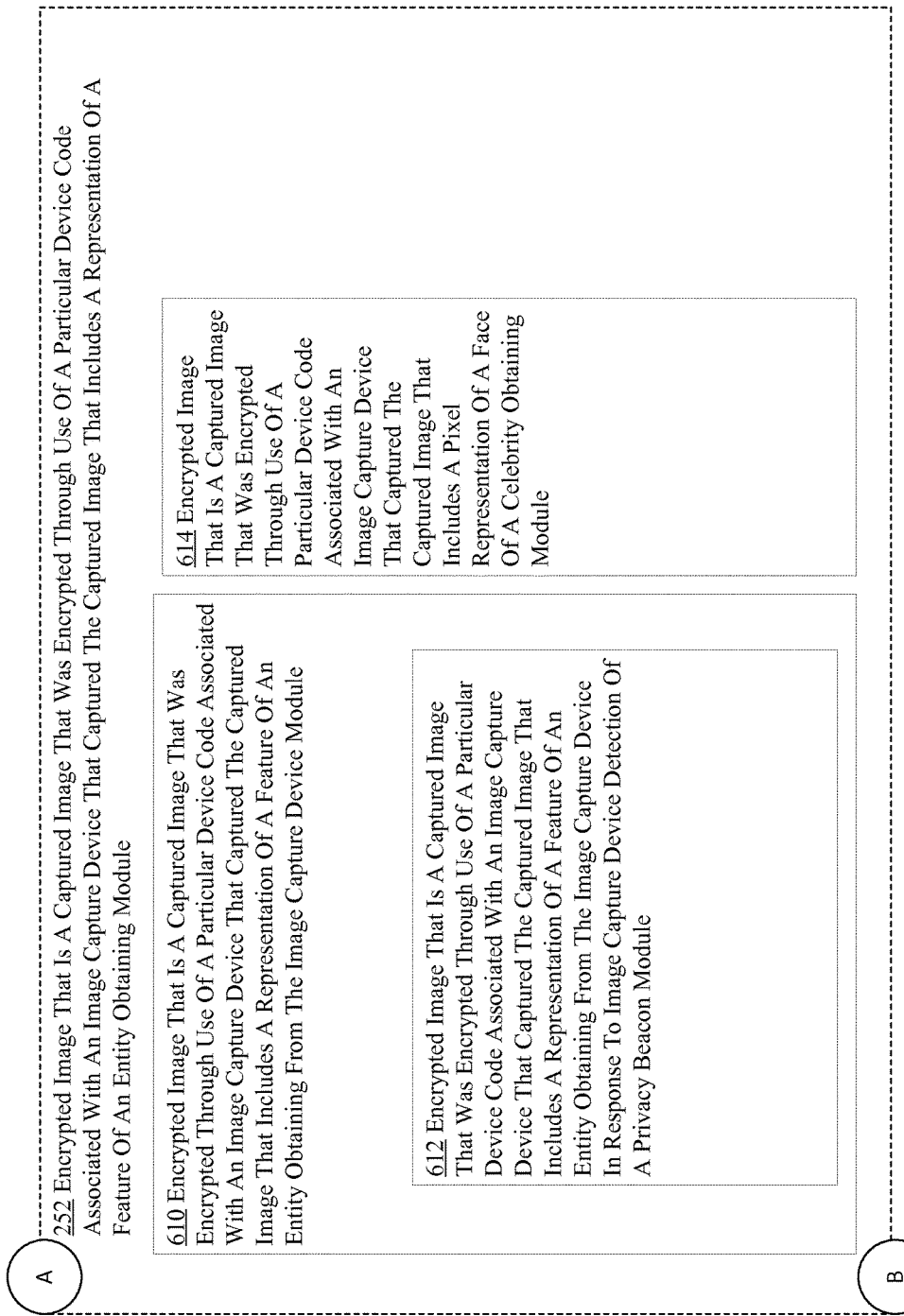

FIG. 6, including FIGS. 6A-6B, shows a particular perspective of an encrypted image that is a captured image that was encrypted through use of a particular device code associated with an image capture device that captured the captured image that includes a representation of a feature of an entity obtaining module 252 of processing module 250 of verification server device 270 of FIG. 2B, according to an embodiment.

Figure 7:
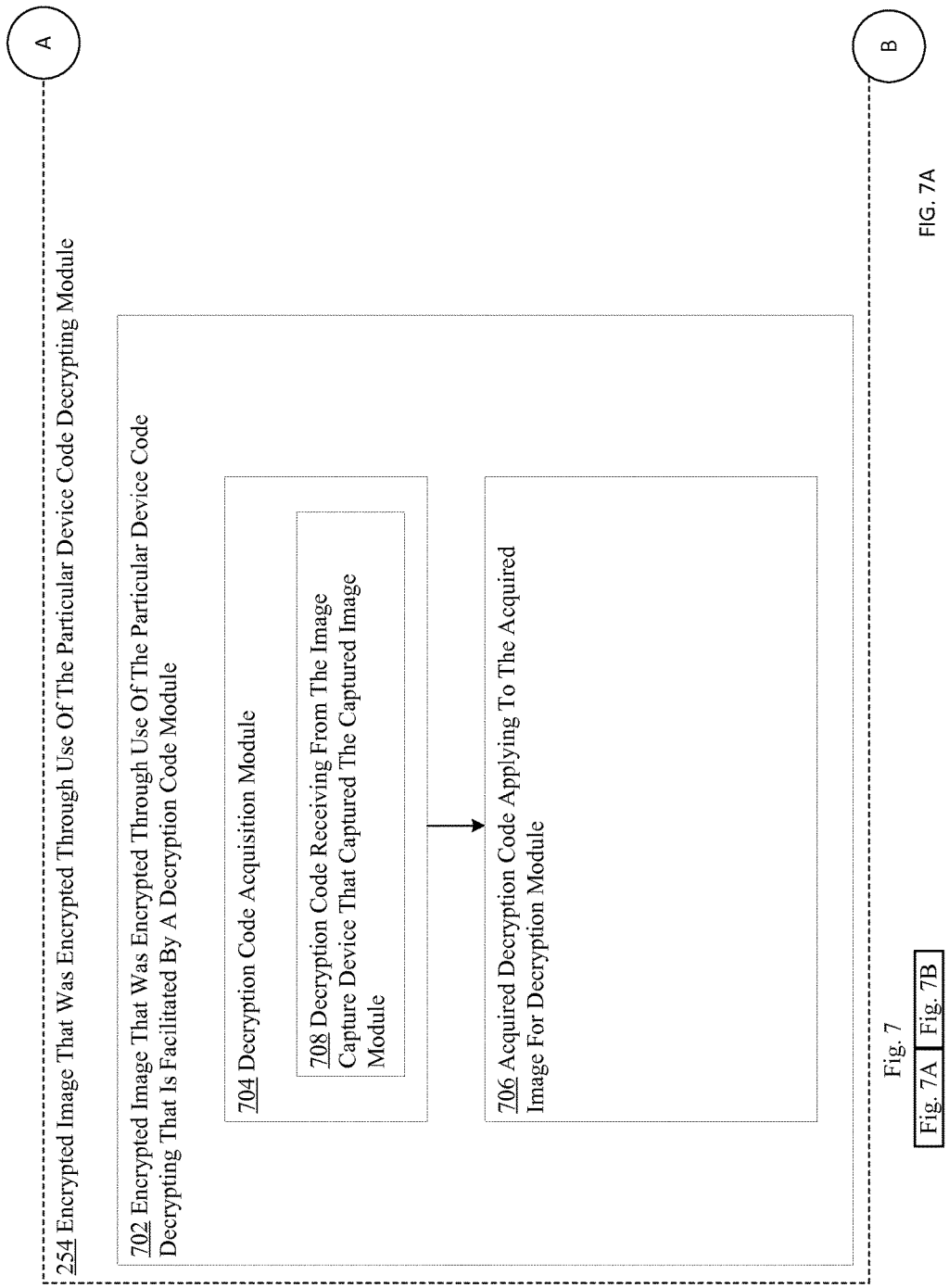

FIG. 7, including FIGS. 7A-7B, shows a particular perspective of an encrypted image that was encrypted through use of the particular device code decrypting module 254 of processing module 250 of verification server device 270 of FIG. 2B, according to an embodiment.

Figure 8:
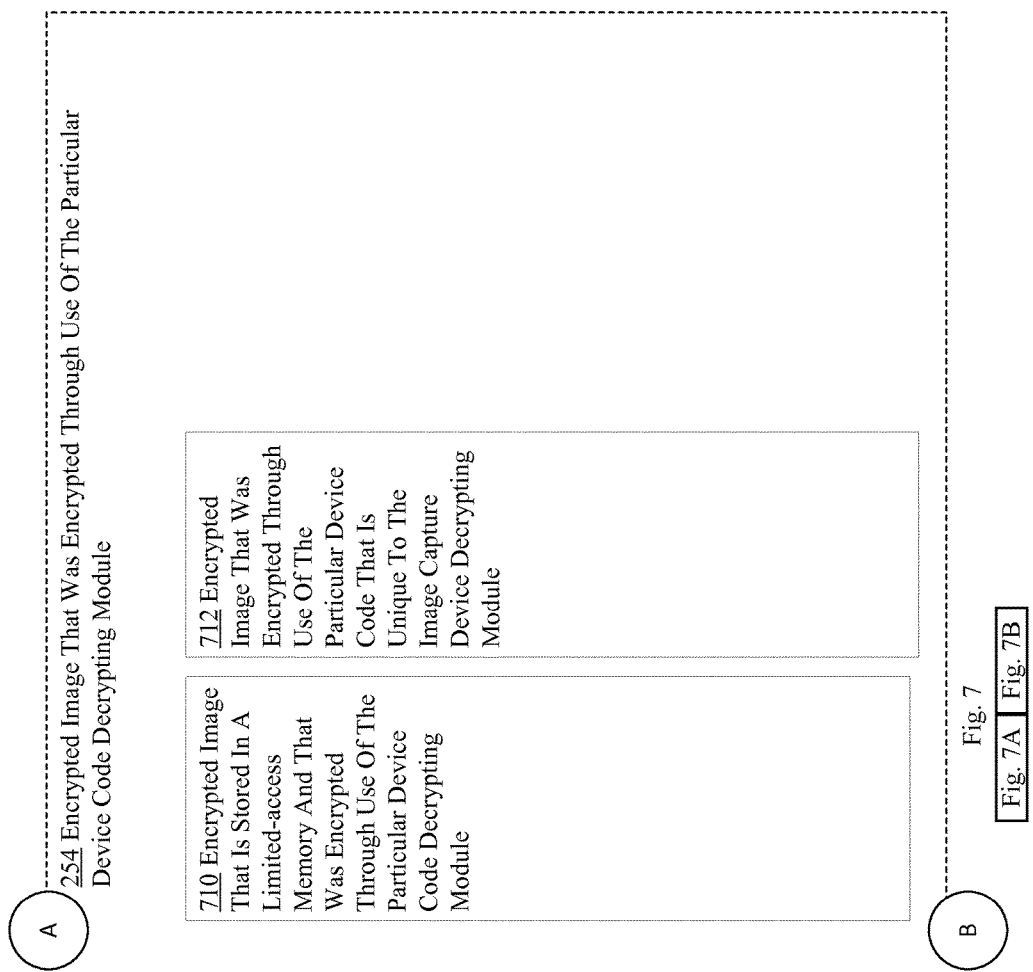

FIG. 8, including FIGS. 8A-8C, shows a particular perspective of a validation detection operation to detect a privacy beacon associated with the entity in the decrypted captured image performing module 256 of processing module 250 of verification server device 270 of FIG. 2B, according to an embodiment.

Figure 9:
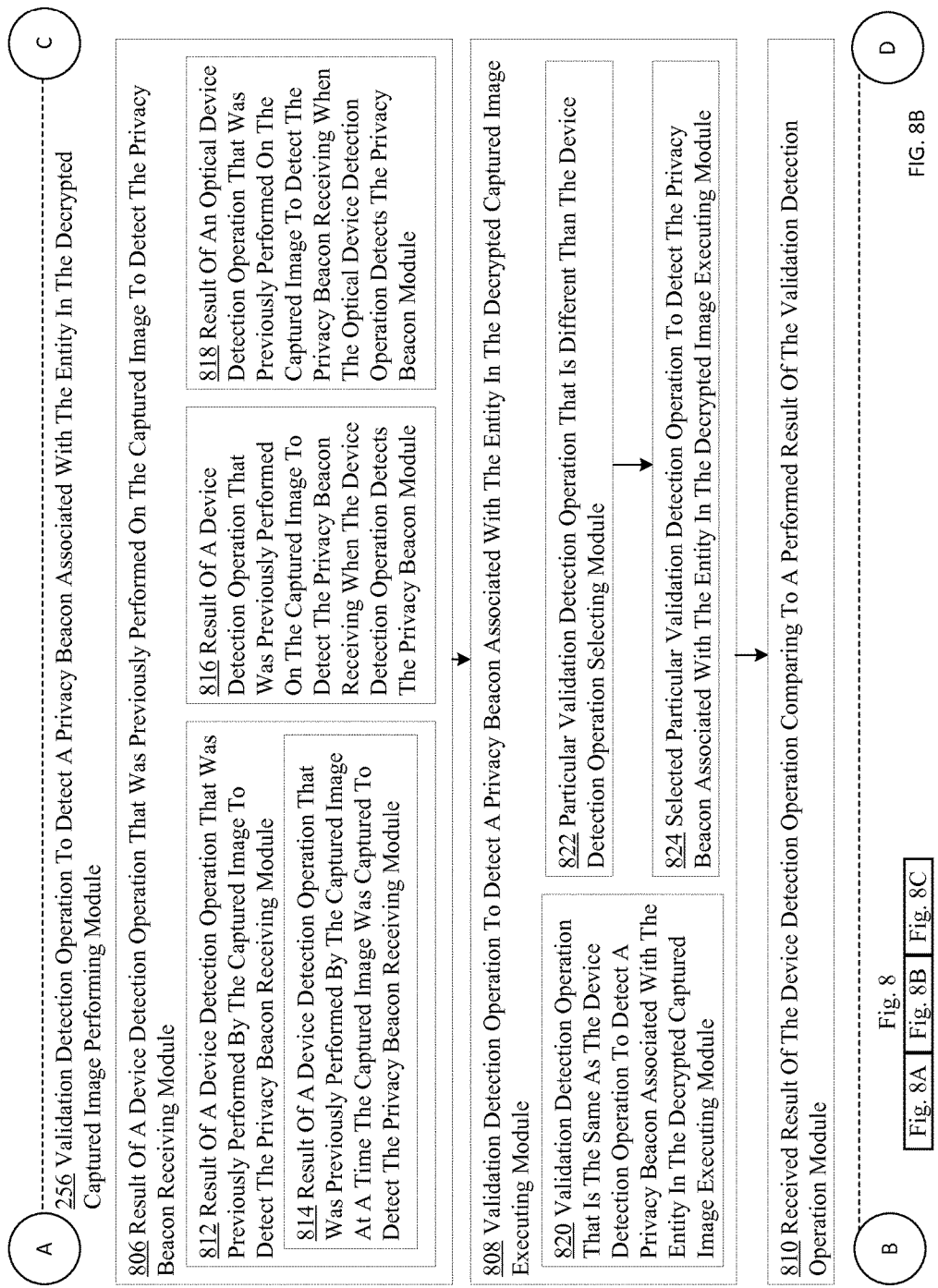

FIG. 9, including FIGS. 9A-9B, shows a particular perspective of a result data that includes an output of the performed validation detection operation to detect the privacy beacon in the captured image storing module 258 of processing module 250 of verification server device 270 of FIG. 2B, according to an embodiment.

Figure 10:
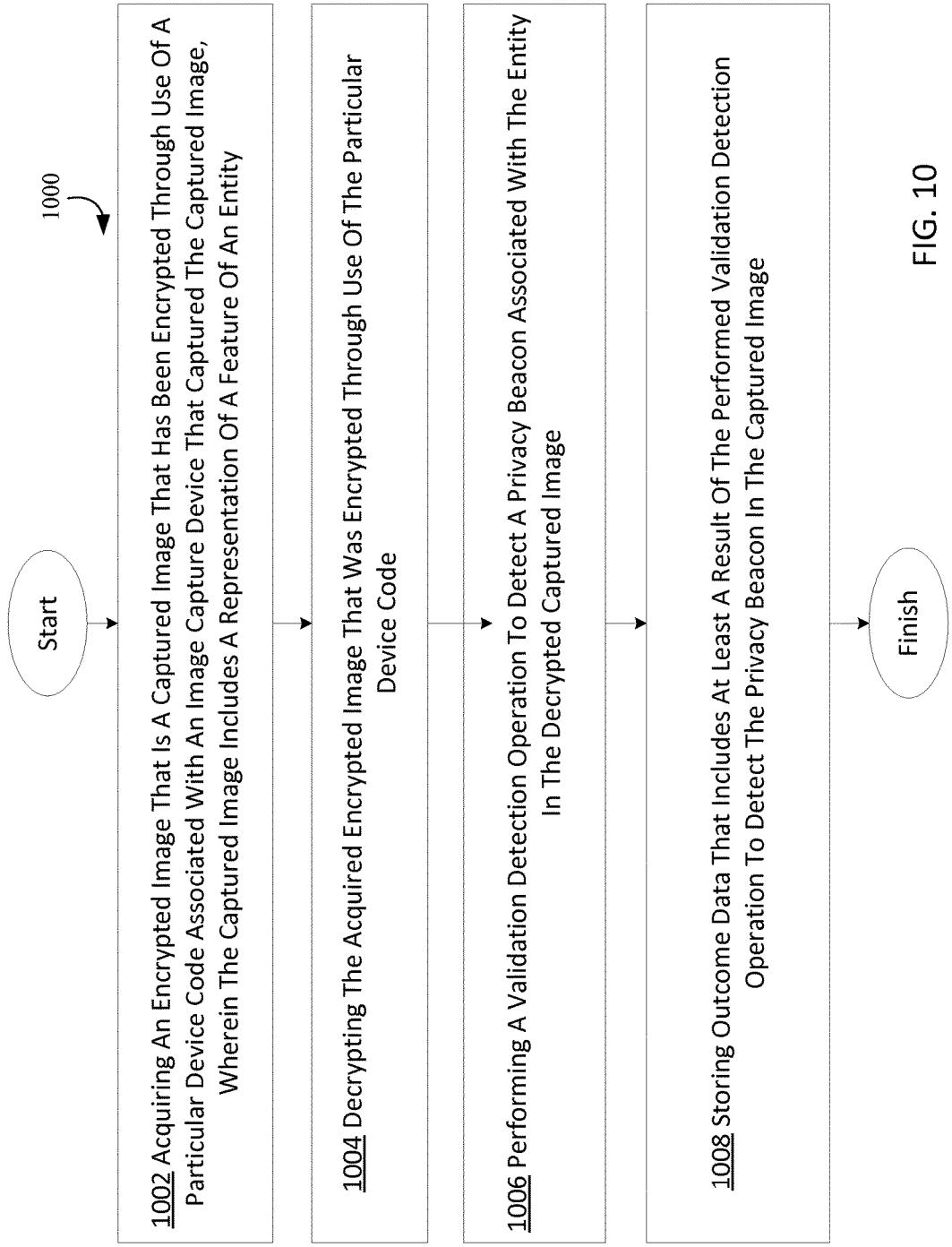

FIG. 10 is a high-level logic flowchart of a process, e.g., operational flow 1000, according to an embodiment.

Figure 11A:
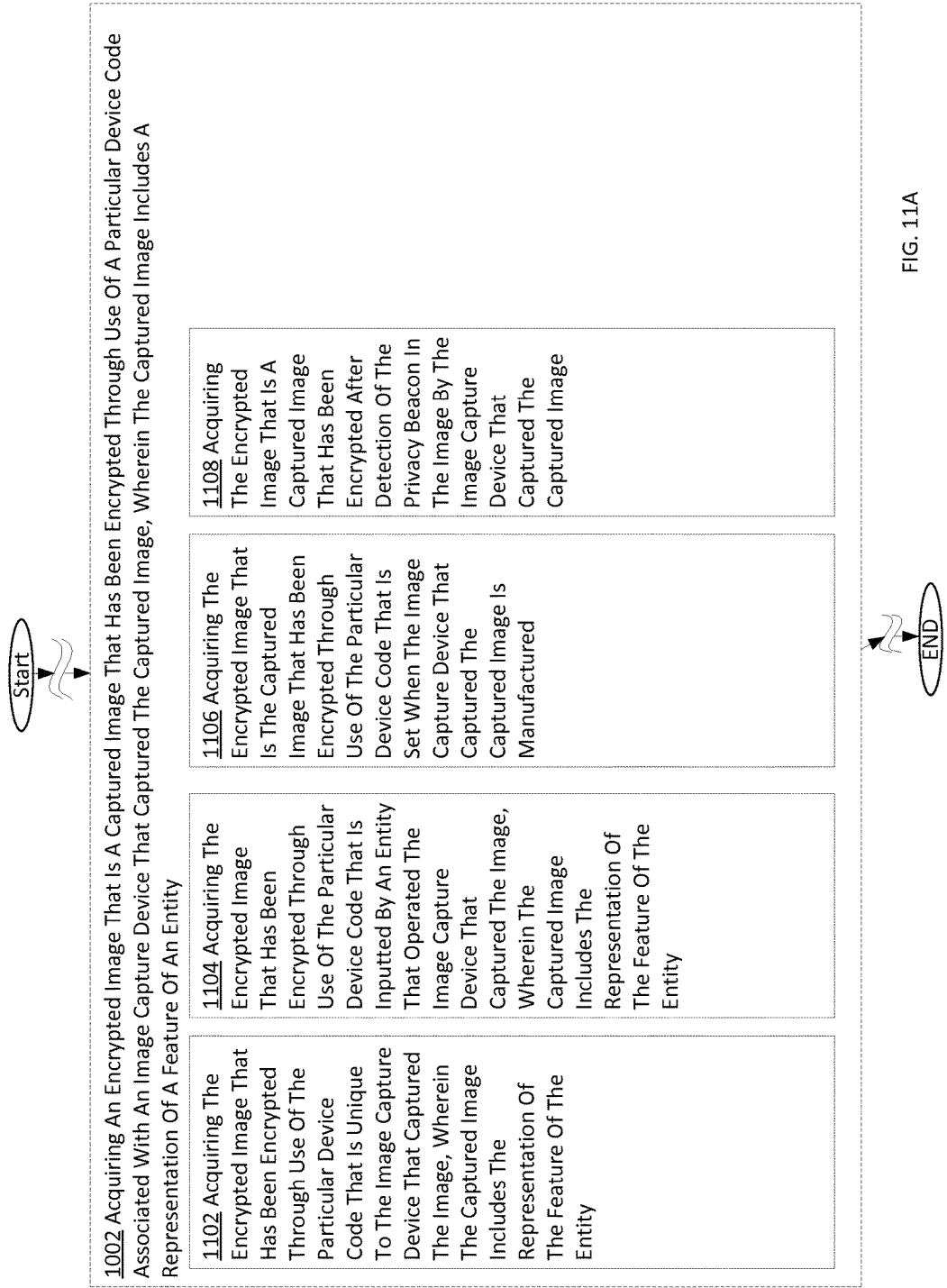

FIG. 11A is a high-level logic flow chart of a process depicting alternate implementations of an acquiring an encrypted image operation 1002, according to one or more embodiments.

Figure 11B:
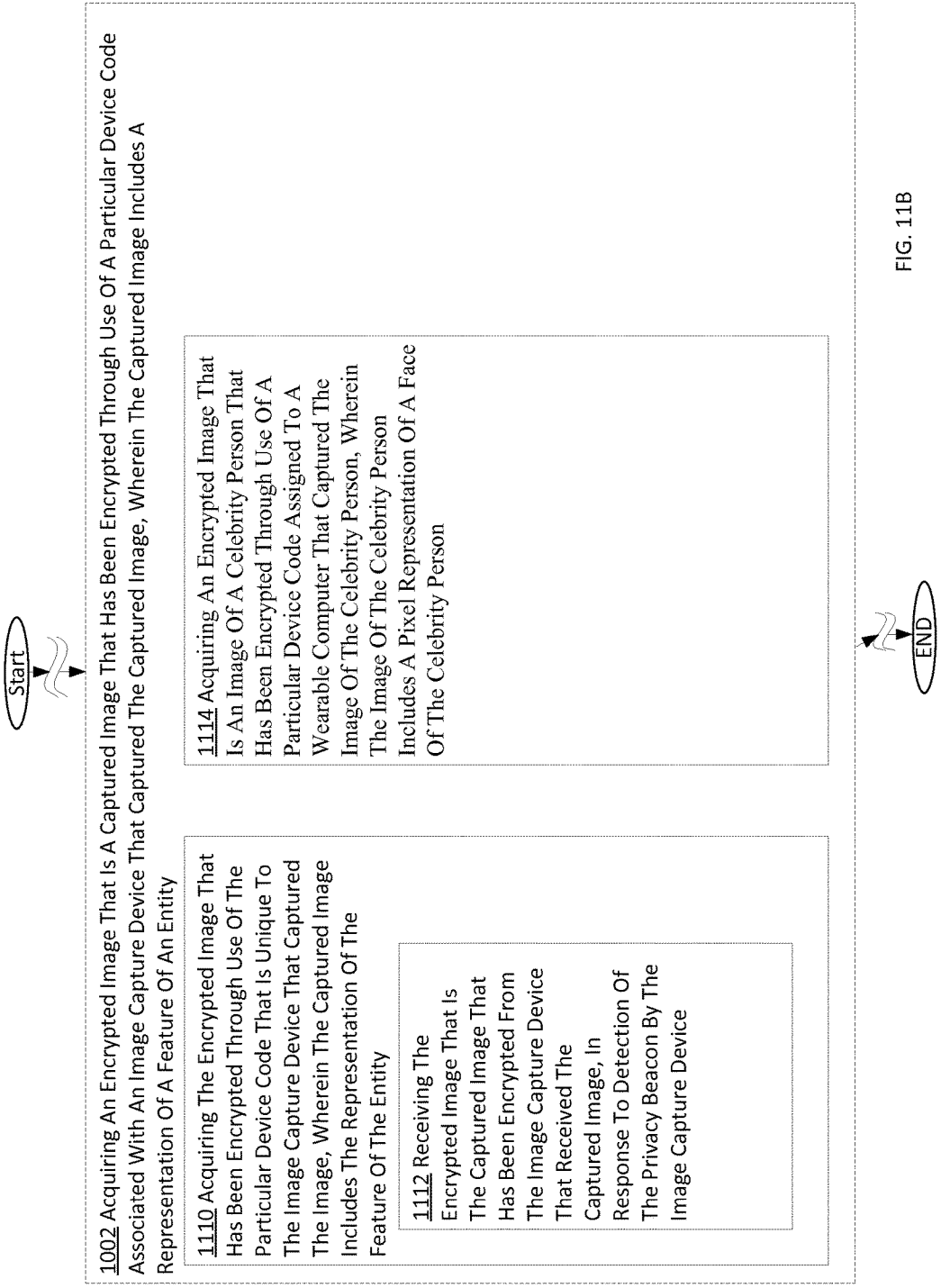

FIG. 11B is a high-level logic flow chart of a process depicting alternate implementations of an acquiring an encrypted image operation 1002, according to one or more embodiments.

Figure 12A:
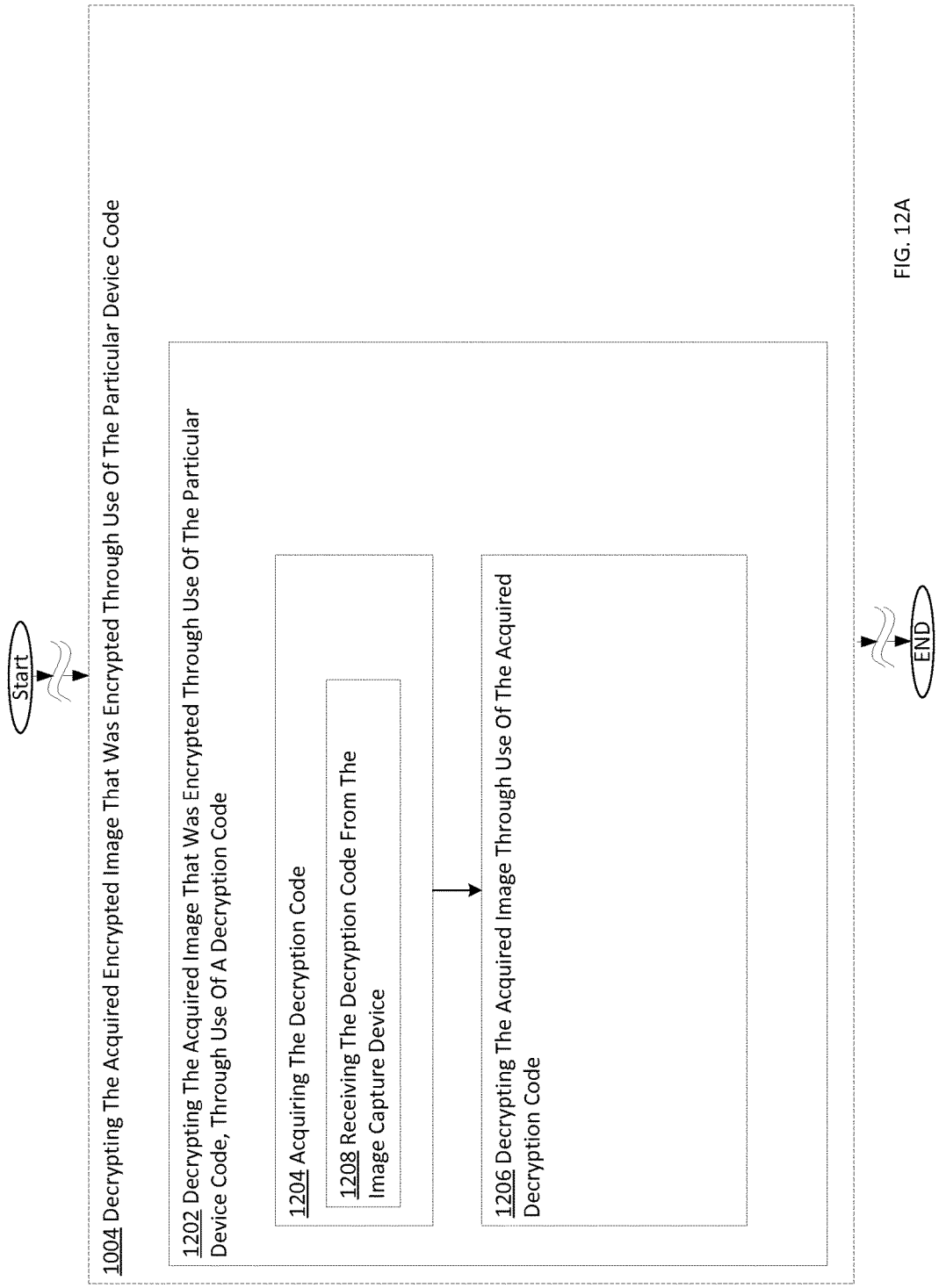

FIG. 12A is a high-level logic flow chart of a process depicting alternate implementations of a decrypting the acquired encrypted image operation 1004, according to one or more embodiments.

Figure 12B:
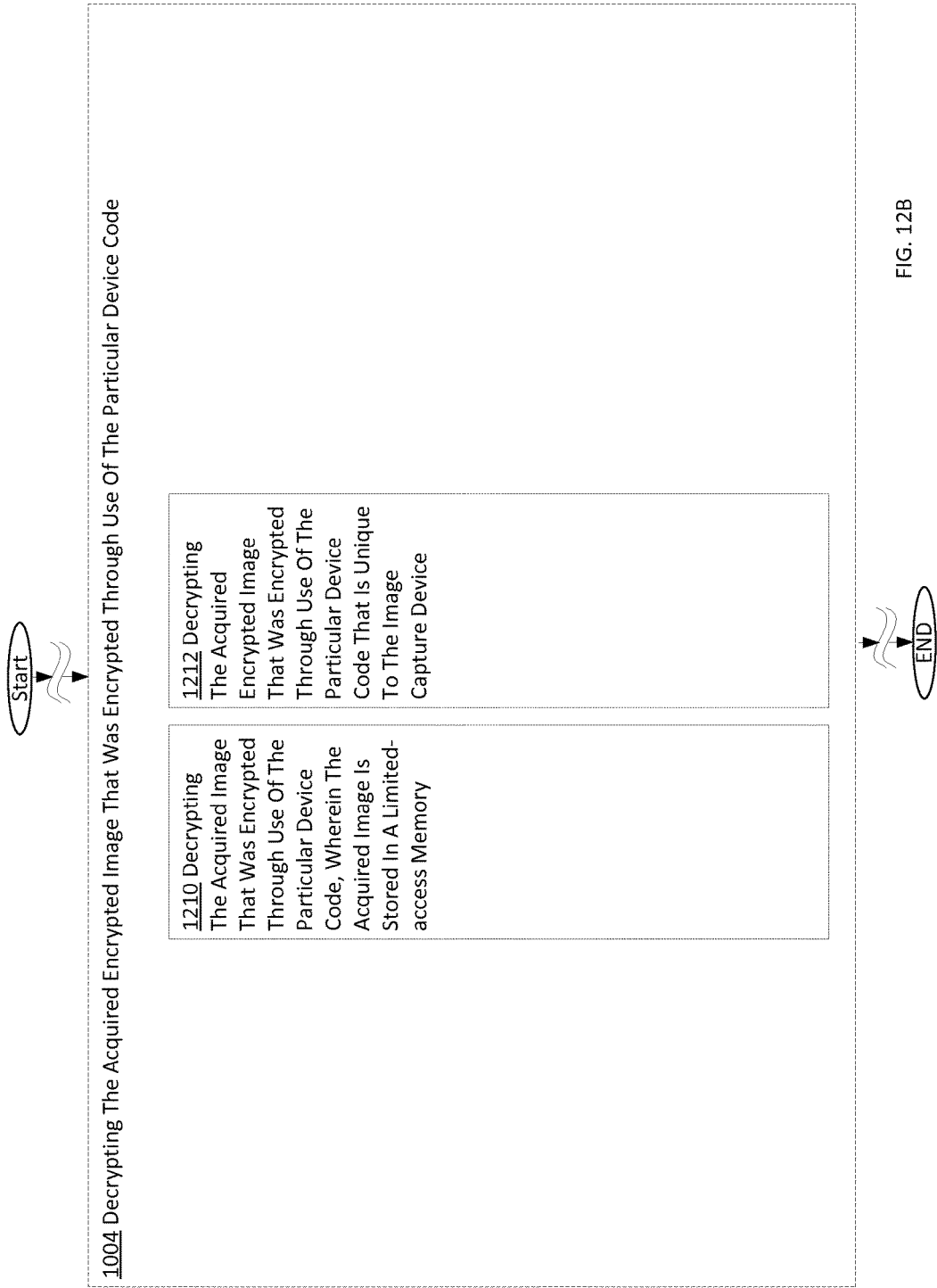

FIG. 12B is a high-level logic flow chart of a process depicting alternate implementations of a decrypting the acquired encrypted image operation 1004, according to one or more embodiments.

Figure 13A:
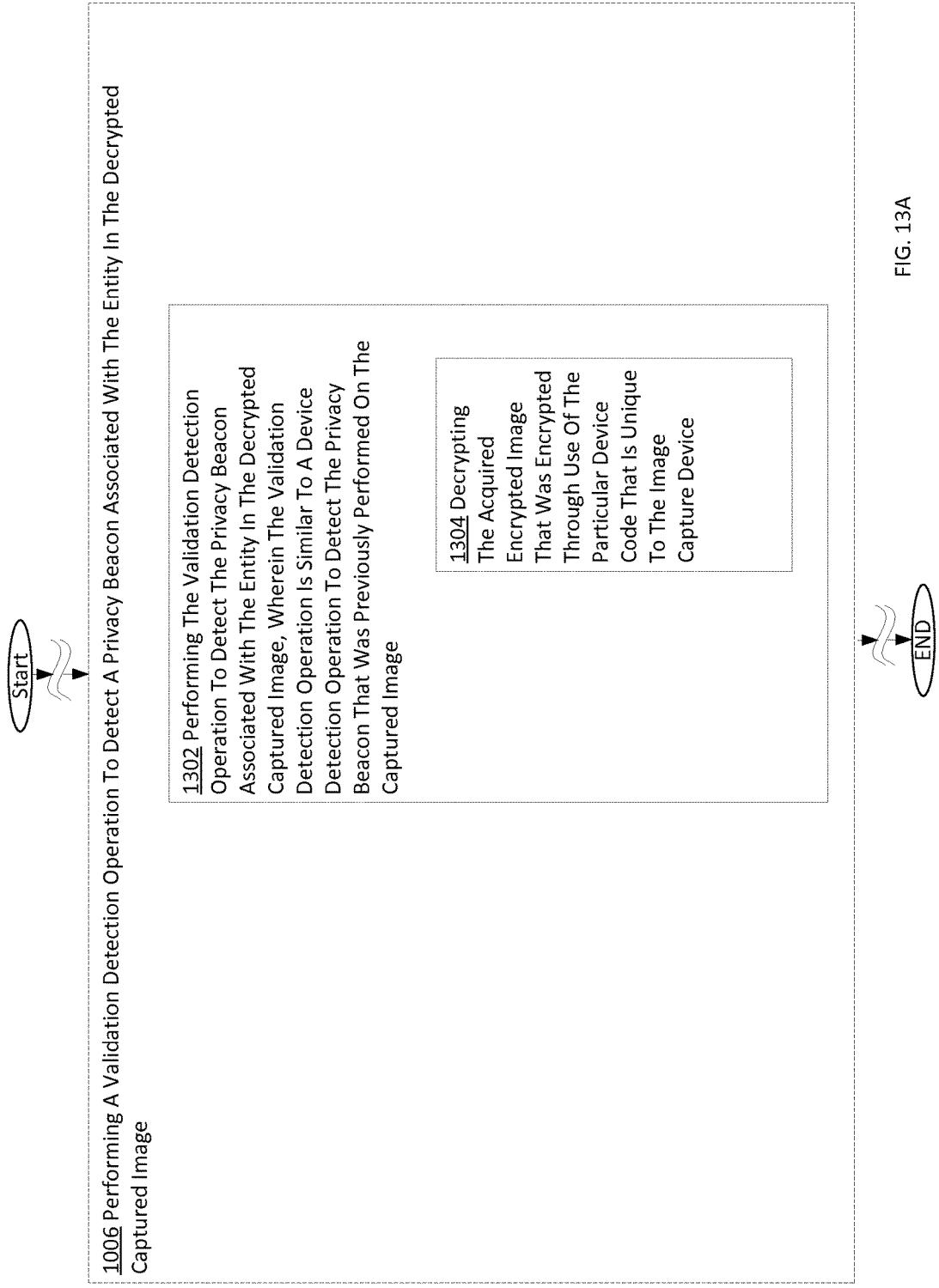

FIG. 13A is a high-level logic flow chart of a process depicting alternate implementations of a performing a validation detection operation 1006, according to one or more embodiments.

Figure 13B:
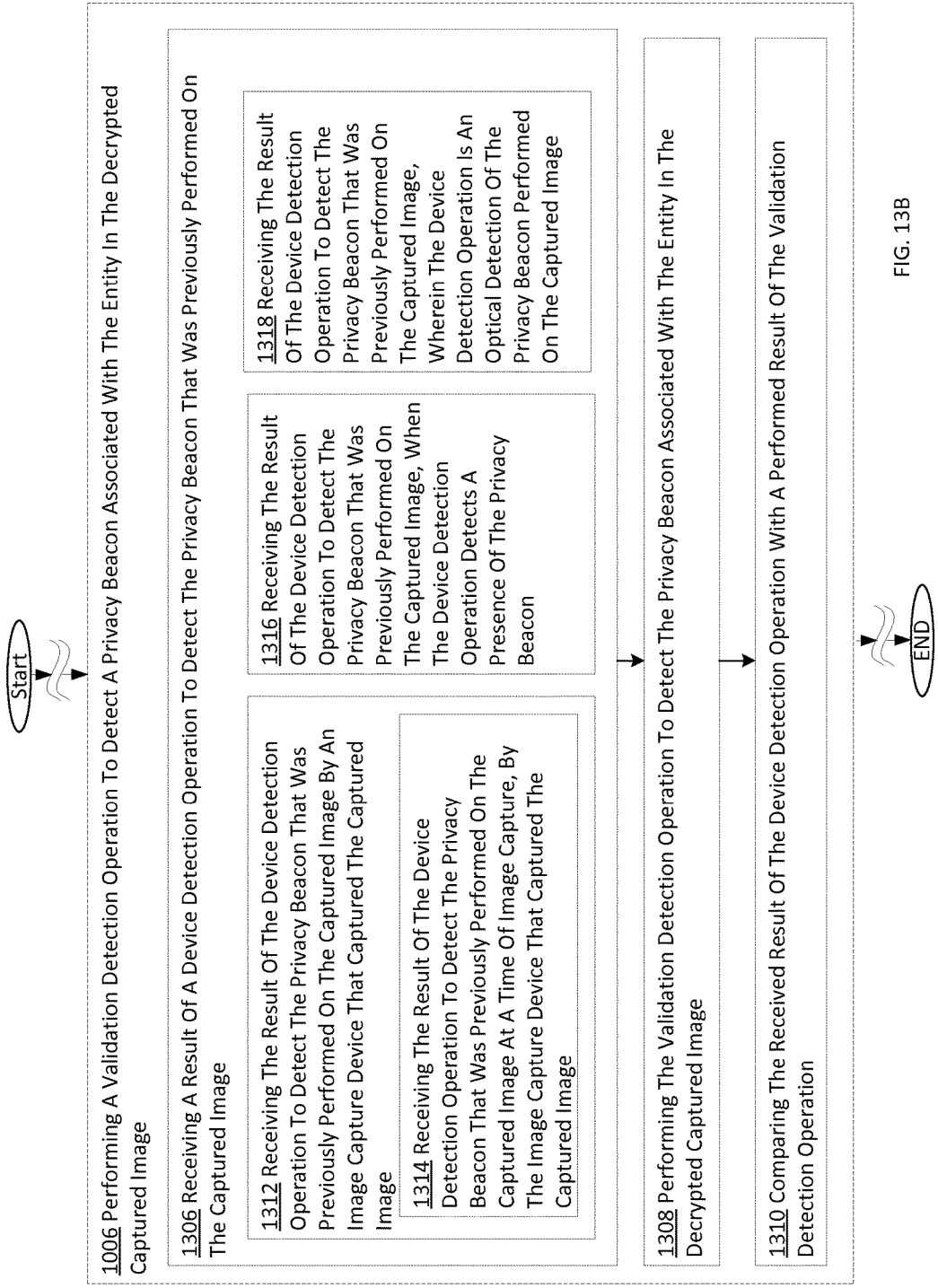

FIG. 13B is a high-level logic flow chart of a process depicting alternate implementations of a performing a validation detection operation 1006, according to one or more embodiments.

Figure 13C:
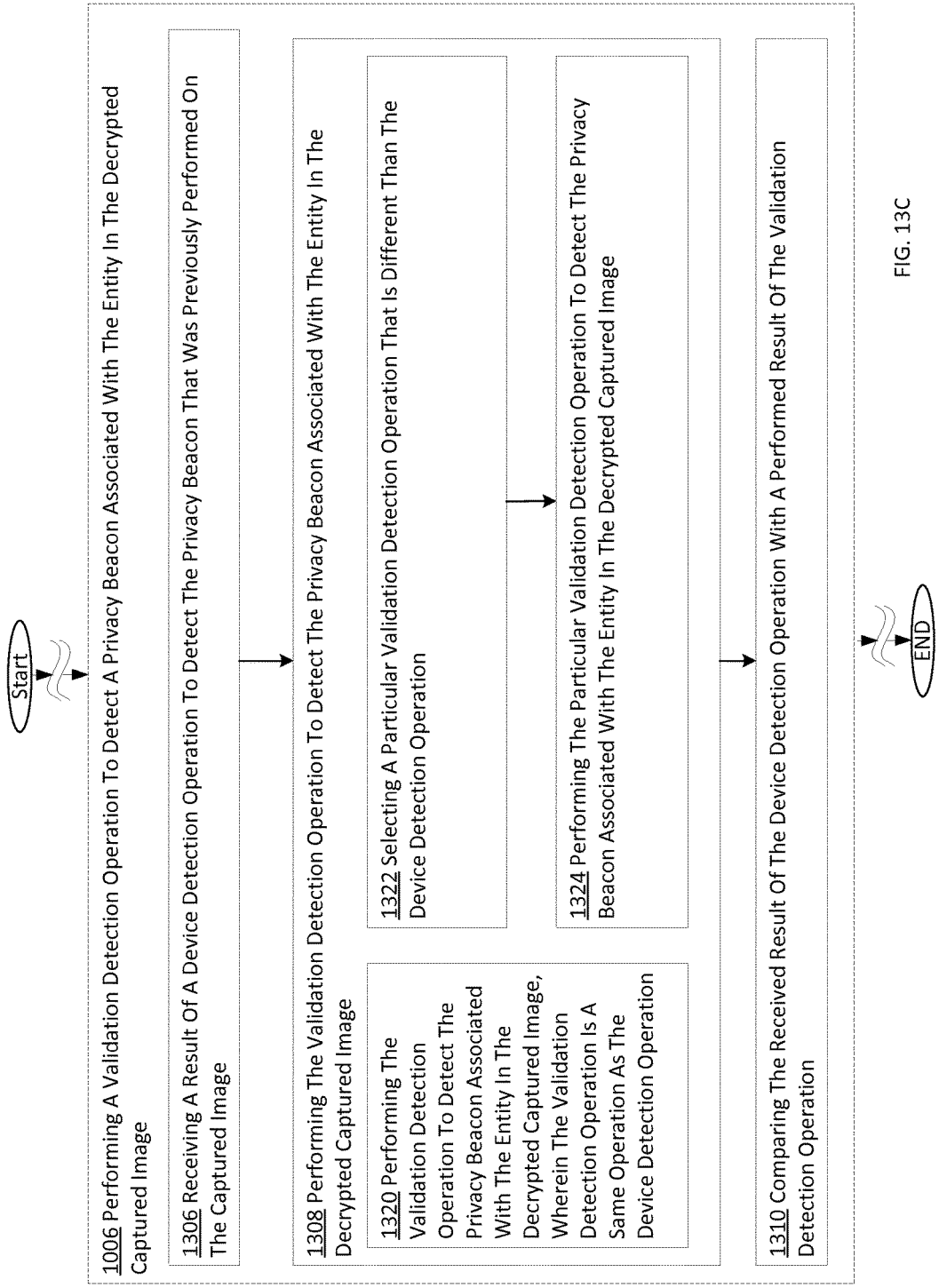

FIG. 13C is a high-level logic flow chart of a process depicting alternate implementations of a performing a validation detection operation 1006, according to one or more embodiments.

Figure 13D:
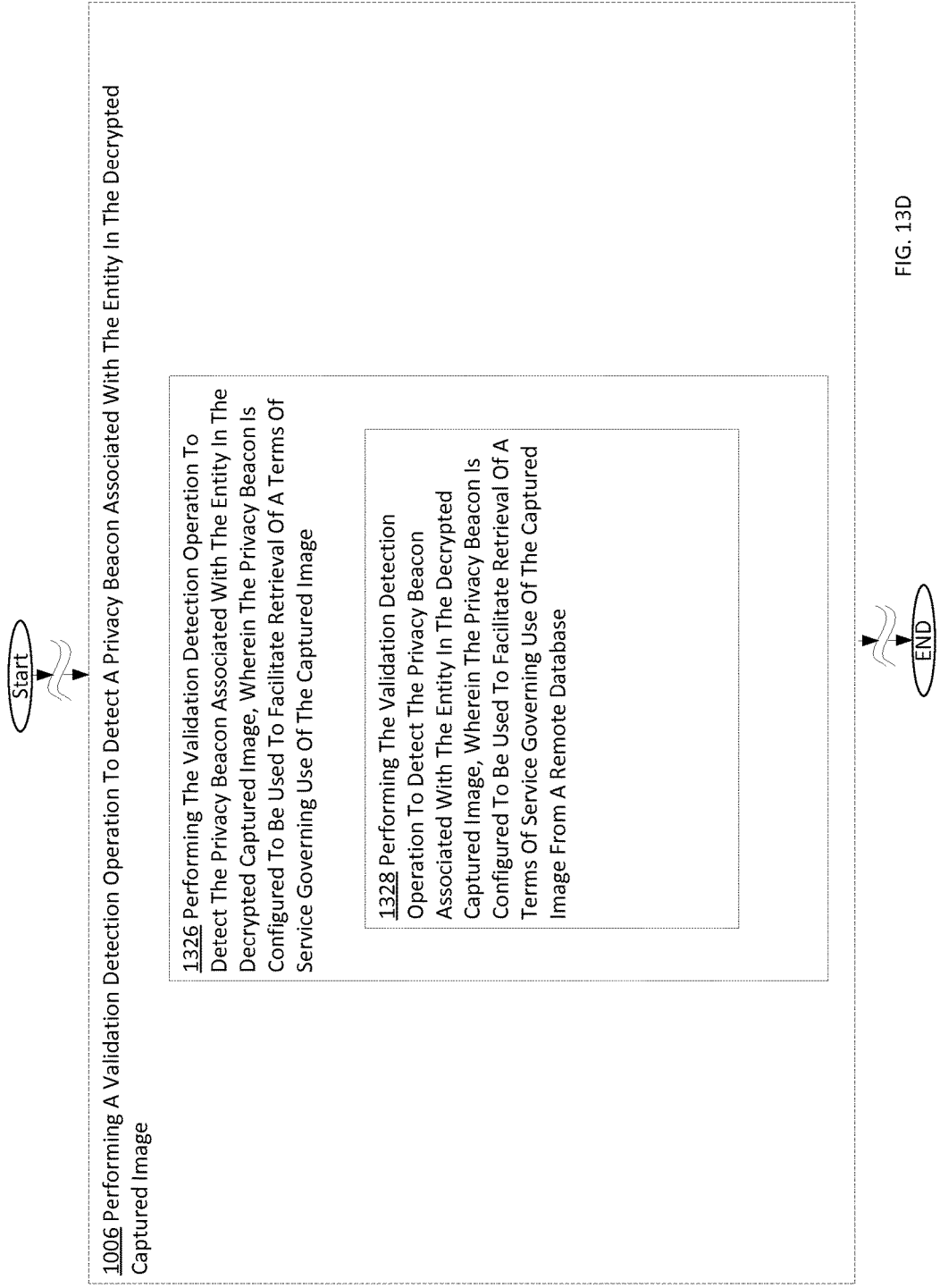

FIG. 13D is a high-level logic flow chart of a process depicting alternate implementations of a performing a validation detection operation 1006, according to one or more embodiments.

Figure 14A:
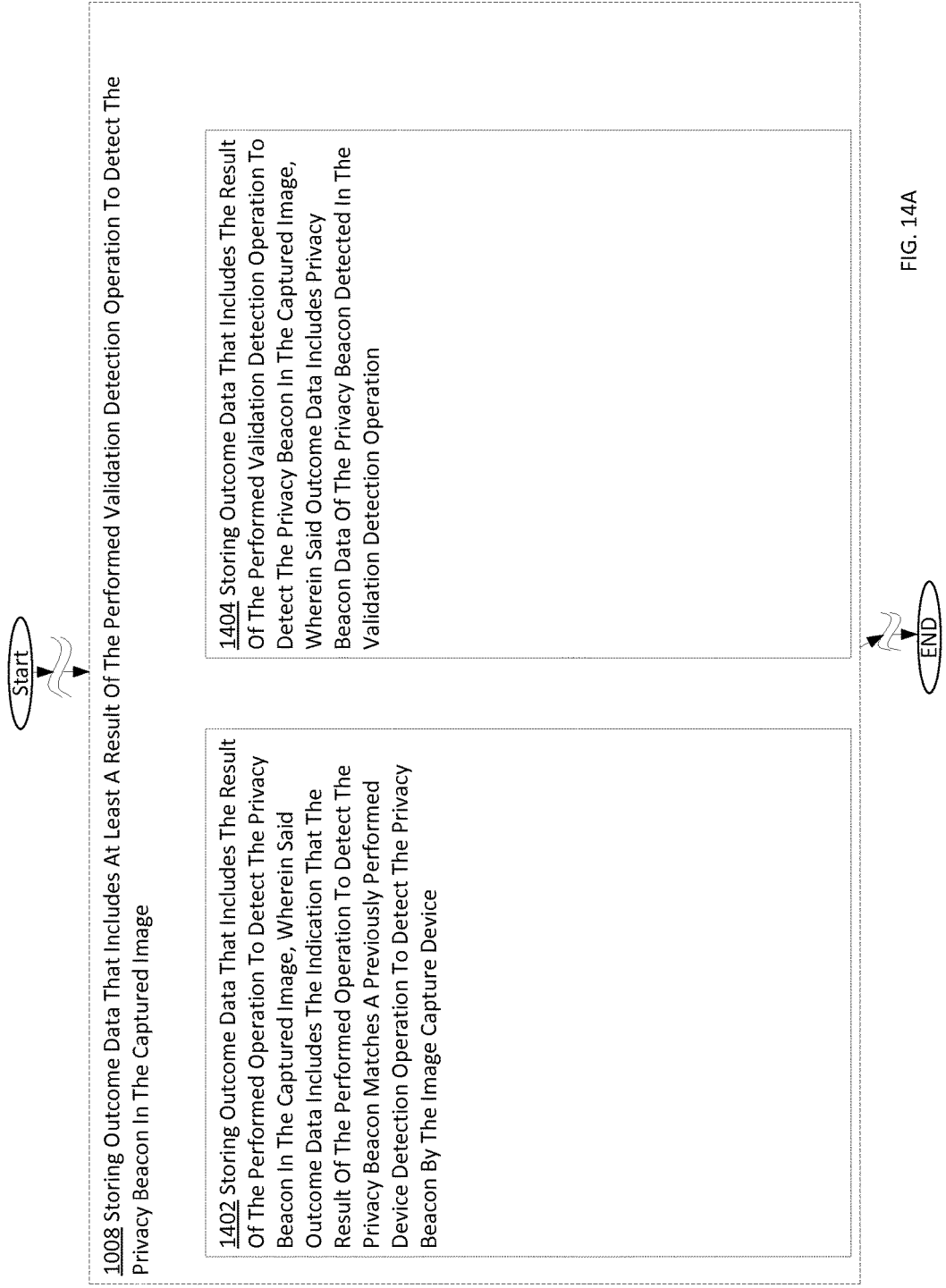

FIG. 14A is a high-level logic flow chart of a process depicting alternate implementations of a storing outcome data operation 1008, according to one or more embodiments.

FIG. 14B is a high-level logic flow chart of a process depicting alternate implementations of a storing outcome data operation 1008, according to one or more embodiments.

Figure 15A:
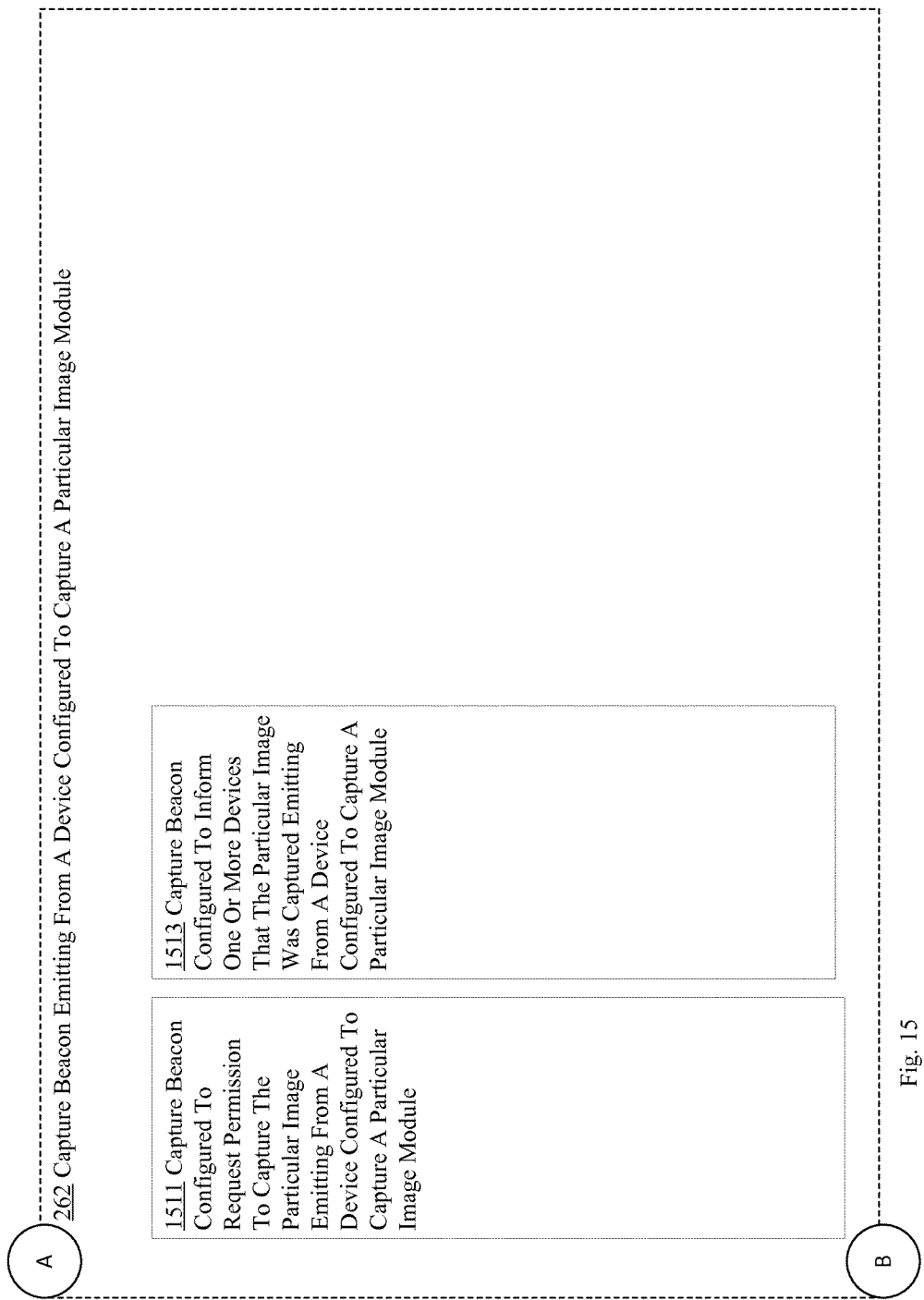

FIG. 15, including FIGS. 15A-15B, shows a particular perspective of a capture beacon emitting from a device configured to capture a particular image module 262 of processing module 260 of computing device 220 of FIG. 2C, according to an embodiment.

Figure 16A:
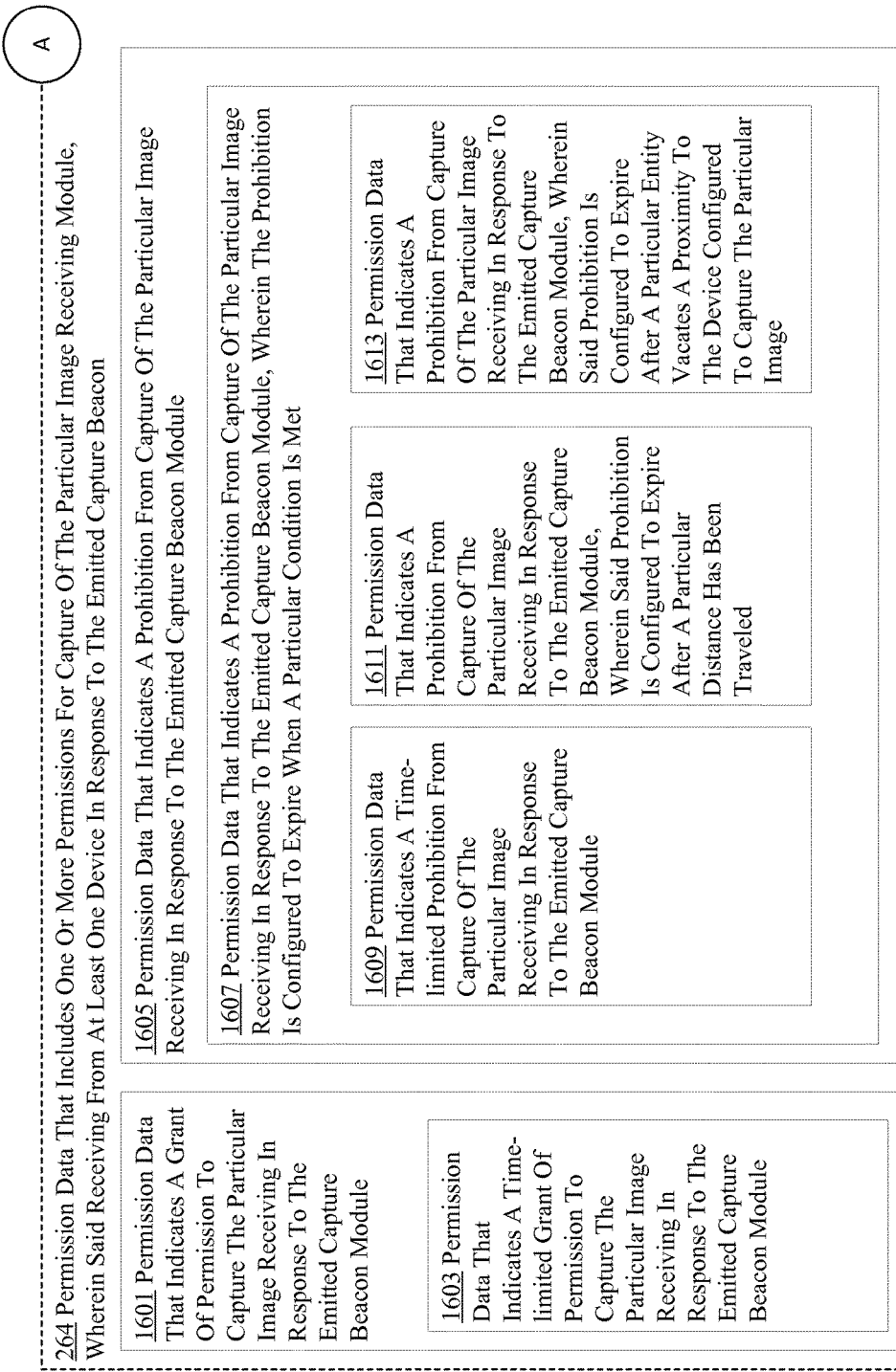

FIG. 16, including FIGS. 16A-16B, shows a particular perspective of a permission data that includes one or more permissions for capture of the particular image receiving module, wherein said receiving from at least one device in response to the emitted capture beacon 264 of processing module 260 of computing device 220 of FIG. 2C, according to an embodiment.

FIG. 17 shows a particular perspective of a validation detection operation to detect a privacy beacon associated with the entity in the decrypted captured image performing module 266 of processing module 260 of computing device 220 of FIG. 2C, according to an embodiment.

Figure 18:
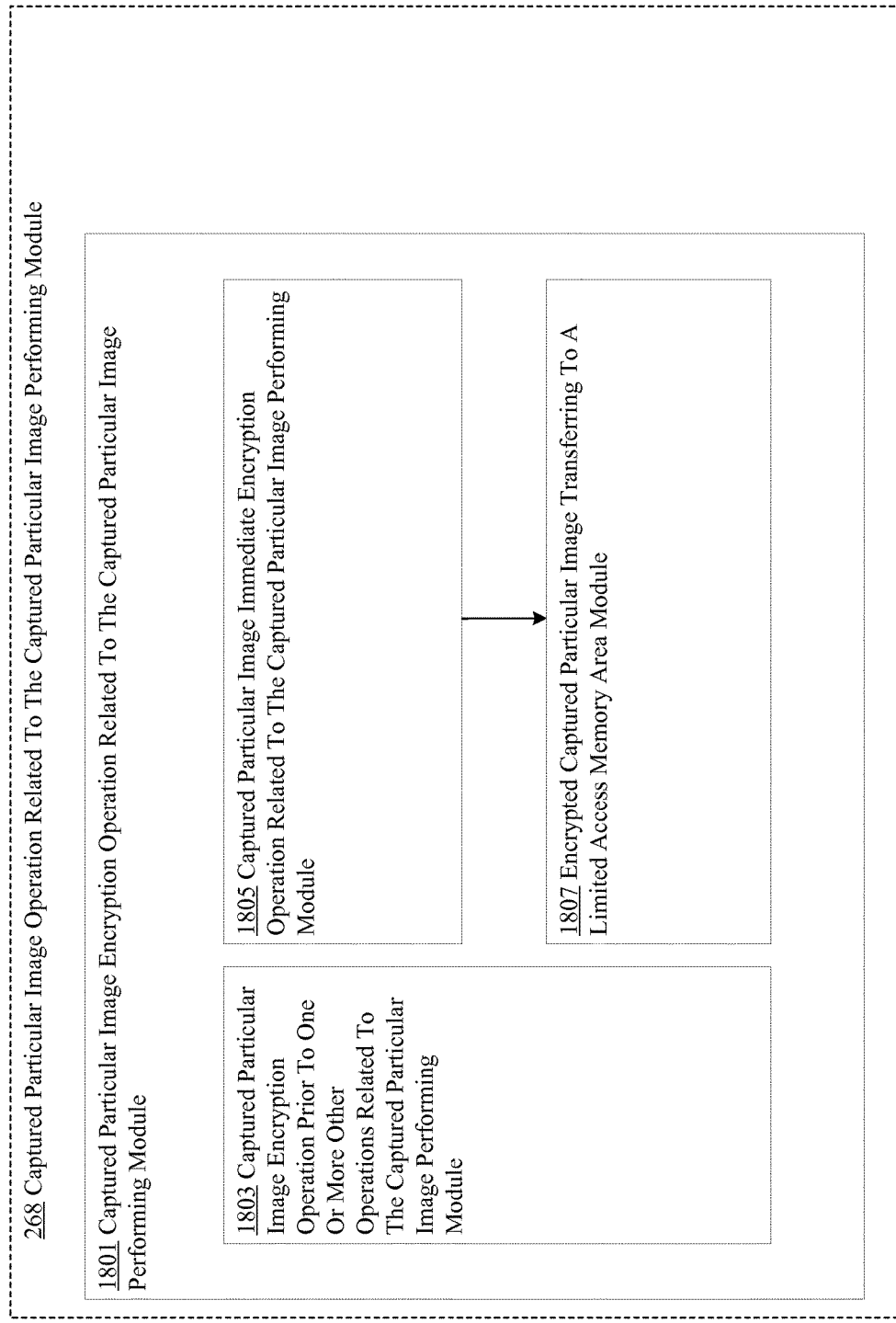

FIG. 18 shows a particular perspective of a captured particular image operation related to the captured particular image performing module 268 of processing module 260 of computing device 220 of FIG. 2C, according to an embodiment.

Figure 19:
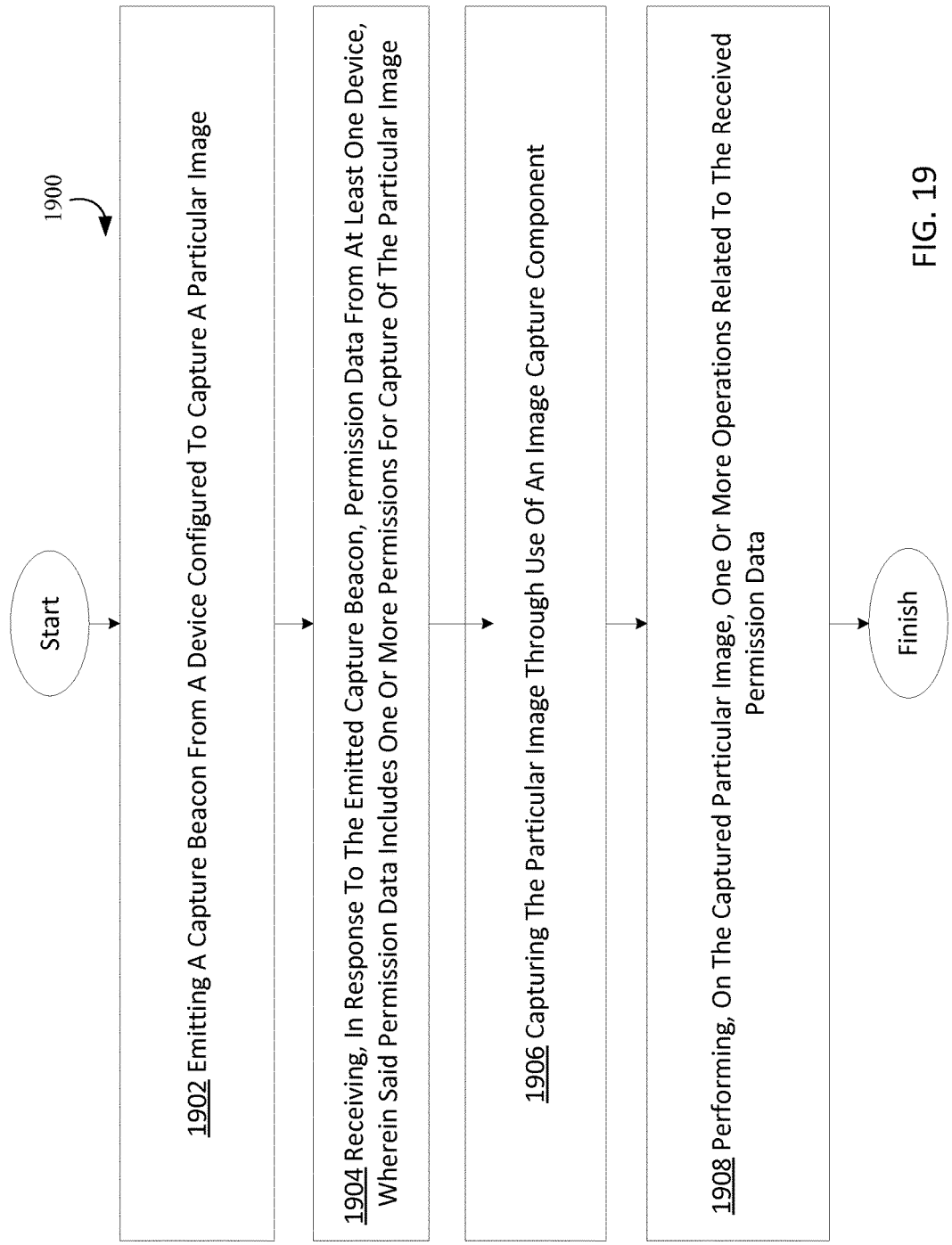

FIG. 19 is a high-level logic flowchart of a process, e.g., operational flow 1900, according to an embodiment.

Figure 20A:
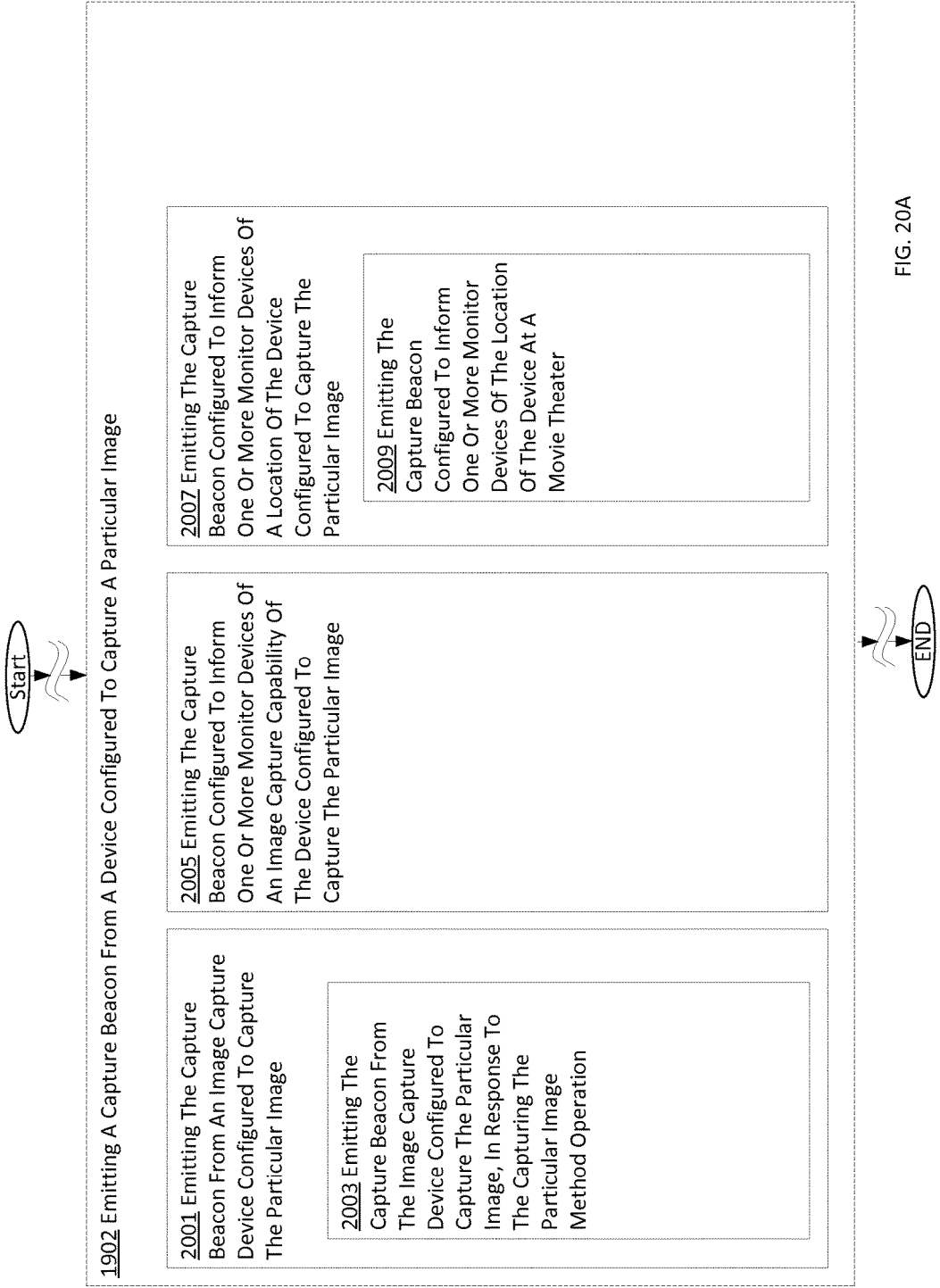

FIG. 20A is a high-level logic flow chart of a process depicting alternate implementations of an emitting a capture beacon 1902, according to one or more embodiments.

Figure 20B:
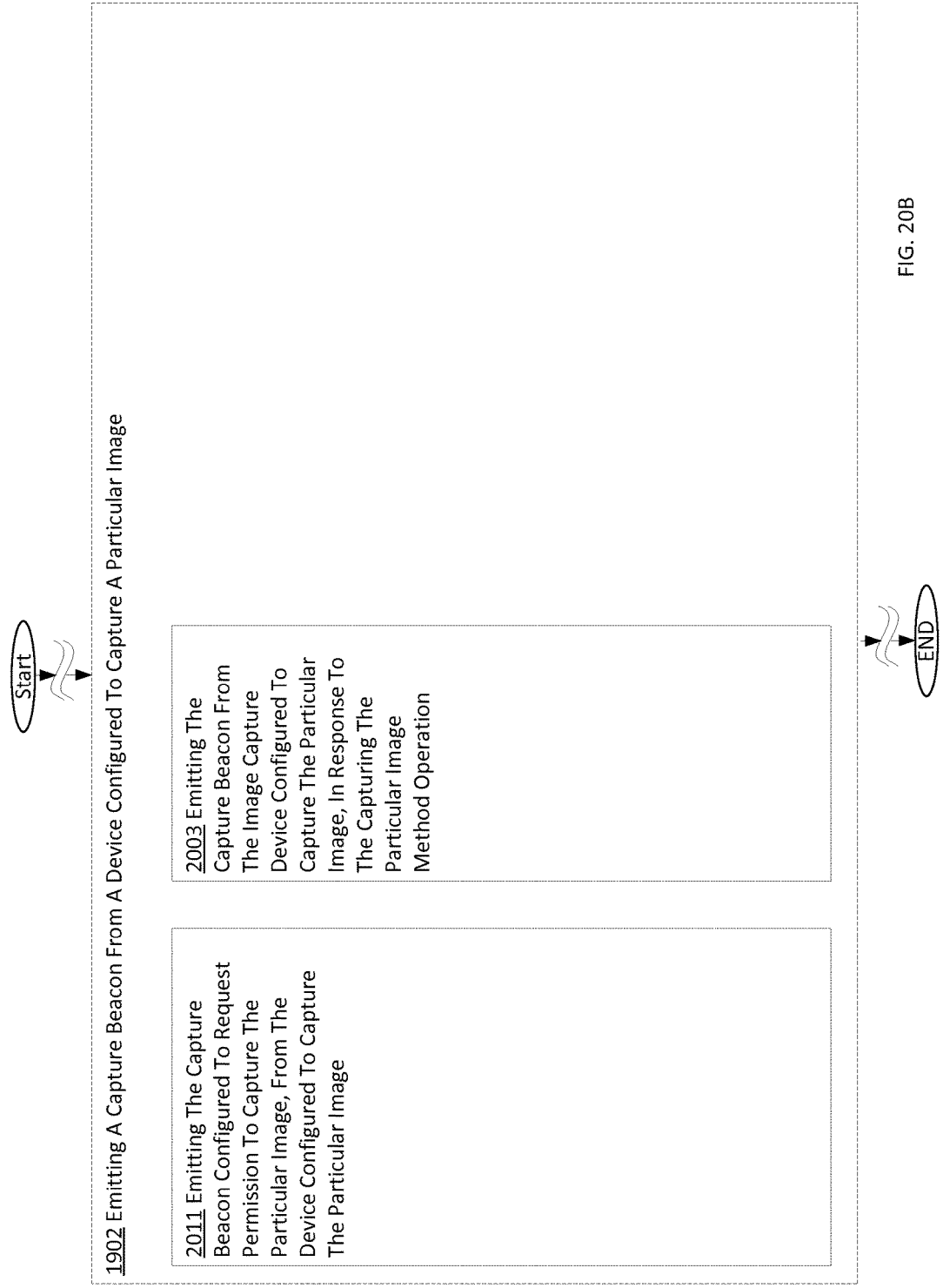

FIG. 20B is a high-level logic flow chart of a process depicting alternate implementations of an emitting a capture beacon 1902, according to one or more embodiments.

Figure 21A:
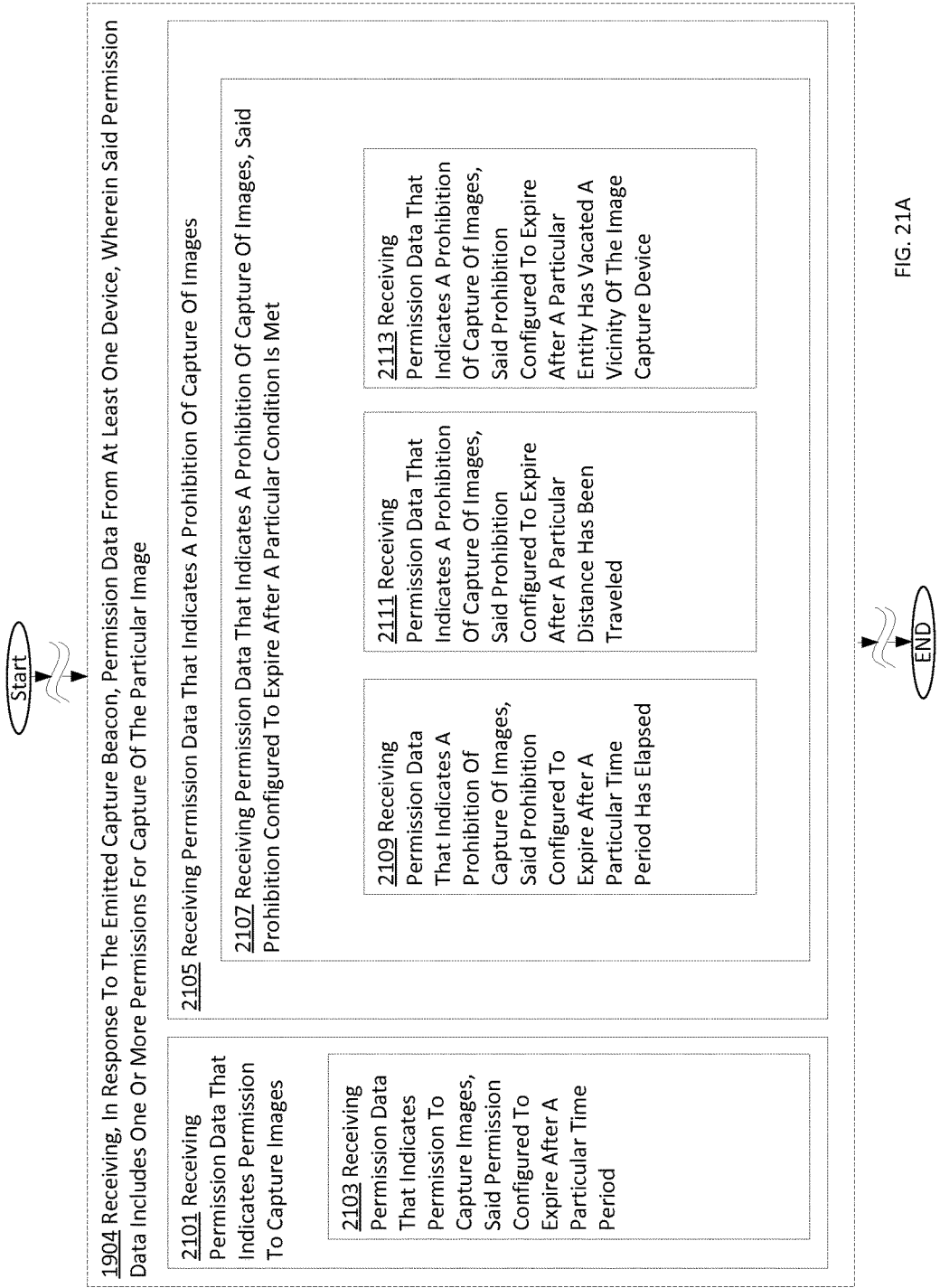

FIG. 21A is a high-level logic flow chart of a process depicting alternate implementations of a receiving permission data 1904, according to one or more embodiments.

Figure 21B:
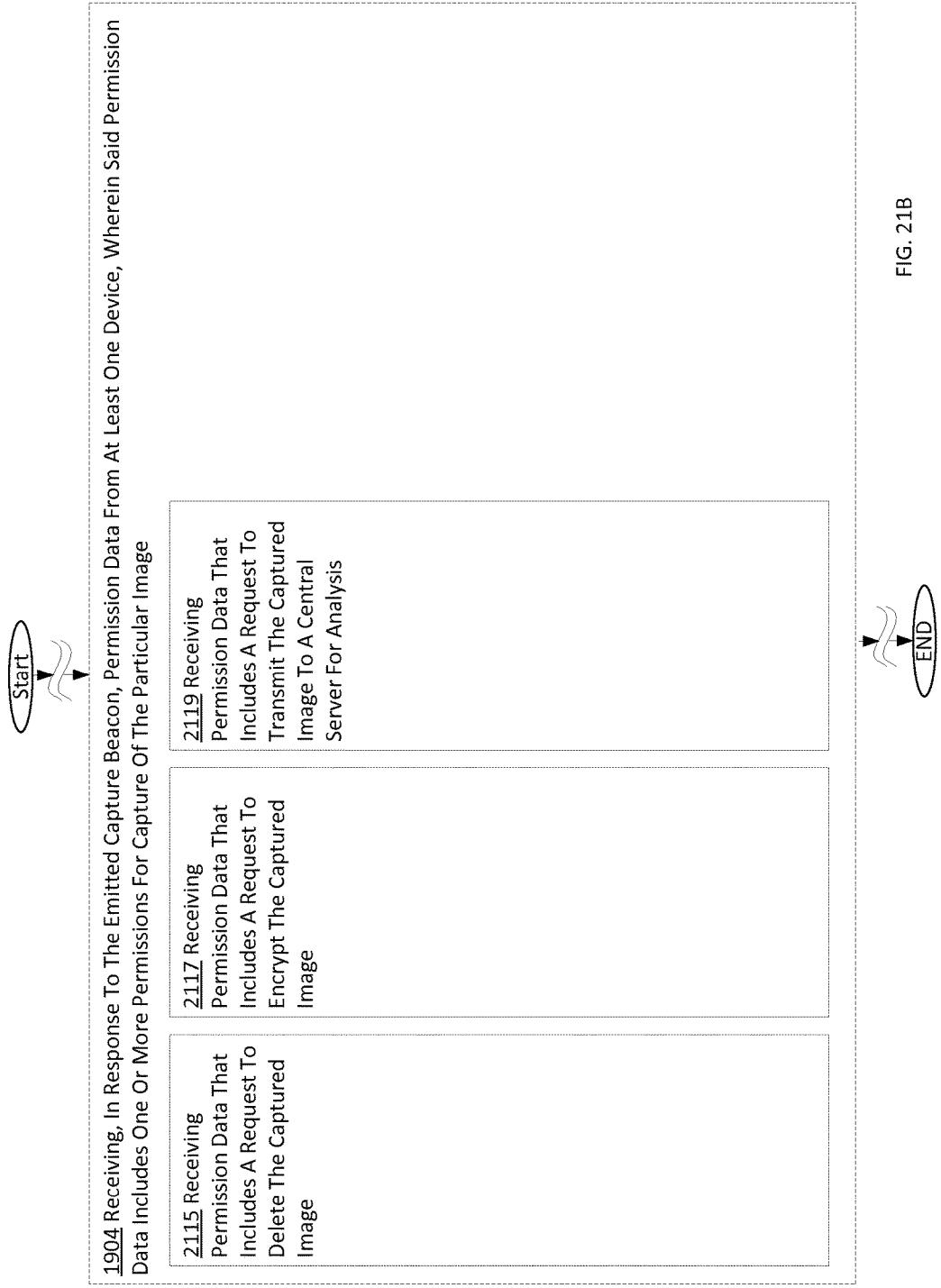

FIG. 21B is a high-level logic flow chart of a process depicting alternate implementations of a receiving permission data 1904, according to one or more embodiments.

Figure 22:
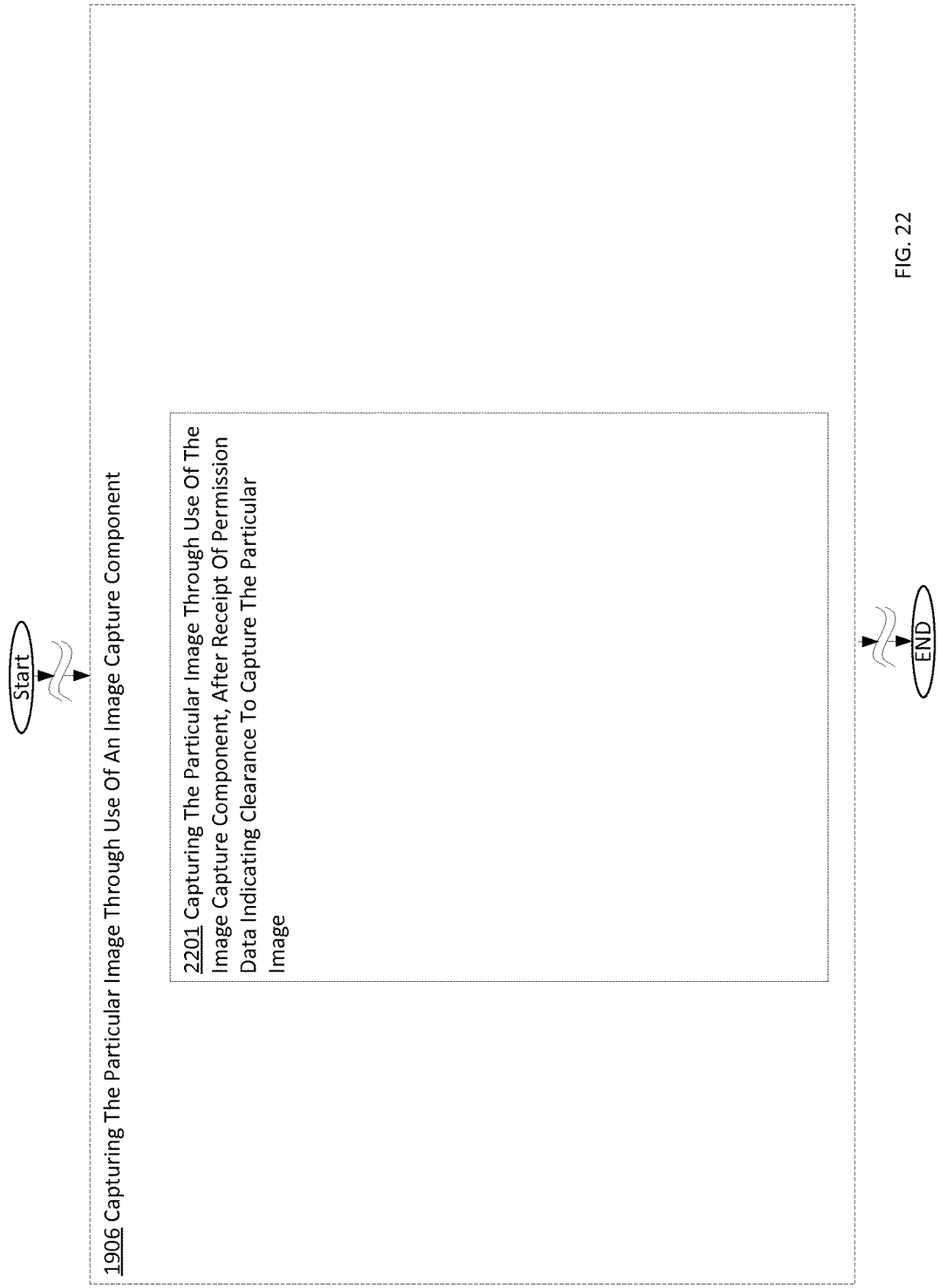

FIG. 22 is a high-level logic flow chart of a process depicting alternate implementations of a capturing the particular image operation 1906, according to one or more embodiments.

Figure 23:
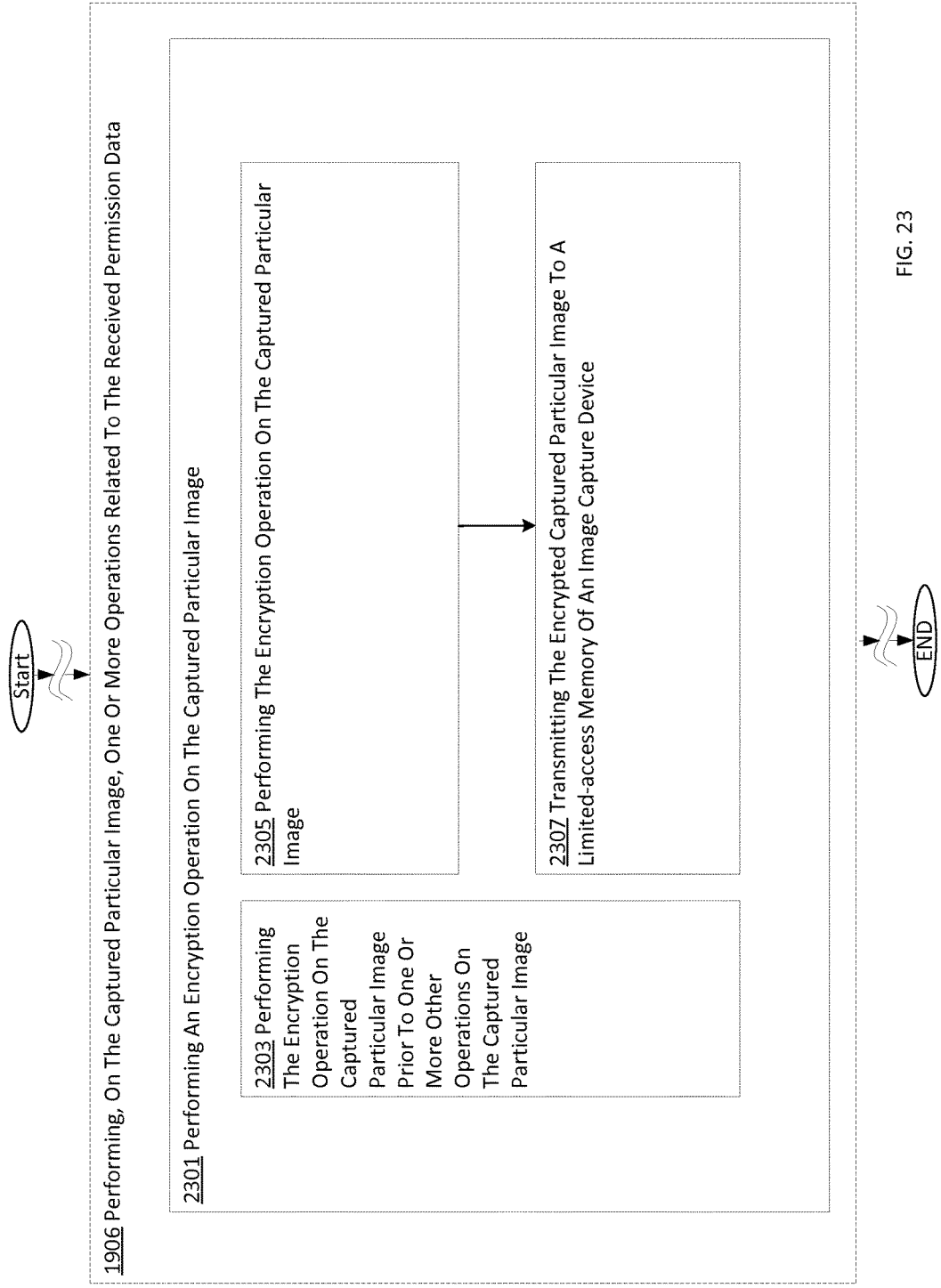

FIG. 23 is a high-level logic flow chart of a process depicting alternate implementations of a performing one or more operations related to the permission data operation 1908, according to one or more embodiments.

DETAILED DESCRIPTION

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring an encrypted image that is a captured image that has been encrypted through use of a particular device code associated with an image capture device that captured the captured image, wherein the captured image includes a representation of a feature of an entity, decrypting the acquired encrypted image that was encrypted through use of the particular device code, performing a validation detection operation to detect a privacy beacon associated with the entity in the decrypted captured image, and storing outcome data that includes at least a result of the performed validation detection operation to detect the privacy beacon in the captured image.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software (e.g., a high-level computer program serving as a hardware specification)).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructionsper_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

It is noted that "wearable computer" is used throughout this specification, and in the examples given, it is generally a wearable computer that captures images. However, this is merely for exemplary purposes. The same systems may apply to conventional digital cameras, and any other camera, including security cameras, surveillance cameras, motor vehicle mounted cameras, road/traffic cameras, cameras at automated teller machines, and the like.

Referring now to FIG. 1, in an embodiment, an entity, e.g., a user of a privacy beacon, e.g., user 2105, e.g., a person, e.g., "Jules Caesar," may be associated with a "Don't Capture Me" (hereinafter "DCM") privacy beacon, e.g., DCM Beacon 2110. In an embodiment, a DCM beacon may be active, e.g., may contain circuitry and be an active unit, e.g., something wearable, e.g., on a piece of clothing, or on a ring, or on a drone associated with the user. In an embodiment, the DCM beacon may be passive, e.g., it may be something that can be detected in the electromagnetic spectrum, or can be otherwise detected but does not contain any circuitry or advanced logic gates of its own. In an embodiment, the DCM beacon may be a combination of the two.

In an embodiment, a DCM beacon may be detectable by a machine or a human being (e.g., a stop sign painted on a user's forehead may be a DCM beacon). In an embodiment, a DCM beacon may be detectable by a particular type of machine, structure, or filter, and may be otherwise undetectable or difficult to detect through human senses. For example, in an embodiment, a DCM beacon may be seen using ultraviolet or infrared light, or a DCM beacon may emit light outside the visible spectrum. In an embodiment, a DCM beacon may be visible or detectable after a filter is applied, e.g., a DCM beacon may be visible after a red filter is applied, or after a transformation is applied to a captured image, e.g., a Fourier transformation.

In an embodiment, a DCM beacon may be detected optically. In another embodiment, a DCM beacon may be detected by sensing a different kind of wave emitted by a DCM beacon, e.g., a wave in the nonvisible electromagnetic spectrum, a sound wave, an electromagnetic wave, and the like. In an embodiment, a DCM beacon may use quantum entanglement (e.g., through use of an entanglement-based protocol, among others).

In an embodiment, a DCM beacon may transmit data, e.g., a terms of service for the user (e.g., user 2105) for which the DCM beacon (e.g., DCM beacon 2110) is associated or linked. In an embodiment, a DCM beacon may be encoded with a location of data, e.g., a web address of a server where terms of service for the user (e.g., user 2105) for which the DCM beacon (e.g., DCM beacon 2110) is associated.

In an embodiment, a DCM beacon may be provided by a drone, of any size, e.g., nanometers to full-sized aircraft, that is associated with the user.

In an embodiment, a DCM beacon may be provided by a piece of electronics that a user carries, e.g., a cellular telephone, tablet, watch, wearable computer, or otherwise.

In an embodiment, a DCM beacon may be embedded in the user, ingested by the user, implanted in the user, taped to the skin of the user, or may be engineered to grow organically in the user's body.

In an embodiment, a DCM beacon may be controlled by a magnetic field or other field emitted by a user, either through a user's regular electromagnetic field or through a field generated by a device, local or remote, associated with the user.

Referring again to FIG. 1, in an embodiment, a different user, e.g., a wearable computer user 3105, may have a wearable computer 3100. A wearable computer may be a pair of eyeglasses, a watch, jewelry, clothing, shoes, a piece of tape placed on the user's skin, it may be ingested by the user or otherwise embedded into the user's body. Wearable computer 3100 may be a piece of electronics carried by a user 3105. Wearable computer 3100 may not be a "wearable" computer in a traditional sense, but may be a laptop computer, tablet device, or smartphone carried by a user. In an embodiment, wearable computer 3100 may not be associated with a user at all, but may simply be a part of a surveillance system, e.g., a security camera, or a camera at an Automated Teller Machine ("ATM").

Wearable Computer That Captures the Image (FIGS. 1-I; 1-J, 1-N, 1-O).

Referring now to FIG. 1, e.g., FIG. 1-J, wearable computer 3100 may include a wearable computer image capturing device 3110, e.g., a lens. Wearable computer image capturing device 3110 may include functionality to capture images, e.g., an image sensor, e.g., a charge-coupled device ("CCM") or a complementary metal-oxide semiconductor ("CMOS"), an analog-to digital converter, and/or any other equipment used to convert light into electrons. Wearable computer image capturing device 3110 may capture the optical data, which may remain as light data, or may be converted into electrons through an image sensor, as raw data. This raw data, e.g., raw data 2200 may be captured by the optical image data acquiring module 3120 of wearable computer 3100. Optical image data acquiring module 3120 may be configured to acquire an image, e.g., an image of user 2105. As described above, a DCM beacon 2110 may be associated with user 2105. In an embodiment, at this point in the operation of wearable computer 3100, no processing has been performed on the raw image data 2200.

Although not pictured here, wearable computer image capturing device 3110 may also include circuitry to detect audio (e.g., a microphone) and/or video (e.g., the ability to capture frames above a certain rate of frames per second). This circuitry and its related explanation have been omitted to maintain simplicity of the drawing, however, through this application, "raw image data 2200" should be considered to also possibly include still pictures, video, and audio, in some embodiments.

Referring now to FIG. 1-I, in an embodiment, wearable computer 3100 then may transfer the raw/optical image data 2200 to an image path splitting module 3130. This splitting path may be optical, e.g., a set of mirrors/lenses, for the case in which raw image data 2200 is still in optical form, or digital, e.g., through use of known electrical signal splitters. Image path splitting module 3130 may be implemented as hardware, software, or a combination thereof.

Referring again to FIG. 1, e.g., FIG. 1-I, in an embodiment, the north (upper) branch, as illustrated in FIG. 1, transmits the raw image data 2200 to an image prior-to-processing encryption module 3150. Image prior-to-processing encryption module 3150 may receive the raw image data 2200. From there, image prior-to-processing encryption module 3150 may acquire an encryption key that is device-specific, e.g., wearable computer device specific encryption key 3182. In an embodiment, wearable computer device-specific encryption key 3182 may be stored in wearable computer device memory 3180, which also may include encrypted image storage 3184, and a wearable computer user-specific encryption key 3186. In another embodiment, device-specific encryption key 3182 may be retrieved from elsewhere, e.g., cloud storage. In another embodiment, device-specific encryption key 3182 may be generated in real time by the device. In another embodiment, device-specific encryption key 3182 may be generated in real time by the device based on random user input (e.g., the last five words spoken by the device and recorded).

In an embodiment, image prior-to-processing encryption module 3150 may generate encrypted image data 2210. Encrypted image data 2210 may be stored in encrypted image storage 3184 of wearable computer device memory 3180. In an embodiment, encrypted image data 2210 also may be transmitted to central server encrypted data and beacon metadata transmission module 3170.

Referring again to FIG. 1-I and FIG. 1-N, in an embodiment, the south (lower) branch, as illustrated in FIG. 1, may transmit the raw image data 2200 to a DCM beacon detecting module 3140. In an embodiment, DCM beacon detecting module 3140 may include one or more of optics-based DCM beacon detecting module 3142, which may be configured to detect the DCM beacon in an optical signal (e.g., light). In an embodiment, DCM beacon detecting module 3140 may include digital image processing-based DCM beacon detecting module 3144, which may be configured to detect the DCM beacon in a converted electron signal (e.g., data signal). In an embodiment, DCM beacon detecting module 3140 is configured to detect a presence or an absence of a DCM beacon, e.g., DCM beacon 2110, associated with the entity (e.g., user 2105, e.g., "Jules Caesar"), without performing any additional processing on the image, or releasing the image for other portions of wearable computer 3100 to use. In an embodiment, for example, raw image data 2200 is not stored in device memory of wearable computer 3100 in a form that is accessible to other applications and/or programs available to wearable computer 3100 or other computing devices that may communicate with wearable computer 3100. For example, a user 3105 of wearable computer 3100 may not, at this stage in processing, capture the raw data 2200 and upload it to a social networking site, e.g., Facebook. In an embodiment, DCM beacon detecting module 3140 may be implemented in hardware, which may prevent users or third parties from bypassing the DCM beacon detecting module 3140, without disassembling the device and physically altering the circuit/logic.

Referring now to FIG. 1-N, in an embodiment, the DCM beacon detecting module 3140 may detect the DCM beacon 2110. For example, in the exemplary embodiment shown in FIG. 1, DCM beacon detecting module 3140 may detect the DCM beacon 2110 that is associated with user 2105, e.g., Jules Caesar. Thus, DCM beacon detecting module 3140 now knows to lock the image data and prevent unencrypted image data from being accessed on the device. Although not shown in this example, if the DCM beacon had not been found, then in an embodiment, the image data 2200 would have been released for use by the device, e.g., for uploading to social network or cloud storage, for example.

In an embodiment, the detected DCM beacon 2110 associated with Jules Caesar may be transmitted to DCM beacon metadata generating module 3160. DCM beacon metadata generating module 3160 may generate metadata based on the detection of the beacon. The metadata may be as simple as "the image data contains a privacy beacon," e.g., Boolean data. In an embodiment, the metadata may be more complex, and may identify the user associated with the privacy beacon, e.g., the metadata may describe "A privacy beacon associated with Jules Caesar has been found in the image data." In another embodiment, the metadata may include the terms of service associated with the personality rights of Jules Caesar, an example of which terms of service will be provided in more detail herein.

In an embodiment, the detected DCM beacon 2110 may be very simple (e.g., optically detectable), and to obtain/generate metadata associated with the detected DCM beacon 2110, DCM beacon metadata generating module 3160 may include a DCM server contacting module 3162, which may contact one or more entities to obtain more information regarding the DCM beacon 2110. The DCM beacon metadata generating module 3160 may, in some embodiments, transmit the DCM beacon, or the image in which the DCM beacon was captured, to the external entity, in order to obtain more accurate data. For example, the DCM server contacting module 3162 may contact service term management server 5000, which may have DCM beacon registry 5010, which will be discussed in more detail further herein.

In an embodiment, DCM beacon metadata generating module 3160 may generate the DCM beacon metadata 2230, and transfer DCM beacon metadata 2230 to central server encrypted data and beacon metadata transmission module 3170.

Referring again to FIG. 1, e.g., FIG. 1-I, central server encrypted data and beacon metadata transmission module 3170 may receive the encrypted image data 2210 and the DCM beacon metadata 2230 (e.g., see FIG. 1-N). In an embodiment, central server encrypted data and beacon metadata transmission module 3170 may facilitate the transmission of encrypted image data 2210 and DCM beacon metadata 2230 to a server, e.g., wearable computer encrypted data receipt and determination server 4000, which will be discussed in more detail herein. In an embodiment, central server encrypted data and beacon metadata transmission module 3170 may include one or more of DCM beacon metadata transmission module 3172, which may be configured to transmit the DCM beacon metadata 2230, and encrypted data transmission module 3174, which may be configured to transmit the encrypted image data 2210.

Wearable Computer Server (FIGS. 1-H, 1-G)

Referring again to FIG. 1, e.g., FIG. 1-H, in an embodiment, a system may include a wearable computer server, e.g., wearable computer encrypted data receipt and determination server 4000. In an embodiment, a wearable computer server may be provided by a manufacturer of the wearable device 3100. In an embodiment, a wearable computer server may be provided by a developer of one or more software applications for the wearable device 3100. In an embodiment, wearable computer server 4000 may not have a direct relationship with wearable device 3100 prior to receiving the encrypted image data and the DCM beacon metadata 2230, as will be discussed in more detail herein. In an embodiment, a wearable computer server 4000 may be implemented at a home computer of a user, for example, and may communicate only with wearable devices that are associated with that user. In another embodiment, a wearable computer server 4000 may communicate with many wearable devices 3100, which may or may not have some relationship. In an embodiment, wearable computer server 4000 may communicate with one or more wearable devices 3100 through use of a communication network, which may use any known form of device communication. In an embodiment, wearable computer server 4000 may be chosen by wearable device 3100, either due to proximity or due to one or more properties or characteristics of wearable computer server 4000. In an embodiment, wearable computer server 4000 may be free to agree or disagree to process DCM beacon and image data received from various wearable devices 3100. In an embodiment, wearable computer server 4000 may be distributed across many computers and/or servers.

In an embodiment, wearable computer encrypted data receipt and determination server 4000 may include an encrypted data and beacon metadata reception module 4100. Encrypted data and beacon metadata reception module 4100 may receive encrypted image data 2210 and DCM beacon metadata 2230 from wearable computer 3100, e.g., central server encrypted data and beacon metadata transmission module 3170. In an embodiment, encrypted data and beacon metadata reception module 4100 may include a DCM beacon metadata reception module 4104. DCM beacon metadata reception module 4104 may be configured to acquire a privacy metadata, e.g., DCM beacon metadata 2230, corresponding to a detection of a DCM beacon, e.g., DCM beacon 2110, in the one or more images captured by the image capture device, e.g., wearable computer 3100. In an embodiment, encrypted data and beacon metadata reception module 4100 may include encrypted data reception module 4102. In an embodiment, encrypted data reception module 4102 may be configured to acquire one or more of a block of encrypted data corresponding to one or more images that previously have been encrypted, e.g., encrypted image data 2210. In an embodiment, encrypted data module 4102 may transmit, or facilitate the transmission of, encrypted image data 2210 to an entity that will perform a secondary detection of the privacy beacon, e.g., DCM beacon detection test duplicating server 4800, which will be discussed in more detail further herein.

Referring again to FIG. 1-H, in an embodiment, encrypted data and beacon metadata reception module 4100 may transmit the received DCM beacon metadata to DCM beacon metadata reading module 4120. If the DCM beacon metadata 2230 indicates that a DCM beacon was not found, then, in an embodiment, processing may transfer to module 4220, which will be discussed in more detail further herein. In the example shown in FIG. 1, the DCM beacon 2110 associated with Jules Caesar was found, and the DCM beacon metadata 2230 indicates this state to DCM beacon metadata reading module 4120.

Referring now to FIG. 1-G, in an embodiment, when the presence of the DCM beacon 2110 is determined through the DCM beacon metadata, e.g., DCM beacon metadata 2230, then a DCM beacon TOS retrieval module 4122 may retrieve term data from a location, which may be a remote location, e.g., a DCM beacon management server 5100, which will be discussed in more detail further herein. In an embodiment, DCM beacon TOS retrieval module 4122 may retrieve term data that includes a terms of service that specifies one or more conditions in which the image containing the DCM beacon 2110 may be used. In an embodiment, the TOS may also specify one or more penalties for using the personality rights that may be associated with the image, without acquiring permission or paying a licensing fee prior to releasing or utilizing the image. In an embodiment, the TOS also may include language forcing the entity that viewed the privacy beacon to accept the TOS upon viewing of the beacon. The TOS will be described in more detail with respect to modules 5000 and 5100.

Referring again to FIG. 1-G, in an embodiment, wearable computer encrypted data receipt and determination server 4000 also may include an encrypted data value calculation module 4130. Encrypted data value calculation module 4130 may use one or more algorithms or other methods of inducing or deducing an estimate regarding how much advertising or other revenue may be garnered by using the images containing the entity associated with the privacy beacon. For example, in an embodiment, encrypted data value calculation module 4130 may include a facial recognition program to recognize the person or persons associated with the beacon. In another embodiment, however, this may not be necessary, because the DCM beacon metadata and/or the ToS may identify the person. In an embodiment, encrypted data value calculation module 4130 may use various heuristics to calculate ad revenue, e.g., based on models used by popular advertising methods, or based on prior releases of images of the person associated with the DCM beacon 2110. In an embodiment, module 4130 may use social networking to acquire a focus group and test the image on the focus group, in order to assist in revenue determination. For example, in the example shown in FIG. 1, the image in question is of Jules Caesar, who is the reclusive leader of the Roman Empire, and so the ad revenue generated from having an actual picture of Jules Caesar, or a video of Jules Caesar drinking a mead-and-tonic, may have high net value.

Referring again to FIG. 1-G, in an embodiment, the ToS acquired from DCM beacon TOS retrieval module 4122, and the encrypted data valuation calculated from encrypted data value calculation module 4130 may be sent to release of encrypted data determination module 4140. Release of encrypted data determination module 4140 may make a determination, at least partly based on the acquired metadata, and at least partly based on a value calculation based on the representation of the feature of the person associated with the DCM beacon 2110 (e.g., Jules Caesar drinking a mead-and-tonic). That determination may be regarding whether to allow an action, e.g., processing, decryption, distribution, editing, releasing, sharing, saving, posting to a social network, and the like, of the image. In an embodiment, the decision may be based on whether the potential advertising revenue outweighs the potential damages retrieved from the terms of service. In an embodiment, this calculation may be a strict number comparison (e.g., is "revenue" greater than "damages"). In an embodiment, the calculation may include more complex factors, e.g., likelihood of success on a damages claim, likelihood that revenues will increase, secondary revenue factors from increased traffic and/or brand awareness, and the like. In addition, in an embodiment, the comparison may not be strictly less than/greater than, e.g., in a risk adverse algorithm, if the numbers are close, then the determination may be to not release the encrypted data, even if the potential ad revenue is calculated as larger than the potential damages by a small amount.

Referring again to FIG. 1-G, if the determination made by release of encrypted data determination module 4140 is "NO," e.g., the potential revenue is less than the potential damages, then the encrypted data 2210 is moved to an encrypted data holding and/or quarantine module 4150. In an embodiment, the data from encrypted data holding and/or quarantine module 4150 is deleted after a predetermined time period, e.g., seven days. In an embodiment, the data is simply stored, encrypted and locked away. In an embodiment, the encrypted image data 2210 may be transmitted to an ad replacement value determination server 4400, shown in FIG. 1-F, which will be discussed in more detail herein.

Referring again to FIG. 1-G, if the determination made by release of encrypted data determination module 4140 is "YES," e.g., the potential revenue is more than the potential damages, then the encrypted data 2210 is transferred to encrypted data decryption enabling module 4152, shown in FIG. 1-H. In an embodiment, encrypted data decryption enabling module 4152 may be configured to determine whether to perform decryption of at least a portion of the encrypted data 2210 based on the result from module 4140 by transmitting the encrypted image data 2210 to wearable computer acquired encrypted data decryption and re-encryption server 4200, which will be discussed in more detail.

Wearable Computer Acquired Encrypted Data Decryption and Re-Encryption Server 4200 (FIGS. 1-L and 1-M)

Referring now to FIG. 1-M, in an embodiment, the system may include wearable computer acquired encrypted data decryption and re-encryption server 4200. In an embodiment, wearable computer acquired encrypted data decryption and re-encryption server 4200 may be a portion of wearable computer server 4000. In an embodiment, however, wearable computer acquired encrypted data decryption and re-encryption server 4200 may be a different server than wearable computer server 4000, and may be controlled by a different entity. For example, in an embodiment, the owner of the wearable computer 3100 hardware may control wearable computer server 4000. After the decision is made to decrypt the data at the wearable computer server 4000, control may be handed off to a different server in control of software on the wearable computer, e.g., software that handles pictures taken by the wearable computer 3100. In another embodiment, wearable computer acquired encrypted data decryption and re-encryption server 4200 may be controlled by a social networking/media site, e.g., Facebook, who may have an agreement to acquire the image data at the same time as the device.

Referring again to FIG. 1-M, in an embodiment, wearable computer acquired encrypted data decryption and re-encryption server 4200 may include encrypted data acquiring module 4210, which may acquire the encrypted image data 2210 from the wearable computer server 4000. In an embodiment, wearable computer acquired encrypted data decryption and re-encryption server 4200 may include a privacy metadata acquiring module 4220, which may acquire privacy metadata from module 4120, if the DCM beacon was never detected and the image is free to be used. For example, in an embodiment, image data with no DCM beacon may be treated similarly to image data with a DCM beacon, but that has been determined to have an advertising value greater than a potential damages value. For example, in an embodiment, image data with no DCM beacon may be treated as image data with potential damages value of zero.

Referring again to FIG. 1-M, in an embodiment, wearable computer acquired encrypted data decryption and re-encryption server 4200 may include data indicating profitability of image with DCM beacon acquiring module 4230, which may receive data from module 4150 of wearable computer server 4000 indicating that the image should be decrypted regardless of the DCM beacon because of its potential profitability.

Referring again to FIG. 1-M, in an embodiment, wearable computer acquired encrypted data decryption and re-encryption server 4200 may include image data decryption preparation module 4240, which may receive data from one or more of data indicating profitability of image with DCM beacon acquiring module 4230, encrypted data acquiring module 4210, and privacy metadata acquiring module 4220. In an embodiment, module 4240 may prepare the image or images for decryption, e.g., perform pre-processing, check image integrity, reconfirm the privacy beacon calculations, and the like.

Referring now to FIG. 1-L, wearable computer acquired encrypted data decryption and re-encryption server 4200 may include device-specific key retrieving module 4250 which may retrieve the device-specific key used to encrypt/decrypt the encrypted image data 2210. In an embodiment, device-specific key retrieving module 4250 may include a device-specific key retrieving from device module 4252, which may be configured to retrieve the device-specific key directly from the device that encrypted the image, e.g., wearable computing device 3100. In an embodiment, device-specific key retrieving module 4250 may include a device-specific key retrieving from server module 4254, which may be configured to retrieve the device-specific key from a server, e.g., from wearable computer encrypted data receipt and determination server 400, or from DCM beacon detection test duplicating server 4800, or from another server not depicted in FIG. 1.

Referring again to FIG. 1-L, in an embodiment, image data decryption with device-specific key module 4260 may take the device-specific key retrieved from module 4250, and apply it to the encrypted image data 2210 to generate decrypted image data 2280, as shown by the icon with the unlocked lock in FIG. 1-L.

Referring again to FIG. 1-L, the image data has been decrypted. However, to protect security, in some embodiments, the data may be re-encrypted with a key that is not tied to a specific device, but may be tied to a specific user of the device, e.g., the key may be related to user 3105, rather than wearable device 3100. This embodiment will be described in more detail herein. This embodiment allows the re-encrypted data to be securely sent to a different device belonging to the user, e.g., a smart TV, a home computer, a video game system, or another portable electronic device, e.g., a cellular smartphone. In an embodiment, the re-encryption with a user specific key may be omitted.

In an embodiment, wearable computer acquired encrypted data decryption and re-encryption server 4200 may include a user-specific key retrieving module 4270, that may be configured to obtain, through generation, acquisition, reception, or retrieval, of a user-specific encryption key. The user-specific encryption key may be delivered to image data encrypting with user-specific key module 4280, which, in an embodiment, also may receive the decrypted image data 2280.

Referring again to FIG. 1-L, in an embodiment, image data encrypting with user-specific key module 4280 may be configured to encrypt the block of decrypted data through use of a unique user code that is related to the user 3105 of the wearable device 3100. The again-encrypted image data then may be transferred to encrypted image data transmitting module 4290. In an embodiment, encrypted image data transmitting module 4290 may transmit the image data that has been encrypted with a user-specific key to one or more other devices, which will be discussed in more detail herein.

Computing Device that Receives the Image Data (FIGS. 1-S and 1-T).

Referring now to FIG. 1-S, in an embodiment, the system may include a computing device 3200, which may be a wearable computer or other device. In an embodiment, computing device 3200 may be the same as wearable computer 3100, but it does not necessarily have to be the same. In an embodiment, computing device 3200 receives the image data. In an embodiment, as described above, the received image data has been encrypted with a user-specific code. Thus, in such an embodiment, computing device 3200 may be associated with user 3105 of the wearable computing device 3100. For example, a user 3105 may have a wearable computing device 3100 that captures images of people. After processing those images at the server 4000, for example, the images, which, in some embodiments, now may be encrypted with a user-specific code, may be transmitted to computing device 3200, which may be the user 3105's home media center back at her house. In another embodiment, computing device 3200 may be user 3105's laptop device, or user 3105's smartphone or tablet device. And, as previously mentioned, in another embodiment, computing device 3200 may simply be the user 3105's wearable computing device 3100 that captured the images originally.

In an embodiment, the computing device 3200 and the wearable computing device 3100 pictured in FIG. 1 are the same device. In an embodiment, the encryption, transmission to a server, decryption, and transmission back, may occur invisibly to the user 3105, e.g., to the user 3105 of the wearable computing device 3100, the images are available to her after they are recorded and saved, with a delay that is not specified. In some embodiments, the user 3105 may not be informed of the path taken by the captured image data.

In an embodiment, wearable computing device 3100 may include an encrypted image data receiving module 3210 configured to acquire the data encrypted by the user-specific key code from encrypted image data transmitting module 4290 of wearable computer 4200. In an embodiment, computing device 3200 may include image data release verification acquiring module 3220, which may be configured to determine that the images received from the encrypted image data transmitting module 4290 of wearable computer 4200 have been approved for release and/or use. In an embodiment, the determination may be made based on the ground that the images are encrypted with a user-specific key rather than a device specific key, if it is possible to tell from the encrypted information (e.g., in some embodiments, different types of encryption that may leave a different "signature" may be used). In an embodiment, the determination may be made by again analyzing the image data. In an embodiment, image data release verification acquiring module 3220 may include encrypted image data analysis module 3222 which may perform analysis on the encrypted image data, including, but not limited to, reading metadata attached to the encrypted image data, to verify that the received encrypted image data is approved for release and/or processing. In an embodiment, image data release verification acquiring module 3220 may include release verification data retrieving module 3224, which may be configured to obtain release verification data from the device that performed the verification, e.g., server 4000, or from a different device.

Referring now to FIG. 1-T, in an embodiment, computing device 3200 may include device memory 3280. Device memory 3280 may store the wearable computer user-specific encryption/decryption key 3286, which may be used to decrypt the received encrypted image data. In an embodiment, device memory 3280 also may include encrypted image storage 3284, which may include one or more image data, which may be encrypted.

Referring again to FIG. 1-S, in an embodiment, computing device 3200 may include user-specific decryption key obtaining module 3230, which may obtain the user-specific encryption/decryption key. In an embodiment, user-specific decryption key obtaining module 3230 may include encryption/decryption key external source obtaining module 3232, which may be configured to obtain the encryption/decryption key from an external source, e.g., server 4000. In an embodiment, user-specific decryption key obtaining module may include encryption/decryption key memory retrieving module 3234, which may be configured to retrieve the encryption/decryption key from device memory 3280 of computing device 3200.

Referring again to FIG. 1-S, in an embodiment, computing device 3200 may include image decryption module 3240, which may use the user-specific encryption/decryption key to decrypt the image data. In an embodiment, the decrypted image data then may be sent to decrypted image release module 3250, where the clear image data may be accessed by the device, and transmitted to other locations, posted to social networking or cloud storage, be shared, manipulated, saved, edited, and otherwise have open access to the decrypted image data.

Ad Replacement Value Determination Server (FIG. 1-F).

Referring back to FIG. 1-G, as discussed briefly above, release of encrypted data determination module 4140 may determine not to release the encrypted data, which may be stored in an encrypted data holding and/or quarantine module 4150. In an embodiment, the encrypted data and the DCM beacon may be transmitted to an ad replacement value determination server, as shown in FIG. 1-F.

Referring now to FIG. 1-F, in an embodiment, the system may include an ad replacement value determination server 4400. Ad replacement value determination server 4400 may take the encrypted image data and determine if there is a way to monetize the images such that the monetization may outweigh the potential damages. For example, ad replacement value determination server 4400 may calculate potential earnings and limited damages liability, if, for example, an entity with the DCM beacon, e.g., Jules Caesar, is instead shown with an advertisement where his head would normally be. In an embodiment, ad replacement value server may be controlled by a different entity than server 4000, and there may be an agreement in place for the ad replacement value determination server 4400 to receive encrypted data for which the server 4000 decides it does not want to allow distribution. For example, ad replacement value server 4400 may be run by a smaller social networking site that cares less about potential damages because they have fewer assets, or are less risk-averse. In another embodiment, ad replacement value determination server 4400 may be part of server 4000, and it may be a practice of server 4000 to send an encrypted image for further analysis after the server 4000 determines that the image is not likely to be profitable without modification.

Referring again to FIG. 1-F, in an embodiment, ad replacement value determination server 4400 may include a DCM beacon metadata reception module 4410 configured to receive the DCM beacon metadata from the wearable computer encrypted data receipt and determination server 4000. In an embodiment, ad replacement value determination server 4400 may include an encrypted data reception module 4420 that may be configured to receive the encrypted data from the wearable computer encrypted data receipt and determination server 4000, e.g., from the encrypted data holding module 4150.

Referring again to FIG. 1-F, in an embodiment, ad replacement value determination server 4400 may include a DCM beacon term acquiring module 4430, which may acquire one or more terms of service from service term management server 5000 and/or DCM beacon management server 5100, similarly to DCM beacon terms-of-service retrieval module 4122 of wearable computer encrypted data receipt and determination server 4000. In an embodiment, DCM beacon term acquiring module may include DCM beacon remote retrieval module 4432. In an embodiment, DCM beacon term acquiring module may be configured to retrieve term data from a remote location, e.g., service term management server 5000, which term data may correspond to a term of service associated with a release of image data that includes the person with which the DCM beacon is associated, e.g., Jules Caesar.

Referring again to FIG. 1-F, in an embodiment, ad replacement value determination server 4400 may include an encrypted data value calculation with standard ad placement module 4440. In an embodiment, standard ad placement module 4440 may perform a similar calculation as encrypted data value calculation module 4130 of wearable computer encrypted data receipt and determination server 4000. In an embodiment, for example, encrypted data value calculation with standard ad placement module 4440 may calculate whether an estimated advertising revenue from one or more advertisement images placed in the encrypted image data will be greater than an estimated potential liability for distribution of the images. In an embodiment, the estimated potential liability is based at least in part on the terms of service which may be retrieved by the DCM beacon term acquiring module 4430.

Referring again to FIG. 1-F, in an embodiment, ad replacement value determination server 4400 may include encrypted image data modification with intentionally obscuring ad placement module 4450. In an embodiment, encrypted image data modification with intentionally obscuring ad placement module 4450 may be configured to modify the encrypted image data (e.g., which, in some embodiments, may require limited decryption and then re-encryption) by replacing one or more areas associated with the entity related to the DCM beacon, e.g., Jules Caesar's face (e.g., or in another embodiment, Jules Caesar's genitalia, if, e.g., it was a naked picture of Jules Caesar), with one or more advertisement images.

Referring again to FIG. 1-F, in an embodiment, ad replacement value determination server 4400 may include modified encrypted data value calculation with intentionally obscuring ad placement module 4460. In an embodiment, modified encrypted data value calculation with intentionally obscuring ad placement module 4460 may be configured to calculate an estimated advertising revenue from the modified image data. In an embodiment, the modified image data then may be distributed through modified encrypted data distributing module 4470.

Tracking Server (FIG. 1-E).

Referring now to FIG. 1-E, in an embodiment, a system may include tracking server 9000. Tracking server 9000 may be configured to log use of a "Don't Capture Me" (hereinafter "DCM") beacon by one or multiple users. In an embodiment, tracking server 9000 may track active DCM beacons, e.g., beacon 2110, through communication with said one or more beacons. In an embodiment, tracking server may track DCM beacons through other means, e.g., social networking and the like. The DCM beacon does not need to be an active DCM beacon in order to be tracked by tracking server 9000.

In an embodiment, tracking server 9000 may include deployment of one or more active and/or passive DCM beacons monitoring module 9010. Deployment of one or more active and/or passive DCM beacons monitoring module 9010 may include one or more of active DCM beacon monitoring module 9012 and passive DCM beacon monitoring/data gathering module 9020. In an embodiment, passive DCM beacon monitoring/data gathering module 9020 may gather data about the passive DCM beacon by observing it, e.g., through satellite video capture, through other image capturing devices, e.g., phone cameras, security cameras, laptop webcams, and the like, or through other means.

In an embodiment, passive DCM beacon monitoring/data gathering module 9020 may include user input module 9022, which may receive an indication from a user, e.g., a switch flipped on a user's cell phone, indicating that the user is using the DCM beacon. In an embodiment, passive DCM beacon monitoring/data gathering module 9020 may include a device status module which tracks a device with which the passive DCM beacon is associated, e.g., a wearable computer that is a shirt, or a cellular phone device in the pocket. In an embodiment, passive DCM beacon monitoring/data gathering module 9020 may include a social media monitoring module that monitors posts on social networking sites to determine if the DCM beacon is being used, and a location of the user.

Referring again to FIG. 1-E, in an embodiment, tracking server 9000 may include a record of the deployment of the one or more active and/or passive DCM beacons storing module 9030, which may be configured to store a record of usage and/or detection logs of the DCM beacons that are monitored. In an embodiment, record of the deployment of the one or more active and/or passive DCM beacons storing module 9030 may store a record of the deployment in deployment record storage 9032. In an embodiment, record of the deployment of the one or more active and/or passive DCM beacons storing module 9030 may transmit all or portions of the recorded record through record of the deployment of one or more active and/or passive DCM beacons transmitting module 9040.

Service Term Management Server 5000 (FIG. 1-A)

Referring now to FIG. 1-A, in an embodiment, the system may include service term management server 5000, which may manage terms of service that are associated with a DCM beacon and/or a person. In an embodiment, service term management server 5000 may include a DCM beacon registry 5010. In an embodiment, the DCM beacon registry 5010 may include one or more of a user's name, e.g., Jules Caesar, a terms of service associated with Jules Caesar, which may be custom to Jules Caesar, or may be a generic terms of service that is used for many persons, and various representations of portions of Jules Caesar, e.g., likeness, handprint, footprint, voiceprint, pictures of private areas, and the like.

Referring again to FIG. 1-A, in an embodiment, the system may include a terms of service generating module 5020. Terms of service generating module 5020 may create a terms of service for the user Jules Caesar. A sample Terms of Service is shown in FIG. 1-A and is reproduced here. It is noted that this is a condensed Terms of Service meant to illustrate an exemplary operation of the system in the environment, and accordingly, several necessary legal portions may be omitted. Accordingly, the example Terms of Service should not be considered as a binding, legal document, but rather a representation of what the binding, legal document would look like, that would enable one skilled in the art to create a full Terms of Service.

Exemplary Terms of Service for User 2105 (Jules Caesar)

1. By capturing an image of any part of the user Jules Caesar (hereinafter "Image"), or providing any automation, design, resource, assistance, or other facilitation in the capturing of the Image, you agree that you have captured these Terms of Service and that you acknowledge and agree to them. If you cannot agree to these Terms of Service, you should immediately delete the captured Image. Failure to do so will constitute acceptance of these Terms of Service.

2. The User Jules Caesar owns all of the rights associated with the Image and any representation of any part of Jules Caesar thereof;

3. By capturing the Image, you agree to provide the User Jules Caesar just compensation for any commercialization of the User's personality rights that may be captured in the Image.

4. By capturing the Image, you agree to take all reasonable actions to track the Image and to provide an accounting of all commercialization attempts related to the Image, whether successful or not.

5. By capturing the Image, you accept a Liquidated Damages agreement in which unauthorized use of the Image will result in mandatory damages of at least, but not limited to, $1,000,000.

In an embodiment, terms of service generating module may include one or more of a default terms of service storage module 5022, a potential damage calculator 5024, and an entity interviewing for terms of service generation module. In an embodiment, default terms of service storage module 5022 may store the default terms of service that are used as a template for a new user, e.g., when Jules Caesar signs up for the service, this is the terms of service that is available to him. In an embodiment, potential damage calculator 5024 may determine an estimate of how much in damages that Jules Caesar could collect for a breach of his personality rights. In an embodiment, for example, potential damage calculator may search the internet to determine how much Jules Caesar appears on social media, blogs, and microblog (e.g., Twitter) accounts. In an embodiment, entity interviewing for terms of service generation module 5026 may create an online questionnaire/interview for Jules Caesar to fill out, which will be used to calculate potential damages to Jules Caesar, e.g., through determining Jules Caesar's net worth, for example.

In an embodiment, service term management server 5000 may include terms of service maintenance module 5030, which may maintain the terms of service and modify them if, for example, the user becomes more popular, or gains a larger online or other presence. In an embodiment, terms of service maintenance module 5030 may include one or more of a social media monitoring module 5042, that may search social networking sites, and an entity net worth tracking module 5034 that may have access to the entity's online bank accounts, brokerage accounts, property indexes, etc., and monitor the entity's wealth.

In an embodiment, serviced term management server 5000 may include a use of representations of an entity detecting module 5040. In an embodiment, use of representations of an entity detecting module 5040 may include one or more of a social media monitoring module 5042, a public photo repository monitoring module 5044, and a public blog monitoring module 5046. In an embodiment, use of representations of an entity detecting module 5040 may track uses of representations, e.g., images, of the user Jules Caesar, to try to detect violations of the terms of service, in various forums.

DCM Beacon Management Server 5100 (FIG. 1-C)

Referring now to FIG. 1-C, in an embodiment, the system may include a DCM beacon management server 5100, which may be configured to manage the DCM beacon associated with a user, e.g., DCM beacon 2110 for user 2105, e.g., Jules Caesar. In an embodiment, DCM beacon management server 5100 and service term management server 5000 may be the same server. In another embodiment, DCM beacon management server 5100 and service term management server 5000 may be hosted by different entities.

For example, a specialized entity may handle the terms of service generation, e.g., a valuation company that may be able to determine a net "social network" worth of a user, e.g., Jules Caesar, and use that to fashion the terms of service.

Referring again to FIG. 1-C, in an embodiment, DCM beacon management server 5100 may include DCM beacon communication with entity wanting to avoid having their image captured module 5110. DCM beacon communication with entity wanting to avoid having their image captured module 5110 may be configured to communicate with a user, e.g., user 2105, e.g., Jules Caesar, and may handle the creation, generation, maintenance, and providing of the DCM beacon 2110 to Jules Caesar, whether through electronic delivery or through conventional delivery systems (e.g., mail, pickup at a store, etc.). In an embodiment, DCM beacon communication with entity wanting to avoid having their image captured module 5110 may include one or more of DCM beacon transmission module 5112, DCM beacon receiving module 5114, and DCM beacon generating module 5116.

In an embodiment, DCM beacon management server 5100 may include entity representation acquiring module 5120. Entity representation acquiring module 5100 may be configured to receive data regarding one or more features of the user that will be associated with the DCM beacon. For example, the user might upload pictures of his body, face, private parts, footprint, handprint, voice recording, hairstyle, silhouette, or any other representation that may be captured and/or may be deemed relevant.

In an embodiment, DCM beacon management server 5100 may include DCM beacon association with one or more terms of service and one or more entity representations module 5130. In an embodiment, DCM beacon association with one or more terms of service and one or more entity representations module 5130 may be configured to, after generation of a DCM beacon, obtain a terms of service to be associated with that DCM beacon. In an embodiment, the terms of service may be received from service term management server 5000.

In an embodiment, DCM beacon management server 5100 may include a DCM beacon capture detecting module 5140. DCM beacon capture detection module 5140 may detect when a DCM beacon is captured, e.g., if it is an active beacon, or it may receive a notification from various servers (e.g., server 4000) and/or wearable devices (e.g., wearable device 3100) that a beacon has been detected, if it is a passive DCM beacon.

In an embodiment, when a DCM beacon is detected, DCM beacon management server 5100 may include terms of service associated with DCM beacon distributing module, which may be configured to provide the terms of service associated with the DCM beacon to an entity that captured the image including the DCM beacon, e.g., to module 4122 of wearable computer encrypted data receipt and determination server 4000, or DCM beacon remote retrieval module 4430 of ad replacement value determination server 4400, for example.

Wearable Computer with Optional Paired Personal Device 3300 (FIGS. 1-Q and 1-R)

Referring now to FIG. 1-R, in an embodiment, the system may include a wearable computer 3300. Wearable computer 3300 may have additional functionality beyond capturing images, e.g., it may also store a user's contact list for emails, phone calls, and the like. In another embodiment, wearable computer 3300 may be paired with another device carried by a user, e.g., the user's smartphone device, which stores the user's contact list. As will be described in more detail herein, wearable computer 3300 operates similarly to wearable computer 3100, except that entities with DCM beacons are obscured, unless they have a preexisting relationship with the user. It is noted that DCM beacon detection and encryption may operate similarly in wearable computer 3300 as in wearable computer 3100, and so substantially duplicated parts have been omitted.

Referring again to FIG. 1-R, in an embodiment, wearable computer 3300 may include an image capturing module 3310, which may capture an image of Jules Caesar, who has DCM beacon "A", Beth Caesar, who has DCM beacon "B", and Auggie Caesar, who has no DCM beacon. In an embodiment, wearable computer 3300 may include an image acquiring module 3320, which may be part of image capturing module 3310, to acquire one or more images captured by an image capture device, e.g., the image of Jules Caesar, Beth Caesar, and Auggie Caesar.

In an embodiment, wearable computer 3300 may include an entity identification module 3330, which may perform one or more recognition algorithms on the image in order to identify persons in the image. Entity identification module may use known facial recognition algorithms, for example, or may ask the user for input, or may search the internet for similar images that have been identified, for example.

Referring again to FIG. 1-R, in an embodiment, wearable computer 3300 may include preexisting relationship data retrieval module 3340, which may retrieve names of known persons, e.g., from a device contact list, e.g., device contact list 3350. In the example shown in FIG. 1, Jules Caesar is in the contact list of the device 3300. It is noted that the device contact list 3350 may be stored on a different device, e.g., the user's cellular telephone.

Referring now to FIG. 1-Q, in an embodiment, wearable computer 3300 may include data indicating an identified entity from the image data has a preexisting relationship obtaining module 3360, which, in an embodiment, may obtain data indicating that one of the entities recorded in the image data (e.g., Jules Caesar) is in the user's contact list.

Referring again to FIG. 1-Q, in an embodiment, wearable computer 3300 may include entities with preexisting relationship marking to prevent obfuscation module 3370. In an embodiment, entities with preexisting relationship marking to prevent obfuscation module 3370 may attach a marker to the image, e.g., a real marker on the image or a metadata attachment to the image, or another type of marker, that prevents obfuscation of that person, regardless of DCM beacon status, because they are in the user's contact list.

Referring again to FIG. 1-Q, in an embodiment, wearable computer 3300 may include unknown entities with DCM beacon obscuring module 3380, which may obfuscate any of the entities in the image data that have a DCM beacon and are not in the contact list. For example, in the example shown in FIG. 1, Beth Caesar's image is obscured, e.g., blurred, blacked out, covered with advertisements, or the like, because she has a DCM beacon associated with her image, and because she is not in the user's contact list. Jules Caesar, on the other hand, is not obscured because a known entity marker was attached to his image at module 3370, because Jules Caesar is in the contact list of an associated device of the user. Auggie Caesar is not obscured regardless of contact list status, because there is no DCM beacon associated with Auggie Caesar.

Referring again to FIG. 1-Q, after the image is obscured, obscured image 3390 of wearable computer 3300 may release the image to the rest of the device for processing, or to another device, the Internet, or cloud storage, for further operations on the image data.

Active DCM Beacon 6000 (FIGS. 1-P and 1-K).

Referring now to FIG. 1-P, in an embodiment, a user 2107 may be associated with an active DCM beacon 2610, which will be discussed in more detail herein. The word "Active" in this context merely means that the DCM beacon has some form of circuitry or emitter.

Referring now to FIG. 1-K, in an embodiment, the system may include an active DCM beacon 6000, which may show an active DCM beacon, e.g., active DCM beacon 2610, in more detail. In an embodiment, beacon 6000 may include DCM beacon broadcasting module 6010. In an embodiment, DCM beacon broadcasting module 6010 may broadcast a privacy beacon associated with at least one user, e.g., user 2107, from at or near the location of user 2107. The beacon may be detected by an image capturing device when the user is captured in an image.

Referring again to FIG. 1-K, in an embodiment, the beacon 6000 may include an indication of DCM beacon detection module 6020, which may detect, be informed of, or otherwise acquire an indication that the active DCM beacon has been captured by an image capturing device. In an embodiment, indication of DCM beacon detection module 6020 may include one or more of DCM beacon scanning module 6022, which may scan nearby devices to see if they have detected the beacon, and DCM beacon communications handshake module 6024, which may establish communication with one or more nearby devices to determine if they have captured the beacon.

Referring again to FIG. 1-K, in an embodiment, beacon 6000 may include term data broadcasting module 6030, which may broadcast, or which may order to be broadcasted, term data, which may include the terms of service. In an embodiment, term data broadcasting module 6030 may include one or more of a substantive term data broadcasting module 6032, which may broadcast the actual terms of service, and pointer to term data broadcasting module 6034, which may broadcast a pointer to the terms of service data that a capturing device may use to retrieve the terms of service from a particular location.

DCM Beacon Test Duplicating Sever 4800 (FIGS. 1-C and 1-D)

Referring now to FIG. 1-C, in an embodiment, the system may include a DCM beacon test duplicating server 4800. In an embodiment, the DCM beacon test duplicating server 4800 may take the image data, and perform the test for capturing the beacon again, as a redundancy, as a verification, or as a protection for wearable computer server 4000. In an embodiment, DCM beacon test duplicating server 4800 may be a part of wearable computer server 4000. In another embodiment, DCM beacon test duplicating server 4800 may be separate from wearable computer server 4000, and may be controlled by a different entity, e.g., a watchdog entity, or an independent auditing agency.

Referring again to FIG. 1-C, in an embodiment, DCM beacon test duplicating server 4800 may include encrypted data reception for secondary DCM beacon detection module 4810, which may acquire the encrypted image data containing the user, e.g., user 2105, e.g., Jules Caesar, and the associated DCM beacon, e.g., DCM beacon 2110.

Referring again to FIG. 1-C, in an embodiment, DCM beacon test duplicating server 4800 may include a device-specific key retrieving module 4820, which may retrieve the device-specific key, e.g., from wearable computer device 3100, or from wearable computer server 4000. In an embodiment, DCM beacon test duplicating server 4800 may include image data decryption with device-specific key module 4830, which may apply the device-specific key obtained by device-specific key retrieving module 4820, and apply it to the encrypted image data, to generate decrypted image data.

Referring again to FIG. 1-C, in an embodiment, the unencrypted image data may be sent to DCM beacon detecting module 4840 of DCM beacon test duplicating server 4800. If the raw image data was optical in its original form, then it may be reconverted to optical (e.g., light) data. In an embodiment, DCM beacon detecting module 4840 may perform a detection for the DCM beacon, as previously described. In an embodiment, DCM beacon detecting module 4840 may include one or more of an optics-based DCM beacon detecting module 4842 and a digital image processing-based DCM beacon detecting module 4844.

Referring now to FIG. 1-D, after the test for detecting the DCM beacon 2220 (which may be the same as the DCM beacon 2210, but is detected at a different place, so a different number has been assigned), DCM beacon detection at duplicating sever result obtaining module 4850 may obtain the result of the detection performed at DCM beacon test duplicating server 4800. Similarly, DCM beacon detection at device result obtaining module 4860 may obtain the result from the DCM beacon detection performed at wearable computer device 3100. The results from module 4850 and 4860 may be stored at DCM beacon test result storage and logging module 4870 of DCM beacon test duplicating server 4800.

Referring again to FIG. 1-D, the test results from DCM beacon test duplicating server 4800 and from wearable computer 3100 may be stored at DCM beacon test result storage and logging module 4870, and such results may be kept for a predetermined length of time. In an embodiment, the results may be transmitted to a requesting party using DCM beacon test result transmitting module 4880.

Referring again to the system, in an embodiment, a computationally-implemented method may include acquiring an image, said image including at least one representation of a feature of at least one entity, detecting a presence of a privacy beacon associated with the at least one entity from the acquired image, without performance of a further process on the acquired image, encrypting the image using a unique device code prior to performance of one or more image processes other than privacy beacon detection, said unique device code unique to an image capture device and not transmitted from the image capture device, and facilitating transmission of the encrypted image and privacy beacon data associated with the privacy beacon to a location configured to perform processing on one or more of the encrypted image and the privacy beacon data.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata, said privacy metadata corresponding to a detection of a privacy beacon in the one or more images captured by the image capture device, said privacy beacon associated with the at least one entity, and determining, at least partly based on the acquired privacy metadata, and partly based on a value calculation based on the representation of the feature of the at least one entity for which the privacy beacon is associated, whether to allow processing, which may include distribution, decryption, etc., of the encrypted data block.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata indicating detection of a privacy beacon in the one or more images captured by the image capture device, said privacy beacon associated with the at least one entity, retrieving term data from a remote location, said term data corresponding to a term of service associated with a potential release of the block of encrypted data corresponding to the one or more images that have previously been encrypted through use of the unique device code associated with the image capture device configured to capture the one or more images, calculating an expected valuation corresponding to potential revenue associated with the release of at least a portion of the block of encrypted data corresponding to the one or more images that have previously been encrypted through use of the unique device code associated with the image capture device configured to capture the one or more images, and determining whether to perform decryption of at least a portion of the block of encrypted data at least partially based on the calculation of the expected valuation corresponding to the potential revenue associated with the release of the at least the portion of the block of encrypted data, and at least partially based on the retrieved term data corresponding to the term of service.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, acquiring a privacy metadata indicating a lack of detection of a privacy beacon in the one or more images captured by the image capture device, decrypting the block of encrypted data corresponding to the one or more images that have previously been encrypted through use of a unique device code associated with the image capture device, and encrypting the block of decrypted data through use of a unique entity code that is related to an entity associated with the image capture device configured to capture the one or more images. Referring again to the system, in an embodiment, a computationally-implemented method may include acquiring a block of encrypted data from a remote location, said block of encrypted data corresponding to one or more images captured by an image capture device, said block of encrypted data previously encrypted through use of a unique entity code that is related to an entity associated with the image capture device, receiving an indication that the one or more images captured by the image capture device were approved for decryption through a verification related to privacy metadata associated with the one or more images, obtaining the unique entity code related to the entity associated with the image capture device, and releasing the one or more images through decryption of the block of encrypted data acquired from the remote location using the obtained unique entity code related to the entity associated with the image capture device.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, retrieving term data from a remote location, said term data corresponding to a term of service associated with a potential release of the one or more images that have previously been encrypted through use of the unique device code associated with the image capture device configured to capture the one or more images, calculating whether an estimated advertising revenue from one or more advertisement images placed in the one or more images of the block of encrypted data will be greater than an estimated potential liability for distribution of the one or more images of the block of encrypted data, said estimated potential liability at least partly based on the retrieved term data, modifying the one or more images of the block of encrypted data by replacing one or more areas associated with one or more entities at least partially depicted in the one or more images with the one or more advertisement images, and calculating a modified estimated advertising revenue from the modified one or more images of the block of encrypted data.

Referring again to the system, in an embodiment, a computationally-implemented method may include monitoring a deployment of a privacy beacon associated with a user, said privacy beacon configured to alert a wearable computer of one or more terms of service associated with said user in response to recordation of image data that includes said privacy beacon by said wearable computer, and said privacy beacon configured to instruct said wearable computer to execute one or more processes to impede transmission of the one or more images that include the user associated with said privacy beacon, and storing a record of the deployment of the privacy beacon associated with the user, said record configured to be retrieved upon request to confirm whether the privacy beacon associated with the user was active at a particular time.

Referring again to the system, in an embodiment, a computationally-implemented method may include receiving data regarding one or more features of one or more entities that are designated for protection by one or more terms of service, associating the one or more terms of service with a privacy beacon configured to be captured in an image when the one or more features of the one or more entities are captured in the image, and providing the terms of service to one or more media service providers associated with a device that captured an image that includes the privacy beacon, in response to receipt of an indication that an image that includes the privacy beacon has been captured.

Referring again to the system, in an embodiment, a computationally-implemented method may include acquiring one or more images that have previously been captured by an image capture device, wherein at least one of the one or more images includes at least one representation of a feature of one or more entities, identifying a first entity for which at least one representation of a first entity feature is present in the one or more images, and a second entity for which at least one representation of a second entity feature is present in the one or more images, obtaining data indicating that the first entity has a preexisting relationship with an entity associated with the image capture device, e.g., in a contact list, preventing an obfuscation of the representation of the first entity for which the preexisting relationship with the entity associated with the image capture device has been indicated, and obfuscating the representation of the second entity for which at least one representation of the second entity feature is present in the one or more images.

Referring again to the system, in an embodiment, a computationally-implemented method may include broadcasting a privacy beacon associated with at least one entity from a location of the at least one entity, said privacy beacon configured to be detected by an image capturing device upon capture of an image of the at least one entity, acquiring an indication that the privacy beacon associated with the at least one entity has been captured by the image capturing device, and broadcasting term data including one or more conditions and/or consequences of distribution of one or more images that depict at least a portion of the at least one entity.

Referring again to the system, in an embodiment, a computationally-implemented method may include acquiring a block of encrypted data corresponding to one or more images that have previously been encrypted through use of a unique device code associated with an image capture device configured to capture the one or more images, wherein at least one of the one or more images includes at least one representation of a feature of at least one entity, decrypting the block of encrypted data corresponding to the one or more images that have previously been encrypted through use of the unique device code associated with the image capture device configured to capture the one or more images, performing an operation to detect a presence of a privacy beacon associated with the at least one entity from the one or more images, wherein the privacy beacon previously had been detected by the image capture device, and storing outcome data corresponding an outcome of the operation to detect the presence of the privacy beacon associated with the at least one entity of the one or more images, wherein said outcome data includes an indication of whether a result of the performed operation to detect the presence of the privacy beacon associated with the at least one entity from the one or more images matches the previous detection of the privacy beacon by the image capture device.

FIG. 2A illustrates an example environments 200 in which methods, systems, circuitry, articles of manufacture, and computer program products and architecture, in accordance with various embodiments, may be implemented by one or more verification server devices 230 (e.g., as shown in FIG. 2B), and in which methods, systems, circuitry, articles of manufacture, and computer program products and architecture, in accordance with various embodiments, may be implemented by one or more image capture devices 220 (e.g., as shown in FIG. 2C). Device 220 may be any kind of device, e.g., they may be an image capture device, or a device that communicates with an image capture device, e.g., a smartphone, a remote server, a network resource, and the like. Device 220 may be a wearable computer. Device 220 may be a stationary camera. In an embodiment, the device 220 may be the device that captured the image.

Referring now to FIG. 2, FIG. 2A illustrates an example environment 200 in which the computing device 220 operates. As shown in FIG. 2A, one or more computing devices 220 may capture images. For example, computing device 220 may capture an image of an entity 105 associated with a privacy beacon, e.g., a DCM ("Don't Capture Me") beacon 110. In this and some other examples, the captured entity is named "Jules Caesar." In an embodiment in which computing device 220 is a wearable computer, computing device 220 may be worn by computing device user 115. In another embodiment, computing device user 115 is not present (e.g., computing device 220 is a security camera, or an automated teller machine with a camera).

Referring again to FIG. 2A, computing device 220 may capture the image data as image data 22, which may be optical data, e.g., light data, digital data, e.g., a digital signal, or data in another form. In a process that will be discussed in more detail herein according to various embodiments, image data 22 may be encrypted using a device-specific code, shown here as encrypted image data 24. Encrypted image data 24 may be transmitted to a server device 230, which may be an example of wearable computer server 3000 shown in FIG. 1. In an embodiment, computing device 220 may generate beacon metadata 150 from the detected DCM beacon 110. In an embodiment, beacon metadata 150 may be binary beacon metadata that indicates whether a beacon has been detected, e.g., yes or no. In an embodiment, beacon metadata 150 may include a data string that identifies the beacon, the entity, the type of beacon, data about the beacon, or a combination of the foregoing. In an embodiment, such a beacon metadata 150 may be used by server device 230 to obtain additional information about the entity, e.g., terms of service data, which will be described in more detail herein. In an embodiment, beacon metadata 150 may include terms of service data associated with the entity, e.g., Jules Caesar. The types of beacon metadata 150 are not limited to those listed in this paragraph, and the foregoing types of beacon metadata 150 will be described in more detail further herein with respect to FIGS. 4A-4E, and with respect to the specific examples listed herein.

Referring again to FIG. 2A, in an embodiment, server device 230 may include a decryption determination module 232, which may determine whether to decrypt the device-based encrypted image 24, in a process described in more detail in this application and the related applications. In an embodiment, decryption determination module 232 may include valuation assessment module 236. Valuation assessment module 236 may make one or more calculations and/or estimations to determine one or more of an estimated value of the captured image, and an estimated liability that may be incurred for the distribution of the image. In an embodiment, if the decryption determination module 232 determines to decrypt the image, then the image may be decrypted into decrypted image 26.

Referring again to FIG. 2A, computing device 220 may include a capture beacon communication module 225. Capture beacon communication module 225 may communicate with a central server, e.g., to determine the scope of rights to capture images, or to inform that an image has been taken, for example. In an embodiment, capture beacon communication module 225 may communicate with image capture monitoring device 280. Computing device 220 may transfer data, e.g., data about computing device 220, to image capture monitoring device 280. In an embodiment, image capture monitoring device 280 may be many devices 280, in which case computing device 220 may sample received information from the many devices 280, e.g., to determine whether it is permitted to capture images at computing device 220's location. In an embodiment, image capture monitoring device 280 may be a remote server, e.g., and may be part of one or more of server device 230 and/or server verification device 270. In an embodiment, image capture monitoring device 280 may include an image capture device communication module 282.

Referring again to FIG. 2A, in an embodiment, server verification device 270 may include a beacon detection and result comparison with device beacon detection module 274. In an embodiment, server verification device 270 receives the encrypted image data, decrypts the encrypted image data, and performs a similar or same test to detect the DCM beacon 110 as was conducted by computing device 220.

Referring again to FIG. 2A, in some embodiments, one or more of the encrypted image data and the DCM beacon metadata are transmitted over one or more communication network(s) 240. In various embodiments, the communication network 240 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 240 may be wired, wireless, or a combination of wired and wireless networks. It is noted that "communication network" as it is used in this application refers to one or more communication networks, which may or may not interact with each other.

Referring now to FIG. 2B, FIG. 2B shows a more detailed description of verification server device 270. In an embodiment, verification server device 270 may include beacon detection and result comparison with device beacon detection module 274. In an embodiment, verification server device 270 may include a processor 272. Processor 272 may include one or more microprocessors, Central Processing Units ("CPU"), a Graphics Processing Units ("GPU"), Physics Processing Units, Digital Signal Processors, Network Processors, Floating Point Processors, and the like. In an embodiment, processor 272 may be a server. In an embodiment, processor 272 may be a distributed-core processor. Although processor 272 is as a single processor that is part of a single computing device 220, processor 272 may be multiple processors distributed over one or many computing devices 220, which may or may not be configured to operate together.

Referring again to FIG. 2B, verification server device 270 may include a device memory 275. In an embodiment, device memory 275 may include memory, random access memory ("RAM"), read only memory ("ROM"), erasable programmable read-only memory ("EPROM"), electronically erasable programmable read-only memory ("EEPROM") cache memory such as random access memory (RAM), flash memory, synchronous random access memory (SRAM), dynamic random access memory (DRAM), flash memory, hard drives, disk-based media, disc-based media, magnetic storage, optical storage, volatile memory, nonvolatile memory, and any combination thereof. In an embodiment, device memory 275 may be separated from the device, e.g., available on a different device on a network, or over the air. For example, in a networked system, there may be many verification server devices 270 whose device memory 275 is located at a central server that may be a few feet away or located across an ocean. In an embodiment, memory 275 may be located at a single network site. In an embodiment, memory 275 may be located at multiple network sites, including sites that are distant from each other.

Referring again to FIG. 2B, in an embodiment, device memory 275 of verification server device 270 may have a result storage 275A, which may be configured to store the result data that includes the result, e.g., outcome, of the validation detection operation.

Referring again to FIG. 2B, verification server device 270 may include processor 272, as described above. Processor 272 is illustrated as being configured to execute computer readable instructions in order to execute one or more operations described above, and as illustrated in FIGS. 10, 11A-11B, 12A-12B, 13A-13D, and 14A-14B. In an embodiment, processor 272 is designed to be configured to operate as processing module 250, which may include one or more of encrypted image that is a captured image that was encrypted through use of a particular device code associated with an image capture device that captured the captured image that includes a representation of a feature of an entity obtaining module 252, encrypted image that was encrypted through use of the particular device code decrypting module 254, validation detection operation to detect a privacy beacon associated with the entity in the decrypted captured image performing module 256, and result data that includes an output of the performed validation detection operation to detect the privacy beacon in the captured image storing module 258.

Referring now to FIG. 2C, FIG. 2C shows a more detailed description of computing device 220. In an embodiment, computing device 220 may include a processor 222. Processor 222 may include one or more microprocessors, Central Processing Units ("CPU"), a Graphics Processing Units ("GPU"), Physics Processing Units, Digital Signal Processors, Network Processors, Floating Point Processors, and the like. In an embodiment, processor 222 may be a server. In an embodiment, processor 222 may be a distributed-core processor. Although processor 222 is as a single processor that is part of a single computing device 220, processor 222 may be multiple processors distributed over one or many computing devices 220, which may or may not be configured to operate together.

Processor 222 is illustrated as being configured to execute computer readable instructions in order to execute one or more operations described above, and as illustrated in FIGS. 19, 20A-20B, 21A-21B, 22, and 23. In an embodiment, processor 222 is designed to be configured to operate as processing module 260, which may include one or more of capture beacon emitting from a device configured to capture a particular image module 262, permission data that includes one or more permissions for capture of the particular image receiving module, wherein said receiving from at least one device in response to the emitted capture beacon 264, particular image capturing module configured to capture the particular image through use of a particular capture component 266, and captured particular image operation related to the captured particular image performing module 268.

Computing device 220 may be any electronic device, portable or not, that may be operated by or associated with one or more users. Computing device 220 is shown as interacting with a user 115. As set forth above, user 115 may be a person, or a group of people, or another entity that mimics the operations of a user. In an embodiment, user 115 may be a computer or a computer-controlled device. Computing device 220 may be, but is not limited to, a wearable computer. Computing device 220 may be any device that is equipped with an image capturing component, including, but not limited to, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 2C, computing device 220 may include a device memory 245. In an embodiment, device memory 245 may include memory, random access memory ("RAM"), read only memory ("ROM"), erasable programmable read-only memory ("EPROM"), electronically erasable programmable read-only memory ("EEPROM") cache memory such as random access memory (RAM), flash memory, synchronous random access memory (SRAM), dynamic random access memory (DRAM), flash memory, hard drives, disk-based media, disc-based media, magnetic storage, optical storage, volatile memory, nonvolatile memory, and any combination thereof. In an embodiment, device memory 245 may be separated from the device, e.g., available on a different device on a network, or over the air. For example, in a networked system, there may be many computing devices 220 whose device memory 245 is located at a central server that may be a few feet away or located across an ocean. In an embodiment, memory 245 may be located at a single network site. In an embodiment, memory 245 may be located at multiple network sites, including sites that are distant from each other.

FIGS. 3A-3E refer to an "image capture device," which is defined as any device that is equipped with the ability to capture images, and not necessarily a wearable computer or a device designed specifically to capture images.

Referring now to FIG. 3A, FIG. 3A shows an exemplary embodiment of a computing device 220 as image capture device 302. In an embodiment, image capture device 302 may include an image capture component, e.g., a lens 306A. Image capture component 306A may capture an image including the user 105 and the DCM beacon 110, and capture that image as raw (optical or digital) data 120. In an embodiment, image capture device 302 may include beacon detection module 310A that is configured to detect DCM beacon 110, either optically, digitally, or other, depending on the embodiment. After detection of the beacon, the image data may be sent to an image data encryption module 320A to encrypt the image. In an embodiment, if the beacon is not detected, the image data 120 is released past barrier 340A and the other image capture device modules 350A may operate on the image data 120. In an embodiment, the encrypted data, and data associated with the DCM beacon 110 (although not necessarily the beacon itself) may be transmitted to encrypted data and beacon transmitting module 330A, which may transmit the encrypted data and beacon data to an external source, e.g., server 3000 as described in FIG. 1. It is noted that beacon detection module 310A, image data encryption module 320A, and encrypted data and beacon transmitting module 330A may be separated from other image capture device modules 350A by barrier 340A.

In an embodiment, barrier 340A may be a physical barrier, e.g., beacon detection module 310A, lens 306A, image data encryption module 320A, and encrypted data and beacon transmitting module 330A may be hard-wired to each other and electrically excluded from other image capture device modules 350A. In another embodiment, barrier 340A may be implemented as a programmed barrier, e.g., the image data 120 is not transmitted to modules other than beacon detection module 310A, lens 306A, image data encryption module 320A, and encrypted data and beacon transmitting module 330A. In another embodiment, barrier 340A may be implemented as a data access barrier, e.g., the captured image data 120 may be protected, e.g., with an access or clearance level, so that only beacon detection module 310A, lens 306A, image data encryption module 320A, and encrypted data and beacon transmitting module 330A may read or operate on the image data 120. In another embodiment, barrier 340A may not be a complete barrier, e.g., barrier 340A may allow "read" access to the image data, but not "copy" or "write" access. In another embodiment, barrier 340A may be a barrier to transmission, e.g., the image may be viewed locally at the device, but may be barred from being saved to a removable memory, or uploaded to a cloud storage or social networking site/social media site.

Referring now to FIG. 3B, FIG. 3B shows an embodiment of a computing device 220 as image capture device 304. In an embodiment, image capture device 304 may include an image capture component, e.g., a lens and sensor 306B. Image capture component 306B may capture an image including the user 105 and the DCM beacon 110, and capture that image as raw (optical or digital) data 120. In an embodiment, image capture device 304 may include image path splitting module 305B that may receive the raw data 120 as a signal, e.g., optical or digital, and split the signal into two branches. As shown in FIG. 3B, one branch, e.g., the north branch, sends the raw signal to image data encryption module 320B, which may encrypt the image. In an embodiment, the other branch, e.g., the south branch, may send the signal to a beacon detection module 310B, which may detect the DCM beacon 110. In an embodiment, if the DCM beacon 110 is detected, then the unencrypted image data that arrived at beacon detection module 310B is destroyed. In an embodiment, if the DCM beacon 110 is not detected, then the encrypted image data from image data encryption module 320B is destroyed, and the unencrypted image data at beacon detection module 310B is allowed to pass to other image capture device modules 350B. In an embodiment, the beacon detection result and the encrypted image data are transmitted to the encrypted data and beacon transmitting module 330B. In an embodiment, barrier 340B may separate image path splitting module 305B, beacon detection module 310B, image data encryption module 320B, and encrypted data and beacon transmitting module 330B from other image capture device modules 350B.

In an embodiment, barrier 340B may be a physical barrier, e.g., beacon detection module 310B, lens 306B, image data encryption module 320B, and encrypted data and beacon transmitting module 330B may be hard-wired to each other and electrically excluded from other image capture device modules 350B. In another embodiment, barrier 340B may be implemented as a programmed barrier, e.g., the image data 120 is not transmitted to modules other than image path splitting module 305B, beacon detection 310B, lens 306B, image data encryption module 320B, and encrypted data and beacon transmitting module 330B. In another embodiment, barrier 340B may be implemented as a data access barrier, e.g., the captured image data may be protected, e.g., with an access or clearance level, so that only beacon detection module 310B, lens 306B, image data encryption module 320B, and encrypted data and beacon transmitting module 330B may read or operate on the image data 120. In another embodiment, barrier 340B may not be a complete barrier, e.g., barrier 340B may allow "read" access to the image data, but not "copy" or "write" access. In another embodiment, barrier 340B may be a barrier to transmission, e.g., the image may be viewed locally at the device, but may be barred from being saved to a removable memory, or uploaded to a cloud storage or social networking site/social media site.

Referring now to FIG. 3C, FIG. 3C shows an embodiment of a computing device 220 implemented as image capture device 306. In an embodiment, image capture device 306 may include an image capture component 306C that captures optical data 120A. In an embodiment, optical data 120A may be sent to optical splitting module 305C, which may split the optical signal, e.g., the light, into two paths. Referring to FIG. 3C, the "south" path may transmit the light to an optical filter 312, which may filter the light for a specific characteristic, e.g., a wavelength or an object, according to known optical filtration techniques. In an embodiment, the filtered optical signal may then be transmitted to a filtered optical signal beacon detection module 310C, which may detect the beacon 110 in the optical data 120A.

Referring again to FIG. 3C, the "north" path from optical splitting module 305C may transmit the optical image data to an optical-to-digital converter 314, e.g., a CMOS or CCD sensor. In an embodiment, the digital signal then may be transmitted to image data encryption module 320C, and the encrypted data transmitted to encrypted data and beacon transmitting module 330C, along with the beacon detection result, for transmission to an external source, e.g., server 3000 as shown in FIG. 1. In an embodiment, barrier 340C may prevent access to the unencrypted image data by other image capture device modules 350C. In an embodiment, barrier 340C may function similarly to barriers 340A and 340B, and the descriptions of those barriers and their possible implementations also may apply to barrier 340C. In an embodiment, image data encryption module 320C, encrypted data beacon and transmitting module 330C, and optical-to-digital converter 314 may be controlled by beacon detection control module 325, which may be part of the processor of image capture device 306, or may be a separate processor. In an embodiment, beacon detection control module 325 may form part or all of processor 222 of computing device 220 of FIG. 2G.

Referring now to FIG. 3D, FIG. 3D shows an exemplary implementation of a computing device 220 implemented as image capture device 308, according to an embodiment. Image capture device 308 may include an optical image collector 306D that may capture an image including the user 105 and the DCM beacon 110, and capture that image as optical data 120A. Optical data 120A may then be sent to optical splitting module 305D, which may split the optical signal, e.g., the light, into two paths. Referring to FIG. 3D, the "south" path may transmit the light to an optical transformation module 332, which may apply a transformation, e.g., a Fourier transformation, to the optical image data. The transformed optical data from module 332, as well as a reference image from optical beacon reference signal providing module 334 may be transmitted to optical beacon detection module 310D. Optical beacon detection module 310D may optically detect the beacon using Fourier transformation and an optical correlator. The basic operation of performing optical image object detection is described in the publically-available (at the University of Michigan Online Library) paper "Report of Project MICHIGAN, SIGNAL DETECTION BY COMPLEX SPATIAL FILTERING," by A. B. Vander Lugt, printed in July 1963 at the Radar Laboratory at the Institute of Science and Technology, the University of Michigan, which is hereby incorporated by reference in its entirety. Applicant's representative is including a copy of this paper with the filing of this application, for the convenience of the Examiner.

Referring again to FIG. 3D, the "north" path from optical splitting module 305D may transmit the optical image data to an optical-to-digital converter 324, e.g., a CMOS or CCD sensor. In an embodiment, the digital signal then may be transmitted to image data encryption module 320D, and the encrypted data transmitted to encrypted data and beacon transmitting module 330D, along with the beacon detection result, for transmission to an external source, e.g., server 3000 as shown in FIG. 1. In an embodiment, barrier 340D may prevent access to the unencrypted image data by other image capture device modules 350D. In an embodiment, barrier 340D may function similarly to barriers 340A and 340B, and the descriptions of those barriers and their possible implementations also may apply to barrier 340D. In an embodiment, image data encryption module 320D, encrypted data and beacon transmitting module 330D, and optical-to-digital converter 324 may be controlled by beacon detection control module 335, which may be part of the processor of image capture device 308, or may be a separate processor. In an embodiment, beacon detection control module 335 may form part or all of processor 222 of computing device 220 of FIG. 2G.

Referring now to FIG. 3E, FIG. 3E shows an exemplary embodiment of an implementation of computing device 220 as image capture device 309. In an embodiment, image capture device 309 may include an optical image collector 306E, e.g., a lens, which may collect the optical data 120A. Optical data 120A may be emitted to an optical beacon detection module 310E, which may detect the DCM beacon 110 using one of the above-described optical detection methods. After detection of the beacon using optical techniques, the optical signal may be captured by an optical-to-digital conversion module 344, and converted to digital image data, which is transferred to image data encryption module 320E for encryption. In an embodiment, modules 306E, 310E, 344, and 320E, are hard-wired to each other, and separated from encrypted data and beacon transmitting module 330E and other image capture device modules 350E by barrier 340E (which, in this embodiment, is shown for exemplary purposes only, because the physical construction of modules 306E, 310E, 344, and 320E removes the need for a barrier 340E, whether implemented as hardware, programming, security, or access. In this embodiment, the image data is encrypted prior to interaction with the "main" portions of image capture device 309, and after the beacon data has been optically detected.

FIGS. 4A-4E show one or more embodiments of a server device 230, according to one or more embodiments. Unless otherwise stated or contradictory to FIGS. 4A-4E, the server devices 430A, 430B, 430C, 430D, and 430E may include the elements of server device 230, as previously described. Similarly, unless otherwise stated or contradictory to FIGS. 4A-4E, the computing devices 420A, 420B, 420C, 420D, and 420E may include the elements of computing device 230, as previously described.

Referring now to FIG. 4A, FIG. 4A shows an exemplary implementation of server device 230 as server device 430A operating in exemplary environment 400A. In an embodiment, computing device 420A further includes a location and time log and transmission module 422. In an embodiment, location and time log and transmission module 422 may record a location, e.g., through global positioning sensors, triangulation using radio signals, or other methods, of the computing device 420A, and a time that the image is captured, at the time the image is captured. This data of location and time of the image capture, e.g., location and time of detection data 162, may be transmitted to server device 430A, as shown in FIG. 4A.

Referring again to FIG. 4A, server device 430A may include a beacon metadata acquisition module 433. Beacon metadata acquisition module 433 may include location and time of beacon detection data acquisition module 433A. Location and time of beacon detection data acquisition module 433A may receive the location and time of detection data 162. In an embodiment in which the beacon metadata 150 is binary beacon metadata 150A, additional data regarding the image may be obtained. For example, server device 430A may transmit the location and time of detection data 162 to a remote location, e.g., to beacon support server 490. Beacon support server may include, for example, a geotagged and timestamped list of detected beacons 436, which may track a location and time when a beacon is detected. Beacon support server 490 may be associated with DCM beacon 110, and may be configured to log each time DCM beacon 110 is detected, e.g., in an embodiment in which DCM beacon 110 is an active beacon that can determine when it is detected. In an embodiment, beacon support server 490 may use the location and time of detection data 162 to determine which DCM beacon 110 is detected, and transmit the beacon identification information back to server device 430A, e.g., to beacon identification data acquisition module 433B. In an embodiment, this beacon identification information may be used by server device 430A. In an embodiment, the beacon identification information may be used to identify the entity in the image, without decrypting the image, for example.

Referring now to FIG. 4B, FIG. 4B shows an exemplary implementation of server device 230 as server device 430B operating in exemplary environment 400B. In an embodiment, the computing device 420B may generate beacon metadata 150, which may be binary beacon metadata 150A, and transmit the binary beacon metadata 150A to server device 430B. In an embodiment, server device 430B receives the binary beacon metadata 150A, e.g., through use of beacon metadata acquisition module 443, which may describe whether a beacon was detected in the encrypted image data block 160, but which may, in an embodiment, not provide additional data regarding the beacon. In an embodiment, server device 430B may include encrypted image analysis and data extraction module 442, which may perform analysis on the encrypted image 24, if possible. Such analysis may include, for example, that the encrypted image data block 160 may have metadata that is not encrypted or that may be read through the encryption. In an embodiment, for example, the image 22 may be encrypted in such a manner that certain characteristics of the encrypted image 24 may be obtained without decrypting the image. In an embodiment, server device 430B may use encrypted image analysis and data extraction module 442 to determine more information about the image, e.g., which may be used to perform valuation of the image and/or to retrieve term data regarding one or more terms of service associated with the DCM beacon 110 and the entity Jules Caesar 105.

Referring now to FIG. 4C, FIG. 4C shows an exemplary implementation of server device 230 as server device 430C operating in exemplary environment 400C. In an embodiment, computing device 420C may transmit the beacon metadata 150, which may be binary beacon metadata 150A, to server device 430C. Beacon metadata 150 may be obtained by beacon metadata acquisition module 456. In an embodiment, beacon metadata acquisition module 456 may relay data regarding the received metadata to a decision-making portion of server device 430C, e.g., a central processor. In an embodiment, server device 430C may determine that it wants more data regarding the image 22, in order to retrieve term data, or perform a valuation of the image data. Accordingly, in an embodiment, server device 430C may include encrypted image analysis and data extraction module 436, which may operate similarly to encrypted image analysis and data extraction module 442, and also, in an embodiment, encrypted image analysis and data extraction module 436 may transmit the encrypted image data block to a "sandbox," e.g., image decryption sandbox 492. Image decryption sandbox 492 may place the image in a virtual or physical "sandbox" where other processes may be unable to access the data. Image decryption sandbox 492 may be part of server device 430C, or may be a separate entity. In an embodiment, image decryption sandbox 492 may decrypt the encrypted image. Encrypted image decryption and beacon identification module 493 may perform analysis on the decrypted image, including identifying the beacon, or identifying the entity, or a combination thereof. The identification data then may be given to beacon identification data reception module 438. In an embodiment, the decrypted image data is then trapped in the sandbox and/or destroyed.

Referring now to FIG. 4D, FIG. 4D shows an exemplary implementation of server device 230 as server device 430D operating in exemplary environment 400D. In an embodiment, computing device 420D may transmit beacon metadata 150, e.g., beacon identifier metadata 150B, to server device 430D. In an embodiment, beacon identifier metadata 150B may identify the beacon, e.g., the DCM beacon 110. The identification may be a unique identification, e.g. "this beacon is associated with user #13606116, Jules Caesar," or, in an embodiment, the identification may be a class of beacon, e.g., "this is a beacon with a $100,000 dollar liquidated damages clause associated with using a likeness of the entity associated with the beacon," or "this is a beacon of a television celebrity," or "this is a beacon provided by Image Protect Corporation."

Referring again to FIG. 4D, server device 430D receives the beacon identifier metadata 150B, e.g., through use of beacon metadata acquisition module 447. In an embodiment, server device 430D may transmit the identifier to an external location, e.g., a terms of service transmission server 485. Terms of service transmission server 485 may store terms of service associated with various beacons in its terms of service repository 489. In an embodiment, each unique beacon may be associated with its own unique terms of service. In another embodiment, there may be common terms of service for various users. In another embodiment, there may be common terms of service for various classes of users. In an embodiment, the terms of service may vary depending on how much the entity, e.g., Jules Caesar, is paying to use the beacon service.

In an embodiment, terms of service transmission server 485 may include beacon identifier lookup table 487. Beacon identifier lookup table 487 may receive the beacon identifier metadata 150B, and use the beacon identifier metadata 150B to obtain the terms of service associated with that beacon, e.g., terms of service data 151. In an embodiment, terms of service data 151 then may be transmitted to server device 430D.

Referring now to FIG. 4E, FIG. 4E shows an exemplary implementation of server device 230 as server device 430E operating in exemplary environment 400E. In an embodiment, computing device 420E may detect the DCM beacon 110, and may obtain the terms of service from the detected beacon (e.g., the terms of service may be read from the beacon, e.g., in compressed binary). In an embodiment, the computing device 420E may use the detected beacon data to obtain the terms of service data from another location, e.g., a terms of service data server (not pictured).

Referring again to FIG. 4E, in an embodiment, computing device 420E may transmit beacon metadata 150, e.g., beacon identifier and terms of service metadata 150C, to server device 430E. Beacon metadata acquisition module 444 may receive the beacon identifier and terms of service metadata 150C, and detect that the terms of service are present in the beacon metadata 150. In an embodiment, beacon metadata terms of service reading module 454 may read the terms of service from the beacon metadata 150.

The foregoing examples are merely provided as examples of how beacon data may operate, and how identifying data and/or term of service data may be obtained by the various server devices, and should not be interpreted as limiting the scope of the invention, which is defined solely by the claims. Any and all components of FIGS. 4A-4E may be combined with each other, modified, or eliminated.

FIGS. 5A-5D show one or more embodiments of a computing device 230, among other components, operating in an environment 500 (e.g., 500A-500D), according to one or more embodiments. Unless otherwise stated or contradictory to FIGS. 5A-5D, the server devices 530A, 530B, 530C, and 530D may include the elements of server device 230, as previously described. Similarly, unless otherwise stated or contradictory to FIGS. 5A-5D, the computing devices 520A, 520B, 520C, and 520D may include the elements of computing device 220, as previously described.

Referring now to FIG. 5A, FIG. 5A shows an exemplary implementation of server device 230 as server device 530A operating in exemplary environment 500A. In an embodiment, as shown in FIG. 5A, computing device 520A may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530A by encrypted image data transmitting module 180. In an embodiment, a decryption determination module 532A may determine to decrypt the image, e.g., in a process described in one or more of this and/or previous applications incorporated by reference. In an embodiment, server device 530A may include decryption module 534A, which may apply a device-based decryption key to the encrypted image 24 to generate decrypted image data. In an embodiment, client-based encryption module 536A may apply a client-based encryption key to the decrypted image data, to generate a client-based encrypted image. In an embodiment, the client-based encrypted image then may be transmitted back to the computing device 520A, which may be a wearable computer, e.g., to client-based encrypted data receiving module 190. In an embodiment, upon receipt of the client-based encrypted image the client-based encrypted image decryption module 195 may decrypt the client-based encrypted image.

In an embodiment, one or more of the originally-captured image 22, the decrypted image data in the decryption module 534A of server device 530A, and the decrypted image data in the client-based encryption module 536A may be identical. In another embodiment, the substantive portion of the data (e.g., the color data) may be identical, and other data, e.g., header data or compression data, may be different. In another embodiment, the decrypted image data in the decryption module 534A of server device 530A, and the decrypted image data in the client-based encryption module 536A may be slightly different.

Referring now to FIG. 5B, FIG. 5B shows an exemplary implementation of server device 230 as server device 530B operating in exemplary environment 500B. In an embodiment, as shown in FIG. 5B, computing device 520B may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530B by encrypted image data transmitting module 180. In an embodiment, a decryption determination module 532B may determine to decrypt the image, e.g., in a process described in one or more of this and/or previous applications incorporated by reference. In an embodiment, server device 530B may include decryption module 534B, which may apply a device-based decryption key to the encrypted image 24 to generate decrypted image data. In an embodiment, client-based encryption module 536B may apply a client-based encryption key to the decrypted image data, to generate a client-based encrypted image.

Referring again to FIG. 5B, in an embodiment, the client-based encrypted image then may be transmitted to a device that is not the computing device 520B, e.g., rather to other client-associated computer device 550. Other client-associated computer device 550 may include client-based encrypted data receiving module 191 and/or client-based encrypted image decryption module 194 which may decrypt the client-based encrypted image, similarly to modules 190 and 195 of FIG. 5A, but not part of computing device 520B. In an embodiment, computer device 550 may also be worn or carried by the client, e.g., a smartphone carried by the client that was wearing the wearable computer 520B. In an embodiment, computer device 550 may be remote from the client, e.g., the client's home computer. In another embodiment, computer device 550 may be a shared server, e.g., where the client stores images on the cloud. In an embodiment similar to the one described above, the computing device 520B may not possess the decrypted image at any point during the process.

Referring again to FIG. 5B, similarly to FIG. 5A, in an embodiment, one or more of the originally-captured image 22, the decrypted image data in the decryption module 534B of server device 530B, and the decrypted image data in the client-based encryption module 536B may be identical. In another embodiment, the substantive portion of the data (e.g., the color data) may be identical, and other data, e.g., header data or compression data, may be different. In another embodiment, the decrypted image data in the decryption module 534B of server device 530B, and the decrypted image data in the client-based encryption module 536B may be slightly different.

Referring now to FIG. 5C, FIG. 5C shows an exemplary implementation of server device 230 as server device 530C operating in exemplary environment 500C. In an embodiment, as shown in FIG. 5A, computing device 520C may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530C by encrypted image data transmitting module 180. In an embodiment, a decryption determination module 532C may determine to decrypt the image, e.g., in a process described in one or more of this and/or previous applications incorporated by reference.

Referring again to FIG. 5C, in an embodiment, one or more of the decision to decrypt the encrypted image 24, and the encrypted image 24 may be transmitted to a client-based encryption handling device 560. In an embodiment, client-based encryption handling device 560 may include decryption module 562, which may apply a device-based decryption key to the encrypted image 24 to generate decrypted image data. In an embodiment, client-based encryption module 564 may apply a client-based encryption key to the decrypted image data, to generate a client-based encrypted image. In an embodiment, the client-based encrypted image, then may be transmitted back to the computing device 520A, which may be a wearable computer, e.g., to client-based encrypted data receiving module 190. In an embodiment, upon receipt of the client-based encrypted image the client-based encrypted image decryption module 195 may decrypt the client-based encrypted image.

Referring again to FIG. 5C, similarly to FIG. 5A, in an embodiment, one or more of the originally-captured image 22, the decrypted image data in the decryption module 562 of client-based encryption handling device 560, and the decrypted image data in the client-based encryption module 564 may be identical. In another embodiment, the substantive portion of the data (e.g., the color data) may be identical, and other data, e.g., header data or compression data, may be different. In another embodiment, the decrypted image data in the decryption module 562 of client-based encryption handling device 560, and the decrypted image data in the client-based encryption module 564 may be slightly different.

Referring now to FIG. 5D, FIG. 5D shows an exemplary implementation of server device 230 as server device 530D operating in exemplary environment 500D. In an embodiment, as shown in FIG. 5D, computing device 520D may capture an image that includes an entity 105 that may be associated with a privacy beacon, e.g., DCM beacon 110. In an embodiment, the captured image, e.g., image 22, may be encrypted into encrypted image 24 using a device-based encryption key. In an embodiment, encrypted image 24 may be combined with beacon metadata, e.g., beacon metadata 150, in an encrypted image data block 160. In another embodiment, beacon metadata 150 may be separate from encrypted image data block 160. In an embodiment, the encrypted image 24 may be transmitted to a server device 530D by encrypted image data transmitting module 180. In an embodiment, a decryption determination module 532D may determine to decrypt the image, e.g., in a process described in one or more of this and/or previous applications incorporated by reference. In an embodiment, server device 530D may include decryption module 534D, which may apply a device-based decryption key to the encrypted image 24 to generate decrypted image data. In an embodiment, client-based encryption module 536D may apply a client-based encryption key to the decrypted image data, to generate a client-based encrypted image.

Referring again to FIG. 5D, in an embodiment, the client-based encrypted image then may be transmitted to a device that is not the computing device 520D, e.g., rather to a social networking server 570 or file repository 570. In an embodiment, social networking server 570 may include client-based encrypted data receiving module 192, similarly to client-based encrypted data receiving module 190 of FIG. 5A. In an embodiment, social networking server 570 may include the client-based encrypted image decryption module 197, which may be similar to the client-based encrypted image decryption module 195 of FIG. 5A, and which may decrypt the client-based encrypted image. In an embodiment, social networking server may automatically decrypt the image, and/or take one or more actions, e.g., posting the image to a user's account, e.g., their "wall" on Facebook, or a similar structure. In another embodiment, the social networking server 570 may wait to decrypt the image, and/or to take one or more actions with the image, until the client that captured the image logs into the social networking service associated with the social networking server.

Referring again to FIG. 5D, similarly to FIG. 5A, in an embodiment, one or more of the originally-captured image 22, the decrypted image data in the decryption module 534D of server device 530D, and the decrypted image data in the client-based encryption module 536D may be identical. In another embodiment, the substantive portion of the data (e.g., the color data) may be identical, and other data, e.g., header data or compression data, may be different. In another embodiment, the decrypted image data in the decryption module 534D of server device 530D, and the decrypted image data in the client-based encryption module 536D may be slightly different.

Referring now to FIG. 6, FIG. 6 illustrates an exemplary implementation of the encrypted image that is a captured image that was encrypted through use of a particular device code associated with an image capture device that captured the captured image that includes a representation of a feature of an entity obtaining module 252. As illustrated in FIG. 6, the encrypted image that is a captured image that was encrypted through use of a particular device code associated with an image capture device that captured the captured image that includes a representation of a feature of an entity obtaining module may include one or more sub-logic modules in various alternative implementations and embodiments. For example, as shown in FIG. 6, e.g., FIG. 6A, in an embodiment, module 252 may include one or more of encrypted image that is a captured image that was encrypted through use of a particular unique device code associated with an image capture device that captured the captured image that includes a representation of a feature of an entity obtaining module 602, encrypted image that is a captured image that was encrypted through use of a user-defined device code associated with an image capture device that captured the captured image that includes a representation of a feature of an entity obtaining module 604, encrypted image that is a captured image that was encrypted through use of a manufacturer-defined device code associated with an image capture device that captured the captured image that includes a representation of a feature of an entity obtaining module 606, and encrypted image that is a captured image that was encrypted through use of a particular device code associated with an image capture device that captured the captured image that includes a representation of a feature of an entity obtaining after detection of a privacy beacon by the image capture device module 608.

Referring again to FIG. 6, e.g., FIG. 6B, in an embodiment, module 252 may include one or more of encrypted image that is a captured image that was encrypted through use of a particular device code associated with an image capture device that captured the captured image that includes a representation of a feature of an entity obtaining from the image capture device module 610 and encrypted image that is a captured image that was encrypted through use of a particular device code associated with an image capture device that captured the captured image that includes a pixel representation of a face of a celebrity obtaining module 614. In an embodiment, module 610 may include encrypted image that is a captured image that was encrypted through use of a particular device code associated with an image capture device that captured the captured image that includes a representation of a feature of an entity obtaining from the image capture device in response to image capture device detection of a privacy beacon module 612.

Referring now to FIG. 7, FIG. 7 illustrates an exemplary implementation of encrypted image that was encrypted through use of the particular device code decrypting module 254. As illustrated in FIG. 7, the encrypted image that was encrypted through use of the particular device code decrypting module 254 may include one or more sub-logic modules in various alternative implementations and embodiments. For example, as shown in FIG. 7, e.g., FIG. 7A, in an embodiment, module 254 may include encrypted image that was encrypted through use of the particular device code decrypting that is facilitated by a decryption code that is facilitated by a decryption code that is facilitated by a decryption code module 702. In an embodiment, module 702 may include one or more of decryption code acquisition module 704 and acquired decryption code applying to the acquired image for decryption module 706. In an embodiment, module 704 may include decryption code receiving from the image capture device that captured the captured image module 708.

Referring again to FIG. 7, e.g., FIG. 7B, in an embodiment, module 254 may include one or more of encrypted image that is stored in a limited-access memory and that was encrypted through use of the particular device code decrypting module 710 and encrypted image that was encrypted through use of the particular device code that is unique to the image capture device decrypting module 712.

Referring now to FIG. 8, FIG. 8 illustrates an exemplary implementation of validation detection operation to detect a privacy beacon associated with the entity in the decrypted captured image performing module 256. As illustrated in FIG. 8, the validation detection operation to detect a privacy beacon associated with the entity in the decrypted captured image performing module 256 may include one or more sub-logic modules in various alternative implementations and embodiments. For example, as shown in FIG. 8, e.g., FIG. 8A, in an embodiment, module 256 may include one or more of validation detection operation that is similar to a device detection operation to detect the privacy beacon, said validation detection operation is to detect a privacy beacon associated with the entity in the decrypted captured image performing module 802. In an embodiment, module 802 may include validation detection operation that is a same operation as the device detection operation to detect the privacy beacon, said validation detection operation is to detect a privacy beacon associated with the entity in the decrypted captured image performing module 804.

Referring again to FIG. 8, e.g., FIG. 8B, in an embodiment, module 256 may include one or more of result of a device detection operation that was previously performed on the captured image to detect the privacy beacon receiving module 806, validation detection operation to detect a privacy beacon associated with the entity in the decrypted captured image executing module 808, and received result of the device detection operation comparing to a performed result of the validation detection operation module 810. In an embodiment, module 806 may include one or more of result of a device detection operation that was previously performed by the captured image to detect the privacy beacon receiving module 812, result of a device detection operation that was previously performed on the captured image to detect the privacy beacon receiving when the device detection operation detects the privacy beacon module 816, and result of an optical device detection operation that was previously performed on the captured image to detect the privacy beacon receiving when the optical device detection operation detects the privacy beacon module 818. In an embodiment, module 812 may include result of a device detection operation that was previously performed by the captured image at a time the captured image was captured to detect the privacy beacon receiving module 814. In an embodiment, module 808 may include one or more of validation detection operation that is the same as the device detection operation to detect a privacy beacon associated with the entity in the decrypted captured image executing module 820, particular validation detection operation that is different than the device detection operation selecting module 822, and selected particular validation detection operation to detect the privacy beacon associated with the entity in the decrypted image executing module 824.

Referring again to FIG. 8, e.g., FIG. 8C, in an embodiment, module 256 may include validation detection operation to detect a privacy beacon that is configured to facilitate retrieval of a terms of service that govern usage of personality rights captured in the captured image and associated with the entity in the decrypted captured image performing module 826. In an embodiment, module 826 may include validation detection operation to detect a privacy beacon that is configured to facilitate retrieval, from a remote location, of a terms of service that govern usage of personality rights captured in the captured image and associated with the entity in the decrypted captured image performing module 828.

Referring now to FIG. 9, FIG. 9 illustrates an exemplary implementation of result data that includes an output of the performed validation detection operation to detect the privacy beacon in the captured image storing module 258. As illustrated in FIG. 9, the result data that includes an output of the performed validation detection operation to detect the privacy beacon in the captured image storing module 258 may include one or more sub-logic modules in various alternative implementations and embodiments. For example, as shown in FIG. 9, e.g., FIG. 9A, in an embodiment, module 258 may include one or more of result data that includes an output of the performed validation detection operation to detect the privacy beacon in the captured image, wherein the output matches an output of a previously performed device detection operation to detect the privacy beacon storing module 902 and result data that includes an output of the performed validation detection operation to detect the privacy beacon in the captured image and that includes privacy beacon data associated with the privacy beacon storing module 904.

Referring again to FIG. 9, e.g., FIG. 9B, in an embodiment, module 258 may include result data that includes an output of the performed validation detection operation to detect the privacy beacon in the captured image, wherein the output of the performed validation detection operation does not match an output of a previously performed device detection operation on the captured image to detect the privacy beacon storing module 906. In an embodiment, module 906 may include one or more of result data that includes an output of the performed validation detection operation to detect the privacy beacon in the captured image, wherein the output of the performed validation detection operation is a detection of a different privacy beacon than the output of the previously performed device detection operation on the captured image to detect the privacy beacon storing module 908, result data that includes an output of the performed validation detection operation to detect the privacy beacon in the captured image, wherein the output of the performed validation detection operation indicates detection of the privacy beacon and the output of the previously performed device detection operation on the captured image indicates failure to detect the privacy beacon storing module 910, and result data that includes an output of the performed validation detection operation to detect the privacy beacon in the captured image, wherein the output of the performed validation detection operation indicates failure to detect the privacy beacon and the output of the previously performed device detection operation on the captured image indicates detection of the privacy beacon storing module 912.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 10 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIGS. 10-14 as well as the other operations to be described herein may be performed by at least one of a machine, an article of manufacture, or a composition of matter.

Referring now to FIG. 10, FIG. 10 shows operation 1000, e.g., an example operation of verification server device 230 operating in an environment 200. In an embodiment, operation 1000 may include operation 1002 depicting acquiring an encrypted image that is a captured image that has been encrypted through use of a particular device code associated with an image capture device that captured the captured image, wherein the captured image includes a representation of a feature of an entity. For example, FIG. 2, e.g., FIG. 2B, shows encrypted image that is a captured image that was encrypted through use of a particular device code associated with an image capture device that captured the captured image that includes a representation of a feature of an entity obtaining module 252 acquiring (e.g., obtaining, receiving, calculating, selecting from a list or other data structure, receiving, retrieving, or receiving information regarding, performing calculations to find out, retrieving data that indicates, receiving notification, receiving information that leads to an inference, whether by human or automated process, or being party to any action or transaction that results in informing, inferring, or deducting, including but not limited to circumstances without absolute certainty, including more-likely-than-not and/or other thresholds) an encrypted (e.g., one or more operations have been performed with the intention of preventing, delaying, or hindering unauthorized access) image (e.g., a description of a graphic picture that is a visual representation of something, regardless of whether that something is coherent, nonsensical, abstract, or otherwise), that is a captured (e.g., is a representation of something real, e.g., not an abstraction imagined by an artist) image (e.g., a description of a graphic picture that is a visual representation of something, regardless of whether that something is coherent, nonsensical, abstract, or otherwise) that has been encrypted through use of (e.g., was facilitated, at least in part, in the derivation of or carrying out of) a particular device code (e.g., any set of data that is associated with the device) associated with an image capture device (e.g., a device that has the hardware and/or software to facilitate the capture of images) that captured the captured image (e.g., a description of a graphic picture that is a visual representation of something, regardless of whether that something is coherent, nonsensical, abstract, or otherwise), wherein the captured image (e.g., a description of a graphic picture that is a visual representation of something, regardless of whether that something is coherent, nonsensical, abstract, or otherwise) includes a representation (e.g., a form of, e.g., pixels, vector maps, instructions for recreating, a set of brightness and color values, and the like) of a feature (e.g., a body, a part of a body, a thing carried by a body, a thing worn by a body, a thing possessed by a body, where the body is not necessarily human, living, or animate) of an entity (e.g., a thing, e.g., a person, a rock, a deer, anything that has separate and distinct existence and objective or conceptual reality).

Referring again to FIG. 10, operation 1000 may include operation 1004 depicting decrypting the acquired encrypted image that was encrypted through use of the particular device code. For example, FIG. 2, e.g., FIG. 2B, shows encrypted image that was encrypted through use of the particular device code decrypting module 254 decrypting (e.g., removing the encryption from, reversing the encryption, or generally modifying into an intelligible form) the acquired encrypted (e.g., one or more operations have been performed with the intention of preventing, delaying, or hindering unauthorized access) image (e.g., a description of a graphic picture that is a visual representation of something, regardless of whether that something is coherent, nonsensical, abstract, or otherwise) that was encrypted through use of (e.g., was facilitated, at least in part, in the derivation of or carrying out of) the particular device code (e.g., any set of data that is associated with the device).

Referring again to FIG. 10, operation 1000 may include operation 1006 depicting performing a validation detection operation to detect a privacy beacon associated with the entity in the decrypted captured image. For example, FIG. 2, e.g., FIG. 2B, shows validation detection operation to detect a privacy beacon associated with the entity in the decrypted captured image performing module 256 performing (e.g., executing, carrying out, facilitating the performance of, taking one or more steps in the furtherance of, etc.) a validation detection operation (e.g., an operation to determine if the privacy beacon is present, e.g., to "validate" the decision made by the device) to detect a privacy beacon (e.g., a marker detectable by some sensor or other action, which may be passive, active, visible or invisible, may operate on the electromagnetic spectrum or in another field, a partial list of which is included below) associated with (e.g., related to, contains data about, stores data about, relates to, etc.) the entity (e.g., a thing, e.g., a person, a rock, a deer, anything that has separate and distinct existence and objective or conceptual reality) in the decrypted captured image (e.g., a description of a graphic picture that is a visual representation of something, regardless of whether that something is coherent, nonsensical, abstract, or otherwise).

Referring again to FIG. 10, operation 1000 may include operation 1008 depicting storing outcome data that includes at least a result of the performed validation detection operation to detect the privacy beacon in the captured image. For example, FIG. 2, e.g., FIG. 2B, shows result data that includes an output of the performed validation detection operation to detect the privacy beacon in the captured image storing module 258 storing (e.g., saving, retaining, transferring to a memory, transferring to another location, copying, moving, etc.) outcome data that includes at least a result of the performed validation detection operation (e.g., an operation to determine if the privacy beacon is present, e.g., to "validate" the decision made by the device) to detect the privacy beacon (e.g., a marker detectable by some sensor or other action, which may be passive, active, visible or invisible, may operate on the electromagnetic spectrum or in another field, a partial list of which is included below) in the captured image (e.g., a description of a graphic picture that is a visual representation of something, regardless of whether that something is coherent, nonsensical, abstract, or otherwise).

An example terms of service is listed below with the numbered paragraphs 1-5. Many other variations of terms of service are known and used in click-through agreements that are common at the time of filing, and the herein example is intended to be exemplary only and not limiting in any way.

1. By capturing an image of any part of the user Jules Caesar (hereinafter "Image"), or providing any automation, design, resource, assistance, or other facilitation in the capturing of the Image, you agree that you have captured these Terms of Service and that you acknowledge and agree to them. If you cannot agree to these Terms of Service, you should immediately delete the captured Image. Failure to do so will constitute acceptance of these Terms of Service.

2. The User Jules Caesar owns all of the rights associated with the Image and any representation of any part of Jules Caesar thereof;

3. By capturing the Image, you agree to provide the User Jules Caesar just compensation for any commercialization of the User's personality rights that may be captured in the Image.

4. By capturing the Image, you agree to take all reasonable actions to track the Image and to provide an accounting of all commercialization attempts related to the Image, whether successful or not.

5. By capturing the Image, you accept a Liquidated Damages agreement in which unauthorized use of the Image will result in mandatory damages of at least, but not limited to, $1,000,000.

A privacy beacon may include, but is not limited to, one or more of a marker that reflects light in a visible spectrum, a marker that reflects light in a nonvisible spectrum, a marker that emits light in a visible spectrum, a marker that emits light in a nonvisible spectrum, a marker that emits a radio wave, a marker that, when a particular type of electromagnetic wave hits it, emits a particular electromagnetic wave, an RFID tag, a marker that uses near-field communication, a marker that is in the form of a bar code, a marker that is in the form of a bar code and painted on a user's head and that reflects light in a nonvisible spectrum, a marker that uses high frequency low penetration radio waves (e.g., 60 GHz radio waves), a marker that emits a particular thermal signature, a marker that is worn underneath clothing and is detectable by an x-ray-type detector, a marker that creates a magnetic field, a marker that emits a sonic wave, a marker that emits a sonic wave at a frequency that cannot be heard by humans, a marker that is tattooed to a person's bicep and is detectable through clothing, a marker that is a part of a user's cellular telephone device, a marker that is broadcast by a part of a user's cellular telephone device, a marker that is broadcast by a keychain carried by a person, a marker mounted on a drone that maintains a particular proximity to the person, a marker mounted in eyeglasses, a marker mounted in a hat. a marker mounted in an article of clothing, the shape of the person's face is registered as the beacon, a feature of a person registered as the beacon, a marker displayed on a screen, a marker in the form of an LED, a marker embedded on a page, or a book, a string of text or data that serves as a marker, a marker embedded or embossed onto a device, and the like.

FIGS. 11A-11C depict various implementations of operation 1002, depicting acquiring an encrypted image that is a captured image that has been encrypted through use of a particular device code associated with an image capture device that captured the captured image, wherein the captured image includes a representation of a feature of an entity according to embodiments. Referring now to FIG. 11A, operation 1002 may include operation 1102 depicting acquiring the encrypted image that has been encrypted through use of the particular device code that is unique to the image capture device that captured the image, wherein the captured image includes the representation of the feature of the entity. For example, FIG. 6, e.g., FIG. 6A shows encrypted image that is a captured image that was encrypted through use of a particular unique device code associated with an image capture device that captured the captured image that includes a representation of a feature of an entity obtaining module 602 acquiring the encrypted image (e.g., an image of two people at a table) that has been encrypted through use of the particular device code (e.g., a code assigned to the device at the time the device was manufactured, or sold, or the first time a particular user entered login data into the device) that is unique to the image capture device (e.g., a wearable computer, e.g., a Nokia Smart-Glasses) that captured the image (e.g., the image of two people at a table), wherein the captured image includes the representation of the feature of the entity.

Referring again to FIG. 11A, operation 1002 may include operation 1104 depicting acquiring the encrypted image that has been encrypted through use of the particular device code that is inputted by an entity that operated the image capture device that captured the image, wherein the captured image includes the representation of the feature of the entity. For example, FIG. 6, e.g., FIG. 6A, shows encrypted image that is a captured image that was encrypted through use of a user-defined device code associated with an image capture device that captured the captured image that includes a representation of a feature of an entity obtaining module 604 acquiring the encrypted image (e.g., an image of two people on a date at a restaurant) that has been encrypted through use of the particular device code that is inputted by an entity (e.g., the person that instructed the image to be captured) that operated the image capture device that captured the image, wherein the captured image (e.g., the image of two people on a date at a restaurant) includes the representation of the feature of the entity (e.g., a face of one of the people).

Referring again to FIG. 11A, operation 1002 may include operation 1106 depicting acquiring the encrypted image that is the captured image that has been encrypted through use of the particular device code that is set when the image capture device that captured the captured image is manufactured. For example, FIG. 6, e.g., FIG. 6A, shows encrypted image that is a captured image that was encrypted through use of a manufacturer-defined device code associated with an image capture device that captured the captured image that includes a representation of a feature of an entity obtaining module 606 acquiring the encrypted image that is the captured image that has been encrypted through use of the particular device code that is set when the image capture device (e.g., the wearable computer, e.g., the Google Glass device) that captured the captured image is manufactured (e.g., or when a portion of the device is manufactured, e.g., an application is designed or a component is added).

Referring again to FIG. 11A, operation 1002 may include operation 1108 depicting acquiring the encrypted image that is a captured image that has been encrypted after detection of a privacy beacon in the image by the image capture device that captured the captured image. For example, FIG. 6, e.g., FIG. 6A, shows encrypted image that is a captured image that was encrypted through use of a particular device code associated with an image capture device that captured the captured image that includes a representation of a feature of an entity obtaining after detection of a privacy beacon by the image capture device module 608 acquiring the encrypted image that is a captured image (e.g., an image of three people at a baseball game) that has been encrypted after detection of a privacy beacon (e.g., a marker mounted on a drone that maintains a particular proximity to the person) in the image by the image capture device that captured the captured image (e.g., the image of three people at a baseball game).

Referring now to FIG. 11B, operation 1002 may include operation 1110 depicting receiving the encrypted image that is the captured image that has been encrypted from the image capture device that captured the captured image. For example, FIG. 6, e.g., FIG. 6B, shows encrypted image that is a captured image that was encrypted through use of a particular device code associated with an image capture device that captured the captured image that includes a representation of a feature of an entity obtaining from the image capture device module 610 receiving the encrypted image that is the captured image (e.g., an image of two people at the airport) that has been encrypted from the image capture device (e.g., a wearable computer) that captured the image.

Referring again to FIG. 11B, operation 1110 may include operation 1112 depicting receiving the encrypted image that is the captured image that has been encrypted from the image capture device that received the captured image, in response to detection of a privacy beacon by the image capture device. For example, FIG. 6, e.g., FIG. 6B, shows encrypted image that is a captured image that was encrypted through use of a particular device code associated with an image capture device that captured the captured image that includes a representation of a feature of an entity obtaining from the image capture device in response to image capture device detection of a privacy beacon module 612 receiving the encrypted image (e.g., an image of a man sitting on a park bench) that is the captured image that has been encrypted from the image capture device (e.g., the wearable computer) that received the captured image, in response to detection of a privacy beacon (e.g., a marker that uses near-field communication) by the image capture device (e.g., the wearable computer).

Referring again to FIG. 11B, operation 1002 may include operation 1114 depicting acquiring an encrypted image that is an image of a celebrity person that has been encrypted through use of a particular device code assigned to a wearable computer that captured the image of the celebrity person, wherein the image of the celebrity person includes a pixel representation of a face of the celebrity person. For example, FIG. 6, e.g., FIG. 6B, shows encrypted image that is a captured image that was encrypted through use of a particular device code associated with an image capture device that captured the captured image that includes a pixel representation of a face of a celebrity obtaining module 614 acquiring an encrypted image that is an image of a celebrity person that has been encrypted through use of a particular device code assigned to a wearable computer that captured the image of the celebrity person, wherein the image of the celebrity person includes a pixel representation of a face of the celebrity person.

FIGS. 12A-12D depict various implementations of operation 1004, depicting decrypting the acquired encrypted image that was encrypted through use of the particular device code, according to embodiments. Referring now to FIG. 12A, operation 1004 may include operation 1202 depicting decrypting the acquired image that was encrypted through use of the particular device code, through use of a decryption code. For example, FIG. 7, e.g., FIG. 7A, shows encrypted image that was encrypted through use of the particular device code decrypting that is facilitated by a decryption code module 702 decrypting the acquired image (e.g., an image of three friends taking shots at a bar) that was encrypted through use of the particular device code (e.g., a device code that was set using the MAC address of the device as a seed value).

Referring again to FIG. 12A, operation 1202 may include operation 1204 depicting acquiring the decryption code. For example, FIG. 7, e.g., FIG. 7A, shows decryption code acquisition module 704 acquiring the decryption code (e.g., the code to decrypt the captured image, e.g., the private key of an asymmetric key pair).

Referring again to FIG. 12A, operation 1202 may include operation 1206 depicting decrypting the acquired image through use of the acquired decryption code. For example, FIG. 7, e.g. FIG. 7A, shows acquired decryption code applying to the acquired image for decryption module 706 decrypting the acquired image (e.g., an image of a person at a famous restaurant) through use of the acquired decryption code (e.g., the code to decrypt the captured image, e.g., the private key of an asymmetric key pair).

Referring again to FIG. 12A, operation 1204 may include operation 1208 depicting receiving the decryption code from the image capture device. For example, FIG. 7, e.g., FIG. 7A, shows decryption code receiving from the image capture device that captured the captured image module 708 receiving the decryption code from the image capture device (e.g., the wearable computer).

Referring now to FIG. 12B, operation 1004 may include operation 1210 depicting decrypting the acquired image that was encrypted through use of the particular device code, wherein the acquired image is stored in a limited-access memory. For example, FIG. 7, e.g., FIG. 7A, shows encrypted image that is stored in a limited-access memory and that was encrypted through use of the particular device code decrypting module 710 decrypting the acquired image (e.g., an image of a family sightseeing on the National Mall) that was encrypted through use of the particular device code (e.g., a code that is stored on the device), wherein the acquired image is stored in a limited-access memory (e.g., a location at which at least one application does not have access to the image).

Referring again to FIG. 12B, operation 1004 may include operation 1212 depicting decrypting the acquired encrypted image that was encrypted through use of the particular device code that is unique to the image capture device. For example, FIG. 7, e.g., FIG. 7B, shows encrypted image that was encrypted through use of the particular device code that is unique to the image capture device decrypting module 712 decrypting the acquired encrypted image that was encrypted through use of the particular device code that is unique to the image capture device (e.g., a wearable computer, e.g., a hypothetical Apple-branded wearable computer, e.g., "iGlasses").

FIGS. 13A-13E depict various implementations of operation 1006, depicting performing a validation detection operation to detect a privacy beacon associated with the entity in the decrypted captured image, according to embodiments. Referring now to FIG. 13A, operation 1006 may include operation 1302 depicting performing the validation detection operation to detect the privacy beacon associated with the entity in the decrypted captured image, wherein the validation detection operation is similar to a device detection operation to detect the privacy beacon that was previously performed on the captured image. For example, FIG. 8, e.g., FIG. 8A, shows validation detection operation that is similar to a device detection operation to detect the privacy beacon, said validation detection operation is to detect a privacy beacon associated with the entity in the decrypted captured image performing module 802 performing the validation decryption operation (e.g., pattern detection using edge analysis) to detect the privacy beacon (e.g., a marker that forms a specific pattern) associated with the entity (e.g., the person whose likeness is captured in the image) in the decrypted captured image (e.g., an image of a person waiting in line at a fast food restaurant), wherein the validation detection operation (e.g., pattern detection using edge analysis) is similar to a device detection operation (e.g., pattern detection using a histogram and/or one or more Fourier transforms) to detect the privacy beacon ((e.g., a marker that forms a specific pattern) that was previously performed on the captured image.

Referring again to FIG. 13A, operation 1302 may include operation 1304 depicting performing the validation detection operation to detect the privacy beacon associated with the entity in the decrypted captured image, wherein the validation detection operation is a same operation as the device detection operation to detect the privacy beacon that was previously performed on the captured image. For example, FIG. 8, e.g., FIG. 8A, shows validation detection operation that is a same operation as the device detection operation to detect the privacy beacon, said validation detection operation is to detect a privacy beacon associated with the entity in the decrypted captured image performing module 804 performing the validation detection operation to detect the privacy beacon associated with the entity in the decrypted captured image, wherein the validation detection operation (e.g., a pattern detection operation) is a same operation as the device detection operation to detect the privacy beacon that was previously performed on the captured image (e.g., an image of a person on top of the Eiffel Tower).

Referring now to FIG. 13B, operation 1006 may include operation 1306 depicting receiving a result of a device detection operation to detect the privacy beacon that was previously performed on the captured image. For example, FIG. 8, e.g., FIG. 8B, shows result of a device detection operation that was previously performed on the captured image to detect the privacy beacon receiving module 806 receiving a result of a device detection operation (e.g., pattern recognition) to detect the privacy beacon that was previously performed on the captured image (e.g., an image of two women at a baseball game).

Referring again to FIG. 13B, operation 1006 may include operation 1308 depicting performing the validation detection operation to detect the privacy beacon associated with the entity in the decrypted captured image. For example, FIG. 8, e.g., FIG. 8B, shows validation detection operation to detect a privacy beacon associated with the entity in the decrypted captured image executing module 808 performing the validation detection operation to detect the privacy beacon (e.g., a visible marker) associated with the entity in the decrypted captured image (e.g., an image of people in a cubicle farm taken by a security camera).

Referring again to FIG. 13B, operation 1006 may include operation 1310 depicting comparing the received result of the device detection operation with a performed result of the validation detection operation. For example, FIG. 8, e.g., FIG. 8B, shows received result of the device detection operation comparing to a performed result of the validation detection operation module 810 comparing the received result of the device detection operation (e.g., low-power pattern detection) with a performed result of the validation detection operation (e.g., high-power pattern detection, with a larger database).

Referring again to FIG. 13B, operation 1306 may include operation 1312 depicting receiving the result of the device detection operation to detect the privacy beacon that was previously performed on the captured image by an image capture device that captured the captured image. For example, FIG. 8, e.g., FIG. 8B, shows result of a device detection operation that was previously performed by the captured image to detect the privacy beacon receiving module 812 receiving the result of the device detection operation (e.g., pattern detection) to detect the privacy beacon (e.g., a marker that emits light) that was previously performed on the captured image (e.g., an image of two people at a dance club) by an image capture device (e.g., a wearable computer) that captured the captured image (e.g., the image of two people at a dance club).

Referring again to FIG. 13B, operation 1312 may include operation 1314 depicting receiving the result of the device detection operation to detect the privacy beacon that was previously performed on the captured image at a time of image capture, by the image capture device that captured the captured image. For example, FIG. 8, e.g., FIG. 8B, shows result of a device detection operation that was previously performed by the captured image at a time the captured image was captured to detect the privacy beacon receiving module 814 receiving the result of the device detection operation (e.g., a Frequentist approach to pattern recognition) to detect the privacy beacon (e.g., a marker) that was previously performed on the captured image at a time of image capture, by the image capture device that captured the captured image.

Referring again to FIG. 13B, operation 1306 may include operation 1316 depicting receiving the result of the device detection operation to detect the privacy beacon that was previously performed on the captured image, when the device detection operation detects a presence of the privacy beacon. For example, FIG. 8, e.g., FIG. 8B, shows result of a device detection operation that was previously performed on the captured image to detect the privacy beacon receiving when the device detection operation detects the privacy beacon module 816 receiving a result of the device detection operation (e.g., a probabilistic pattern classifier that uses a Bayesian statistical approach) to detect the privacy beacon (e.g., an emitter of nonvisible light that is nonetheless captured in the image) that was previously performed on the captured image, when the device detection operation (e.g., a probabilistic pattern classifier that uses a Bayesian statistical approach) detects a presence of the privacy beacon (e.g., an emitter of nonvisible light that is nonetheless captured in the image).

Referring again to FIG. 13B, operation 1306 may include operation 1318 depicting receiving the result of the device detection operation to detect the privacy beacon that was previously performed on the captured image, wherein the device detection operation is an optical detection of the privacy beacon performed on the captured image. For example, FIG. 8, e.g., FIG. 8B, shows result of an optical device detection operation that was previously performed on the captured image to detect the privacy beacon receiving when the optical device detection operation detects the privacy beacon module 818 receiving the result of the device detection operation to detect the privacy beacon that was previously performed on the captured image, wherein the device detection operation is an optical detection (e.g., a detection that uses only optical components) of the privacy beacon (e.g., a light beam that creates a particular pattern) performed on the captured image (e.g., an image of a person standing on a sidewalk).

Referring now to FIG. 13C, operation 1308 may include operation 1320 depicting performing the validation detection operation to detect the privacy beacon associated with the entity in the decrypted captured image, wherein the validation detection operation is a same operation as the device detection operation. For example, FIG. 8, e.g., FIG. 8B, shows validation detection operation that is the same as the device detection operation to detect a privacy beacon associated with the entity in the decrypted captured image executing module 820 performing the validation detection operation (e.g., a quadratic discriminant analysis) to detect the privacy beacon (e.g., a visible marker) associated with the entity in the decrypted captured image, wherein the validation detection operation (e.g., a quadratic discriminant analysis) is a same operation as the device detection operation (e.g., a quadratic discriminant analysis).

Referring again to FIG. 13C, operation 1308 may include operation 1322 depicting selecting a particular validation detection operation that is different than the device detection operation. For example, FIG. 8, e.g., FIG. 8B, shows particular validation detection operation that is different than the device detection operation selecting module 822 selecting a particular validation detection operation (e.g., pattern recognition that uses a clustering algorithm) that is different from the device detection operation (e.g., pattern recognition that uses a classification algorithm).

Referring again to FIG. 13C, operation 1308 may include operation 1324 depicting performing the particular validation detection operation to detect the privacy beacon associated with the entity in the decrypted captured image. For example, FIG. 8, e.g., FIG. 8B, shows selected particular validation detection operation to detect the privacy beacon associated with the entity in the decrypted image executing module 824 performing the particular validation detection operation (e.g., the pattern recognition that uses the clustering algorithm) to detect the privacy beacon (e.g., a visible marker emitted by a device carried by the entity) associated with the entity in the decrypted captured image.

Referring now to FIG. 13D, operation 1006 may include operation 1326 depicting performing the validation detection operation to detect the privacy beacon associated with the entity in the decrypted captured image, wherein the privacy beacon is configured to be used to facilitate retrieval of a terms of service governing use of the captured image. For example, FIG. 8, e.g., FIG. 8C, shows validation detection operation to detect a privacy beacon that is configured to facilitate retrieval of a terms of service that govern usage of personality rights captured in the captured image and associated with the entity in the decrypted captured image performing module 826 performing the validation detection operation to detect the privacy beacon (e.g., a marker that is detectable only at a particular range of resolutions of an image) associated with the entity in the decrypted captured image, wherein the privacy beacon (e.g., a marker that is detectable only at a particular range of resolutions of an image) is configured to be used to facilitate retrieval of a terms of service (e.g., that includes a liquidated damages clause) governing use of the captured image (e.g., an image of five men playing in an illegal poker game).

Referring again to FIG. 13D, operation 1326 may include operation 1328 depicting performing the validation detection operation to detect the privacy beacon associated with the entity in the decrypted captured image, wherein the privacy beacon is configured to be used to facilitate retrieval of a terms of service governing use of the captured image from a remote database. For example, FIG. 8, e.g., FIG. 8C, shows validation detection operation to detect a privacy beacon that is configured to facilitate retrieval, from a remote location, of a terms of service that govern usage of personality rights captured in the captured image and associated with the entity in the decrypted captured image performing module 828 performing the validation detection operation (e.g., an optical analysis using one or more Fourier transforms) to detect the privacy beacon (e.g., an emitted-light marker) associated with the entity (e.g., the person whose image is captured) in the decrypted captured image (e.g., an image of a person at a movie theater), wherein the privacy beacon (e.g., the emitted-light marker) is configured to be used to facilitate retrieval of a terms of service governing use of the captured image from a remote database.

FIGS. 14A-14B depict various implementations of operation 1008, depicting storing outcome data that includes at least a result of the performed validation detection operation to detect the privacy beacon in the captured image, according to embodiments. Referring now to FIG. 14A, operation 1008 may include operation 1402 depicting storing outcome data that includes the result of the performed validation detection operation to detect the privacy beacon in the captured image, wherein said outcome data includes the indication that the result of the performed validation detection operation to detect the privacy beacon matches a previously performed device detection operation to detect the privacy beacon by the image capture device. For example, FIG. 9, e.g., FIG. 9A, shows result data that includes an output of the performed validation detection operation to detect the privacy beacon in the captured image, wherein the output matches an output of a previously performed device detection operation to detect the privacy beacon storing module 902 storing outcome data that includes the result of the performed operation to detect the privacy beacon (e.g., a marker that reflects visible light) in the captured image (e.g., an image of a person on a park bench), wherein said outcome data includes the indication that the result of the performed validation detection operation (e.g., pattern analysis) to detect the privacy beacon (e.g., the marker that reflects visible light) matches a previously performed device detection operation (e.g., a less processor-intensive pattern analysis) to detect the privacy beacon (e.g., the marker that reflects visible light) by the image capture device (e.g., a wearable computer, e.g., a DigiLens DL40).

Referring again to FIG. 14A, operation 1008 may include operation 1404 depicting storing outcome data that includes the result of the performed validation detection operation to detect the privacy beacon in the captured image, wherein said outcome data includes privacy beacon data of the privacy beacon detected in the validation detection operation. For example, FIG. 9, e.g., FIG. 9A, shows result data that includes an output of the performed validation detection operation to detect the privacy beacon in the captured image and that includes privacy beacon data associated with the privacy beacon storing module 904 storing outcome data that includes the result of the performed validation detection operation (e.g., histogram analysis) to detect the privacy beacon (e.g., a marker that is visible on the entity) in the captured image (e.g., an image of three friends at the mall), wherein said outcome data includes privacy beacon data (e.g., the identifier of the person associated with the privacy beacon) of the privacy beacon (e.g., a marker that is visible on the entity) detected in the validation detection operation (e.g., a color analysis).

Referring now to FIG. 14B, operation 1008 may include operation 1406 depicting storing outcome data that includes a result of the performed operation to detect the privacy beacon in the captured image, when the result of the performed validation detection operation does not match a result of a previously performed device detection operation on the captured image to detect the privacy beacon. For example, FIG. 9, e.g., FIG. 9B, shows result data that includes an output of the performed validation detection operation to detect the privacy beacon in the captured image, wherein the output of the performed validation detection operation does not match an output of a previously performed device detection operation on the captured image to detect the privacy beacon storing module 906 storing outcome data that includes a result of the performed operation to detect the privacy beacon (e.g., a marker that emits light in a visible spectrum) in the captured image (e.g., an image of a celebrity at the beach), when the result of the performed validation detection operation (e.g., pattern detection on the image) does not match a result of a previously performed device detection operation (e.g., pattern detection on the image) on the captured image to detect the privacy beacon (e.g., a marker that emits light in a visible spectrum)

Referring again to FIG. 14B, operation 1406 may include operation 1408 depicting storing outcome data that includes the result of the performed operation to detect the privacy beacon in the captured image, when the result of the performed validation detection operation detected a different privacy beacon than the result of the previously performed device detection operation on the captured image to detect the privacy beacon. For example, FIG. 9, e.g., FIG. 9B, shows result data that includes an output of the performed validation detection operation to detect the privacy beacon in the captured image, wherein the output of the performed validation detection operation is a detection of a different privacy beacon than the output of the previously performed device detection operation on the captured image to detect the privacy beacon storing module 908 storing outcome data that includes the result of the performed operation to detect the privacy beacon (e.g., a marker that emits light in a visible spectrum) in the captured image, when the result of the performed validation detection operation detected a different privacy beacon (e.g., a marker that emits light in a visible spectrum, but the wavelength of the light or the pattern it generates is different) than the result of the previously performed device detection operation on the captured image to detect the privacy beacon (e.g., a marker that emits light in a visible spectrum).

Referring again to FIG. 14B, operation 1406 may include operation 1410 depicting storing outcome data that includes the result of the performed operation to detect the privacy beacon in the captured image, when the performed validation detection operation detected the privacy beacon and the device detection operation determined that the privacy beacon was absent from the captured image. For example, FIG. 9, e.g., FIG. 9B, shows result data that includes an output of the performed validation detection operation to detect the privacy beacon in the captured image, wherein the output of the performed validation detection operation indicates detection of the privacy beacon and the output of the previously performed device detection operation on the captured image indicates failure to detect the privacy beacon storing module 910 storing outcome data that includes the result of the performed operation to detect the privacy beacon (e.g., a marker that is in the form of a bar code and painted on a user's head and that reflects light in a nonvisible spectrum) in the captured image (e.g., an image of two people on a fishing trip), when the performed validation detection operation detected the privacy beacon (e.g., a marker that is in the form of a bar code and painted on a user's head and that reflects light in a nonvisible spectrum) and the device detection operation determined that the privacy beacon (e.g., a marker that is in the form of a bar code and painted on a user's head and that reflects light in a nonvisible spectrum) was absent from the captured image (e.g., the image of two people on a fishing trip).

Referring again to FIG. 14B, operation 1406 may include operation 1412 depicting storing outcome data that includes the result of the performed operation to detect the privacy beacon in the captured image, when the performed validation detection operation determined an absence of the privacy beacon in the captured image and the device detection operation detected the privacy beacon. For example, FIG. 9, e.g., FIG. 9B, shows result data that includes an output of the performed validation detection operation to detect the privacy beacon in the captured image, wherein the output of the performed validation detection operation indicates failure to detect the privacy beacon and the output of the previously performed device detection operation on the captured image indicates detection of the privacy beacon storing module 912 storing outcome data that includes the result of the performed operation to detect the privacy beacon (e.g., a marker that reflects light in a visible spectrum) in the captured image, when the performed validation detection operation determined an absence of the privacy beacon (e.g., a marker that reflects light in a visible spectrum) in the captured image and the device detection operation detected the privacy beacon (e.g., a marker that reflects light in a visible spectrum).

Referring now to FIG. 15, FIG. 15 illustrates an exemplary implementation of the capture beacon emitting from a device configured to capture a particular image module 262. As illustrated in FIG. 15, the capture beacon emitting from a device configured to capture a particular image module may include one or more sub-logic modules in various alternative implementations and embodiments. For example, in an embodiment, as shown in FIG. 15, .e.g., FIG. 15A, module 262 may include one or more of capture beacon emitting from an image capture device configured to capture a particular image module 1501, capture beacon that informs a recipient monitor device of an image capture capability of the device configured to capture the particular image emitting from the device configured to capture the particular image module 1505, and capture beacon that informs a recipient monitor device of a position of the device configured to capture the particular image emitting from the device configured to capture the particular image module 1507. In an embodiment, module 1501 may include capture beacon emitting from an image capture device configured to capture the particular image configured to capture a particular image module 1503. In an embodiment, module 1507 may include capture beacon that informs a recipient monitor device of a position at a movie theater of the device configured to capture the particular image emitting from the device configured to capture the particular image module 1509.

Referring again to FIG. 15, e.g., FIG. 15B, in an embodiment, module 262 may include one or more of capture beacon configured to request permission to capture the particular image emitting from a device configured to capture a particular image module 1511 and capture beacon configured to inform one or more devices that the particular image was captured emitting from a device configured to capture a particular image module 1513.

Referring now to FIG. 16, FIG. 16 illustrates an exemplary implementation of the permission data that includes one or more permissions for capture of the particular image receiving module, wherein said receiving from at least one device in response to the emitted capture beacon 264. As illustrated in FIG. 16, the permission data that includes one or more permissions for capture of the particular image receiving module, wherein said receiving from at least one device in response to the emitted capture beacon may include one or more sub-logic modules in various alternative implementations and embodiments. For example, in an embodiment, as shown in FIG. 16, .e.g., FIG. 16A, module 264 may include one or more of permission data that indicates a grant of permission to capture the particular image receiving in response to the emitted capture beacon module 1601 and permission data that indicates a prohibition from capture of the particular image receiving in response to the emitted capture beacon module 1605. In an embodiment, module 1601 may include permission data that indicates a time-limited grant of permission to capture the particular image receiving in response to the emitted capture beacon module 1603. In an embodiment, module 1605 may include one or more of permission data that indicates a prohibition from capture of the particular image receiving in response to the emitted capture beacon module, wherein the prohibition is configured to expire when a particular condition is met 1607, permission data that indicates a time-limited prohibition from capture of the particular image receiving in response to the emitted capture beacon module 1609, permission data that indicates a prohibition from capture of the particular image receiving in response to the emitted capture beacon module, wherein said prohibition is configured to expire after a particular distance has been traveled 1611, and permission data that indicates a prohibition from capture of the particular image receiving in response to the emitted capture beacon module, wherein said prohibition is configured to expire after a particular entity vacates a proximity to the device configured to capture the particular image 1613.

Referring again to FIG. 16, e.g., FIG. 16B, in an embodiment, module 264 may include one or more of permission data that includes a request to discard the captured image receiving module, wherein said receiving from at least one device in response to the emitted capture beacon 1615, permission data that includes a request to encrypt the captured image receiving module, wherein said receiving from at least one device in response to the emitted capture beacon 1617, and permission data that includes a request to transmit the captured image to a particular location receiving module, wherein said receiving from at least one device in response to the emitted capture beacon 1619.

Referring now to FIG. 17, FIG. 17 illustrates an exemplary implementation of the particular image capturing module configured to capture the particular image through use of a particular capture component 266. As illustrated in FIG. 15, the particular image capturing module configured to capture the particular image through use of a particular capture component may include one or more sub-logic modules in various alternative implementations and embodiments. For example, in an embodiment, as shown in FIG. 17, module 266 may include validation detection operation to detect a privacy beacon associated with the entity in the decrypted captured image performing after receipt of the permission data module 1701.

Referring now to FIG. 18, FIG. 18 illustrates an exemplary implementation of the captured particular image operation related to the captured particular image performing module 268. As illustrated in FIG. 18, the captured particular image operation related to the captured particular image performing module may include one or more sub-logic modules in various alternative implementations and embodiments. For example, in an embodiment, as shown in FIG. 18, module 268 may include one or more of captured particular image encryption operation related to the captured particular image performing module 1801, captured particular image encryption operation prior to one or more other operations related to the captured particular image performing module 1803, captured particular image immediate encryption operation related to the captured particular image performing module 1805, and encrypted captured particular image transferring to a limited access memory area module 1807.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 19 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIGS. 19-23 as well as the other operations to be described herein may be performed by at least one of a machine, an article of manufacture, or a composition of matter.

Referring now to FIG. 19, FIG. 19 shows operation 1900, e.g., an example operation of computing device 200 of FIG. 2C operating in an environment 200. In an embodiment, operation 1900 may include operation 1902 depicting emitting a capture beacon from a device configured to capture a particular image. For example, FIG. 2, e.g., FIG. 2C, shows capture beacon emitting from a device configured to capture a particular image module 262 emitting (e.g., transmitting, transferring, broadcasting, sending, communicating, moving to, facilitating transmission of) a capture beacon (e.g., a signal that is a request for data or that includes data) from a device (e.g., a device that is capable of capturing images or video) configured to capture (e.g., collect the light that represents, or receive from a device that collected the light that represents) a particular image (e.g., a description of a graphic picture that is a visual representation of something, regardless of whether that something is coherent, nonsensical, abstract, or otherwise).

Referring again to FIG. 19, operation 1900 may include operation 1904 depicting receiving, in response to the emitted capture beacon, permission data from at least one device, wherein said permission data includes one or more permissions for capture of the particular image. For example, FIG. 2, e.g., FIG. 2C, shows capturing the particular image through use of an image capture component 264 receiving, in response to the emitted capture beacon (e.g., a signal that is a request for data or that includes data), permission data (e.g., data that sets the metes and bounds of one or more actions and whether they are permitted, in the positive or negative, and/or any conditions and/or limitations set forth on the one or more actions) from at least one device (e.g., it could be many devices, e.g., crowdsourcing permissions based on what other devices are doing, or a central device that is tracking permission), wherein said permission data includes one or more permissions (e.g., .g., data that sets the metes and bounds of one or more actions and whether they are permitted, in the positive or negative, and/or any conditions and/or limitations set forth on capturing an image) for capture (e.g., collect the light that represents, or receive from a device that collected the light that represents) of the particular image (e.g., a description of a graphic picture that is a visual representation of something, regardless of whether that something is coherent, nonsensical, abstract, or otherwise).

Referring again to FIG. 19, operation 1900 may include operation 1906 depicting capturing the particular image through use of an image capture component. For example, FIG. 2, e.g., FIG. 2C, shows particular image capturing module configured to capture the particular image through use of a particular capture component 256 capturing (e.g., collecting the light that represents, or receiving from a device that collected the light that represents) the particular image (e.g., a description of a graphic picture that is a visual representation of something, regardless of whether that something is coherent, nonsensical, abstract, or otherwise) through use of an image capture component (e.g., any component designed to facilitate the capture of an image, e.g., a lens, a mirror, a CCD array, a CMOS array, a D/A converter, and the like).

Referring again to FIG. 19, operation 1900 may include operation 1208 depicting performing, on the captured particular image, one or more operations related to the received permission data. For example, FIG. 2, e.g., FIG. 2C, shows captured particular image operation related to the captured particular image performing module 258 performing, on the captured particular image (e.g., a description of a graphic picture that is a visual representation of something, regardless of whether that something is coherent, nonsensical, abstract, or otherwise), one or more operations related to the received permission data (e.g., the permission data sets forth the conditions under which the one or more operations may be carried out).

FIGS. 20A-20B depict various implementations of operation 1902, depicting emitting a capture beacon from a device configured to capture a particular image, according to embodiments. Referring now to FIG. 20A, operation 1902 may include operation 2001 depicting emitting the capture beacon from an image capture device configured to capture the particular image. For example, FIG. 15, e.g., FIG. 15A, shows capture beacon emitting from an image capture device configured to capture a particular image module 1501 emitting a capture beacon (e.g., data indicating that the device is in a particular area and is ready to capture images) from a device configured to capture a particular image (e.g., an image of a baseball game occurring at a stadium).

Referring again to FIG. 20A, operation 2001 may include operation 2003 depicting emitting the capture beacon from the image capture device configured to capture the particular image, in response to the capturing the particular image method operation. For example, FIG. 15, e.g., FIG. 15A, shows capture beacon emitting from an image capture device configured to capture the particular image configured to capture a particular image module 1503 emitting the capture beacon (e.g., a signal indicating that the device has captured an image from a football game) from the image capture device (e.g., a wearable computer, e.g., Google Glass) configured to capture the particular image (e.g., an image of a player in the football game).

Referring again to FIG. 20A, operation 1902 may include operation 2005 depicting emitting the capture beacon configured to inform one or more monitor devices of an image capture capability of the device configured to capture the particular image. For example, FIG. 15, e.g., FIG. 15A, shows capture beacon that informs a recipient monitor device of an image capture capability of the device configured to capture the particular image emitting from the device configured to capture the particular image module 1505 emitting the capture beacon (e.g., data that states "my camera is active" from the device) configured to inform one or more monitor devices (e.g., a device placed at the top of an exclusive bar for celebrities which has outlawed wearable computers) of an image capture capability (e.g., data indicating that the device has an image capture component, or that the image capture component of the device is active) of the device (e.g., a wearable computer, e.g., an EyeTap) configured to capture the particular image (e.g., an image of someone at the exclusive bar).

Referring again to FIG. 20A, operation 1902 may include operation 2007 depicting emitting the capture beacon configured to inform one or more monitor devices of a location of the device configured to capture the particular image. For example, FIG. 15, e.g., FIG. 15A, shows capture beacon that informs a recipient monitor device of a position of the device configured to capture the particular image emitting from the device configured to capture the particular image module 1507 emitting the capture beacon (e.g., data identifying the device, its owner, and the device location) configured to inform one or more monitor devices (e.g., a remote tracking server distant from the location of the device) of a location of the device (e.g., a wearable computer, e.g., a hypothetical Apple-branded wearable computer, e.g., an iGlasses) configured to capture the particular image (e.g., an image of two people at a restaurant).

Referring again to FIG. 20A, operation 2007 may include operation 2009 depicting emitting the capture beacon configured to inform one or more monitor devices of the location of the device at a movie theater. For example, FIG. 15, e.g., FIG. 15A, shows capture beacon that informs a recipient monitor device of a position at a movie theater of the device configured to capture the particular image emitting from the device configured to capture the particular image module 1509 emitting the capture beacon configured to inform one or more monitor devices (e.g., a remote server that also runs an application store for the device) of the location of the device (e.g., a wearable computer, e.g., a hypothetical Microsoft-branded wearable computer, e.g., KinectVision) at a movie theater.

Referring now to FIG. 20B, operation 1902 may include operation 2011 depicting emitting the capture beacon configured to request permission to capture the particular image, from the device configured to capture the particular image. For example, FIG. 15, e.g., FIG. 15A, shows capture beacon configured to request permission to capture the particular image emitting from a device configured to capture a particular image module 1511 emitting the capture beacon (e.g., which may contain a protected version of the captured image, or a description of the image to be captured, or a generic request) configured to request permission to capture the particular image, from the device configured to capture the particular image (e.g., an image at a concert).

Referring again to FIG. 20B, operation 1902 may include operation 2013 depicting emitting the capture beacon configured to inform one or more devices that the particular image was captured. For example, FIG. 15, e.g., FIG. 15B, shows capture beacon configured to inform one or more devices that the particular image was captured emitting from a device configured to capture a particular image module 1513 emitting the capture beacon configured to inform one or more devices that the particular image (e.g., an image of a celebrity at the beach) was captured.

FIGS. 21A-21B depict various implementations of operation 1904, depicting receiving, in response to the emitted capture beacon, permission data from at least one device, wherein said permission data includes one or more permissions for capture of the particular image, according to embodiments. Referring now to FIG. 21A, operation 1904 may include operation 2101 depicting receiving permission data that indicates permission to capture images. For example, FIG. 16, e.g., FIG. 16A, shows permission data that indicates a grant of permission to capture the particular image receiving in response to the emitted capture beacon module 1601 receiving (e.g., from a monitor device, or from crowdsourcing other devices and determining implicit permission because other devices are capturing images in the same vicinity) permission data that indicates permission to capture images.

Referring again to FIG. 21A, operation 2101 may include operation 2103 depicting receiving permission data that indicates permission to capture images, said permission configured to expire after a particular time period. For example, FIG. 16, e.g., FIG. 16A, shows permission data that indicates a time-limited grant of permission to capture the particular image receiving in response to the emitted capture beacon module 1603 receiving permission data that indicates permission to capture images, said permission configured to expire after a particular time period (e.g., five minutes, twenty four hours, etc.).

Referring again to FIG. 21A, operation 1904 may include operation 2105 depicting receiving permission data that indicates a prohibition of capture of images. For example, FIG. 16, e.g., FIG. 16A, shows permission data that indicates a prohibition from capture of the particular image receiving in response to the emitted capture beacon module 1605 receiving permission data that indicates a prohibition of capture of images (e.g., it is determined, either because of the location of the device or other factors, that images are prohibited).

Referring again to FIG. 21A, operation 2105 may include operation 2107 depicting receiving permission data that indicates a prohibition of capture of images, said prohibition configured to expire after a particular condition is met. For example, FIG. 16, e.g., FIG. 16A, shows permission data that indicates a prohibition from capture of the particular image receiving in response to the emitted capture beacon module, wherein the prohibition is configured to expire when a particular condition is met 1607 receiving permission data that indicates a prohibition of capture of images, said prohibition configured to expire after a particular condition is met (e.g., rendering of payment of some type, whether monetary, e-currency (e.g., in-game or in-app currency), or a promise to do some task (e.g., visit or tag a page on a social networking site) at a later time).

Referring again to FIG. 21A, operation 2107 may include operation 2109 depicting receiving permission data that indicates a prohibition of capture of images, said prohibition configured to expire after a particular time period has elapsed. For example, FIG. 16, e.g., FIG. 16A, shows permission data that indicates a time-limited prohibition from capture of the particular image receiving in response to the emitted capture beacon module 1609 receiving permission data that indicates a prohibition of capture of images, said prohibition configured to expire (e.g., be lifted, even if the device loses contact with the entity that grants permission) after a particular time period has elapsed.

Referring again to FIG. 21A, operation 2107 may include operation 2111 depicting receiving permission data that indicates a prohibition of capture of images, said prohibition configured to expire after a particular distance has been traveled. For example, FIG. 16, e.g., FIG. 16A, shows permission data that indicates a prohibition from capture of the particular image receiving in response to the emitted capture beacon module, wherein said prohibition is configured to expire after a particular distance has been traveled 1611 receiving permission data that indicates a prohibition of capture of images, said prohibition configured to expire after a particular distance has been traveled (e.g., after the device has left the jurisdiction of the entity granting the permission).

Referring again to FIG. 21A, operation 2107 may include operation 2113 depicting receiving permission data that indicates a prohibition of capture of images, said prohibition configured to expire after a particular entity has vacated a vicinity of the image capture device. For example, FIG. 16, e.g., FIG. 16A, shows permission data that indicates a prohibition from capture of the particular image receiving in response to the emitted capture beacon module, wherein said prohibition is configured to expire after a particular entity vacates a proximity to the device configured to capture the particular image 1613 receiving permission data that indicates a prohibition of capture of images, said prohibition configured to expire after a particular entity (e.g., a particular celebrity that does not want his picture taken) has vacated a vicinity of the image capture device (e.g., the wearable computer requesting permission to capture images).

Referring now to FIG. 16B, operation 1904 may include operation 2115 depicting receiving permission data that includes a request to delete the captured image. For example, FIG. 16, e.g., FIG. 16B, shows permission data that includes a request to discard the captured image receiving module, wherein said receiving from at least one device in response to the emitted capture beacon 1615 receiving permission data that includes a request to delete (e.g., remove, discard, write over, or otherwise make inaccessible) the captured image.

Referring again to FIG. 16B, operation 1904 may include operation 2117 depicting receiving permission data that includes a request to encrypt the captured image. For example, FIG. 16, e.g., FIG. 16B, shows permission data that includes a request to encrypt the captured image receiving module, wherein said receiving from at least one device in response to the emitted capture beacon 1617 receiving permission data that includes a request to encrypt the captured image (e.g., an image of a celebrity at a bar).

Referring again to FIG. 16B, operation 1904 may include operation 2119 depicting receiving permission data that includes a request to transmit the captured image to a central server for analysis. For example, FIG. 16, e.g., FIG. 16B, shows permission data that includes a request to transmit the captured image to a particular location receiving module, wherein said receiving from at least one device in response to the emitted capture beacon 1619 receiving permission data that includes a request to transmit the captured image to a central server (e.g., a server that can perform a valuation of the image) for analysis (e.g., to determine whether it is prohibited to have the image, and if so, if the value of the image outweighs the potential liability).

FIG. 22 depicts various implementations of operation 1906, depicting capturing the particular image through use of an image capture component, according to embodiments. Referring now to FIG. 22, operation 1906 may include operation 2201 depicting capturing the particular image through use of the image capture component, after receipt of permission data indicating clearance to capture the particular image. For example, FIG. 17, shows validation detection operation to detect a privacy beacon associated with the entity in the decrypted captured image performing after receipt of the permission data module 1701 capturing the particular image through use of the image capture component (e.g., the lens and CMOS sensor) after receipt of permission data indicating clearance to capture the particular image (e.g., an image of a professional baseball game).

FIG. 23 depicts various implementations of operation 1908, depicting performing, on the captured particular image, one or more operations related to the received permission data, according to embodiments. Referring now to FIG. 23, operation 1908 may include operation 2301 depicting performing an encryption operation on the captured particular image. For example, FIG. 18 shows captured particular image encryption operation related to the captured particular image performing module 1801 performing an encryption operation on the captured particular image (e.g., an image of two people at a restaurant).

Referring again to FIG. 23, operation 2301 may include operation 2303 depicting performing the encryption operation on the captured particular image prior to one or more other operations on the captured particular image. For example, FIG. 18 shows captured particular image encryption operation prior to one or more other operations related to the captured particular image performing module 1803 performing the encryption operation on the captured particular image (e.g., an image of three people at a blackjack table in Las Vegas) prior to one or more other operations (e.g., saving, storing, viewing, transmitting, distributing, posting to a website, e-mailing, etc.) on the captured particular image.

Referring again to FIG. 23, operation 2301 may include operation 2305 depicting performing the encryption operation on the captured particular image. For example, FIG. 18 shows captured particular image immediate encryption operation related to the captured particular image performing module 1805 performing the encryption operation on the captured particular image (e.g., an image of three people playing cards).

Referring again to FIG. 23, operation 2301 may include operation 2307 depicting transmitting the encrypted captured particular image to a limited-access memory of an image capture device. For example, FIG. 18 shows encrypted captured particular image transferring to a limited access memory area module 1807 transmitting the encrypted particular image (e.g., an image of three people playing cards) to a limited-access memory (e.g., a position in memory to which not every application has access, e.g., an e-mailing application may not be able to attach the image as an email, for example) of an image capture device (e.g., a wearable computer, e.g., a hypothetical Samsung-branded wearable computer, e.g., Samsung "Spectacles").

It is noted that, in the foregoing examples, various concrete, real-world examples of terms that appear in the following claims are described. These examples are meant to be exemplary only and non-limiting. Moreover, any example of any term may be combined or added to any example of the same term in a different place, or a different term in a different place, unless context dictates otherwise.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

The foregoing detailed description has set forth various embodiments of the devices and/or processes via the use of block diagrams, flowcharts, and/or examples.

Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.)

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in an embodiment," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A device, comprising:
   (a) circuitry configured to obtain a captured image;
   (b) circuitry configured to encrypt the captured image through use of a particular device code of a particular device that captured the captured image to create an encrypted image;
   (c) circuitry configured to decrypt the encrypted image that was encrypted through use of the particular device code to provide a decrypted captured image;
   (d) circuitry configured to perform a validation detection operation to detect a privacy beacon associated with an entity whose partial image appears in the decrypted captured image, including at least:
      (1) circuitry configured to perform a validation detection operation to detect a privacy beacon, including at least one of obtaining or generating privacy beacon complex metadata, wherein the privacy beacon complex metadata includes at least terms of service that govern usage of personality rights captured in the captured image, and wherein the privacy beacon is associated with the entity whose partial image appears in the decrypted captured image; and
   (e) circuitry configured to store a result data that includes an output of the performed validation detection operation.

2. The device of claim 1, wherein said circuitry configured to encrypt the captured image through use of a particular device code of a particular device that captured the captured image to create an encrypted image comprises:
   circuitry configured to encrypt the captured image through use of a unique particular device code associated with the image capture device that captured the captured image.

3. The device of claim 1, wherein said circuitry configured to encrypt the captured image through use of a particular device code of a particular device that captured the captured image to create an encrypted image comprises:
   circuitry configured to encrypt the captured image through use of a user-defined device code associated with the image capture device that captured the captured image.

4. The device of claim 1, wherein said circuitry configured to encrypt the captured image through use of a particular device code of a particular device that captured the captured image to create an encrypted image comprises:
   circuitry configured to encrypt the captured image through use of a manufacturer-defined device code associated with the image capture device that captured the captured image.

5. The device of claim 1, wherein said circuitry configured to encrypt the captured image through use of a particular device code of a particular device that captured the captured image to create an encrypted image comprises:

circuitry configured to encrypt the captured image after detection of a privacy beacon by the image capture device through use of the particular device code associated with the image capture device that captured the captured image.

6. The device of claim 1, wherein said circuitry configured to encrypt the captured image through use of a particular device code of a particular device that captured the captured image to create an encrypted image comprises:
   circuitry configured to encrypt the captured image, including at least the partial image of the entity, through use of a unique particular device code associated with the image capture device that captured the captured image.

7. The device of claim 1, wherein said circuitry configured to encrypt the captured image through use of a particular device code of a particular device that captured the captured image to create an encrypted image comprises:
   circuitry configured to encrypt the captured image in response to detection of a privacy beacon by the image capture device.

8. The device of claim 1, wherein said circuitry configured to decrypt the encrypted image that was encrypted through use of the particular device code to provide a decrypted captured image comprises:
   circuitry configured to decrypt the encrypted image that was encrypted through use of the particular device code that is facilitated by a decryption code to provide a decrypted captured image.

9. The device of claim 8, wherein said circuitry configured to decrypt the encrypted image that was encrypted through use of the particular device code that is facilitated by a decryption code to provide a decrypted captured image comprises:
   circuitry configured to acquire a decryption code and to decrypt the encrypted image including at least decrypting at least in part by applying the acquired decryption code to the encrypted image to provide a decrypted captured image.

10. The device of claim 9, wherein circuitry configured to acquire a decryption code and to decrypt the encrypted image including at least decrypting at least in part by applying the acquired decryption code to the encrypted image to provide a decrypted captured image comprises:
    circuitry configured to acquire a decryption code from the image capture device that captured the captured image and to decrypt the encrypted image including at least decrypting at least in part by applying the acquired decryption code to the encrypted image to provide a decrypted captured image.

11. The device of claim 1, wherein said circuitry configured to decrypt the encrypted image that was encrypted through use of the particular device code to provide a decrypted captured image comprises:
    circuitry configured to decrypt the encrypted image that is stored in a limited-access memory and that was encrypted through use of the particular device code to provide a decrypted captured image.

12. The device of claim 1, wherein said circuitry configured to perform a validation detection operation to detect a privacy beacon associated with an entity whose partial image appears in the decrypted captured image comprises:
    circuitry configured to perform a validation detection operation that is similar to a device detection operation to detect a privacy beacon associated with the entity whose partial image appears in the decrypted captured image.

13. The device of claim 1, wherein said circuitry configured to perform a validation detection operation to detect a privacy beacon associated with an entity whose partial image appears in the decrypted captured image comprises:
    circuitry configured to receive a result of a previous device detection operation that was previously performed on the decrypted captured image to detect the privacy beacon;
    circuitry configured to execute a current validation detection operation to detect the privacy beacon associated with the entity whose partial image appears in the decrypted captured image; and
    circuitry configured to compare the received result of the previous device detection operation to a result of the current validation detection operation.

14. The device of claim 13, wherein said circuitry configured to receive a result of a previous device detection operation that was previously performed on the decrypted captured image to detect the privacy beacon comprises:
    circuitry configured to receive a result of a previous device detection operation that was previously performed by an image capture device that captured the captured image to detect the privacy beacon.

15. The device of claim 14, wherein said circuitry configured to receive a result of a previous device detection operation that was previously performed by an image capture device that captured the captured image to detect the privacy beacon comprises:
    circuitry configured to receive a result of a previous device detection operation that was previously performed by an image capture device that captured the captured image at a time the captured image was captured to detect the privacy beacon.

16. The device of claim 13, wherein said circuitry configured to receive a result of a previous device detection operation that was previously performed on the decrypted captured image to detect the privacy beacon comprises:
    circuitry configured to receive a result of an optical device detection operation that was previously performed on the captured image to detect the privacy beacon.

17. The device of claim 13, wherein said circuitry configured to receive a result of a previous device detection operation that was previously performed on the decrypted captured image to detect the privacy beacon comprises:
    at least one of:
    circuitry configured to execute a particular validation detection operation that is different than a device detection operation; or
    circuitry configured to execute a selected particular validation detection operation to detect the privacy beacon associated with the entity whose partial image appears in the decrypted image.

18. The device of claim 1, wherein said circuitry configured to store a result data that includes an output of the performed validation detection operation comprises:
    circuitry configured to store a result data that includes an output of the performed validation detection operation to detect the privacy beacon in the captured image and that includes privacy beacon data associated with the privacy beacon.

19. The device of claim 1, wherein said circuitry configured to store a result data that includes an output of the performed validation detection operation comprises:
    circuitry configured to store a result data that includes an output of the performed validation detection operation to detect the privacy beacon in the captured image, wherein the output of the performed validation detection operation does not match an output of a previously performed device detection operation on the captured image to detect the privacy beacon.

20. The device of claim 19, wherein said circuitry configured to store a result data that includes an output of the performed validation detection operation to detect the privacy beacon in the captured image, wherein the output of the performed validation detection operation does not match an output of a previously performed device detection operation on the captured image to detect the privacy beacon comprises:
   circuitry configured to store a result data that includes an output of the performed validation detection operation to detect the privacy beacon in the captured image, wherein the output of the performed validation detection operation indicates detection of the privacy beacon and the output of the previously performed device detection operation on the captured image indicates failure to detect the privacy beacon.

21. The device of claim 19, wherein said circuitry configured to store a result data that includes an output of the performed validation detection operation to detect the privacy beacon in the captured image, wherein the output of the performed validation detection operation does not match an output of a previously performed device detection operation on the captured image to detect the privacy beacon comprises:
   circuitry configured to store a result data that includes an output of the performed validation detection operation to detect the privacy beacon in the captured image, wherein the output of the performed validation detection operation indicates failure to detect the privacy beacon and the output of the previously performed device detection operation on the captured image indicates detection of the privacy beacon.

22. A computing device comprising:
   (a) circuitry configured to emit a capture beacon into an area, including at least:
      (1) circuitry configured to emit a capture beacon into an area that informs one or more recipient monitor devices within the area of an image capture capability of a device configured to capture a particular image, wherein the one or more recipient monitor devices are separate and apart from the computing device;
   (b) circuitry configured to receive a permission data that includes one or more permissions associated with capture of a particular image from at least one of the one or more recipient monitor devices associated with a particular entity in the area in response to the emitted capture beacon, wherein the circuitry configured to receive a permission data is configured to receive permission data from the at least one of the one or more recipient monitor devices prior to a capture of the particular image;
   (c) circuitry configured to capture, responsive to the permission data associated with the particular entity in the area, a particular image through use of a capture component; and
   (d) circuitry configured to perform a captured particular image operation related to the captured particular image.

23. The device of claim 22, wherein said circuitry configured to emit a capture beacon into an area comprises:
   circuitry configured to emit a capture beacon into an area from an image capture device configured to capture a particular image.

24. The device of claim 23, wherein said circuitry configured to emit a capture beacon into an area from an image capture device configured to capture a particular image comprises:
   circuitry configured to emit a capture beacon into an area from an image capture device configured to capture one or more particular video images.

25. The device of claim 22, wherein said circuitry configured to emit a capture beacon into an area comprises:
   circuitry configured to emit a capture beacon configured to request permission to capture an image into an area.

26. The device of claim 22, wherein said circuitry configured to emit a capture beacon into an area comprises:
   circuitry configured to emit a capture beacon into an area, the capture beacon configured to inform one or more recipient monitor devices within the area that an image was captured.

27. The device of claim 22, wherein said circuitry configured to receive a permission data that includes one or more permissions associated with capture of a particular image from at least one of the one or more recipient monitor devices associated with a particular entity in the area in response to the emitted capture beacon comprises:
   circuitry configured to receive a permission data that indicates a grant of permission to capture a particular image in response to the emitted capture beacon.

28. The device of claim 27, wherein said circuitry configured to receive a permission data that indicates a grant of permission to capture a particular image in response to the emitted capture beacon comprises:
   circuitry configured to receive a permission data that indicates a time-limited grant of permission to capture the particular image in response to the emitted capture beacon.

29. The device of claim 22, wherein said circuitry configured to receive a permission data that includes one or more permissions associated with capture of a particular image from at least one of the one or more recipient monitor devices associated with a particular entity in the area in response to the emitted capture beacon comprises:
   circuitry configured to receive a permission data that indicates a prohibition from capture of a particular image in response to the emitted capture beacon.

30. The device of claim 29, wherein said circuitry configured to receive a permission data that indicates a prohibition from capture of a particular image in response to the emitted capture beacon comprises:
   circuitry configured to receive a permission data that indicates a prohibition from capture of a particular image in response to the emitted capture beacon, wherein the prohibition is configured to expire when a particular condition is met.

31. The device of claim 30, wherein said circuitry configured to receive a permission data that indicates a prohibition from capture of a particular image in response to the emitted capture beacon, wherein the prohibition is configured to expire when a particular condition is met comprises:
   circuitry configured to receive a permission data that indicates a time-limited prohibition from capture of a particular image in response to the emitted capture beacon.

32. The device of claim 22, wherein said circuitry configured to receive a permission data that includes one or more permissions associated with capture of a particular image from at least one of the one or more recipient monitor devices associated with a particular entity in the area in response to the emitted capture beacon comprises:

circuitry configured to receive a permission data that includes a request to discard a captured image from at least one device in the area in response to the emitted capture beacon.

33. The device of claim 22, wherein said circuitry configured to receive a permission data that includes one or more permissions associated with capture of a particular image from at least one of the one or more recipient monitor devices associated with a particular entity in the area in response to the emitted capture beacon comprises:
circuitry configured to receive a permission data that includes a request to encrypt a captured image from at least one device in the area in response to the emitted capture beacon.

34. The device of claim 22, wherein said circuitry configured to receive a permission data that includes one or more permissions associated with capture of a particular image from at least one of the one or more recipient monitor devices associated with a particular entity in the area in response to the emitted capture beacon comprises:
circuitry configured to receive a permission data that includes a request to transmit a captured image to a particular location from at least one device in the area in response to the emitted capture beacon.

35. The device of claim 22, wherein said circuitry configured to capture, responsive to the permission data associated with the particular entity in the area, a particular image through use of a capture component comprises:
circuitry configured to capture, responsive to the permission data associated with the particular entity in the area, a validation detection operation to detect a privacy beacon associated with the particular entity in a decrypted captured image after receipt of the permission data.

36. The device of claim 22, wherein said circuitry configured to perform a captured particular image operation related to the captured particular image comprises:
circuitry configured to perform a captured particular image encryption operation related to the captured particular image.

37. The device of claim 36, wherein said circuitry configured to perform a captured particular image encryption operation related to the captured particular image comprises:
circuitry configured to perform a captured particular image encryption operation prior to one or more other operations related to the captured particular image.

38. The device of claim 36, wherein said circuitry configured to perform a captured particular image encryption operation prior to one or more other operations related to the captured particular image comprises:
circuitry configured to perform a captured particular image immediate encryption operation related to the captured particular image; and
circuitry configured to transfer an encrypted captured particular image to a limited access memory.

39. A first device comprising:
(a) circuitry configured to emit a capture beacon into an area;
(b) circuitry configured to receive a permission data that includes one or more permissions associated with capture of one or more particular images from at least one or more second devices associated with a particular entity in the area in response to the emitted capture beacon, the one or more second devices being separate and apart from the first device,
wherein the circuitry configured to receive a permission data is configured to receive permission data from the one or more second devices associated with the particular entity prior to a capture of the one or more particular images, including at least one of:
(1) circuitry configured to receive at least a first permission of the permission data that indicates a grant of permission to capture a first particular image in response to the emitted capture beacon;
(2) circuitry configured to receive at least a first permission of the permission data that indicates a prohibition from capture of a first particular image in response to the emitted capture beacon;
(3) circuitry configured to receive at least a first permission of the permission data that includes a request to discard a captured first image from at least one device in the area in response to the emitted capture beacon; or
(4) circuitry configured to receive at least a first permission of the permission data that includes a request to encrypt a captured first image from at least one device in the area in response to the emitted capture beacon;
(c) circuitry configured to capture, responsive to at least a second permission of the permission data associated with the particular entity in the area, a second particular image through use of a capture component; and
(d) circuitry configured to perform a captured second particular image operation related to the captured particular image.

* * * * *